United States Patent [19]

Gundersen et al.

[11] 3,795,771

[45] Mar. 5, 1974

[54] PASSENGER ENTERTAINMENT/PASSENGER SERVICE AND SELF-TEST SYSTEM

[75] Inventors: James L. Gundersen, Carson; Richard L. Julian, Pacific Palisades; Thomas J. Kosco, Harbor City; Dan E. Lewis, Culver City; Richard E. Sklar, Los Angeles, all of Calif.

[73] Assignee: Hughes Aircraft Company, Culver City, Calif.

[22] Filed: May 15, 1970

[21] Appl. No.: 37,832

[52] U.S. Cl. .......... 179/15 A

[51] Int. Cl. .......... H04j 3/04

[58] Field of Search .......... 79/15 A, 15 AT, 15 AL, 15 BY, 79/15 BF

[56] References Cited

UNITED STATES PATENTS

| | | | |
|---|---|---|---|
| 3,585,307 | 11/1971 | Greenberg | 179/15 BF |
| 3,585,595 | 6/1971 | Slavin | 340/163 |

*Primary Examiner*—Ralph D. Blakeslee
*Attorney, Agent, or Firm*—James K. Haskell; Joseph P. Kates

[57] ABSTRACT

A time multiplexed passenger entertainment and service combined system suitable for distribution throughout compartments of super airplanes. Common power supplies, cabling, and boxes, and hybrid microelectronics and/or medium or large scale MOS-FET integrated circuit chips are employed. A main multiplexer receives passenger address or tape deck analog signals and converts them to a pulse code modulated digital bit stream which is time shared between channels. A coaxial cable transmits the bit stream to compartment submultiplexers. Each submultiplexer receives the digital bit stream, optionally inserts into the bit stream bits representing analog-to-digital converted movie audio or compartment introduced passenger address and distributes the data stream along four columns of seat group units on individual column coaxial cables. At each seat group unit a demultiplexer of a seat group demultiplexer/encoder converts the bit stream into the original analog signals, amplifiers the analog signals and drives individual seat transducers for passenger listening. A passenger control unit provides channel and volume level selection. The passenger service system provides control functions comprising reading light, stewardess call (aisle and control panel lights and chimes). The service system comprises a section timer/decoder to generate binary logic pulses which are transmitted by cable sequentially down and up the seat columns from seat group unit to seat group unit. A similar cable connects the corresponding overhead unit containing the reading lights, etc. to the section timer/decoder. The seat encoder of each seat group demultiplexer/encoder receives digital interrogating signals, processes them relative to switch positions determined by the passenger and sends out results to the section timer/decoder. The overhead decoder of each seat group receives the retransmitted digital signals from the section timer/decoder and performs switching functions conforming to seat encoder commands. The system incorporates a self-test subsystem comprising a test signal generator and circuits operating in conjunction with the entertainment and service system circuits.

12 Claims, 62 Drawing Figures

INVENTORS.
JAMES L. GUNDERSEN,
RICHARD L. JULIAN,
THOMAS J. KOSCO,
DAN E. LEWIS,
RICHARD E. SKLAR,
BY Joseph P. Kates
ATTORNEY.

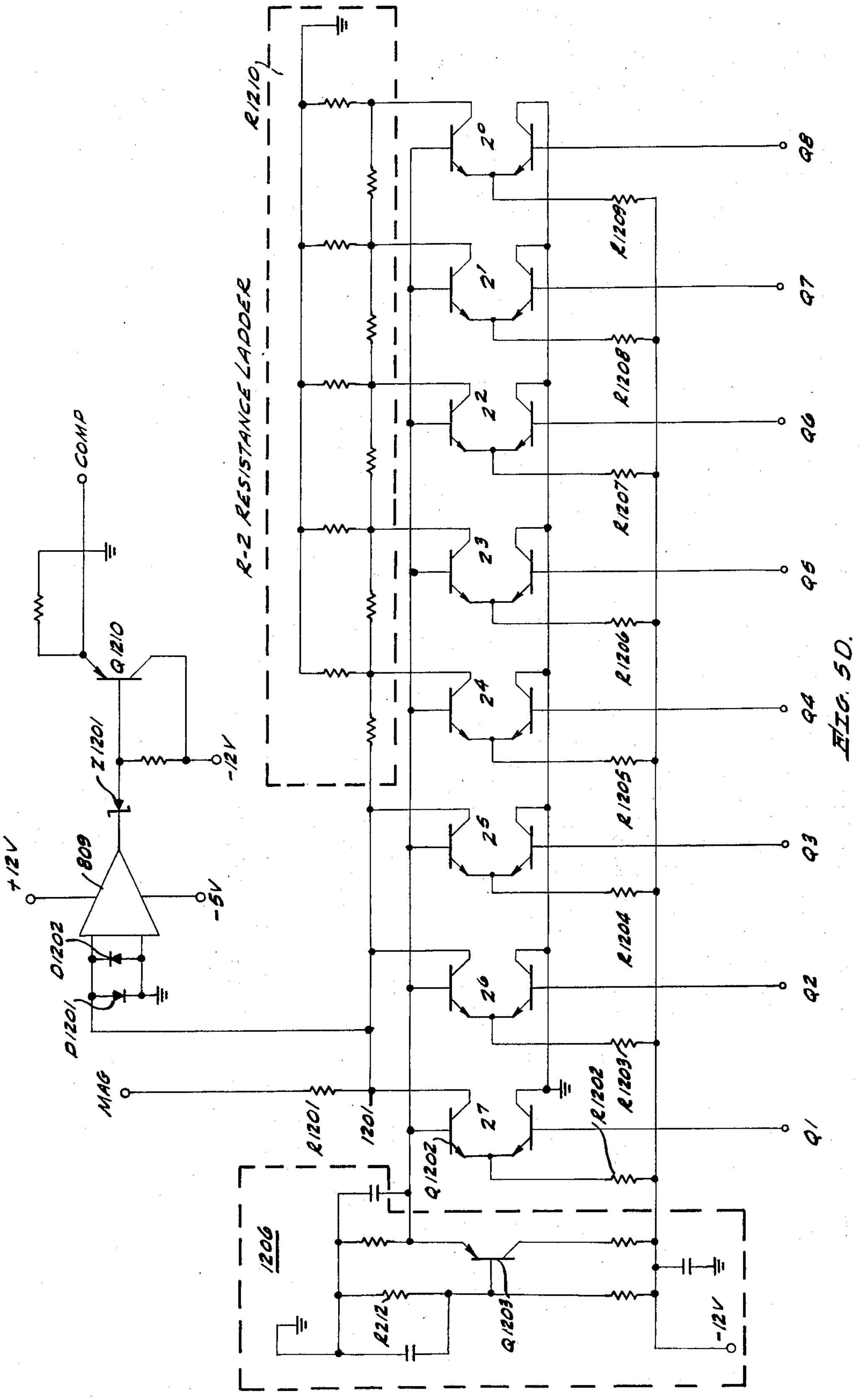
FIG. 5D. D/A LADDER

PATENTED MAR 5 1974 3,795,771

SHEET 13 OF 59

FIG. 6A2

| FIG. 6A1 | FIG. 6A2 |
|---|---|

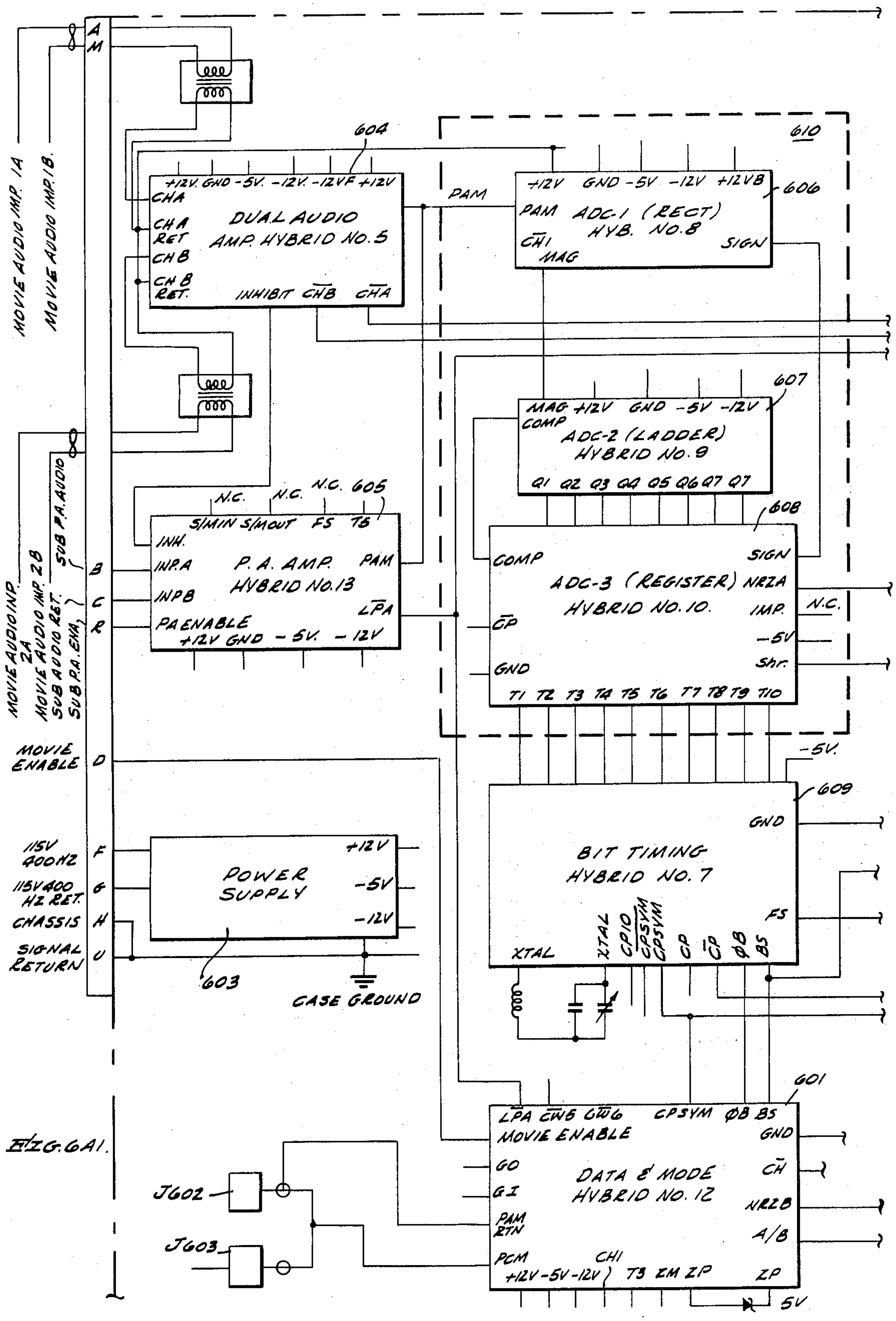
FIG. 6A1.

COMPARATOR, DATA DETECTOR & CP SEPARATOR

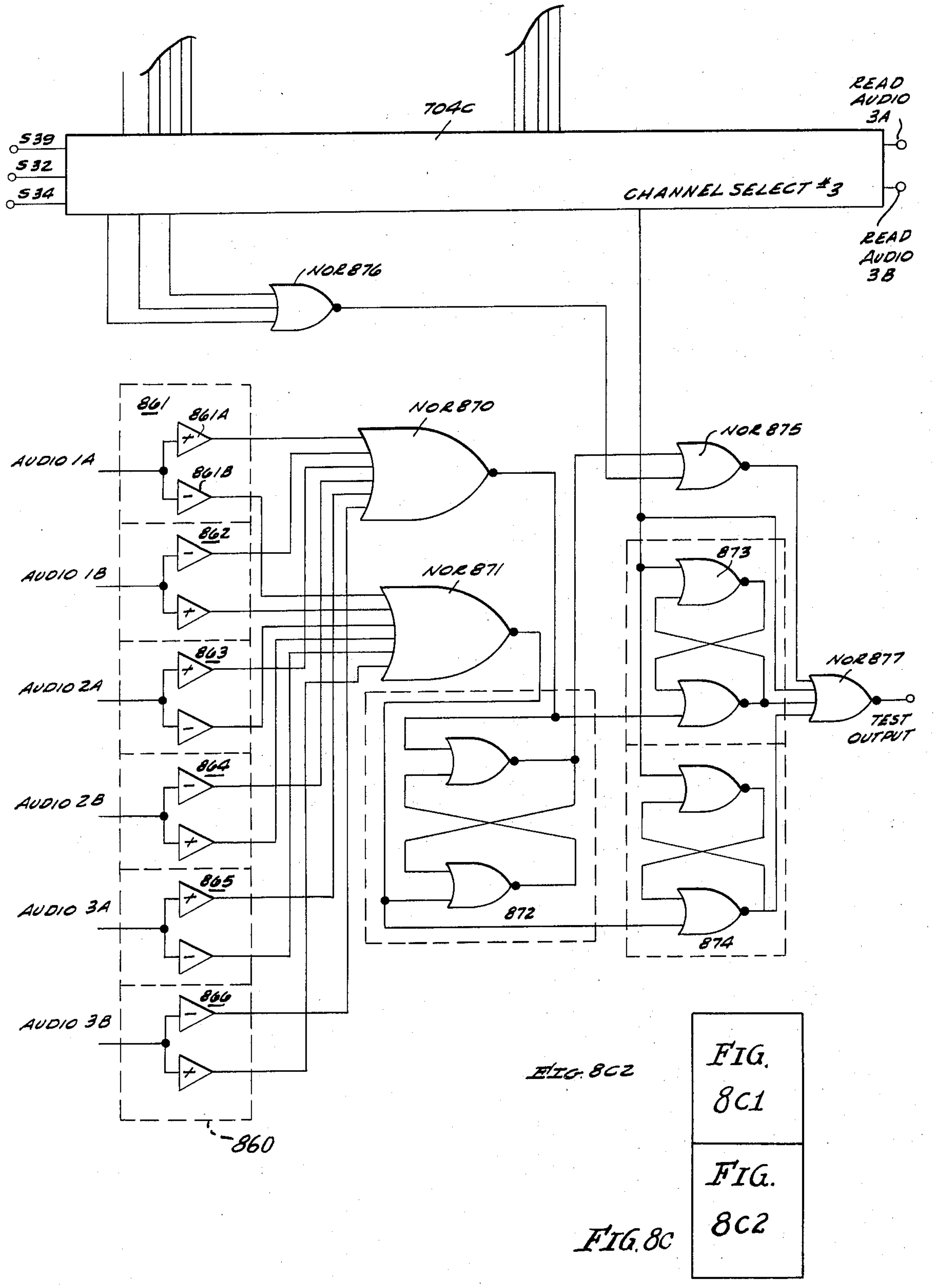
FIG. 8C2 FIG. 8C

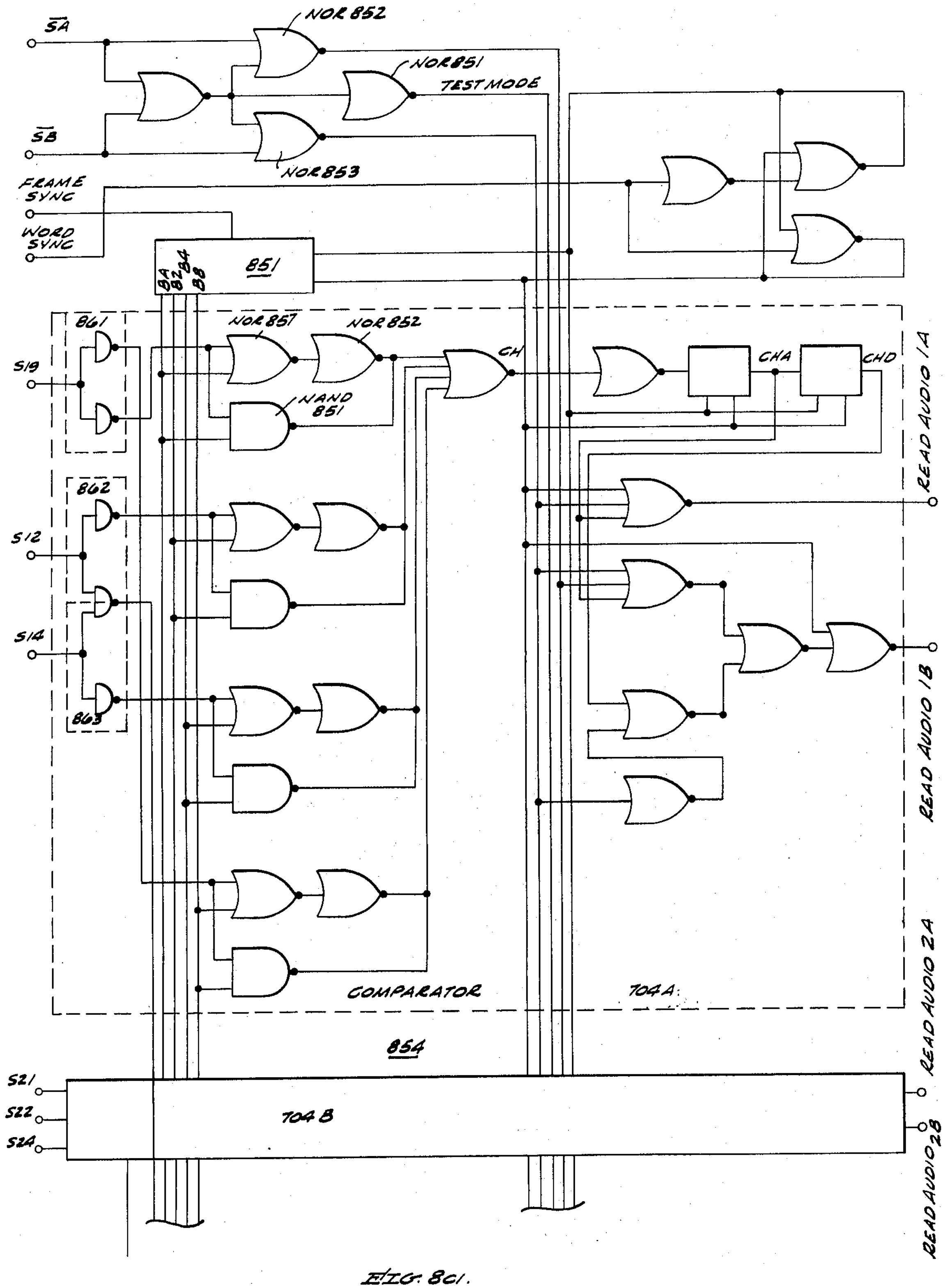
FIG. 8C1.

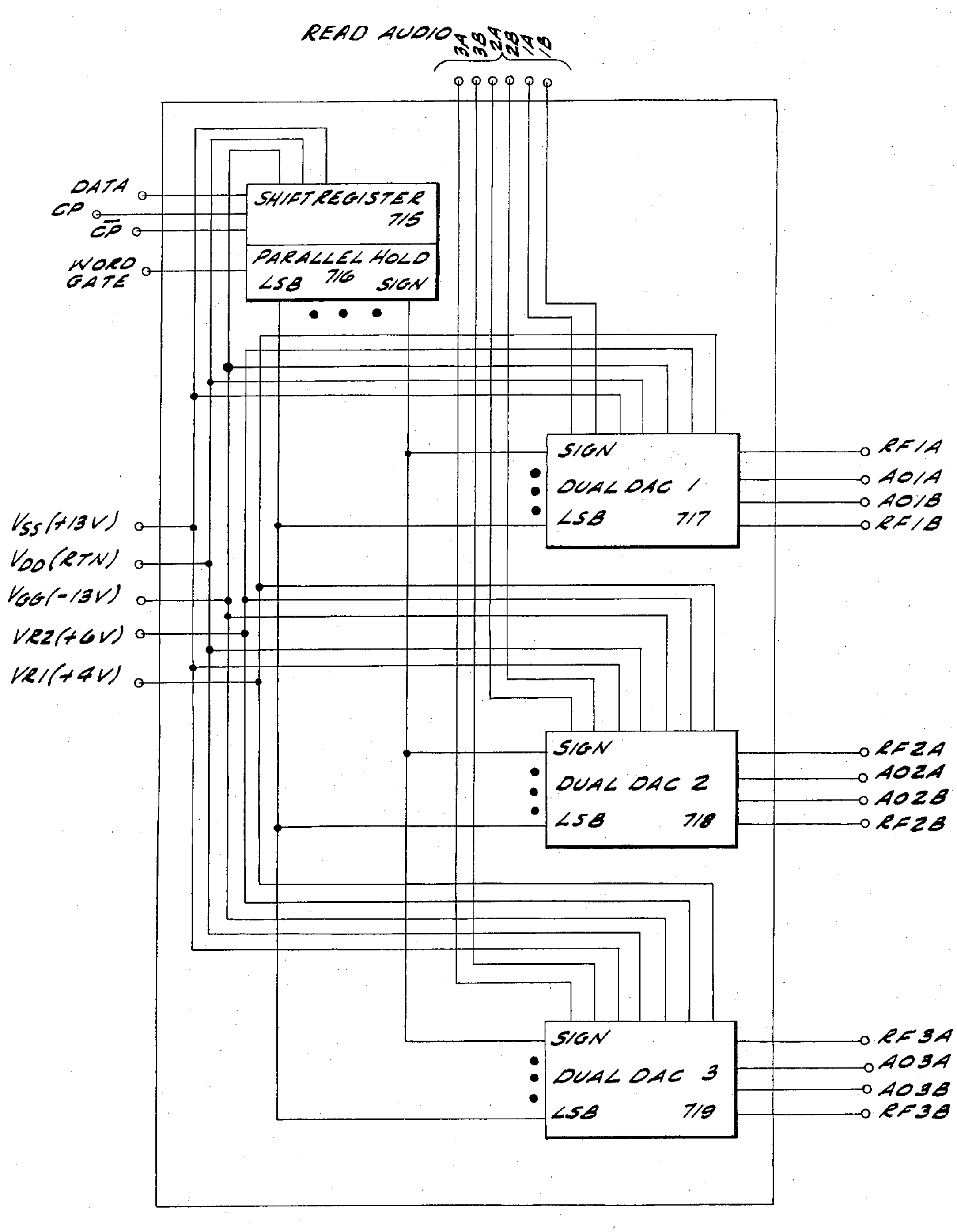
FIG. 8.D.

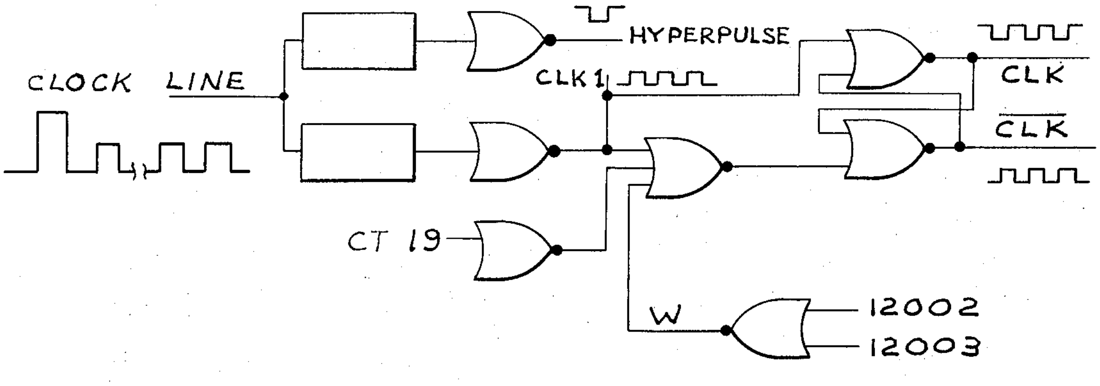
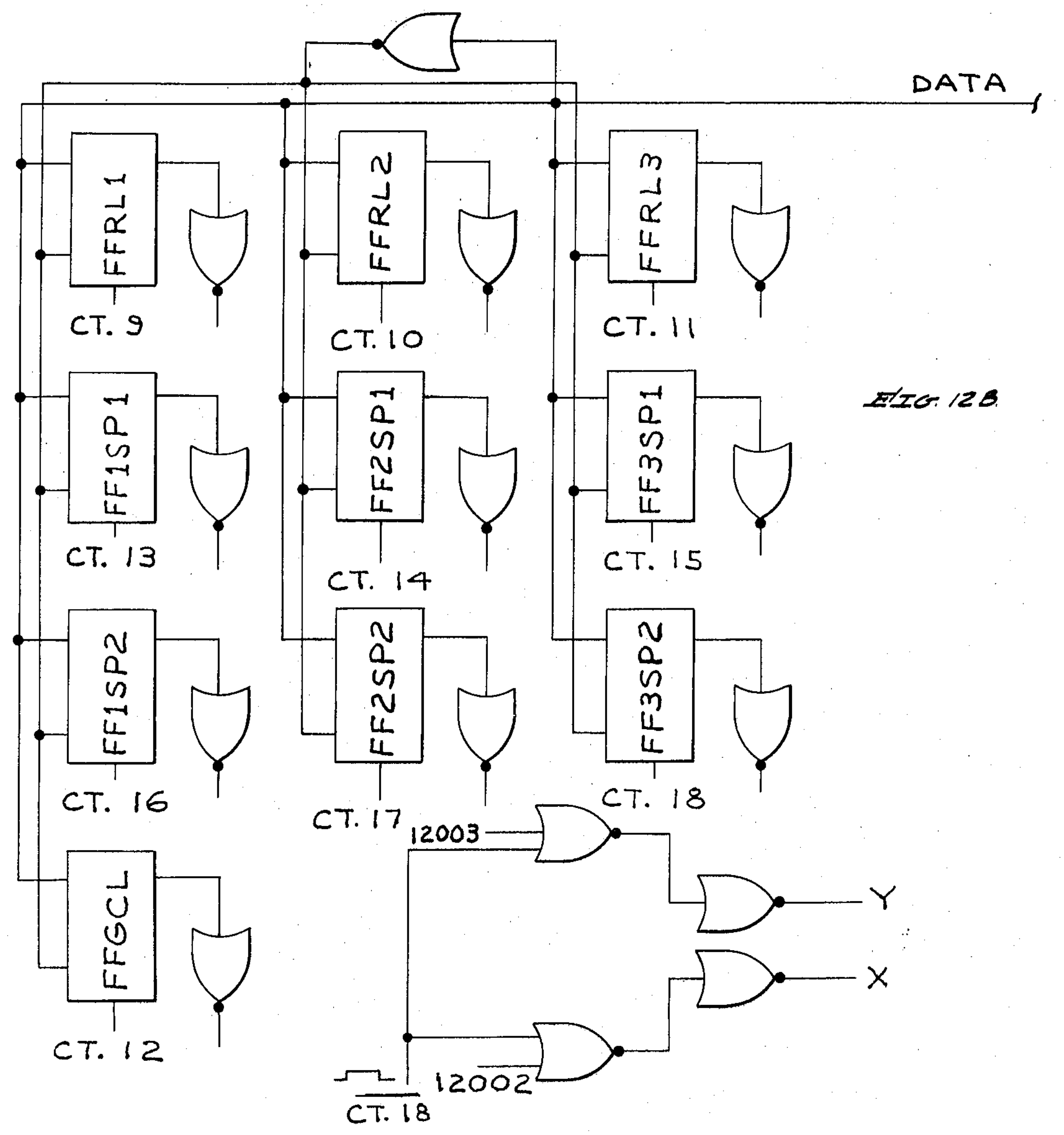
FIG. 12B

SEAT ENCODE TIMING

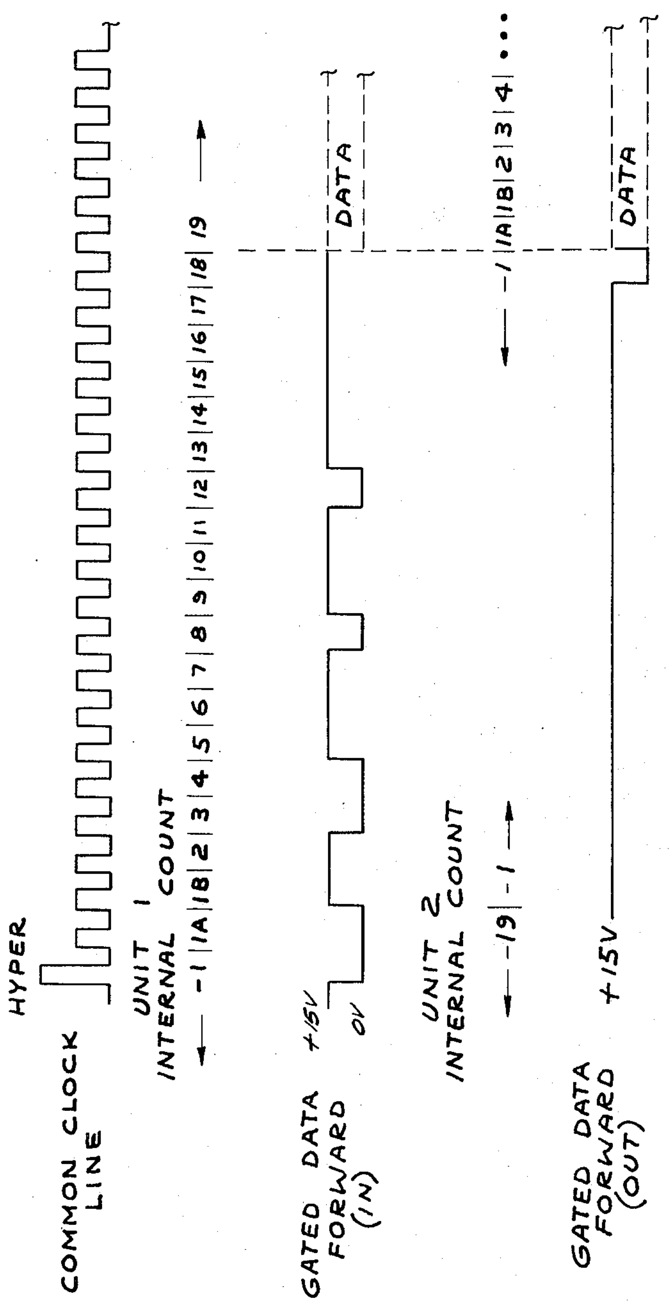
FIG. 15 SEAT ENCODER SYSTEM TIMING

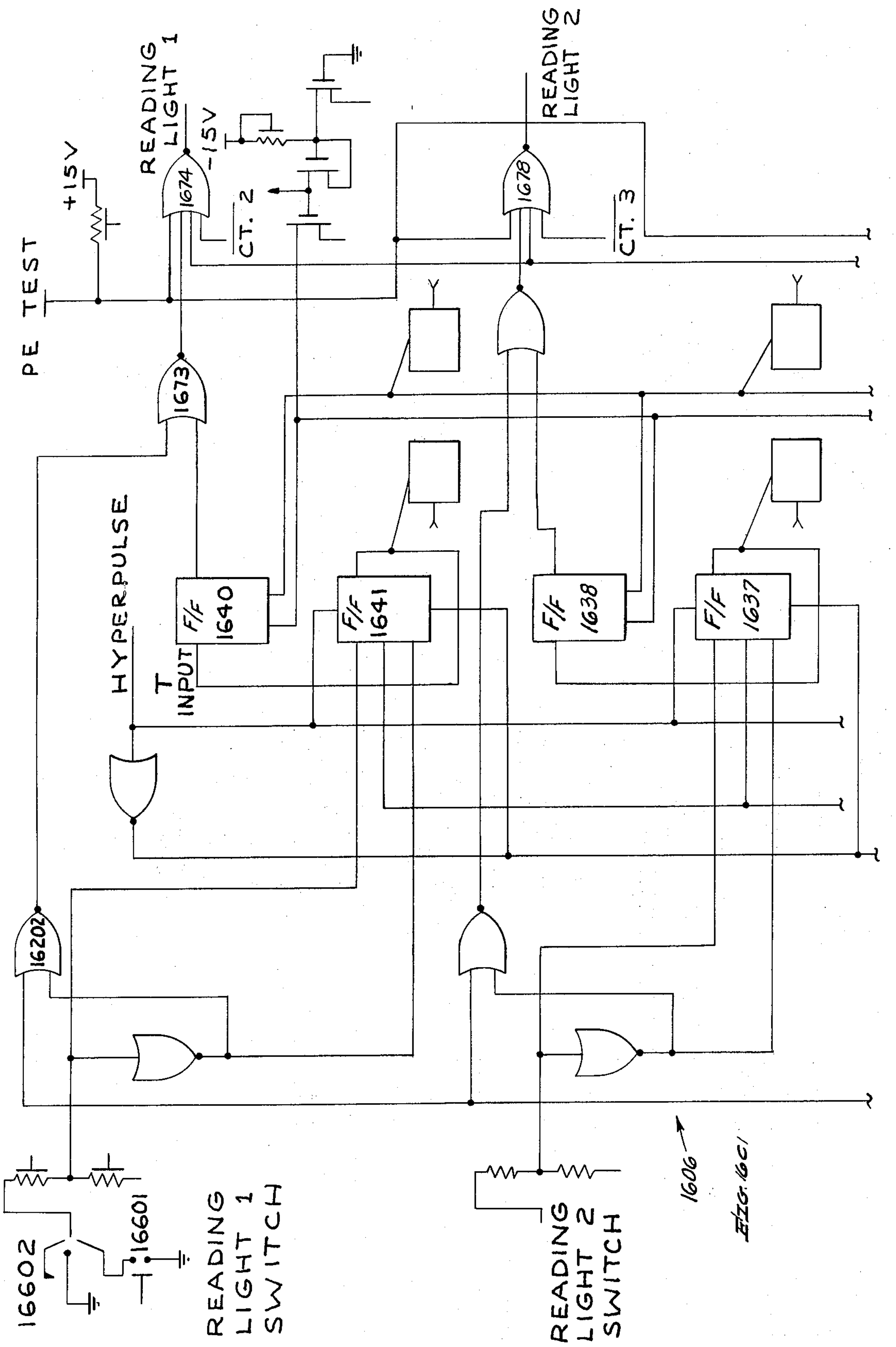
FIG. 16C1

OVERHEAD DECODER TIMING

LOGIC UNIT

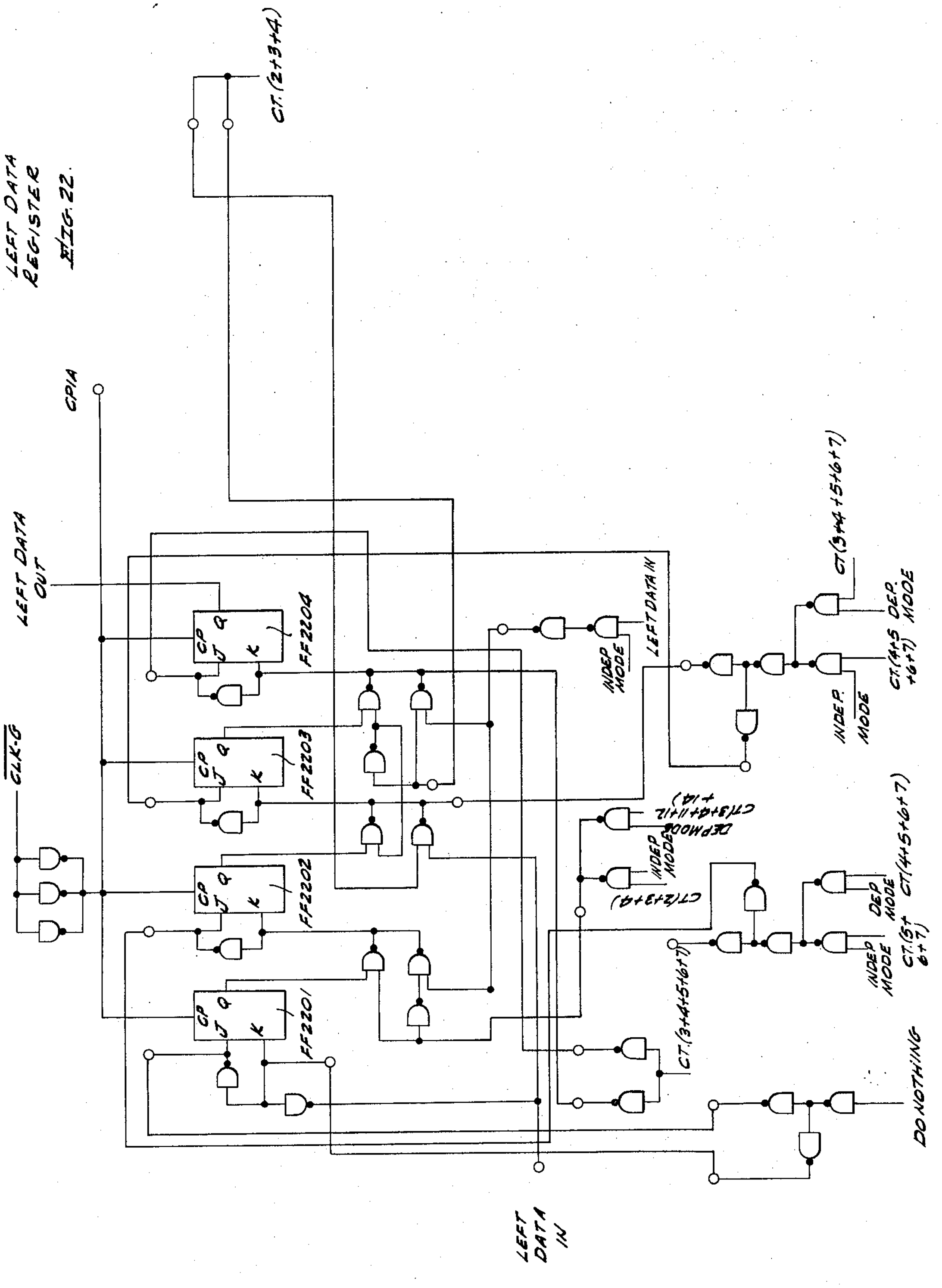
LEFT DATA REGISTER FIG. 22

RIGHT REGISTER
INBOARD - 3 SEATS
SINGLE COLUMN

PASSENGER ENTERTAINMENT/PASSENGER SERVICE AND SELF-TEST SYSTEM

BACKGROUND OF THE INVENTION

1. Field of the Invention

The present invention relates to a passenger entertainment and service system suitable, for example, for vehicles such as super passenger aircraft. More particularly, the invention relates to such a passenger entertainment and service system wherein there is provided multichannel multiplex distribution means and a simple harness, which employs digital data transmittal, wherein hybrid or complex monolithic circuits comprising medium or large scale MOSFET integrated circuit chips are employable, which utilizes sophisticated but practical time multiplexing for distribution of signals throughout passenger compartments, wherein the entertainment and service subsystems utilize common power supplies, cabling, and boxes, and wherein passenger or operator selectable as applicable stereophonic and monaural recorded musical programs, passenger address, movie film entertainment, passenger operable remote reading light, stewardess call and provision for other desirable functions are incorporated.

2. Description of the Prior Art

Conventional hardwired prior art entertainment and service systems for vehicles including aircraft utilize a complex harness and simple electronics. Such service systems consist of lights and switches operated off the aircraft power supply. Additional service is normally provided by the passenger's vocal request to the stewardess as she walks up or down the aisle. Button buzzer service request has also been provided in vehicles. Such systems do not provide sufficient passenger entertainment, passenger address, passenger service and operability insurance functions. If hardwired conventionally, such a system, to be adequate particularly for super passenger airplanes, even if such a system were available, would impose weight and performance penalties which would be untenable from an economic viewpoint. A basic rule of thumb for commercial aircraft states that each pound of excess (nonrevenue) weight has a value of approximately $100.00. Additionally, the task of servicing such a complex hardwired communications installation is so difficult as to render such systems unrealistic.

Requirements for fidelity of reproduction, for sufficient passenger selection and volume adjustment, for variety of entertainment, for realistic equipment servicing, for more rapid passenger service, for simplifying work by attendant personnel and for alerting such personnel, for data transmittal, for realistic self-test of the entire passenger entertainment and service installation, for high signal-to-noise ratio; and the need for substantial reduction of ill effects from radio interference and crosstalk, and for fewer and simpler equipment with lesser harness requirements for its performance impose severe constraints and problems. The present invention presents solutions for these problems and overcomes these and other disadvantages of the prior art.

SUMMARY, ADVANTAGES AND OBJECTS OF THE INVENTION

The system of the invention comprises a pulse code modulated entertainment and service system integrally incorporating self-test circuitry and mechanisms, wherein is provided sophisticated means to time multiplex many channels of audio onto one coaxial cable, to decode and select the transmitted intelligence of a monaural or stereophonic pair of channels at each passenger seat, to provide (1) passenger address override of first priority from a main station and of next priority from each of the plurality of substations, (2) local substation movie audio, (3) passenger-to-attendant call, reading light switching, and additional optional passenger service functions. The system comprises a readily serviced relatively simple communications and service system utilizing multichannel, multiplex signal distribution means, digital circuits, simple harness and complex but practical electronics with adaptability for incorporation of complex monolithic circuits, for example, medium or large scale MOSFET integrated circuit chips, and/or hybrid microelectronic circuits, and employs means to utilize common power supplies, cabling, and boxes. The system provides for optimum word length (effectively 10 bits), preemphasis, deemphasis, filtering, frequency range, and responsive mechanisms for optimum economical yet faithful reproduction of recorded tape or other audio transmitted programs, either stereophonic or monaural; provides passenger channel selection and volume adjustment means, and means for inserting the above-mentioned overriding passenger address and the audio portions of a movie film as selected or determined by the crew and/or passenger. The system provides means to distribute the entertainment signals on a single subminiature coaxial cable. The system of the invention incorporates in an optimum configuration, entertainment, service, automatic and manual test and diagnostic features in basic units, portions of which perform sole, dual, and multiple functions as most practically integrated. The basic units of themselves are replete with inventive features both singly and in combination, which are too numerous to enumerate in this section but which will be brought out in the description and claims hereinbelow. The basic entertainment subsystems units comprise a main multiplexer, compartment submultiplexers, the demultiplexers of seat demultiplexer/encoders for respective seat groups, and passenger control units in each passenger's seat arm rest which enable channel selection and volume level adjustment. The service subsystem provides means to switch reading lights which may be beyond reach of passengers, means to initiate attendant calls remotely, other optional service function capability and seat aisle and control panel visual and sound attendant alerting means. The basic service subsystem units comprise (1) section timer/decoders to generate necessary binary pulses for unique "daisy chain" rearward and forward seat group by seat group sequential transmission along columns of seat groups in a simple cable configuration and connection, (2) the encoders of the seat demultiplexer/encoders to receive digital interrogating signals and process them and means to send the results to the section timer/decoder, (3) overhead decoders correspondingly physically disposed above the seat groups retaining seat demultiplexer/encoders and responsive to transmitted digital signals from the encoder portions via the section timer/decoders to perform necessary switching functions, and (4) passenger control units to initiate commands for reading light service, call functions and spares. The invention provides circuits wherein a high fidelity, low noise, sampled data audio system of optimum listener acceptability is achieved. Other features provided comprise means to isolate faults to individual line replaceable units, optimum arrangement and capability for freedom from electromagnetic interference, a configuration and circuits for optimum time-division pulse-code-modulation with good frequency response in each channel, proper preempahsis, filtering, dynamic range, provision for economical yet effective immunization from quantization noise effects, good signal-to-noise ratio and power output, provision for operation by submultiplexers if the main multiplexer fails, digital time-multiplexed approach for service functions, fine passenger control unit functionability and lighting and sound recognition capability, seat configuration flexibility, and means to enable ready replacement of throw-away line modules or units.

The system of the invention enables the passenger to select audio channels and volume level as well as to initiate requests for passenger service to the stewardess by push button and to switch on and off individual passenger lights.

In large aircraft, such as the Douglas DC-10, it is not possible or feasible for the passengers to reach overhead to operate reading light switches or stewardess call switches. Therefore, these functions are performed remotely from the armrest unit. The passenger service subsystem enables individual reading light control, and individual stewardess call.

The passenger entertainment and service system is of comparatively low weight and cost, yet is built to perform effective data transmission functions with appropriate signal conditioning at both ends of the signal transmission paths. The entertainment and service subsystems are structured to possess the functional advantages of both independent and interdependent interrelated subsystems. The entertainment subsystem provides multichannel, high fidelity transmitted audio data. The service subsystem provides ONE-ZERO digital data. The system provides multiplexing of both the passenger entertainment and passenger service functions, with combined electronics of both entertainment and service subsystems in the seat demultiplexer/encoder, a separate entertainment and data harness with sharing of power wires, pulse code modulated time-division multiplexing of entertainment data and digital time division multiplex of service data. In the pulse code modulation (hereinafter abbreviated "PCM") system, the signal-to-noise requirement determines the quantization level that must be achieved. The invention provides sampling at three times per cycle of the highest frequency of the input analog signals to allow the PCM system to track the input amplitude with fidelity. The PCM system provides reliable, predictable performance without potential drift, crosstalk and tuning problems of FM (frequency modulation); without the noise, reflection, and crosstalk sensitivity of pulse amplitude modulation, and at a lower transmission bit rate than delta sigma modulation techniques. The inventive system has high noise immunity due to the fact that ground noise or pickup on the coax transmission line is eliminated prior to data demodulation and therefore does not appear at the reconstructed audio output. The data line is handled differentially to eliminate common mode noise and the signal levels are sufficient to exceed any projected differential noise levels. The inventive PCM system achieves substantially complete freedom from adjacent channel crosstalk by using a separate digital-to-analog converter for each channel. Because each decommutator channel is fed from a static register, there is no channel-to-channel coupling in the sensitive demodulation process. At the analog commutators in the main and compartment multiplexers, the crosstalk problem is minimized by allowing adequate settling time prior to analog-to-digital conversion.

The transmitted PCM waveform is Manchester-coded (split-phase coded) which restricts the data spectrum to a range wherein frequency components close to the ADF system band of frequencies (0.2 to 1.8 MHz) are of sufficiently low level that the shielding effect of the coax prevents spurious RF interference with the ADF system.

The inventive system minimizes the effect of noise sources such as bit quantization, aliasing, crosstalk, and harmonic distortion. The system approach is to strip out the selected channel as a digital word and transfer it to both a separate hold register and a separate digital-to-analog converter for each output channel. The power supply audio outputs have high noise rejection to eliminate the place where crosstalk elements could enter the system. In the inventive system aliasing or music tinniness distortion is minimized by rapidly rolling off the baseband (audio) data beyond the frequencies of interest and by sampling at a sufficiently high frequency, e.g., 3 × 10 KHz (kilohertz) in the illustrative embodiment. A notch filter at one-half the channel sample rate, e.g., 15 KHz, is added also to assure minimization of the aliasing effect. The quantization noise effect that results due to the granularity of a PCM system is optimized by providing dynamic range for the multiplex system of 55 decibels to maintain the signal-to-noise ratio in terms of the source material noise above 55 decibels and allow for input level adjustment error as well as enabling handling of peak music transients without clipping. The 55 decibels (db) requirement is met in the present system by providing an effective resolution of greater than 9 bits, for example, 10 bits. Furthermore, the use of a sample rate of 30 KHz/channel (at least twice the maximum signal frequency) insures adequate fidelity for a 10 KHz audio response. Preemphasis of the high frequencies to compensate for natural roll-off of the pneumatic head set and provide greater signal-to-noise margin at higher frequencies is provided by preemphasis circuits in the main multiplexer and submultiplexers. The preemphasis, provided with corresponding deemphasis at the demultiplexer, improves system signal-to-noise ratios. The deemphasis also provides flat frequency response. Override mode detection circuits in the submultiplexer prevent or enable the submultiplexer to add local audio. Simplicity is provided by use of a successive approximation analog-to-digital conversion. Simple analog-to-digital converter means provides reliability and achieves wire reduction. Low pass filter means are optionally addable either in the demultiplexer/encoder or in the passenger control unit. Sampling rate and effective 10 bit analog-digital conversion of each sample enables a frequency response from 50 Hz to 10KHz at a signal-to-noise ratio of better than 55 db.

The passenger service area sectional service subsystem provides control by a section timer/decoder to provide required synchronization, timing and control of all seat encoders and corresponding overhead decoders. The seat encoder provides data encoding of a passenger request such as reading light, attendant call or spare. The overhead decoder provides corresponding decoding to turn on the proper reading light. The section timer/decoder decodes the attendant call data, pulses the attendant call chime and turns on or off the appropriate set of master call lights by area. The seat encoder also controls turning on and off of aisle call lamps. Each section timer/decoder operates independently. Seat generated data is transmitted to the overhead decoders by serial, successive interrogation of each seat encoder-overhead decoder pair on two data lines and a single signal return. One of the data lines (common clock) and the signal return line are common to all units in a column, while the other data line (gated data) is serially switched into a seat encoder (or overhead decoder). After interrogation of that seat group, the signal is switched on through to the next seat encoder and overhead decoder, etc. Individual seat encoders and overhead decoders are provided with bidirectional "gated-data" switches, which allows section timer/decoder interrogation from either end of a service area.

In the service subsystem, common clock/gated data configuration is provided with a common clock line and a gated data line interconnecting the section timer/decoder with a column of seat encoders. A common clock line and a gated data line also interconnects the section timer/decoder with a corresponding column of overhead decoders. Clock lines to the seat encoders and overhead decoders are common to all seat encoders and all overhead decoders, respectively. Information appearing on these lines is simultaneously received by all units attached. Serial connection of seat encoders or overhead decoders cause the internal bidirectional digital buffers to become the interconnecting elements of the gated data line. Bidirectional digital buffers allow the section timer to drive either end of the column string, thus adding to the flexibility of the passenger service system. Means are provided such that if the bidirectional digital buffer is disabled, no signal is allowed to pass through this element.

The section timer/decoder samples each group encoder in series disabling the seat encoder/overhead decoder combination at the end of the sample interval and permitting the next seat encoder/overhead decoder combination to be sampled until all seat groups have been serviced. A synchronizing (sync) pulse appearing on the common clock line simultaneously disables all bidirectional buffers and resets all the basic timing control counters in the seat encoders and overhead decoders, enables the input/output gates of the seat encoder and enables the input gates of the overhead decoder. THis allows the seat encoder or overhead decoder to receive information from the gated data line and allows the seat encoder to transmit information onto this line.

In the service subsystem, the common clock/gated data optimum method for monitoring and controlling the seat encoders and overhead decoders provides simplicity and requires only one common clock wire and one signal ground to interface with each column of overhead decoders and seat encoders.

The invention features a built-in self-test feature to allow quick and thorough testing of system performance wherein both the digital circuits and analog power stages of the seat demultiplexer/encoder are tested and testing is also provided of seat unit call lights and other service features. The test mode is entered by a main multiplexer input switch that forces a known pattern of digital data down the coax to the submultiplexers in an override mode. This pattern is retransmitted to individual seat demultiplexers where at the audio outputs the reconstructed test pattern appears to generate a signal which is ORed into the call light and reading light inputs of the passenger service seat encoders. The seat encoder then processes these service inputs, turns off the aisle and passenger control unit call lights, and the call and reading light information is transmitted back to the section timer/decoder where the master call lights are turned off. The section timer/decoder retransmits the reading-light information to the overhead decoders, where all the reading lights are turned off. Incorporation of these and other self-test features thus allows completed testing (including the audio power output stages) and fault isolation of all elements of the system at a small cost with a simple preempt and logic network.

Accordingly, an object of the present invention is to provide a time multiplexed passenger entertainment and service combined system having self-test features suitable for distribution throughout compartments of super airplanes or other vehicles adapted to carry many passengers which may number hundreds of passengers.

Another object of the invention is to provide a readily tested combined passenger entertainment and service system employing common power supplies, cabling, boxes, adaptable to hybrid microelectronics or medium or large scale integrated circuits having improved analog-to-digital and digital-to-analog conversion techniques and wherein passenger control provides readily controllable channel, volume level, and passenger service options.

Another object of the present invention is to provide a passenger entertainment, service and self-test system wherein there is provided multichannel multiplex distribution means, a simple harness, which employs digital data transmittal, and practical time multiplexing for distribution of entertainment, passenger address override and movie audio as well as remote reading light, stewardess call and other desirable functions and which system provides optimum fidelity, economy, entertainment and service, without unduly loading down the vehicle but rather providing weight and space savings, and which provides automatic and manual and diagnostic test features.

The above-mentioned and other features and objects of the present invention will be apparent by reference to the following description taken in conjunction with the accompanying drawings in which:

BRIEF DESCRIPTION OF THE DRAWINGS

FIG. 2 is a block diagram illustrating units and interconnections of the system of FIG. 1 involved in entertaining and servicing individual passengers of a section of a compartment and wherein is shown a tape deck, the main multiplexer, the submultiplexer of the first compartment in which by way of illustration, passengers who may request service or entertainment or are being serviced or entertained may be seated and a column of seat group demultiplexer/encoders associated with the corresponding seat group units in one of the columns of seat group units serviced by a section timer/decoder, a passenger control unit for each of the seat group demultiplexer/encoders illustrated whereby the passenger requests service, light or desired channels of incoming entertainment, the section timer/decoder for the illustrated seat group unit column, the overhead decoders associated with the demultiplexer/encoder of a seat group unit, an aisle, master call light and chimes to visually inform and audibly alert the stewardess that a passenger has requested service, the individual passenger reading lights, and further illustrates the remote self-test switching unit;

FIG. 3 comprises FIGS. 3A and FIG. 3B placed side by side with FIG. 3A to the left and FIG. 3B to the right, and together form a composite block and schematic diagram of the main multiplexer module of the preferred illustrative embodiment of FIG. 1, wherein:

FIG. 3B is a partially block and partially schematic diagram of the Manchester generator, channel timing, main multiplexer passenger address amplifier, stereo/-mono switching, power supply, self-test and output units and of the wiring interconnection thereamong and to and from the passenger address, remote self-test switching, main PCM calbe and submultiplexer units;

FIGS. 4A, 4AA, 4B, 4C, 4D and 4E comprise operational, timing, and waveform system diagrams explanatory of the detailed structure and operation to perform the required functions of the units of the main multiplexer and of the submultiplexers of the illustrative embodiment system, and wherein:

FIG. 4A is a partially block and partially schematic diagram of the dual audio amplifiers, one of the amplifiers being shown in sequentially operating detail, and further illustrates the function of its output with those of the remainder of the dual audio amplifiers to provide the pulse amplitude modulated output fed to the A/D converter in the main multiplexer module of the illustrative embodiment system;

FIG. 4AA is a timing diagram illustrative of the times and periods for sequential channel sampling in the dual audio amplifiers of FIG. 4A;

FIGS. 5A, 5B, 5C, 5D and 5C are schematic diagrams of individual units of the main multiplexer module of the illustrative embodiment system of FIG. 1 wherein:

FIG. 5A is a schematic and partially block representation of one of the dual audio amplifier channels;

FIG. 5B is a schematic representation of the passenger address amplifier circuit of the main multiplexer representation of FIG. 3B;

FIG. 5C is a schematic diagram of the rectifier circuit of the analog-to-digital converter of FIG. 4C;

FIG. 5D is a schematic diagram of the ladder circuit of the analog-to-digital converter of the main multiplexer of FIG. 3A;

FIG. 8AA is a timing diagram wherein the encircled numbered individual waveforms represent PCM, CPFS and data waveforms appearing at corresponding encircled numbered points of FIG. 8A;

FIG. 8BB is a waveform and timing diagram of the timing unit of FIG. 8B;

FIG. 8CA is a waveform and timing diagram of the channel select unit of FIG. 8C;

FIG. 8DA is a logic diagram of the shift and parallel hold circuit in the shift register, hold register and digital-to-analog converter unit of FIG. 7;

FIG. 8DB is a partially logic and partially schematic diagram of a dual digital-to-analog converter of the shift register, hold register and digital-to-analog converter unit of FIG. 7;

FIG. 8DC is a waveform and timing diagram for the units of FIG. 8D, 8DA and 8DB;

FIG. 8DD is a partially block and partially schematic diagram of one of the dual power amplifiers of FIG. 7;

FIG. 8DE is a partially block and partially schematic diagram of a second illustrative embodiment of one of the dual power amplifiers of FIG. 7;

FIGS. 12A and 12B form a combined logic diagram of the overhead decoder circuit of the illustrative embodiment;

FIG. 15 is a timing waveform representation of the seat encoder system timing for the preferred illustrative embodiment of FIG. 1 and illustrating the hyperpulse and ensuing timing pulses for the internal count, the gated data forward in and the gated data forward out pulses for the seat encoder system timing of the illustrative embodiment;

FIG. 16 is a diagrammatic representation of the interfitting blocks of the service system for the seat encoder circuitry of the illustrative embodiment of FIG. 1 taken in the arrangement as illustrated and wherein:

FIG. 22 is a logic diagram illustrating the logic of the left data register of the section timer/decoder of FIG. 18;

DESCRIPTION OF THE PREFERRED EMBODIMENTS

Figure 1:
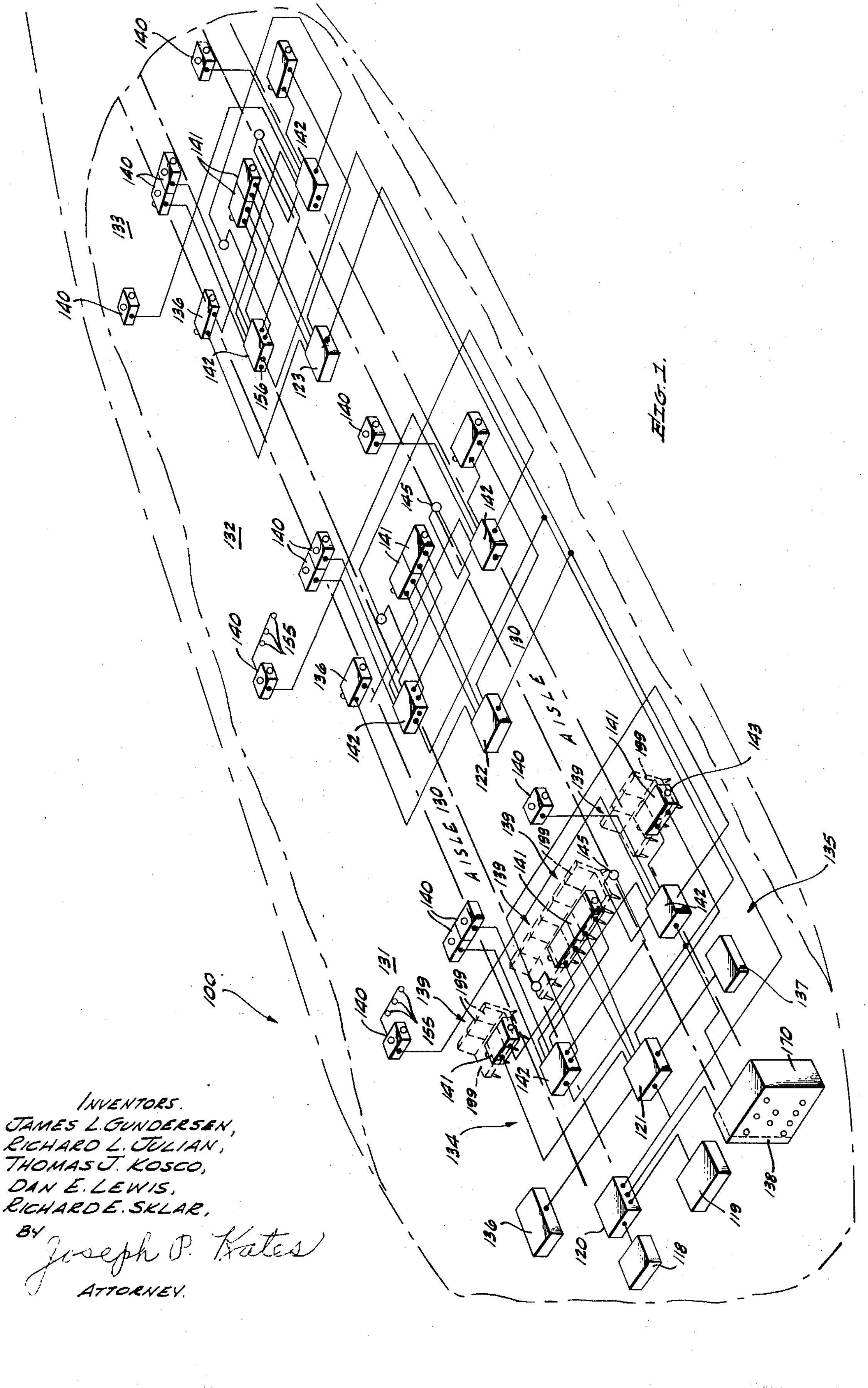
FIG. 1 is a block, schematic, and partially pictorial fanciful representation of a first illustrative embodiment of the passenger entertainment and service system incorporating self-test of the present invention illustrating an aircraft comprising three compartments, each of which is divided into two sections, each section comprising two columns of seat row group units separated by an aisle, and wherein is further illustrated units comprising a multi-channel audio tape deck, coaxial and overhead electrical cable interconnections, a self-test initiating unit comprising a remote test switching unit, an aircraft main multiplexer, a submultiplexer for each of the compartments, a demultiplexer/encoder and a corresponding overhead decoder for each seat row group unit, each of the compartments comprising an inboard two-column and an outboard two-column seat row group unit timer/decoder, an aisle reset call switch and light for each seat group unit, and master call light and chime means to alert attendant(s) in each section.

Refer to FIG. 1. An exemplified aircraft physical configuration and distribution of the passenger entertainment and passenger service system with self-test features of the present invention is therein illustrated. The aircraft generally designated 100 comprises a first compartment 131, a second compartment 132, and a third compartment 133. Each of the compartments 131, 132 and 133 are divided into sections 134 and 135 (numbered in compartment 131 only). Each of the sections 134 and 135 has an aisle 130. Along each of these aisles 130 on either side is disposed a column of seat groups 139 of seats 199 shown in the first compartment 131 only. A column may, for example, comprise 31 seat groups 139. Fewer seat groups may be provided in a column. Seat groups 139 may each consists of one, two or three passenger seats 199. For each of the seat groups 139 there is provided a seat group demultiplexer/encoder 141 (the seat group primary electronics package). Mounted over each seat group 139 (and its seat group demultiplexer/encoder 141) is a corresponding overhead decoder 140. Compartment 131 is provided with a submultiplexer 121. Compartment 132 is provided with a submultiplexer 122. Compartment 133 is provided with a submutliplexer 123. Each of compartments 131, 132 and 133 is provided with two section timer/decoder units 142, one for the passenger service system of the inboard column of seat groups 139 and one for the passenger service system of the outboard columns of seat groups 139. At each inboard end of individual seat 199 and optionally also at each outboard end of seat 199 of the seat groups (with respect to the aisles 130) is provided a service light 143. Corresponding reset switches (not numbered) may be provided.

Various optional combinations may be provided. For example, forward compartment 131 might be individually entertained, with a combined entertainment area for the aft middle compartment 132 and aft compartment 133 where first class forward, and middle and aft ordinary passenger flight compartments are provided.

Forward of the aircraft are provided a tape deck unit 119, a main multiplexer 120 and a self-test panel unit 170. A main passenger address system 118 and a remote self-test switching unit 138 are also provided. Self-test switch unit 138 may be physically incorporated in self-test panel unit 170. The main passenger address system 118 and the remote self-test unit 138 are connected to feed information into the main multiplexer 120 (see FIG. 3 also). Tape deck unit 119 comprises a plurality of tape units (not separately illustrated) to present recorded tape programs. A compartment movie projection and sound system 136 and a compartment passenger address system 137 (illustrated in FIG. 1 only in compartment 131) is supplied for each of compartments 131, 132 and 133 and is electrically connected into the respective submultiplexers 121, 122 and 123.

Figures 2, 3:
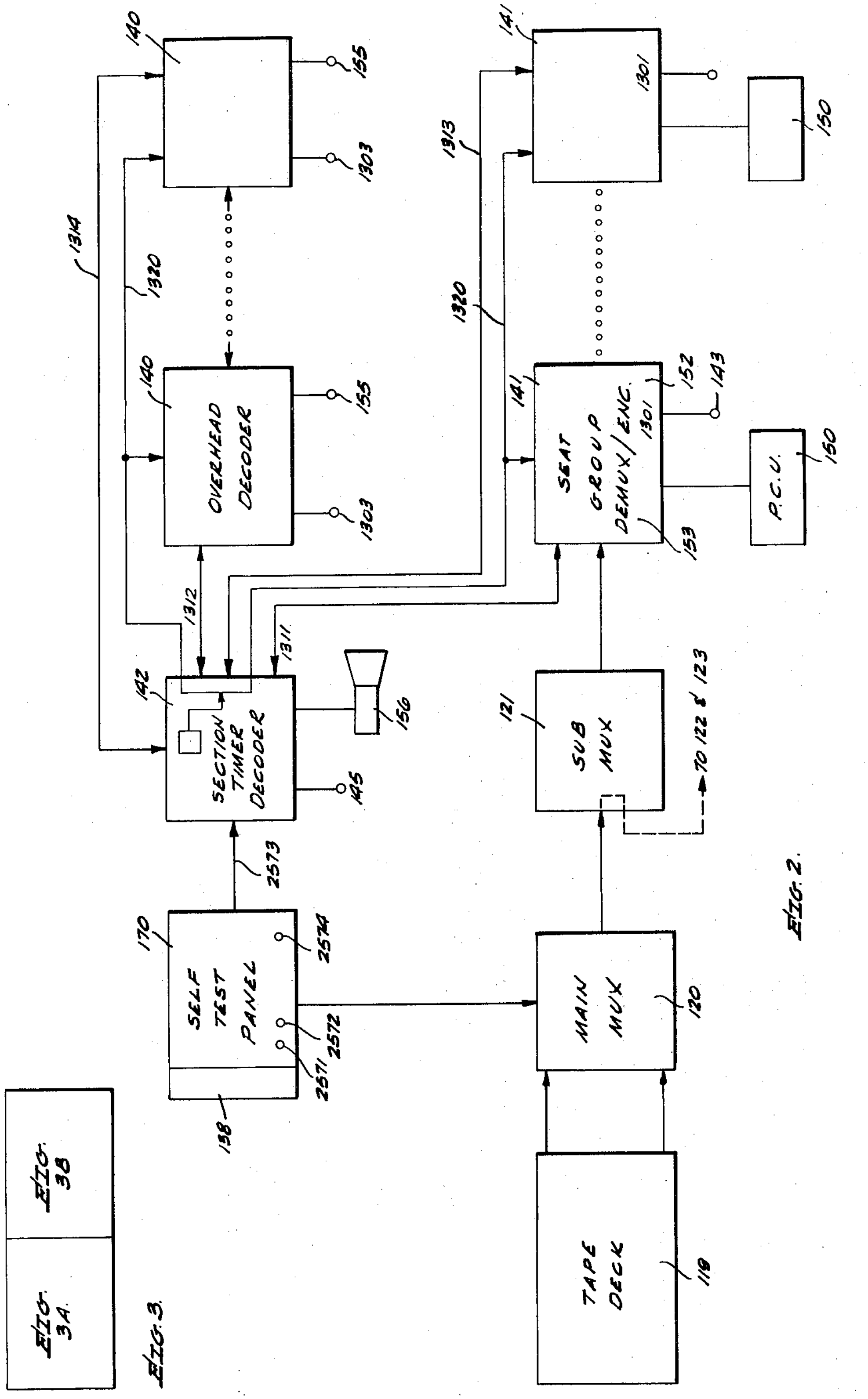

Refer also to FIG. 2. Forward in each compartment 131, 132 and 133 at a station where a stewardess is stationed normally, for each of the sections 134 and 135 is provided a ceiling master call light 145. Ceiling master call light 145 remains lit as long as service is requested by any passenger in the section 134 or 135 for which a stewardess is responsible. Each of the master call lights 145 is coupled to a respective section timer/decoder 142. Additionally to the call light 142, a chime 156 is provided. Various alternate configurations of ceiling master call lights 145 and chimes 156 may be provided. For example, in the illustrative embodiment they are provided in association with the section timer/decoders 142 but they could also be provided aft of the compartment to alert the stewardess regardless of whether she is temporarily in the forward or in the aft section of a compartment 121, 122 or 123.

The tape units of tape deck unit 119 present recorded tape programs, which may be stereophonic or monophonic (monaural) programs. Stereophonic is hereinafter abbreviated "stereo." Monophonic or monaural is hereinafter abbreviated "mono." Stereophonic and/or monophonic (or monaural) is hereinafter abbreviated "stereo/mono." The stereo/mono recordings from the tape deck 119 are presented through channels or pairs of channels in the entertainment subsystem. Optionally passenger address information or moving picture (hereinafter abbreviated "movie") audio portions are presented through the entertainment subsystem channels. Usually passenger address information will be at the option of the flight crew, e.g., pilot or stewardess, and will preempt or override the audio entertainment or movie audio channels or pairs of channels. Provision is made to enable each passenger to select the audio or movie audio channels which the passenger wishes to hear.

Refer further to FIG. 2 in conjunction with FIG. 1. From the tape deck unit 119, 16 inputs are fed into the dual audio amplifiers 301 (see FIG. 3A) of the main multiplexer 120.

The passenger entertainment system is a pulse code modulated (PCM) system which multiplexes up to 16 channels of audio input into one coaxial cable and then decodes and transmits mono signals or stereo signals through a pair of channels as selected at each passenger seat. The system also has passenger address modes that override all 16 channels for announcements.

The main multiplexer 120 located in the forward aircraft section, supplies pulse-code-modulated multiplex composite signals of 16 channels of high fidelity audio to each compartment submultiplexer 121, 122 or 123. Each of submultiplexers 121, 122 and 123 then distributes the composite pulse code modulated multiplexed signals to each of the seat group rows 139 within its respective compartment on separate miniature coaxial lines. Each submultiplexer 121, 122 and 123 has its own backup clock, which is automatically gated in upon loss of main multiplexer input data. Each submultiplexer, e.g., submultiplexer 121, then sends to the entertainment, passenger override or movie audio signals to the demultiplexer/encoders 141 of the seat groups 139 in the compartment for which it provides entertainment and address signals.

Each seat group 139 has a demultiplexer/encoder 141 assigned to it which provides independent data demultiplexing and audio amplification of the channels selected by each of the passengers in the aircraft. The selected audio may be either mono or stereo (requiring one or two channels, respectively, of the 16 available), as programmed into the main multiplexer 120. One bit position per channel in the transmitted pulse code modulated multiplex system conveys mono/stereo information. If the passenger has selected a mono program channel, both his earphones receive the data. If the passenger has selected a stereo channel, the demultiplexer/encoder 141 automatically switches each cahnnel of the pair of channels selected into the proper earphone.

The main multiplexer 120 receives 16 high quality audio signals from the reproducers of the magnetic tape unit or tape deck 119. Each input is sampled 30,000 times per second and each sample analog voltage is converted to a digital work of 8 bits plus a sign bit for a total of 9 bits. These bits, plus a stereo bit for each input and 7 frame synchronizing bits, are transmitted to the three submultiplexers 121, 122 and 123, one in each of the compartments 131, 132 and 133 (see FIG. 4E).

After the 7 frame bits, the first bit time of the first sampling period is always a logical 1 or high. Therefore, in Manchester coding, this bit is represented by a transition from high to low. Since the half time before transition is high, this effectively makes the frame synchronizing voltage at least 7 ½ bits long depending upon whether the last bit of channel 16 is a zero. In this case, where the channel 16 last bit is a zero, the frame synchronizing voltage is 8 bits long.

Although the multiplexer and submultiplexer units 120, 121, 122 and 123 and the demultiplexers of seat demultiplexer/encoder units 141 actually process only 9 bits, the actual performance is equivalent to that of a 10-bit system as will be described. The seat demultiplexers 153 (see FIG. 7) of the seat group demultiplexer/encoder units 141 receive PCM data from the submultiplexer 121 and convert the passenger's selected program (channels) selected by the passenger control unit 150 (hereinafter abbreviated "PCU") which are provided for each seat group 139 into pairs of audio signals. The digital-to-analog converted audio signals are filtered, and amplified. The output entertainment signals of the seat group demultiplexer/encoders 141 drive a pair of audio transistor emitter-followers connected in push-pull arrangement. The emitter-followers in turn, drive one channel of the passenger's stereo audio transducers.

The self-test unit 170 and its remote self-test switching unit 138 provide a built-in test feature that allows quick and thorough testing of the system performance. During the test mode, both the digital circuits and the analog power stages of the demultiplexer 153 of the seat group demultiplexer/encoder 141 are tested. The test mode is signaled by the presence of a logical one stereo bit in every word, where normally there is at most a logical one stereo bit in every other word. In this mode, all of the audio amplifiers are driven to full scale positive. A threshold detector on the audio output verifies that all the audio amplifier outputs are at full scale positive value. Next, all audio outputs are driven full scale negative and additional detectors verify that each meets full scale negative requirements. The demultiplexer 153 of the seat group demultiplexer/encoder 141 sends a signal to passenger service encoder 152 of that demultiplexer/encoder 141 if the above requirements have been met. The passenger service encoder 152 in turn interprets this signal as a call light reset request and a reading light turn-off request, and turns off the call lights for this seat demultiplexer/encoder 141 and the reading lights of the corresponding overhead decoder 140, verifying proper operation of the entertainment system.

FIG. 2 illustrates the interconnection of the test subsystem, the passenger entertainment subsystem, and the passenger service subsystem in the total system. The passenger service system consists of the following basic units: (1) The seat encoder 152 of the seat group demultiplexer/encoder 141, (2) the overhead decoder 140, and (3) the section timer/decoder 142. The function of these units in a service area is to provide passenger-to-attendant calls and reading light on/off capabilities for each passenger in that service area. The passenger service system also has the capability of handling auxiliary functions for each passenger.

The system configuration for the passenger service system is herein referred to as a common clock/gated data configuration. This configuration has a common clock line 1320 and a gated data line 1311 interconnecting the section timer/decoder 142 with a column of seat encoders 152 of seat group demultiplexer/encoders 141. It also has the common clock line 1320 and a gated data line 1313 interconnecting the section timer/decoder 142 with a corresponding column of overhead decoders 140. Each overhead decoder 140 corresponds to the seat group demultiplexer/encoder 141 of a seat group 139 (see FIG. 1) in a column of seat group demultiplexer/encoders 141 and corresponding overhead decoders 140 serviced by a section timer/decoder 142. The clock line 1320 is common to all the seat encoders 152 and all the overhead decoders 140. Any information appearing on the clock line 1320 is simultaneously received by all overhead decoder 140 and encoder 152 units attached to the line 1320. The seat encoders 152 are connected in series. The overhead decoders 140 are also connected in series. Internal bidirectional digital buffers (to be described) in each of the encoders 152 and in each of the decoders 140 are the interconnecting elements for the gated data lines 1311 and 1313. Each of the section timer/decoders 142 is connected to drive either end of a column string in a "daisy chain" arrangement, thereby adding to the flexibility of the passenger service system. The bidirectional digital buffer acts as a switch and when it is disabled, no signal is allowed to pass through this element.

Each section timer/decoder 142 has the capability of controlling two columns of seat groups 139, that is two columns of seat group demultiplexer/encoders 141 and their corresponding overhead decoders 140. Each corresponding demultiplexer/encoder 141 and overhead decoder 140 may be considered a combination. The section timer/decoder 142 samples each seat group encoder 152 of seat group demultiplexer/encoder 141 serially. During this sample interval, the requirements of each seat set by the PCU's 150 are received by the section timer/decoder 142 and the information is sent to the corresponding overhead decoder 140 and a DC level to control a master call light 145 at an attendant station is provided. At the end of the sample interval, the encoder 152 of its seat demultiplexer/encoder 141 and overhead decoder 140 combination is disabled, and the next seat combination is sampled. The process continues, each seat group being sampled a minimum of five times per second (depending upon the number of seat groups in the column being serviced).

The seat encoders 152 of the seat group units 139 provide the data encoding of the passenger request (reading light, attendant call, and two other functions) while the overhead decoder 140 provides the corresponding decoding to turn on the proper reading light 155. The section timer/decoder 142 also provides decoding of the attendant call data and activates the attendant call chime 156 and turns on or off the appropriate set of master call lights 145 (by section or area) on command.

The seat encoder 152 of the seat demultiplexer/encoder 141 also controls the turning on and off of aisle call lamp 143 which indicates to the stewardess the appropriate seat group 139 (see FIG. 1) requesting the call.

The physical location of the section timer/decoders 142 is not critical. Passenger control units 150 should be physically located within easy reach of the passenger. The section timer/decoders 142 generate the necessary binary logic pulses which are transmitted sequentially from seat group 139 to seat group 139 down the seat columns on a twisted pair of wires in the same cable assembly as the passenger entertainment system coaxial cable. A similar cable assembly or twisted pair connects the overhead decoders 140 and their connected reading lights 155 to the section timer/decoder 142. The seat encoder 152 receives the digital interrogating signals, processes them relative to switch positions of the PCU 150, and sends the results to the section timer/decoder 142. The corresponding overhead decoder 140 receives the retransmitted digital signals from the seat encoder 152 via the section timer/decoder 142 and performs the necessary switching functions to conform to the seat encoder 152 commands.

Each section timer/decoder 142 operates with its two columns of seat encoders 152 and overhead decoders 140 independently of all other section timer/decoders 142. Data transmittal of the PCU 150 generated data to the overhead decoder 140 is effected by serial successive interrogation of each seat encoder 152-overhead decoder 140 pair on the two data lines 1311 and 1313 respectively. The common clock line 1320 is common to all seat group units 139 in a column, while the data lines are serially switched into a seat encoder 152 and overhead decoder 140. Upon completion of interrogation of a particular seat group 139, the signal is switched on through to the next seat encoder 152 and overhead decoder 140 combination and so on sequentially. The signal is also switched in a backward direction through the seat group encoders 152 and overhead decoders 140 sequentially. Individual seat encoders 152 and overhead decoders 140 are provided with bidirectional gated data switches (to be described) which allows section timer/decoder 142 interrogation from either end of the service section or area 134 or 135.

A three-position remote switch (not illustrated is provided on the self-test panel 170 to exercise the passenger service system reading lamps 155. The three switch positions may be (1) all reading lamps on, (2) all reading lamps off, and (3) reading lamps normal. A second similar switch (not illustrated) on the test panel 170 provides the same capability for the call functions.

The built-in test features of the system enable fast, effective, and easy maintenance of the multiplex system, and associated reading lights 155, call lights 1303, master call lights 145, of the passenger control units 150. The passenger service subsystem is tested first. All the reading lights 155, aisle call lights 143, and master call lights 145 are turned on. The commands turning on all lights are sent from the section timer/decoder 142 to each seat group unit 139. Each decoder 152 of its seat group unit 139 in turn transmits to its associated overhead decoder 140 via the section timer/decoder 142 the "reading lights on" command. The "call lights on" command from each seat group unit 139 is processed by the section timer/decoder 142. This test establishes the continuity of the service system and operation of all lights. Next all reading lights 155 and call lights 143 and 145 are turned off to verify the whole cycle of operation.

The entertainment system is tested using the service system reading lights 155 and aisle call lights 143 to identify any failure. The service system is placed in the "all reading lights on" test mode. The entertainment subsystem test is inititated at the main multiplexer 120. The main multiplexer 120 transmits a special test pattern to identify the test mode for the submultiplexers 121, 122 and 123 and the seat demultiplexers 153 of the seat demultiplexer/encoders 141.

Figure 3A:
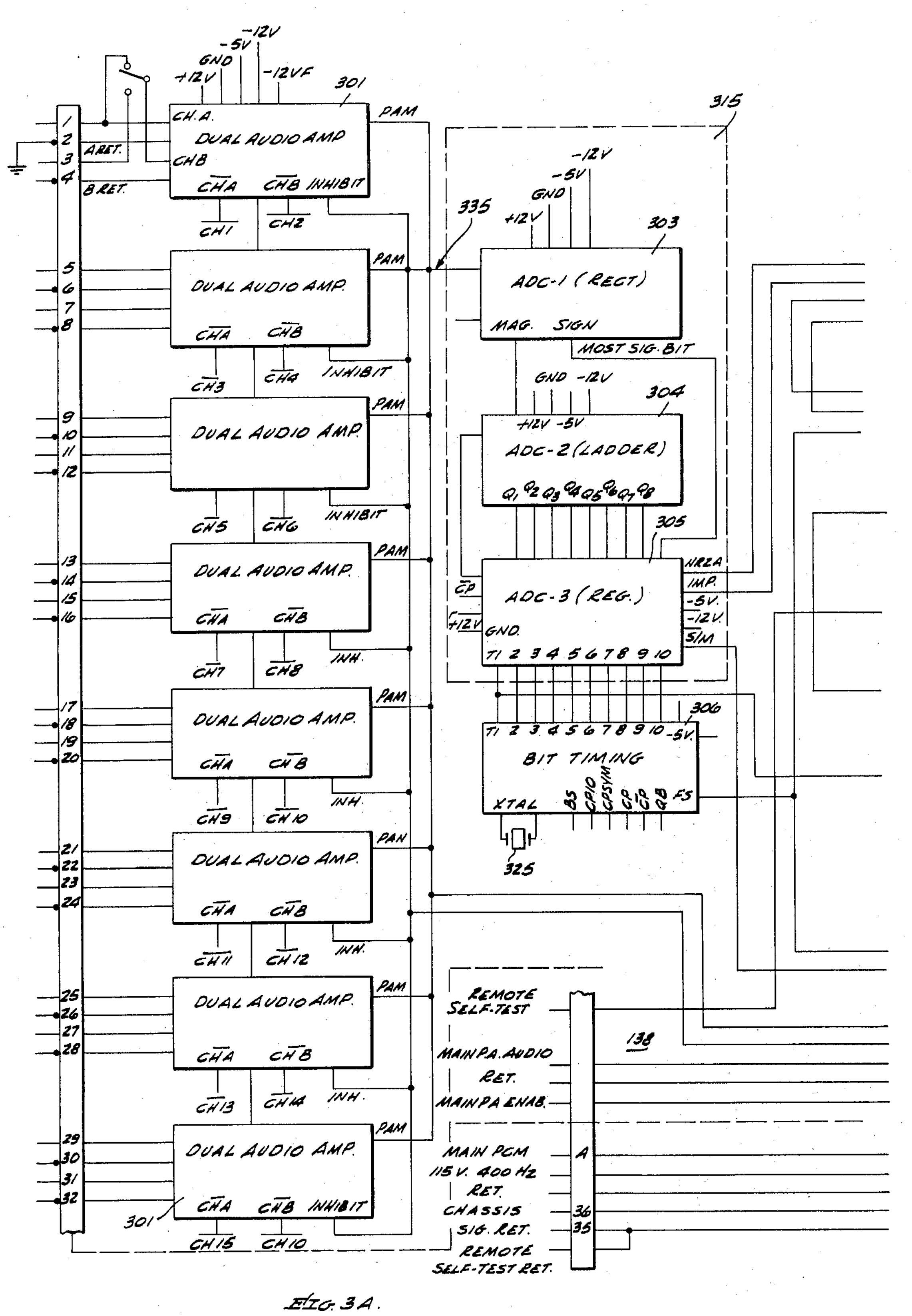
FIG. 3A is a block and schematic diagram of the dual audio amplifiers, the analog-to-digital converters, the bit timing unit and wiring thereamong and to and from the tape deck, the units of FIG. 3B, the passenger address and the remote self-test switching unit.
Figure 38:
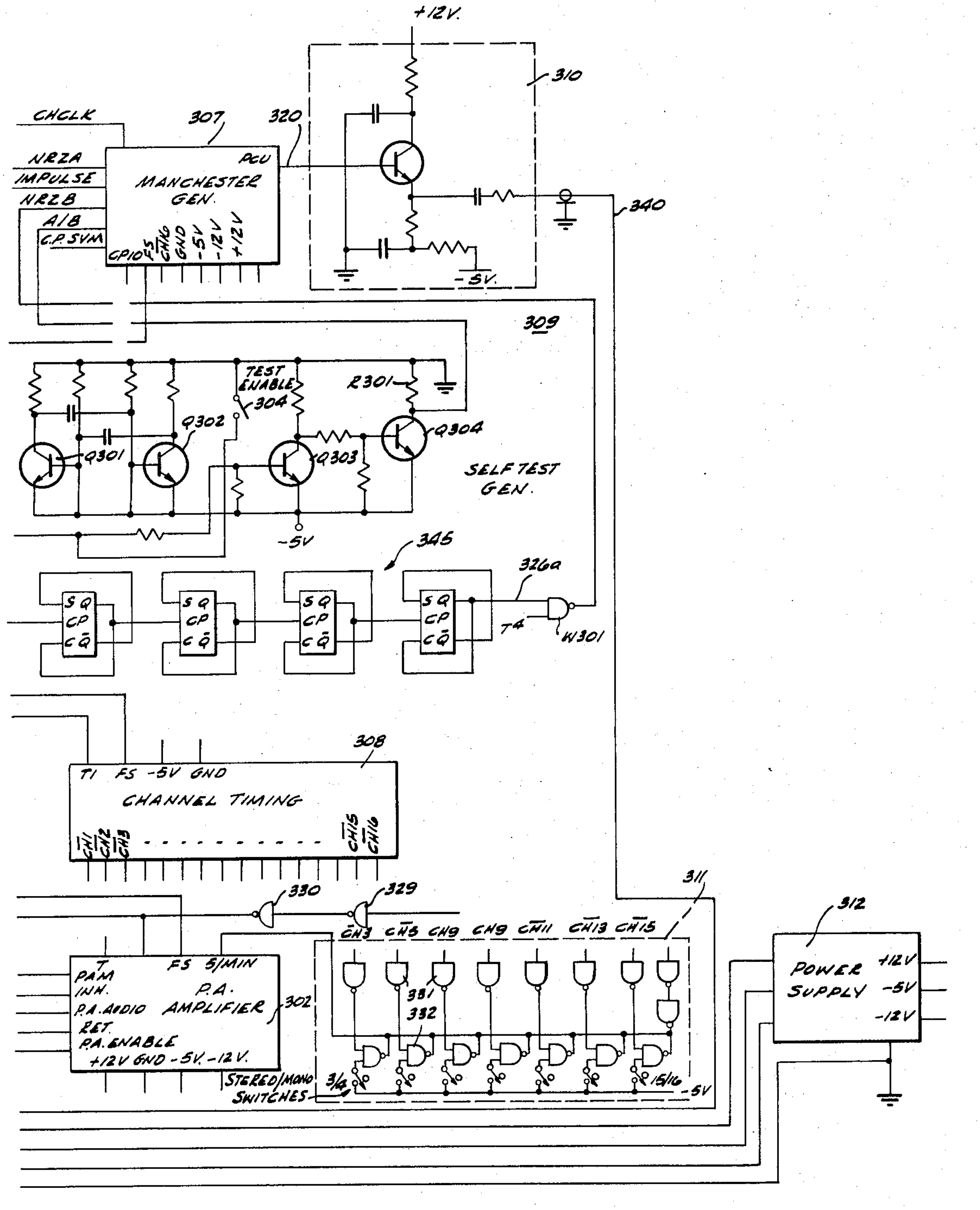

Refer to FIGS. 3A and 3B of FIG. 3. In the main multiplexer 120 are provided eight dual audio amplifiers 301. Each of the dual audio amplifiers comprises a pair of amplifiers (see FIG. 4A). The 16 channels from the tapes of tape unit 119 are introduced as CHA and CHB signals and signal return lines into the dual audio amplifiers 301. Where voltages are mentioned hereafter and logic symbols are clearly not intended, the symbols + for plus and − for minus are utilized. Amplifier 301 is provided with a +12 volts, two −12 volts, a −5 volts and a ground input line.

As will be discussed in detail in FIG. 4A, gain and impedance match, presampling, preempahsis and sampling functions are provided. A PAM output line is connected to the output of the dual audio amplifiers 301 to provide a composite pulse amplitude modulation (PAM) output 335. An example of a composite PAM signal is illustrated in FIG. 4B.

An analog-to-digital converter unit 315 is provided. The analog-to-digital converter 315 comprises a full wave rectifier 303, a ladder circuit 304, and a register 305. A bit timing unit 306 provides the successive timing pulse times T1 through T10 illustrated also in the waveforms of FIG. 4E. A channel timing unit 308 is provided. Channel timing unit 308 is a conventional timing circuit and provides the channel sampling period timing pulses in order to obtain the individual channel pulse amplitude modulation (PAM) outputs. These outputs are connected to form the composite PAM output illustrated in FIG. 4E and in FIG. 3 at point 335.

Connected responsive to the output of the register 305 of the analog-to-digital converter unit 315 is a Manchester generator 307. As also illustrated in FIG. 3D, the Manchester generator 307 converts the NRZ data output from the data register 305 of the analog-to-digital converter 315 to a Manchester biphase coded signal. This is accomplished by combining the clock pulses with the NRZ"A" output of the register unit 305 (see FIG. 4D). The clock pulses are obtained from a clock pulse generator comprising a crystal oscillator 325 and a divide by 2 counter (not illustrated). The Manchester biphase output (see FIG. 4D) appears at the output line 320 from the Manchester generator 307. The Manchester generator 307 is illustrated in FIG. 5D. Responsive to this Manchester generator output at line 320 is connected an impedance matching circuit 310. Impedance matching circuit 310 presents a low impedance to properly drive a coax line 340 for maximum efficiency transmission between the main multiplexer and the submultiplexers over the coax line 340 provided therebetween. A self-test generator circuit 309 is provided. Further provided is a conventional power supply unit 312 to provide +12 volts, –5 volts and –12 volts to drive the units of the main multiplexer 120. As illustrated on the drawing, power supply 312 utilizes 115 volts at 400 Hertz (Hz) and supplies a +12 volts, –12 volts and –5 volts DC power output to the units of the main multiplexer 120.

Figure 4A:
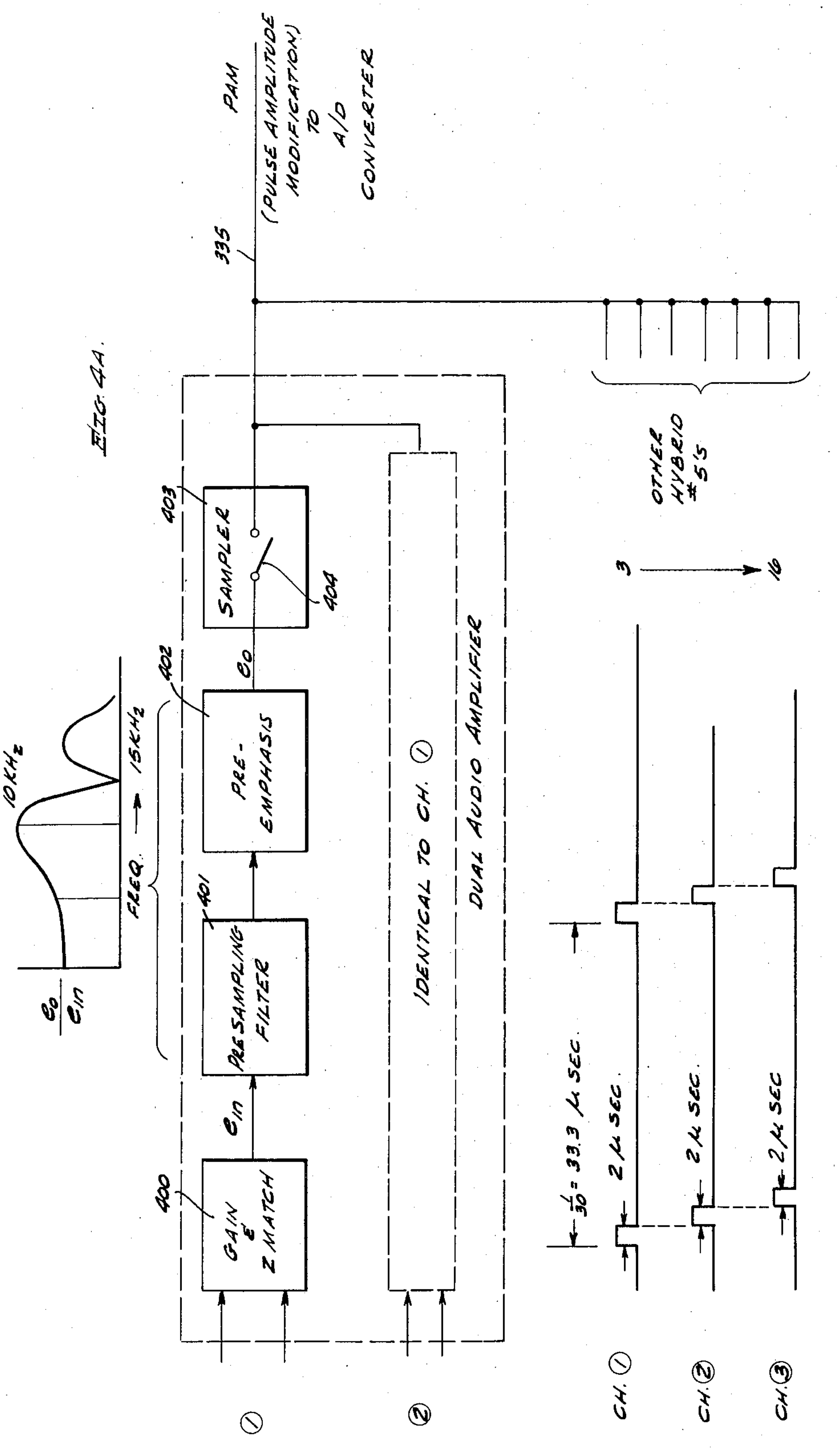
Figure 4B:
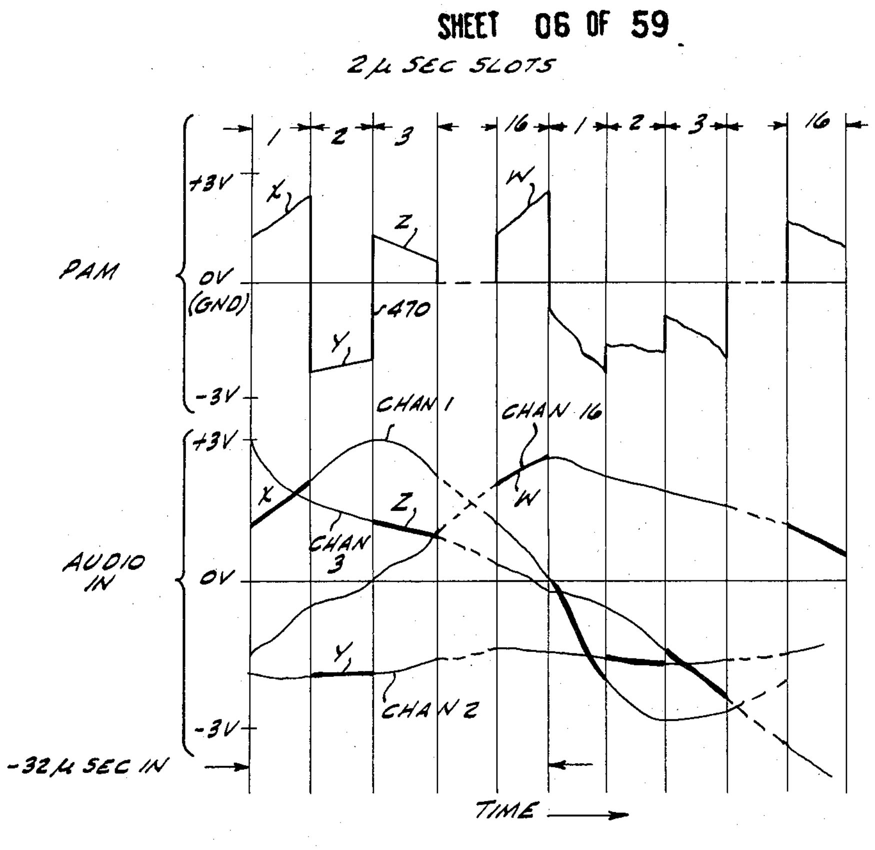
FIG. 4B is a timing waveform illustrating the pulse amplitude modulation sampling and pulse amplitude modulation composite waveform formed by the dual audio amplifiers of FIG. 3A.
Figure 4D:
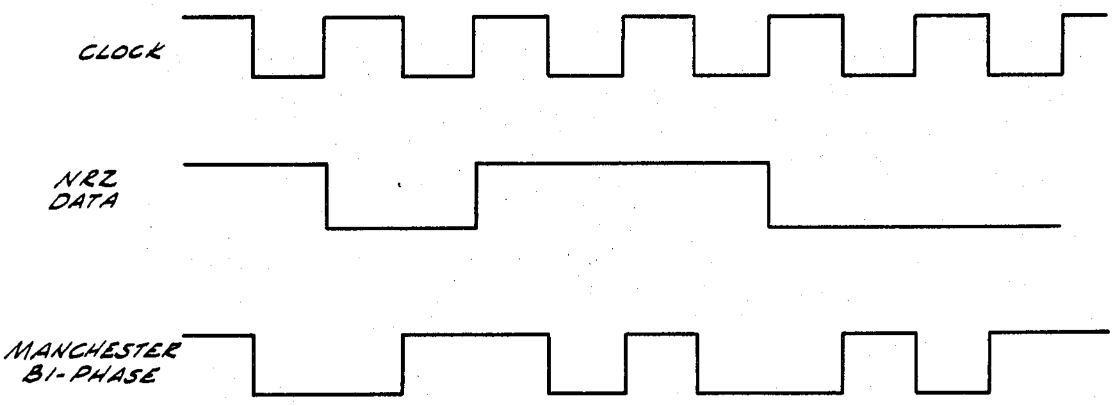
FIG. 4D is a timing and waveform diagram of the Manchester encoding waveform formation provided by the Manchester encoder circuit of the illustrative embodiment of FIG. 1.
Figure 4C:
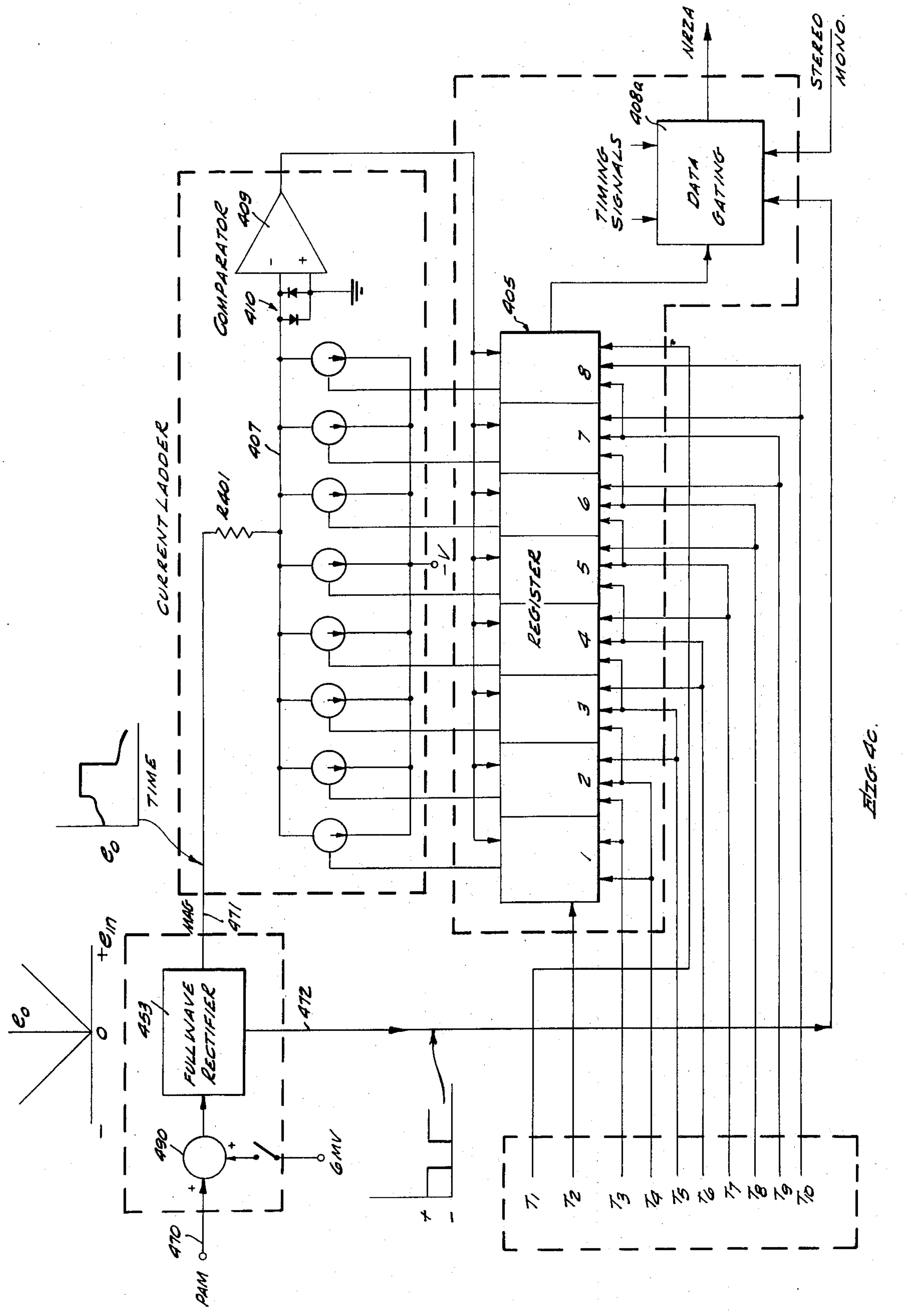
FIG. 4C is a partially block and partially schematic functional representation of the analog-to-digital converter circuitry of the main multiplexer module of the illustrative embodiment of FIG. 1.
Figure 4E:
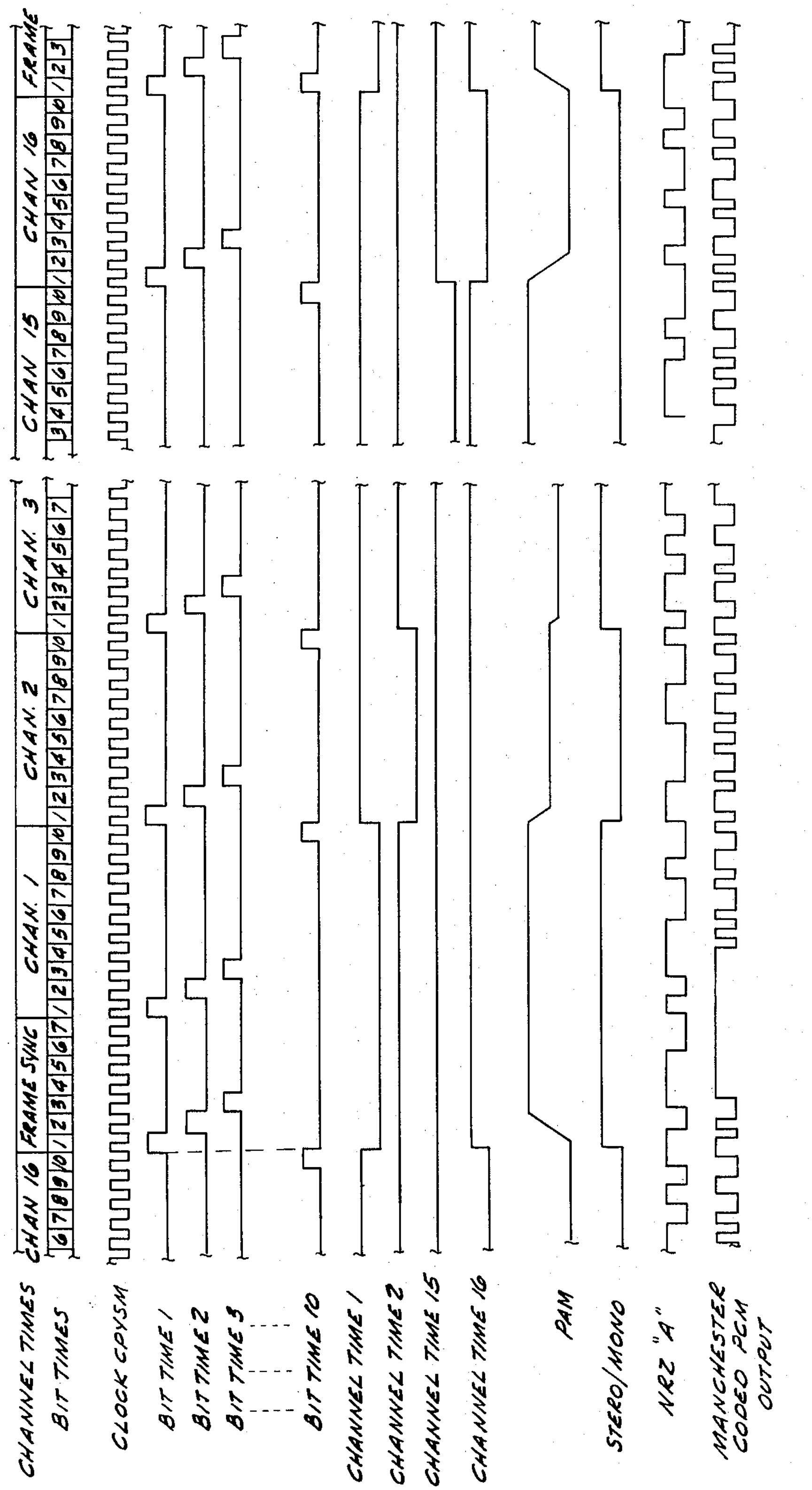
FIG. 4E is a timing and waveform diagram of the clock pulse, sampling, channel, analog-to-digital output, stereophonic/monaural, NRZ"A," Manchester coded and composite bit time representations and waveforms generated in the timing circuits of the main multiplexer module of the illustrative embodiment of FIG. 1.

A bit timing unit 306 and a channel timing unit 308 are provided (see also FIG. 4E). In the bit timing unit 306, a crystal oscillator 325 and a divide-by-two counter (not illustrated) generate clock pulses CP, $\overline{CP}$, CP10, CPSYM and $\overline{CPSYM}$ which are used throughout the main multiplexer 120 of FIG. 3. An appropriate clock pulse drives a divide-by-10 counter which provides 10 outputs indicating the bit times T1 through T10. A channel timing unit 308 is also provided. Channel timing unit 308 generates the channel time 1 through channel time 16 channel sampling time pulses. The channel timing pulses are hereinafter abbreviated $\overline{CH1}$, $\overline{CH2}$, $\overline{CH3}$, etc. The bar is the conventional logic signal for "not." Thus $\overline{CH3}$ designates a channel 3 time not or negative pulse signal which lasts for the duration of the channel 3 sampling time. The $\overline{CH1}$ through $\overline{CH16}$ signals are respectively connected into the dual amplifiers 301.

A logic input comprising the $\overline{CH1}$ input from channel timing unit 308 is applied through a pair of provided logic gates 329 and 330 to the stereo/mono (or S/M) input to the register 305. This provides channel 1 with a logic bit "1" always so that channel 1 is always set to the stereo mode. As seen in FIG. 4B the $\overline{CH1}$ waveform unlike the other $\overline{CH}$ waveforms has a duration of the frame sync in addition to the sampling time.

A stereo/mono switching unit 311 is also provided. Switching unit 311 comprises $\overline{CH3}$, $\overline{CH5}$, $\overline{CH7}$, $\overline{CH9}$, $\overline{CH11}$, $\overline{CH13}$ and $\overline{CH15}$ inputs. Connected responsive to each of these inputs respectively are a first plurality of logic gates 311. Connected to the respective outputs of logic gates 331 are one input to each of a plurality of second logic gates 332. Each of the logic gates 332 has two inputs, one from the output of the respective logic gates to which the $\overline{CH3}$, $\overline{CH5}$, etc. abovedescribed inputs are applied. Between the –5 volt power supply input from power supply 312 and the respective second inputs to the second above-series-connected logic gates 332 are respectively provided and connected stereo/mono (or S/M) switches S/M 3/4, S/M 5/6, S/M 7/8, S/M 9/10, S/M 11/12, S/M 13/14 and S/M 15/16. These may be hand set by the crew or an operator for example, prior to the flight, or upon determination of which channels are to receive stereo and which are to receive mono intelligence.

A public address amplifier 302 is provided and comprises a three-wire push to talk unit. It is compatible with the three-wire push to talk system conventionally supplied in aircraft wherein a main public address audio return line and main public address enable line are provided. The term "public address" is hereinafter abbreviated "PA;" "analog-to-digital" is abbreviated "A/D" and "digital-to-analog" is abbreviated "D/A." The number "one" is symbolized by "1" and zero by "0." The term "Hertz," now employed instead of cycle per second, is abbreviated "Hz" or "hz" hereinafter.

Functionally, the PA amplifier 302 provides buffering between the aircraft amplifier (not illustrated) and the remaining units of the main multiplexer 120. It also provides additional gain and automatic gain control. Upon the enabling of the PA enable line into the PA amplifier 302 from the main PA audio of the aircraft, the –5 volts supply into the PA amplifier 302 is applied at the inhibit output of PA amplifier 302 and all 16 dual audio amplifier channels 301 are inhibited. Also, a PA audio signal is applied at the output of all 16 of the channels 301. That is, the inhibit line inhibits each of the units 301 and on the PAM line, the audio which has been amplified in the PA amplifier 302 is transmitted to the point 305 and thence into the PAM input into the rectifier 303 of the A/D converter 315. From that point on, processing is identical to that of the PAM output signals received from one of the dual audio amplifier channels 301.

On switching the PA on, logic circuitry within the PA amplifier 302 causes the signal on the S/M OUT output of amplifier 302 to differ from the signal applied to the S/M IN input of amplifier 302 by the stereo/mono switching unit 311 hereinabove described. That is, effectively the S/M IN and S/M OUT path in the PA amplifier 302 is opened and an altered stereo/mono signal is transmitted on the stereo/mono output line leading to the stereo/mono input of the register 305. This is also shown in FIG. 4C illustrating S/M being inserted into the data stream. In this mode, stereo/mono output instead of being a 10 or a 00 indicating the stereo or mono input condition of successive odd and even number channels is presenting a 01 input at the data gating unit 408 (FIG. 4C).

Referring to FIG. 4C, the data gating unit 408 in conjunction with the switching unit 311 of FIG. 3, it may be seen that the switching unit 311 permits sequential insertion of 10 bits in stereo condition and 00 bits when in mono condition in at the stereo/mono input of data gating unit 408 at the proper time for insertion in the first bit time for each channel. The P.A. amplifier, when in P.A. mode effectively replaces the stereo/-mono bits (which normally occupy the first bit position of the ten which represent each channel) with the digit 0 in each odd numbered channel first bit and the digit 1 in each even numbered channel first bit. The first bit of channel 1 is an exception; it is a 1 even in PA mode. This coding of the first bits informs each of the submultiplexers (121, 122 and 123) that the system is in main PA mode.

A self-test generator 309 is provided in the main multiplexer 120 (FIG. 3B). A plurality of transistors Q301, Q302, Q303 and Q304 are provided. Transistors Q301 and Q302 form a free-running multivibrator or generator operating at approximately 16 Hz. Transistors Q303 and Q304 are responsive to the closing of the test enable switches, and generate a logical signal to put the main multiplexer 120 into self-test mode. When the test enable switch SW302 is closed, switching occurs by virtue of the waveform developed at the output of transistor Q304 which supplies an input to the A/B (A or B) input to Manchester generator 307. This causes switching of the Manchester generator 307 from accepting NRZ"A" circuit input to accepting NRZ"B" circuit input. The 16 Hz free-running multivibrator is followed by a divide-by-16 ripple counter 345 comprising the four cascaded flip flops (not numbered). That is, upon input being supplied from the free-running multivibrator Q301 and Q302 into the counter 845, a rippling pulse occurs wherein each flip flop of the successive four flip flops of counter 845 enables the next flip flop which provides a divide-by-16 counter. The resultant output frequency of the counter 345 at point 326*a* is approximately 1 Hz. This signal is gated by the NAND gate N301 with the T4 signal to yield a waveform which corresponds to the A/D converter output if a full scale 1 Hz square wave were applied to the A/D converter input. In test mode all stereo/mono bits are 1. This signal is applied to the NRZ"B" input of the Manchester generator 307. The output from the main multiplexer 120 is transmitted from the impedance matching unit 310 to the output from line 840 entitled "MAIN PCM."

The system works in four basic modes wherein the first bit of each of the channels is set as follows: In stereo operation, the first bit of an odd-numbered channel is a 1. The first bit of the succeeding (even numbered) channel is a 0. Only pairs of adjacent numbered channels wherein the odd number is lower, such as 1 and 2, 3 and 4, 7 and 8, etc. can be used as stereo pairs. In mono operation, the bits of adjacent odd and even channels are 00. In passenger PA, the bits of the odd number channels are 0's and the bits of the even number channels are 1's. In the self-test mode the bits of all of the channels are 1's. The first bit of channel 1 is always a 1 regardless of mode; and channel 1 and 2 are always operated in the stereo mode even though there may possibly be identical signals coming from the two channels at a given moment.

OPERATIONAL DESCRIPTION OF THE UNITS OF THE MAIN MULTIPLEXER

Refer to FIG. 4A. The audio signals from the 16 channels of input from the tape deck 119 are applied to the dual audio amplifiers 301 of the main multiplexer 120. The dual audio amplifiers 301 are responsive to an audio range of signals from 50 Hz to about 10 KHz. Each of the 16 channels is sampled at a rate of 30,000 times per second. This sampling of the 16 channel aduio waveforms is sequential. That is, after the frame synchronizing bits (see FIG. 4D), the first channel is sampled for the next almost 2 microseconds, the second channel is then sampled for almost 2 microseconds, etc. Each of the 16 channels is sampled 30,000 times per second, sequentially in the order frame sync, first channel sampling, second channel sampling . . . 16th channel sampling, frame sync, first channel sampling . . . etc. This satisfies the criteria of the Shannon sampling theorem. The Shannon theorem imposes the requirement that for accurate transcription, there must be at least two samplings of the waveform of a channel within the time period of one cycle of the highest frequency component present in the waveform. The illustrative embodiment system has a sampling rate of 30,000 times per second which is over two times the approximate upper frequency of 10,000 Hz.

Each of the dual audio amplifiers 301 of the main multiplexer (see FIG. 4A) comprises a gain and impedance match circuit 400. The gain and impedance match circuit 400 matches the 600 ohm termination of the tape unit 119 with its own 600 ohm input tape termination. A presampling filtering circuit 401 and a preemphasis circuit 402 are provided. The presampling filtering and preemphasis operations in conjunction provide the waveform waveform illustrated at the bracket between the filter 401 and preemphasis circuit 402. The preemphasis circuit 402 operation causes the first part of the characteristic wherein the higher frequencies are emphasized in preference to the lower frequencies. That is, the preemphasis circuit 402 provides emphasis at the higher frequency within the two KHz to 10 KHz range. The presampling filter 401 provides the notch filtering which gives a sharp cutoff of input at the 15 KHz frequency. Because of economical filter design considerations, the trailing edge results. This is not particularly bothersome in this system.

Figure 5A:
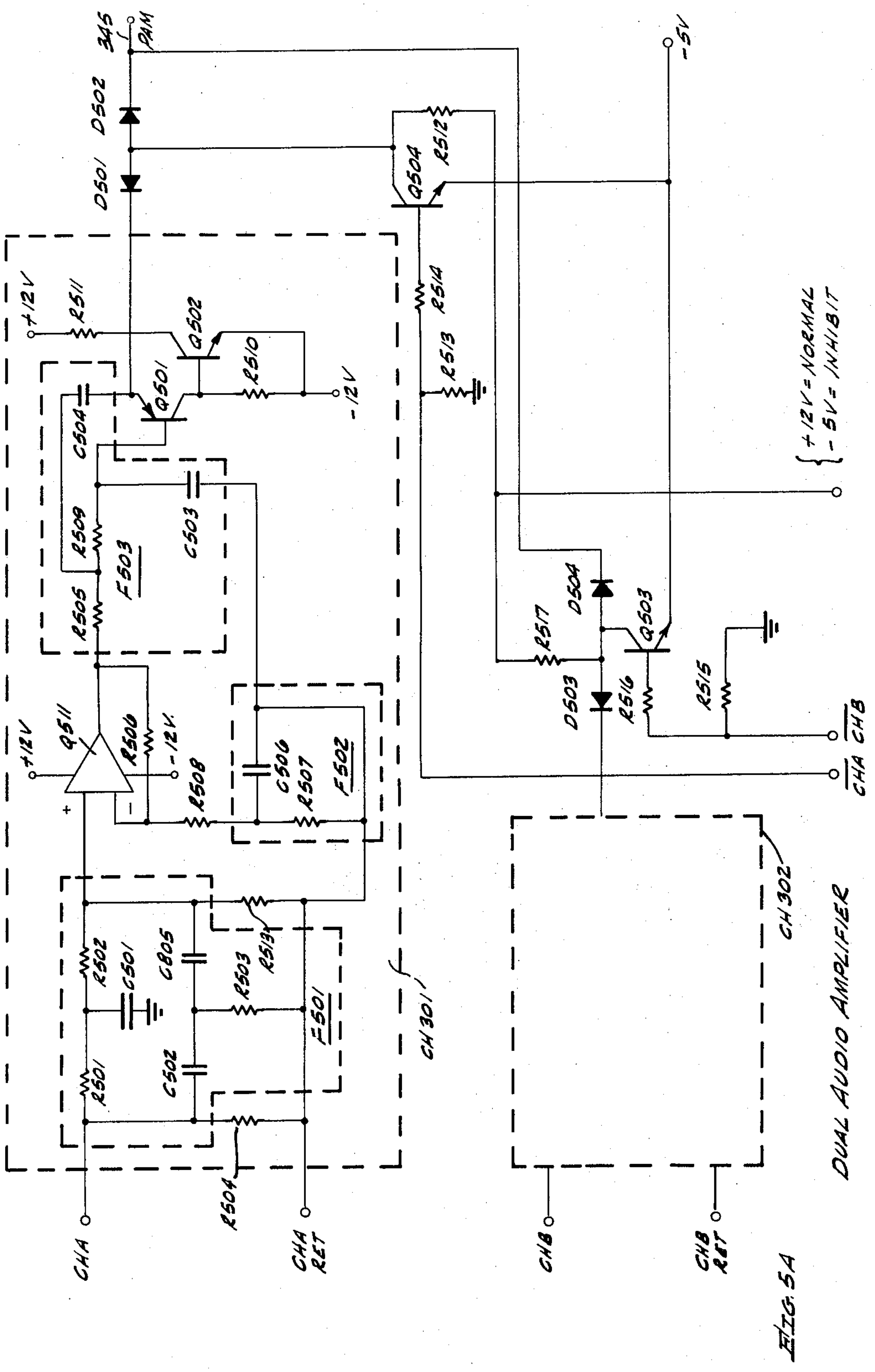

As will be explained further hereinafter, deemphasis is provided in conjunction with preemphasis to improve the system signal-to-noise ratio. This is an important feature of the invention. Deemphasis may optionally be provided at the transducer in the passenger control unit 150 or may be provided as an integral part of the audio output amplifier (to be described) located in the demultiplexer 153 of the demultiplexer/encoder 141 of the passenger seat group unit 139. Merely an integrator or a low pass filter may be used to provide the required deemphasis. The combination of the A/D and D/A converters operates better with the preemphasis and the deemphasis required to compensate for the preemphasis to yield a proper response at the output. To the preemphasis circuit 402 output of the dual audio amplifier 301 is connected a sampler circuit 403 wherein, as shown in the illustrated waveforms of FIG. 4AA, sampling is effected for each channel sequentially at a 30,000 per second rate. Observing the timing diagram channel 1 waveform (FIG. 4AA), channel 1, for example, closes the switch 404 (actually switching circuit means) for a period of about 2 microseconds to permit the signal to be sent on the common multiplex PAM line 335. Switch 404 then remains open for the duration of the approximately 33.3 microseconds of the entire 16 channel period. Similarly, during the next approximately 2 microseconds of the first 1/30,000 of a second (the period of sampling 16 channels), channel 2 is sampled by closing the switch for channel 2 corresponding to the channel 1 sampler 403 switch 404. This channel 2 dual audio amplifier 301 sampler switch remains open for the remainder of the 16 channel sampling period of 33.3 microseconds. In this manner, there is time sharing of the PAM line 335. That is, time sharing of all 16 channels which are sampled for a 2 microsecond period each during 1/30,000 of a second (or 33.3 micro ($\mu$) seconds) is provided along the PAM line 335. It should be understood that the gain and impedance match stages 400, the presample filter 401, the preemphasis circuit 402 and the sampler switch circuit 403 are merely schematically represented and all are contained in a physical embodiment known to the art or hereinbelow described. A schematic diagram of one of the dual audio amplifier stages 301 of the main multiplexer unit 120, the first stage for example, is shown in FIG. 5A. Restating, sampling of the entire group of 16 channel inputs from the tape occurs 30,000 times per second. Each channel of the 16 channels is sequentially sampled for a period of 2 microseconds during the 1/30,000 of a second that that is required to sample all 16 channels. The entire composite signal appears on the PAM line output 335.

Refer now to FIG. 4B. The actual waveform inputs from the tape which were represented in FIG. 4A as channel inputs 1, 2 and 3, it will be understood, will actually be analog waveforms which are composed of frequencies from 50 Hz to 10,000 Hz essentially. For example, waveforms sampled in channels 1, 2 and 3 may be as illustrated in FIG. 4B, where the sampling of channel 1 during the first 2 microsecond period is illustrated by the heavy line X on the channel 1 waveform. Similarly, the waveform of channel 2 may be at a higher or lower voltage and during the 2 microsecond period 2, the waveform may slope as shown on the heavy darkened portion Y of the channel 2 waveform. During the third sampling period of 2 microseconds, channel 3 may be having the output illustrated by heavy line Z of FIG. 4B.

The output of the pulse amplitude modulation or PAM line 335 will be therefore the composite sample waveform shown in FIG. 4B. This waveform appears on the line 335 also shown in FIG. 3A, the main multiplexer. As illustrated in the diagram of FIG. 4A, each dual amplifier 301 comprises two identical channel amplifiers which together feed commonly into the PAM line 335. Thus, as shown in FIGS. 3A and 4A, there are eight subPAM lines 346. Each of the subPAM lines carries the dual audio amplifier output of two sequentially sampled successive channel audio amplifiers 301. The eight subPAM lines 346 are combined into PAM line 335 to form a common PAM input to the A/D converter 315. The A/D converter 315 comprises the rectifier 303, the ladder circuit 304 and the register 305.

Refer again to FIG. 4B. With the passage of time, for example, one cycle of the sampling period of the tape tracks from 1 to 16, during the first 2 microsecond interval, in the dual audio amplifier circuit of FIG. 4A, the channel 1 waveform portion X (illustrated as a heavy broadened section X of the channel 1 waveform) is sampled and the sampled voltage X appears at the composite output of the two channels, channel 1 and channel 2 on one of the eight subPAM lines 346 leading from unit 301 of the main multiplexer 120 of FIG. 3. Similarly, at sampling time 2 of each 16 channel sampling period which corresponds to the second or channel 2, 2 microsecond period illustrated both in the upper and lower waveforms representation of FIG. 4B, the Y portion of the audio waveform from channel 2 of the tape deck 119 is sampled and appears as part of the PAM composite waveform as shown at the PAM line output 335 of the dual audio amplifiers 301 of FIGS. 4B and 3A. Similarly, in the third channel sampling duration of 1 cycle of the 16 channel sampling period of the tape tracks 119, the waveform Z will appear at the output (not numbered) of the first stage of the second audio amplifier stage 301 of the eight dual audio amplifiers 301 of FIG. 3A and along with the fourth channel sampling voltage (not illustrated) will appear at the output of the second dual audio amplifier 301. Also similarly, in the 16th channel sampling (2 microseconds) period of a cycle of the sampling period of tape tracks 1–16, waveform W will appear at the output of the second stage of the 15th and 16th channel audio amplifier 301 which in conjunction with the waveform from amplifier 15 of first stage of the 15th and 16th channel audio amplifier 301 constitutes the output of the 15th and 16th channel dual audio amplifier 301. The composite outputs of the eight dual audio channels 301 appear on the PAM line 335 (see FIGS. 4A and 3A). Illustrated also in FIG. 4B is another frame during which a second cycle of the sampling period of tape tracks 1–16 is made and the composite waveform from this series of channel samplings is illustrated. The process is cyclic and repeated at a 30 KC rate, that is, 30,000 times each second each of the 16 channels is sampled.

In the waveform illustrations of FIG. 4B the rate of change, i.e. frequency, of audio inputs is shown exaggerated for purposes of better illustration. The actual slopes are low, yielding substantially square topped pulses on the PAM line 335.

Figure 5B:
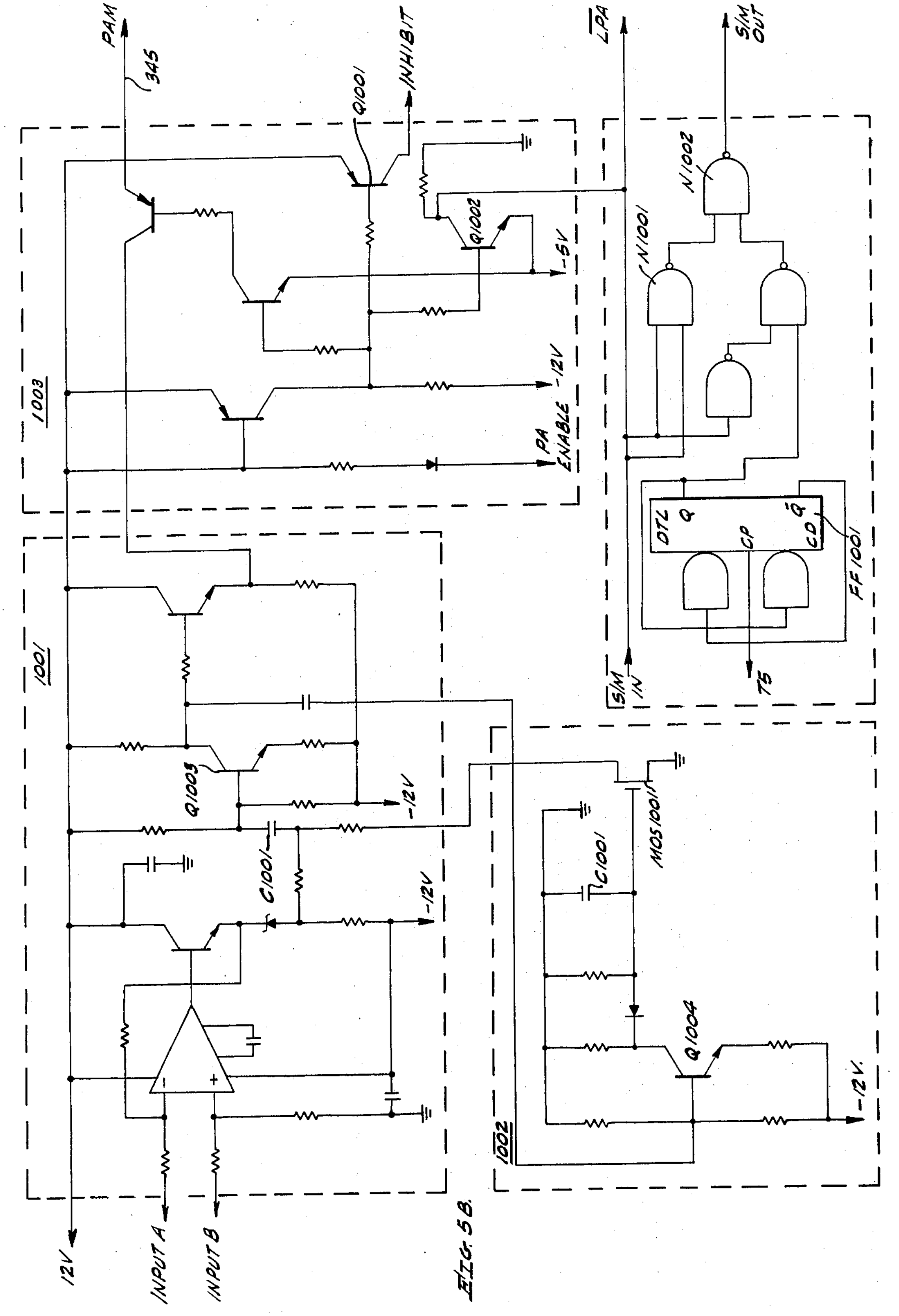

The period of sampling of each sequential channel is 2 microseconds (2 $\mu$sec.). That is, channel 1 is sampled for 2 microseconds, channel 2 is sampled for the next 2 microseconds approximately. Actually because of frame sync sampling will deviate somewhat, but it will be in that order. The period *m* shown in the lower waveform of FIG. 5B represents the length of time (32 $\mu$sec.) for sampling all 16 channels. To this is added the frame sync time which makes the total sampling period 33.3 microseconds. The PAM voltage utilizes ground as a reference and reaches levels from −2.3 to +3.7 volts, approximately.

Refer again to FIG. 4C and in particular to the continuation of the PAM signal into the analog-to-digital converter (also illustrated in FIG. 3A, the block diagram comprising this section of the multiplexer 120). The PAM composite signal illustrated in FIGS. 4A and 4B is applied to a summing circuit 490 and thence to a full wave rectifier 453 wherein the signal appears exactly as the input signal except that it is full wave rectified. Voltage gain is here introduced if found desirable. From the composite PAM waveform 470 voltage, rectifier 453 provides a pair of outputs. One of the outputs is the full wave rectified voltage 471 corresponding to the magnitude of the PAM waveform 470. The other output, labelled "sign," indicates whether the waveform 470 voltage is above or below ground. That is, the binary signal 472 is provided, the high of which indicates a position excursion in waveform 470 and the negative of which indicates a negative excursion in waveform 470. The magnitude of the signal is therefore shown at waveform 471 and the polarity of the signal is separately taken out of the full wave rectifier 453 as the binary waveform 472. Waveform 271 is applied into a resistor R401 the value of which is chosen to provide proper output gain. There is also provided a current ladder 407 schematically and functionally illustrated as a bank of switchable current sources from a most significant bit ($2^7$) switching current source to a least significant bit ($2^0$) switching current source. The plurality of switching current sources give the respective weight outputs of $2^0$, $2^1$, $2^2$, $2^3$, $2^4$, $2^5$, $2^6$ and $2^7$ respectively. The current ladder 304 and the register 305 perform a function of an 8-bit successive approximation analog-to-digital converter as will be described hereinbelow:

Each of the 2 microsecond channel times of the waveform 471 as noted by the arrows $e_0$ are broken down into 10 bit times by the bit timing circuit 306 also illustrated in FIG. 3, such that each of the bit times is a period of 200 nanoseconds (0.2 μsec.). The bit timing unit 306 divides each of the 2 microsecond periods of the waveform 471 into timing periods T1, T2, T3, T4, T5, T6, T7, T8, T9 and T10, and thus also divides the channel timing into timing periods of 200 nanoseconds (0.2 μsec.) each. These timing periods in turn enable the individual flip flops FF1, FF2, FF3, FF4, FF5, FF6, FF7 and FF8 of the register 305 such that under the proper further enabling conditions, a pulse output representing the data output is applied to the data gating unit 408*a*. At time T2, conventional circuitry (not shown) causes the register 305 to be set to midscale, that is 10000000. full scale is obviously all 1's which indicates a $2^8-1$ value. The bottom of the scale is all 0's. Time T2 is used to provide circuit settling time. Times T1 and T2 together, in addition to the time T2 circuitry being used to place the register 305 at midscale, also permits the full wave rectifier circuit 453 to settle. At time T3 when the register 305 has been set to midscale, the most significant bit switch $2^7$ is on and the remaining switches of unit 407 are off. The comparator 409 at this time looks at the input voltage at the point 410 and compares it with respect to ground or a reference of 0 volts. Since unit 407 consists of switched constant current sources drawing current from point 410, while resistor R401 and the voltage of waveform 471 constitute a source which supplies current to point 471 in varying amounts depending upon the voltage at point 410, it will be seen that for a fixed voltage waveform 471, the voltage present at point 410 will become more negative as more current is drawn by the current sources of unit 407. Specifically, if the current drawn by unit 407 is equal to the voltage of waveform 471 divided by the resistance of R401, point 410 will be at ground potential. As the current into unit 407 is greater or less than this amount, point 410 will be below or above ground, respectively. The diodes (not numbered) wired between point 410 and ground are present in the illustrative embodiment to restrict the magnitude of the voltage swings of point 410. They do not alter the relationship of parameters described above which determines whether point 410 is above or below ground potential. Since the current sources of unit 407 draw currents in ratios of powers of two responsive to the state of the bits of register 405, the amount of current drawn by the plurality of sources will be directly proportional to the binary number stored in register 405. This means that, with proper selection of resistor R401, the voltage at point 410 (and thus the output of comparator 401) can be made to indicate whether the number stored in register 405 is greater or less than the voltage of waveform 417. This has been done in the illustrative embodiment, wherein all 1's in register 405 balance a maximum value of waveform 471.

At time T3, the comparator 409 which is constantly looking at the point 410, determines whether at that time there is a voltage above or below ground and accordingly presents to all of the flip flops of the register 305 logic voltage output which is high if the input is below ground, and which is low if the input is above ground. This is the voltage shown at the output of the comparator 409 and which is applied to each of the flip flops FF1 through FF8 of the register 305. At time T3, only the flip flop FF1 (most significant flip flop) of the register 305 is enabled. If at that time the comparator 409 detects an above ground condition at point 410 a signal will be applied along the line which in the presence of the enabling signal at time T3 will cause the most significant bit flip flop FF1 to remain in the 1 condition. That is, as shown on the drawing, if the source at 470 is at a high enough voltage such that the voltage at 410 is above ground, more current is being supplied at point 410 than the most significant bit flip flop FF1 switching circuit $2^7$ can accept. A positive voltage is applied to the comparator 409. The comparator 409 is an inverting circuit to provide inversion of the signal such that the output is low when input 410 is above ground. This output is applied simultaneously to all of the bits FF1 through FF8 of the register 305. However, only the most significant bit is enabled by the time T3 input signal and therefore if the signal is low indicating a higher than ground signal at point 410, the register 405 will remain at or above the midscale point. That is, the flip flop FF1 will remain in the 1 state. At this point, it is known that the voltage is above the midpoint scale. At time T3, simultaneously with the action of flip flop FF1 returning to the zero state or remaining in the 1 state as determined by the output of comparator 409 and as described above, the enabling signal causes the flip flop FF2 of the register 405 to go into the 1 state. Then at time T4, if the voltage at 410 is above ground, by inversion through comparator 409, the output is low and the flip flop FF2 is not changed. If, however, at time T4 the voltage at point 410 is actually below ground, the output of the comparator 409 is a high and the state of the flip flop FF2 is changed to a 0. If the flip flop FF2 is not changed, this indicates that the input condition is above three-fourths scale. If, however, there is a low at time T4 at point 410, the output is high and the flip flop FF2 is changed at time T4 in this condition, just as flip flop FF1 would have been returned to the zero state if the voltage at point 410 had been below ground at time T3. If flip flop FF2 is changed, this indicates that the PAM level is between one-half and three-fourths of full scale. At time T4, the flip flop FF3 of register 305 is set to a 1 and enabled. At time T5, if the voltage at point 410 is above ground, the output of the comparator 409 will be a low and the state of the flip flop FF3 will not be changed. This retains a 1 in the third flip flop FF3 of the register 305. If, however, the output at point 410 at this time is below ground, the state of the flip flop FF3 will be changed to a 0. Similarly, at the sequential times T3 through T10, the sampling of the waveform 471 is effected and the total number in the register 305 at the end of the period provides the approximated value of the voltage of waveform 471 during these 2 microseconds. As stated, each time the decision has been made on a bit flip flop as for example, bit flip flop FF1, the output is presented through the data gating circuit 408*a* to provide a serial bit string at the output line NRZ"A." NRZ means nonreturn to 0 from the data line NRZ"A." There is a second data line NRZ"B" and the two will be explained hereinafter. Circuitry is provided (not shown in FIG. 4C) such that only at time T5 is the state of the flip flop FF1 applied to the data gating circuit 408*a*, only at time T6 is the state of the flip flop FF2 of register 305 applied to the data gating circuit 408*a*, at time T7 only the flip flop FF3 state is being applied to the data gating circuit 408*a*, so that the output of NRZ"A" is a string of pulses corresponding to the progressive states of the register 305.

Refer to FIG. 4E. In the data gating unit 408*a* stereo/mono information is introduced at time T3 of each channel. That is, at time T3, the stereo/mono bits, whose state depends on the mode in which the unit is operating as hereinabove described, appear as appropriate to each particular channel. Similarly, at time T4 the sign bit from the full wave rectifier 453 is presented and introduced into data gating circuit 408*a* such that at time T4 in the NRZ data chain output it is indicated whether there is a positive or negative input from the PAM input waveform 470 shown in FIG. 4A. At times T5 through the following T2 the data indicating the states of the flip flops in register 405 are sequentially presented at the NRZ"A" data output line as described hereinabove. The various timing signals applied to the data gating circuit 408*a* can include the timing signals T1 through T10 inclusive.

The timing within the main multiplexer 120 (see FIG. 3A) is provided by the bit timing unit 306 within the main multiplexer 120. At the beginning of timing bit T1 in the bit timing circuit 306 the channel timing unit 308 gets a clock pulse. This causes the channel timing unit 308 to increment. The channel timing unit 308 is a counter circuit. When the channel timing unit 308 changes state, its output causes switching between sequential channels of the dual audio amplifier units 301.

During times T1 and T2 (counted off by the bit timing unit 306 of the main multiplexer 120), settling of the signal occurs and also a 1 is emplaced into the most significant bit position of the register 305. Thus, as seen in FIG. 4C, the bit timer 306 at time T2 sets the most significant bit (1) (flip flop FF1) of the register 305 to a 1 state.

By the end of time T2, counted out by the bit timing unit 306, the appropriate analog level for the particular channel being sampled is present on the PAM line 335.

Referring to FIG. 4C again therefore, at the end of time T2 for a particular channel, the PAM information has gone through the summing amplifier 490 and through the full-wave rectifier 453, has affected the voltage at point 410 and has been compared in the comparator 409 long enough for a decision to appear at its output as to whether or not the input is above or below ground at point 410. Bit 1 (flip flop FF1) has already been changed to a 1 at the beginning of time T2. At time T3 the information which has been sent through the comparator 409 is acted upon. That is, if the input line from the comparator 409 is a high indicating that point 410 is below ground, the first flip flop 1 will be changed in state to a 0. If it is a low indicating point 410 above ground, it will be permitted to remain a 1. Simultaneously the bit timing T3 signal also sets the state of the second most significant flip flop bit 2 (or flip flop FF2) in the register 305, to the 1 state.

At time T4 the operation comparing the magnitude voltage of waveform 471 with the magnitude represented by the states of the flip flops of register 405 has been completed in the manner hereinabove described, and the second most significant bit (2) of the register 305 is either changed to a 0 or a 1 in accordance with whether the output of comparator 409 is high or low respectively. At time T4, additionally, flip flop FF3 of the register 305 has its state changed to a 1 by the timing pulse T4 from the bit timing generator 306.

Also at time t4, the state of bit 1 which has already been determined as hereinabove described is read out as either a 1 or a 0 which indicates that either the voltage of waveform 471 is greater or less than half of the entire scale on the 256 gradations of magnitude. This data is read into a flip flop from the data gating unit 408*a*, from which circuit it appears at the NRZ"A" output at time T5. Also at time T5, the T5 bit from the bit timer 306 sets the fourth most significant bit (flip flop FF4) of the register 305 to the 1 state, sets flip flop FF3 to 0 or 1 depending on the output of the comparator 409, and enables reading out of the state at that time of bit 2 into the flip flop which upon feeding through the data gating circuitry 408*a* causes an output of the number 2 reading of the register 305 on the NRZ line at time T6. Similarly, progressive setting of the sequentially next lower bit positions of the register 305 is effected in bit times T6, T7, T8 and T9, at which time bit 8 is set, and the comparison and read out operations are sequentially effected in the manner indicated hereinabove, such that, for example, bit 8 is reset to 0 if necessary at time T10. At time T1 the read out of the eighth bit position of the register 305 is effected and after passing through the data gating circuit 408*a* appears on the NRZ"A" output line at time T2. This ends a cycle of A/D conversion.

OPERATION OF EFFECTIVE BIT ADDING CIRCUIT

The PAM output from the dual audio amplifier channels 301 on being applied to PAM line 335 is summed in summing amplifier 490. The summing amplifier 490 may be physically in the full wave rectifier 453 or may be separately incorporated. Fed along with the PAM voltage into the summing amplifier 490 is a −6 millivolt of 0 voltage as determined by switch 403 (schematically illustrated to represent a flip flop control and switching circuitry). Means (not illustrated) are provided to control switch SW403. SW403 upon closing for every other sixteen channel scan, feeds a 6 millivolt voltage into summing device 490 for the 33.3 microseconds that switch 403 is closed. Switch SW403 then remains open for the period of sampling the next 16 channels or 33.3 microseconds. Therefore, every other channel sampling there is instituted a —6 millivolt increment. The PAM input voltage varies between a maximum of +3 and a minimum of —3 volts referenced to ground, so that the 6 millivolt signal represents roughly 1/1,000th of the total input range. Since the 6 millivolts is in the negative direction for the sequence of 16 channels every other period, any positive voltage in the 2 microsecond period for each channel sampling period is decremented by 6 millivolts. If the sampled voltage input is negative, the 6 millivolts due to SW403 are added to give a more negative voltage.

Figures 7, 7A:
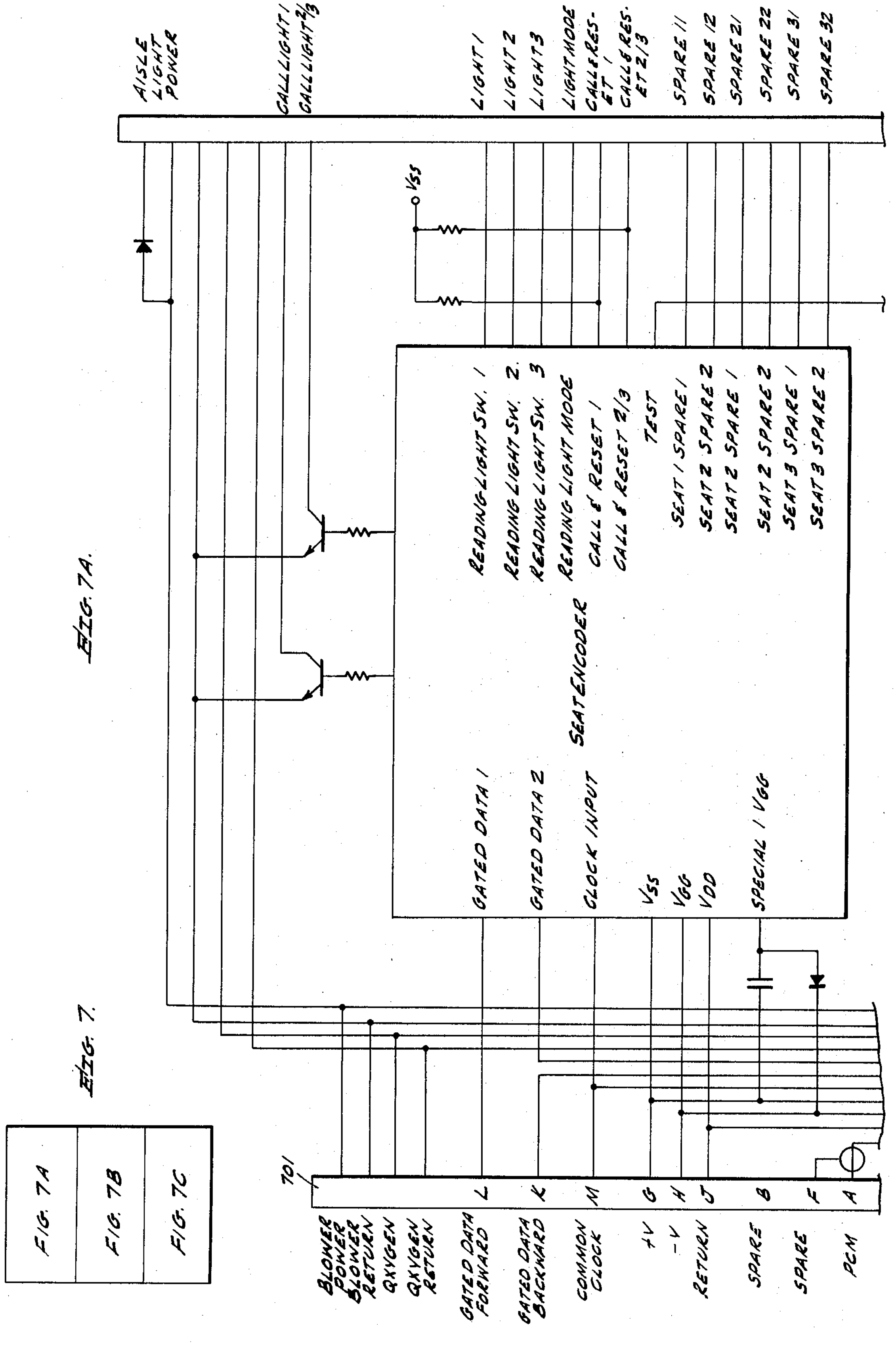
FIG. 7 is composed of FIGS. 7A, 7B and 7C which form a wiring partially block and partially schematic diagram of the seat demultiplexer/encoder funtional units of a seat group of the embodiment of FIG. 1 illustrating the seat encoder, the gated forward and backward data, service power, and special purpose lines; the comparator, data detector and clock pulse separator; timing; channel select; shift and parallel hold register and digital-to-analog converter; audio amplifier; and power conditioner units and the signal flow lines into and out of these functional units.
Figure 7B:
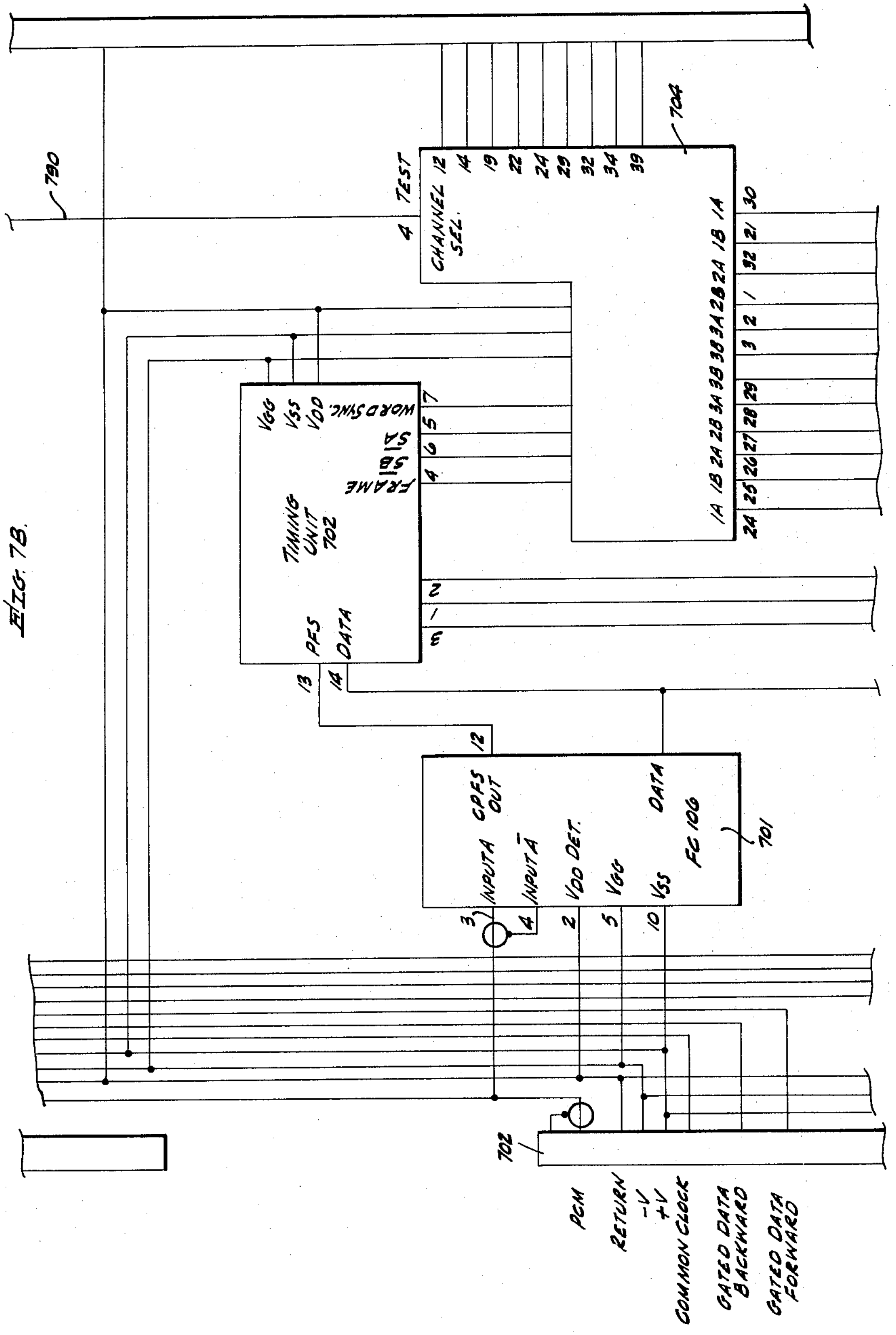
Figure 7C:
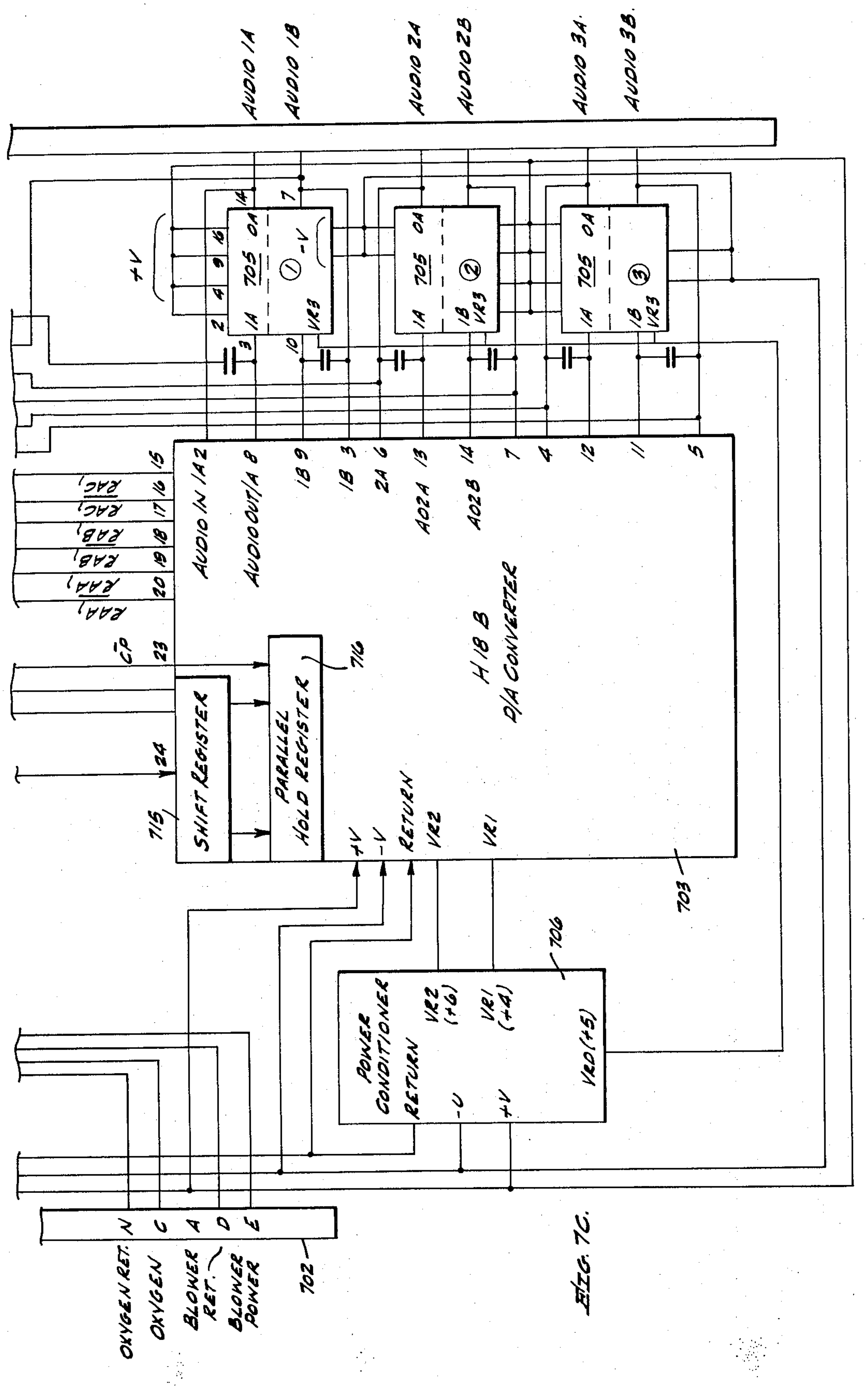

In the illustrative embodiment, the switch SW403 changes state during the 7 ½ or 8 bit time wide hyperpulse or synchronization pulse which begins each 16 channel scan. Thus switch SW403 is alternately opened and closed during the hyperpulse times, and remains alternately open and closed during the channel scan times. This alternatively provides and does not provide a 6 millivolt increment in the negative direction to the PAM voltage over the 16 channel scan time. When the signal is later converted from a digital to an analog signal, integrating the —6 millivolt voltage increments over two or more scans effectively provides the equivalent of adding 1 bit to the information presented. This is so because the 6 millivolt increment represents approximately 1/1024 of the full range of the PAM signal, while the range covered by each of the output numbers from the A/D converter covers 1/512 of this full PAM range. If the input signal lies in the lower half of the range covered by a particular level, the increment causes the passenger during samples when the increment is present to hear a 1/512 lower signal, because the PAM voltage after subtraction of the increment lies in the next lower A/D converter level range. Since the passenger's headset does not respond to the 15 KHz square wave which results, it tends to average each of several samples at a point midway between the two levels involved in adjacent shifts of level. Therefore, if the signal present on a particular channel is changing slowly enough (due to being of low level and/or low frequency) that it remains for two or more successive samples in the lower half of the range of a particular A/D converter level, the passenger gets a true indication of an additional level between each of the two levels into which the A/D converter 315 has resolved the output. Thus effectively he gets an additional 10th bit of accuracy which causes a truer analog output. Therefore, especially in the case of soft music, the passenger hears a more faithful rendition of the actual analog signal input into the equipment. Therefore, as illustrated in FIG. 7, (the analog-to-digital converter), either by providing a minimum of 10 bits or by providing nine bits in conjunction with the incremental signal described hereinabove, to give an effective 10-bit output digital signal which can be converted later to an analog signal, a more faithful rendition of the input is achieved. Alternatively, of course, a full 10-bit A/D converter could be supplied in order to achieve the same result. However, importantly critically, the present system provides the realization that a 9-bit encoding is insufficient to provide the maximum in passenger entertainment and the difference is highly significant in adding a 10th bit. The system is far superior to prior art systems wherein only an 8-bit resolution was provided. Resolution over the 10-bit amount, while necessitating considerable extra circuitry to accomplish, actually does not have a significantly greater effect upon the fidelity. Therefore, use of the 10-bit analog-to-digital conversion is significant in the present application.

It is also very likely that the addition of more bits than 10 will cause unwanted chattering to the passenger at the output.

That is, the advantage of adding bits to the system is that it improves the signal to noise ratio at the passenger audio output. However, in order to realize the benefits of adding bits, the signal-to-noise ratio of the electronic and musical equipment must be as good as that which can theoretically be achieved using the added bits. Therefore, if the electronics of the program source or A/D converter have signal-to-noise ratios lower than those achievable by systems in excess of 10 bits, the improvement in signal-to-noise ratio which could theoretically be achieved by adding the additional bits would not be realized, and the additional bits would simply "chatter" in response to the noise from the electronics.

Ten-bit resolution requires that the signal-to-noise ratio be about 60 db which is provided by the equipment of the illustrative embodiment of the invention. Signal-to-noise ratios of greater than 60 db are difficult to perceive with the ear and are also difficult to achieve in electronic equipment. Systems with a data format of more than 10 bits may not be realizable except by extremely sophisticated and costly electronic equipment. Therefore, the present invention accomplishes its function of providing a simple, economical and yet high fidelity musical or audio output.

Refer to FIG. 4D. FIG. 4D illustrates the waveform change made by the Manchester generator 307 of FIG. 3. From the output NRZ "A" line illustrated in FIG. 4D, the waveform illustrated on line 7A(2) NRZ data appears. Simultaneously, as NRZ data implies, clock pulses are being fed to the Manchester generator 807. The Manchester generator performs a "coincidence" or "inverse exclusive or" function as indicated by the equation $$\text{Manchester} = \overline{\text{clock}} \text{ plus NRZ data}$$

in accordance with the following truth table showing the Manchester encoding.

| CLOCK | DATA | $\overline{\text{CLOCK}}$ PLUS DATA |
|---|---|---|
| 0 | 0 | 1 |
| 0 | 1 | 0 |
| 1 | 0 | 0 |
| 1 | 1 | 1 |

That is, for example, in the first half of time T3, the clock pulse would be "on" (high) and there would simultaneously be a high on the NRZ data line so that the Manchester biphase output would be a high. In the second half of the period the clock pulses off with the NRZ data still on so that the output would be represented in the Manchester as a low on the Manchester biphase line 781. Similarly, in time T4 on the first half cycle the clock pulse is present and the NRZ data is a low so the output is represented as a low and on the second half cycle the clock is logic zero (low) and the NRZ data is also low so the "inverse exclusive or" function of the Manchester generator 807 causes the output at this time on the Manchester biphase line 7A(1) to be a high. During the first half of time T5 the clock pulse is present which presents a high to the Manchester generator circuit and the NRZ data is also high which in accordance with the truth table of the Manchester generator circuit provides a high in the Manchester coded line. In the second half of time T5 the clock pulse is not present and the NRZ data pulse is present which creates a low at the Manchester biphase line. That is as represented by the last column of the truth table, any time the clock and the NRZ data are both the same, the output of the Manchester generator is a 1 and any time the clock and the NRZ data are different, the output is a 0. That is, as defined herein, the "inverse exclusive or" only looks at whether the clock and NRZ data inputs both are the same or are different. If different, the output is a 0 and if the same, the output is a 1. It follows, then, that with this Manchester modulation technique, either a positive to negative or a negative to positive transition must occur in each mid-bit time. Thus, the Manchester biphase output is termed a self-clocking modulation. That is, the Manchester biphase waveform contains both a clock and the NRZ data within the output waveform. That is, since transitions are known to occur regularly each mid-bit time, while transitions at the end of the bit time are not always present, the mid-bit transitions can be detected and used as a clock.

The waveforms of FIGS. 4D are generated by the Manchester generator 307 illustrated in FIG. 3 as will be described in greater detail hereinbelow. Additionally, the Manchester generator generates a frame sync signal and at the proper time it injects the frame sync signal into the bit stream.

Now refer to FIG. 4E, the timing diagram for the main multiplexer. The clock pulses may be generated by a crystal oscillator (not illustrated) which may be running at a 10.02 megacycle rate. The output of the crystal oscillator (not shown) operating at 10.02 megacycles may be sent through a divide by 2 counter or flip flop circuit to provide output clock pulses at a 5.01 megacycle rate. These are the clock pulses illustrated in FIG. 4E on the clock pulse line. The bit timing circuit 306 illustrated in FIG. 3 is essentially a count by 10 circuit which provides outputs of bit time 1, bit time 2, bit time 3 and up to bit time 10 as illustrated in FIG. 4E. As illustrated also in FIG. 4E, channel timing output signals which change state on every tenth bit from the bit timing unit 306 to provide channel timing indications at channel times 1 through 16 are provided. These are generated by the channel timing unit 308. The bit timing and channel timing units are conventional state-of-the-art circuits and will not be described hereinafter in detail. Refer further to FIG. 4E. The clock pulses at the 5.01 megahertz rate are shown on the first waveform line. The separate bit time pulses from 1 to 10 which come out of the bit timing circuit 306 are illustrated in FIG. 3 and the channel times from 1 to 16 which are 2 microsecond approximate duration successive sampling pulses to keep the successive channels being sequentially sampled are illustrated in the channel time 1 through channel time 16 waveforms shown therein. The pulse amplitude modulated signal, which is also shown in FIG. 5A at the output and in FIG. 5C at the input to the full wave rectifier, is illustrated as the PAM signal in FIG. 4E. As illustrated by the dashed line which represents the ground voltage level on the PAM signal, the PAM signal is bidirectional. The analog to digital output signals which were developed in FIG. 4C and there illustrated at the output of the register 305 as NRZ "A" are shown by the NRZ "A" output series of pulses illustrated in FIG. 4E. The stereo/mono information bit which is inserted from a set of gates 311 illustrated in FIG. 3B is also illustrated in FIG. 4E as the waveform stereo/mono. As illustrated in this waveform, the stereo/mono signal is always in stereo on the channel 1 portion of the sampling cycle in the illustrative embodiment equipment and therefore in channel 1, bit 1 is always a 1, by definition. The remaining 14 channels may be set in pairs, for example, channels 3 and 4, channels 5 and 6, etc., in accordance with the arbitrary setting of the bank of switches 311 in the main multiplexer as illustrated in FIG. 3B. It should be appreciated, of course, that the stereo/mono waveform illustrated in FIG. 4E will be changed to show highs wherever the bank of switches 311 shown in FIG. 3B have been arbitrarily set to stereo instead of mono reception. The NRZ "A" waveform output from the data gating circuit 408A illustrated in FIG. 4C is also illustrated in time relationship to the other waveforms in FIG. 4E on the NRZ "A" line. Further, the Manchester coding of this output as illustrated by way of example in FIG. 4D is also shown in the Manchester coded waveform of FIG. 4E. This Manchester coded waveform also illustrates the 7½ bits wide or 8 bits wide frame sync pulse.

The function of the passenger address amplifier 302 has been discussed. As has been described in conjunction with the description of FIGS. 4A, 4B, 4C, 4D and 4E, the audio input which comprises a signal input and a reference voltage line is applied to both channels of the dual audio amplifiers 301 which, since there are eight dual audio amplifiers 301, comprise a total of 16 channels. In the dual audio amplifiers 301, the signals are amplified, impedance match occurs, presampling occurs, preemphasis is introduced and the output is sampled to provide the PAM output at the line 335 into the A/D converter rectifier 303. When the passenger address amplifier 302 is actuated, the 16 audio amplifiers 301 channels are inhibited by the inhibit signal placed over the inhibit line from the passenger address amplifier 302 into all the inhibit inputs of each of the dual audio amplifiers 301. In addition to inhibiting the dual audio amplifiers 301, the passenger address amplifier 302 applies audio output corresponding to the message being sent over the passenger address amplifier into the PAM line 335 leading into the rectifier 313. As described later in detail, in the analog-to-digital converter unit 315 this data is converted to a digital signal in the same manner as described for the output from the dual audio amplifier channels 301. The output from the dual audio amplifier 301 channels is also converted to NRZ data. The register 305 feeds the NRZ"A" output into the Manchester generator 307 where it is combined with the symmetrical clock pulse $\overline{\text{CPSYM}}$ from the bit timing unit 301 which is fed into the Manchester generator 307 at the $\overline{\text{CPSYM}}$ input therein. The NRZ"A" data input into the Manchester generator 307 comprises the stereo/mono bit indicating whether stereophonic or monaural music is being transmitted from each of the dual audio amplifiers 301 together with the data from the first channel. In the next 10 bit word appears the stereo/mono bit for channel 2 with the A/D converted data output from channel 2 and so on up to channel 16. Recycling then occurs after frame sync.

A self-test 1 Hz signal is generated by the self-test generator for use when the self-test entertainment procedure is followed. In this case, the NRZ"A" data is not read into the Manchester generator 307 but the NRZ"B" data (which comprises the 1 Hz signal) is read in instead.

Both the NRZ"A" and NRZ"B" data are continuously produced by the equipment but only one of the two is read in accordance with whether it is in the entertainment or self-test mode (and the equipment has power supplied to it). The Manchester encoder 307 converts whatever data it happens to be reading at the time (NRZ"A" or NRZ"B" data) into Manchester encoded data which is fed into the output buffer 310 where the impedance is matched to provide the proper output impedance for the cable 340 which is sent from the main multiplexer 120 the the submultiplexers 121, 122 and 123. After all 16 channels have been read, on each cycle a suitable synchronization pulse (frame sync) is fed into the system. In the illustrative embodiment system, a relatively long high state pulse is generated in the Manchester generator 307 and inserted prior to the commencing of the next cycle (between channel 16 data and channel 1 data).

Refer further to the main multiplexer 120 of FIG. 3. A channel 1 signal is sent through a pair of NAND gates (not numbered) and into the stereo/mono or S/M input to the register 305 of the A/D converter 315. This input is encoded in the register 305 to provide a 1 on each cycle into the bit chain from the first dual audio amplifier 301 sampled in the cycle. That is, at the time of sampling of channel 1, the 1 is inserted into the bit stream as the stereo/mono bit as further illustrated also in FIG. 4C.

similarly, the unit 311 provides the proper stereo/mono bits at the proper times for the successive channels from 1 through 16. The stereo/mono bits are applied from the unit 311 into the PA amplifier 302 at the S/M in or stereo/mono input to the PA amplifier 302. In the absence of "PA enable" the stereo/mono bits from the stereo/mono unit 311 are fed along the stereo/mono out line into the stereo/mono input of the register 305 where they are injected at the proper times into the corresponding channel bit streams. During the PA enable mode, the data from the "stereo/mono in" is replaced in the circuitry by a special pattern of 1's and 0's hereinabove described, employed to recognize PA announcements.

SELF-TEST

Refer again to FIG. 3, the main multiplexer 120. The self-test generator 309 is enabled into the self-test mode (normally in the absence of passengers in the aircraft) by closing the remote self-test switch. The self-test enable switch SW304 is optionally provided for bench checkout. Upon closing the remote self-test switch the base of transistor Q303 is grounded. This provides a −5 volt difference across the input diode through a resistor (not numbered) which may be 10K ohms and which turns on transistor Q303. The turning on of transistor Q303 turns off transistor Q304. This puts a ground via the resistor R301 onto the A/B line input into the Manchester generator 307. This input causes the Manchester generator 307 to select the data from the NRZ"B" stream. The integrated flip flop unit 345 causes an output at input line 326*a* to the NAND gate N301. At clock time T4 NAND gate N301 is enabled. The frequency from the unit 345 may be for example, 1 Hz. This provides a corresponding output on the NRZ"B" data line which is fed along the coaxial cable into the submultiplexers 121, 122 and 123 and thence into the passenger seat group units 139.

By enabling the NAND gate N301 to go low at time T4, the NRZ"B" line produces a data stream in which all stereo/mono bits are high or logical 1's at the output and in which the digital data represents a 1 Hz full scale square wave.

Stages Q301 and Q302 comrise a free running 16 Hz multivibrator which is coupled to the first flip flop of the integrated flip flop unit 345. Unit 345 is a divide-by-16 counter which provides a 1 Hz signal. This provides a 1 Hz input to the NAND gate N301. During time T4, the inverse of the state of the square wave input of NAND gate N301 is applied to the NRZ"B" line in the Manchester generator 307. Time T4 in the NRZ line represents the sign bit so that the NRZ"B" data represents a full scale magnitude signal which oscillates at a 1 Hz rate.

Now refer to FIG. 5A, the schematic diagram of the dual audio amplifier 301 of FIG. 3. Dual audio amplifier 301 circuits 1 and 2 are shown by way of example. From the tape deck unit 120 the entertainment of the particular channel is fed into the channel A and channel A reference pins of the individual audio amplifier channels 301. The input signal from the tape unit 120 is developed across resistor R504 and is filtered in filter F501 to provide a very sharp rejection of frequencies at 15 KHz. The filtered signal from the notch filter F501 is developed across resistor R513 and fed into the positive input to an operational amplifier Q511. Operational amplifier Q511 may be a conventional type, for example, the type known as μA741. Suitable ±12 volts filtered and −5 volts power supplies are supplied from the power supply unit 312 in the main multiplexer 120. The gain of the operational amplifier Q511 is frequency selective because of filters F501, F502 and F503, increasing from the lower frequencies of about 2 KHz to about 10 KHz and then dropping off sharply toward the notch at 15 KHz. Further to filters F501 and F502, low pass filtering is provided by filter F503 comprising capacitors C503 and resistors R505 and R509 such that the frequencies passed through the input stage of the operational amplifier Q511 and attendant circuitry are substantially between the 2 KHz and 10 kHz frequency range. Capacitor C504 helps to add preemphasis. The filter F502 comprises the capacitor C503 and the resistor R507. Filter F502 provides preemphasis which is the increase in gain in the region of 2 through 10 KHz in accordance with the diagram illustrated in FIG. 4A. Before sampling in the presampling filter 301, the combined filtering which occurs in filters F501, F502 and the filter formed by the capacitor C503 and resistors R505 and R509 is the presampling filter and preemphasis operation illustrated in FIG. 3 in dual audio amplifier units 301.

The filtered, prior to sample and preemphasized, output is applied to the base of transistor Q501. Transistors Q501 and Q502 together form a Hooke circuit wherein it is assured that the voltage which appears at the emitter of stage Q501 is about a 0.6 volts voltage rise over the voltage applied to the base of Q501. Transistors Q501 and Q502 thus provide current multiplication and thus a voltage level shifting circuit wherein the voltage level shift is approximately 0.6 volts upward.

The 0.6 volt level shifted voltage which appears at the emitter of transistor Q501 is also applied at the collector of transistor Q502, and at the cathode of a diode D501 which is provided. The emitter of transistor Q501, the collector of transistor Q502 and the cathode of diode D501 are connected together. The voltage which is applied to the cathode of diode D501 is the filtered and preemphasized voltage from each of the channels. It comprises preemphasized and amplified audio.

Refer to FIG. 4A further. The sampling circuit comprises the circuits of transistor Q503 and transistor Q504. Each of transistors Q503 and Q504 has a collector, a base and an emitter. Transistor Q504 provides for the sampling of channel A input and transistor Q503 provides the sampling for the channel B input. In the transistor Q504 there is applied to the emitter a source of −5 volts. A base current limiting input resistor R514 and a base input voltage developing resistor R513 are provided. The collector output voltage is developed across resistor R512. The transistor Q503 circuit also has its emitter tied to the −5 volts voltage source and joined to the emitter of transistor Q504. Similarly, base voltage developing resistor R515 and a base input current limiting resistor R516 to transistor Q503 are provided. To the collector are coupled the anodes of a pair of diodes D503 and D504. The cathode of diode D503 is connected to the output of channel 302 which is the sequential circuit which may be identical to the first circuit channel 301 normally being sampled in the sampling sequence. The cathode of diode D504 is connected to the cathode of diode D502. The composite pulse amplitude modulated or PAM output 635 of the sampled circuits appears at the junction between the cathodes of diodes D502 and D504. The power supply 312 of the main multiplexer illustrated in FIG. 3B supplies +12, −12, ground and −5 volts voltages.

OPERATION OF THE DUAL AUDIO AMPLIFIER SAMPLING CIRCUITRY.

Consider the operation of the circuit of transistor Q504. An inhibit input of −5 volts may be applied over the inhibit lint from the passenger address amplifier 302 illustrated in FIG. 3B.

In normal operation, without a passenger address override, +12 volts is applied at the inhibit point resistor R112 to the collector of stage Q504. When channel 301 is not being sampled, transistor Q504 is placed in current saturation by the application of the $\overline{\text{CH}}$ output of the channel timing circuit 308 (see FIG. 3). That is, the channel $\overline{\text{CHA}}$ output is a high which causes conduction of transistor Q504 into saturation. Since the transistor is conducting heavily, this forces the emitter to be at substantially −5 volts to which it is coupled. Therefore, since the transistor is conducting to saturation, its collector is essentially at −5 volts, the transistor representing substantially a short. This places the anode of diodes D501 and D502 at the −5 volt level and effectively cuts off the diodes. Since the voltage at the collector of transistor Q502 can never go below −5 volts, the cathode of diode D501 is not below the −5 volts point and conduction across the diode D501 is blocked. Practically the collector of transistor Q502 can never go below −3 volts. Therefore, with no conduction across the diode D501 the signal output of channel A is blocked.

During the time interval that channel A is selected (or sampled) the channel A input from the channel timing unit 308 (see FIG. 3B) goes to the −5 volts state which rapidly causes transistor Q504 to cut off. Cutting of transistor Q504 causes current flow across resistor R512 between the +12 volts voltage supply and the junction between the anode of the diodes D501 and D502. This current divides evenly between the identical diodes D501 and D502. Since the drop across the conducting diodes D501 and D502 is equal, the voltage which appears at the collector of transistor Q502 which represents the output audio signal also appears at the PAM output line 635. Therefore, while channel 301 or channel A is being sampled, the voltage appearing at the PAM output line 635 faithfully follows the presampled, filtered and preemphasized voltage at the output of the transistor Q502. The channel 302 circuit of transistor Q503 performs identically in response to the channel B or $\overline{\text{CHB}}$ signal being present or absent in accordance with the channel timing unit 308 (see FIG. 3B).

Refer again to FIG. 3 in conjunction with FIG. 5A. The $\overline{\text{CHA}}$ input to FIG. 5A represents the output $\overline{\text{CH 1}}$ from the channel timing unit 308 and the $\overline{\text{CHB}}$ input to the first dual audio amplifier 301 represents the channel 2 output of channel unit 308.

While in nowise to be considered as limiting the scope of the invention, the following is one representative set of values which may be used in th circuit of the dual audio amplifiers of FIG. 5A:

| Number on Drawings & in Specification | Designation |
|---|---|
| Transistors | |
| Q501 | 2N2907A |
| Q502 | 2N2222A |
| Q503 | 2N2369 |
| Q504 | 2N2369 |
| Q511 | A741 |
| Diodes | |
| D501 | 1N3064 |
| D502 | 1L3064 |
| D503 | 1N3064 |
| D504 | 1N3064 |
| | Ohms and Tolerance Where Special |
| Resistors | (K = 1,000) |
| R501 | 10.6K±1% |
| R502 | 10.6K±1% |
| R503 | 5.3K : 1% |
| R504 | 600±10% |
| R505 | 14.5K±5% |
| R506 | 51K±5% |
| R507 | 10K±5% |
| R508 | 1.8K±5% |
| R509 | 14.5K±5% |
| R510 | 15K |
| R511 | 15K |
| R512 | 5K±5% |
| R513 | 1K |
| R514 | 1K |
| R515 | 1K |
| R516 | 1K |
| R517 | 5K±5% |
| | Designation |
| Capacitors | |
| C501 | 2000±5% pfd |

-Continued

| Number on Drawings & in Specification | Designation |
|---|---|
| C502 | 1000±5% pfd |
| C503 | 200±10% pfd |
| C504 | 5600 : 10% pfd |
| C505 | 1000±5% pfd |
| C506 | .01±10% mfd |

Refer to FIG. 5B. FIG. 5B illustrates the passenger address amplifier 502 which is illustrated in block diagrammatic form in FIG. 3A. The circuit 1001 is a conventional voltage gain amplifier and need not be discussed in detail. The circuit 1002 set apart in dashed lines provides automatic gain control for citcuit 1001. A conventional enabling circuit 1003 is provided. Circuit 1003 in accordance with the state of the PA enable input provides a +12 or open output at the inhibit output of transistor Q1001. It also provides a digital signal output $\overline{\text{LPA}}$ at the output of stage 1002. Circuit 1003 also switches the output of the amplifier 1001 onto the PAM output 605. The logic circuit 1004 provides digital circuitry to supply the stereo/mono bits which are generated in the channel switching unit 311, and are modified in the passenger address amplifier 302 (see FIG. 3). The circuit 1004 is the circuitry in the PA amplifier 302 that modifies the stereo/mono output of the stereo/mono bit genertor 311. The stereo/mono digital signals which have been set by the switches 311 are applied to the input of NAND gate N1001. If the $\overline{\text{LPA}}$ output is high indicating that the equipment is not set for passenger address announcement, then these bits are outputed by a NAND gate N1002 directly to the stereo/mono output from whence they are multiplexed into the data gating unit 408*a* illustrated in FIG. 4C at the stereo/mono information input to the data gating unit 408*a.*

The $\overline{\text{LPA}}$ output (depending upon the state of the transistor Q1002) indicates the condition necessary for passenger address overriding of the stereo/mono dual amplifier channels. In this case th stereo/mono inputs on the S/M input line to the NAND gate N1001 are not transmitted through NAND gate N1001 which is now in disabled state. Instead, the information output of the NAND gate N1001 in this condition is replaced by a pattern of 1's and 0's at the output of the flip flop FF1001 such that during odd number channel times a 0 is transmitted from the flip flop FF1001 and during even number channels a 1 is transmitted. This causes a sequenced stereo/mono output which causes the 01 code input during each channel while passenger addressing is enabled by which the submultiplexers 121, 122 and 123 recognize the presence of passenger address announcements. On channel 1, as hereinefore stated, a 1 is always transmitted even during passenger address anouncements. As illustrated in FIG. 3, that is done by the gates responsive to the $\overline{\text{channel 1}}$ input to the passenger address amplifier 302 and to the register 305 of the A/D converter 315.

Refer to the automatic gain control circuit 1002. This circuit receives as input the output of the audio signal internal in the audio amplifier 1001 taken off the collector of the amplifier stage Q1003 and coupled through a capacitor (not numbered) to the base of transistor Q1004 of the automatic gain control circuit. The circuit of transistor Q1004 is a conventional amplifier, the output of which is rectified and its peak value stored on capacitor C1001. The voltage stored on capacitor C1001 which corresponds to the output at the collector of transistor Q1003 is applied to the gate of the MOS device MOS1001. This voltage is at approximately ground when the voltage at the Q1003 collector is relatively small indicating a relatively soft passenger address signal input. The voltage at the junction between the capacitor C1001 and the gate of MOS device MOS1001 becomes more and more negative as the signal amplitude at the collector of transistor Q1003 increases. The MOS device MOS1001 represents a variable voltage resistor which has a high impedance when the voltage at the capacitor C1001 connection to its input gate is very near ground and which becomes a progressively smaller resistance when the voltage applied to the gate of MOS device MOS1001 from capacitor C1001 becomes more negative. This decrease in resistance causes a corresponding decrease in signal amplitude to be applied via the resistor R1001 and the capacitor C1001 to the base of the transistor Q1003. This effectively provides automatic gain control of the system.

Figure 5C:
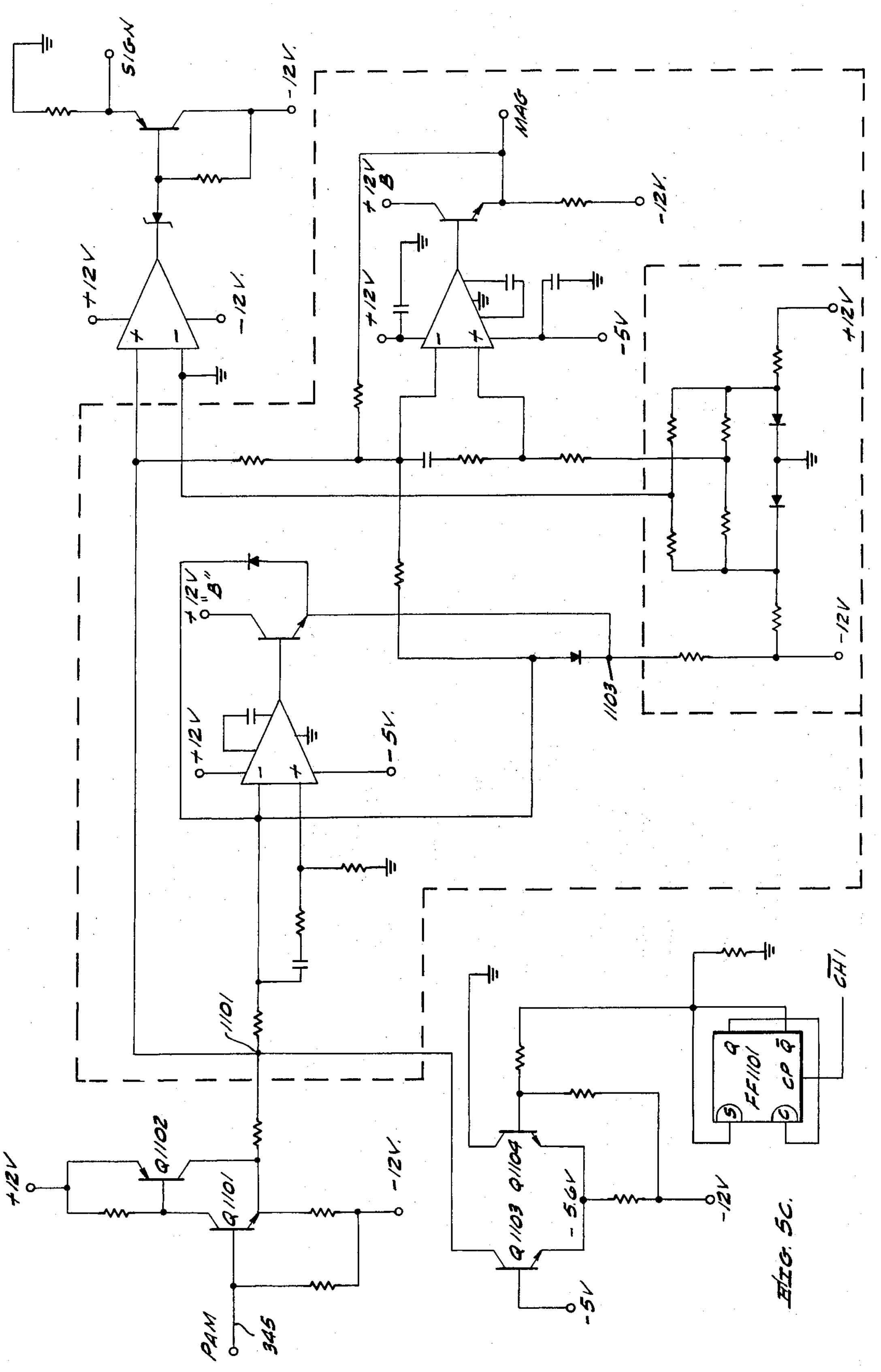

Refer to FIG. 5C. FIG. 5C illustrates the rectifier 303 of the A/D converter 315 of the main multiplexer unit 120 illustrated in FIG. 3. The rectifier of FIG. 5C contains a voltage incrementing or summing circuit 490 also illustrated in FIG. 4C by which the input voltage is decremented by a half least significant bit voltage depending upon the state of an input switching circuit. Stages Q1101 and Q1102 form a Hooke circuit to restore the level to the pulse amplitude modulated output voltage of the dual audio amplifier 301 sampler stage 404 (on PAM line 345). Another Hooke circuit (see FIG. 5B) raised the level of voltage by about 0.6 volts and the Hooke circuit of Q1101 and Q1102 again lowers this voltage about the same amount. These two circuits act in conjunction with rapid switching to compensate for the delay effects which would otherwise result because of the length of the PAM line 345.

As was described hereinabove in conjunction with FIG. 4C, the circuit of flip-flop FF1101 acts as a switch which changes state by means of the flip-flop FF1101 each time the $\overline{\text{channel 1}}$ signal is generated by the channel timing unit 308. Thus, for every other change of state of the flip-flop FF1101 the voltage is incremented at the point 1101. That is, the voltage at point 1101 is decreased by 6 millivolts whenever the flip-flop FF1101 is in the state such that its $\overline{Q}$ output is a low. When the $\overline{Q}$ output is a high, this drives the stage Q1104 into conduction which causes the emitter of stage Q1103 to rise in voltage which thereby cuts off transistor Q1103. That provides no extra current flow from point 1101 into stage Q1103 and therefore no increment of voltage results. When flip-flop FF1101 on the next cycle of channels is triggered by the $\overline{\text{CH 1}}$ input from the channel timer 308 the flip flop FF1101 again changes state putting a low at the $\overline{Q}$ output of flip flop FF1101. This low is coupled to the stage Q1104 to turn stage Q1104 off. Turning of stage Q1104 off effectively puts the emitter of stage Q1103 at about −5.6 volts and the difference across the input diode of stage Q1103 thereby causes stage Q1103 to conduct. The current flow across resistor R1101 through the stage Q1103 and across the resistor R1102 thereby causes a 6 millivolt drop at the point 1101 to occur. This effectively introduces a 6 millivolt or one-half least significant bit change for every other cycle of the sampling sequence. The remaining stages provide a fast full-wave rectifier to provide rectified amplified output voltage on the magnitude (mag) output. Further, by virtue of the branching of the circuit shown in the upper right corner, a digital value representing the sign of the input is generated at the sign output. These outputs are also shown in FIG. 4C as outputs from the full wave rectifier 308 whereby the sign in the positive or negative direction appears at the sign output and the magnitude of the voltage is provided on the magnitude output. Actually, by virtue of amplification, the input from −3 to +3 volts provides a sign output depending upon whether it is a − or a + and also provides a corresponding magnitude of up to 8 volts depending upon the percentage of the 3 volts of the positive or negative direction which is the input into the rectifier circuit. The circuit elements are also provided in the circuit 1103 whereby balancing occurs to enable adjustment for precision in the output characteristics of the rectifier.

Refer to FIG. 5D. FIG. 5D illustrates the current ladder network 304 which is schematically illustrated also in FIG. 4C and in FIG. 3. The input at the MAG line which represents an absolute magnitude is applied across resistor R1201. Resistor R1201 may be a 666 ohm resistor. The voltage at point 1201 is held at ground by virtue of the diodes D1201 and D1202. The cathode of diode D1201 is grounded and connected to the anode of diode D1202. Therefore, the current across the resistor R1201 is always proportional to the input MAG voltage. A comparator 809 is provided.

With an increase in current due to a higher voltage magnitude input at a given instant, more current is drawn across resistor R1201. This current is continuously compared by the comparator 809 with the current from a source to be now described. A plurality of balanced pairs of transistors form each of the successive 8 bits of the binary weighted current ladder 304. These eight balanced transistor pairs are arranged in configuration such that each pair responds to one of the respective stages of the inputs Q1 through Q8. These are the lines which go up from the flip flops of the register 305. For example, when Q1 is a low, this turns the transistor Q1201 off whcih in turn causes the transistor Q1202 to conduct. The low is a −5 volts corresponding to a 1 in the corresponding (most significant) bit of the register wherein the input to point Q1 occurs. This occurs always at the T2 time set by the bit timing circuit 306. The bases of each of the top transistors of the pairs of transistors forming the ladder are kept at a constant voltage by the transistor Q1203. Thus, when transistor Q1202 is turned on, its emitter follows at a voltage which is the drop of the diode between the base and emitter of stage Q1202. This voltage provides a current across selected resistor R1202 which causes transistor Q1202 to act as a current source in drawing current from point 1201. Each of the successive pairs of transistors comprising the $2^7$, $2^6$, $2^5$, $2^4$, $2^3$, $2^2$, $2^1$, and $2^0$ power circuits are current sources constructed in such a manner so that their current ratios are proportional to the bit numbers to which the circuits relate. In this embodiment, in order to prevent too small a current through the $2^0$ stage pair and to prevent too large a current from flowing through the $2^7$ bit stage or most significant bit stage comprising transistor Q1201 and Q1202, an R-2R ladder is provided. R1210 is provided which allows the final six pairs of transistors from $2^5$ on down to $2^0$ to be operated at the same current level. The R-2R resistance ladder R1210 thereby insures that the current drawn from the point 1201 from the 5th most signifcant bit down to the least significant bit circuits varies in a binary weighted manner. That is, the ladder R1210 provides binary weighting of the individual bit circuits to insure proper current drain and that the least significant bit does not have too little current drain or the most significant bit have too much current drain.

By the provision of carefully selected close tolerance resistors R1202, R1203, R1204, R1205, R1206, R1207, R1208 and R1209 in the emitter circuits in each of the balanced pairs of transistors in each of the ladder bit positions $2^7$ through $2^0$, the remaining resistors, for example, the resistors in the R-2R ladder R1210 may be made with a much lower tolerance resistance value than would otherwise be necessary. Resistors R1202 through R1209 inclusive are chosen in accordance with the proper current drain which is required from the point 1201 in order to cause the ladder to properly operate. Each of these resistors may comprise a tapped resistor wherein one or more portions may be shorted across to provide the exact amount of resistance which under test yields the proper current drain. The voltage bleeder and filters provides the proper stable voltage bleeder source required for operation of the balanced pairs of transistors of the bit positions.

The comparator 809 continuously compares the current drawn from the point 1201 by the current sources comprising the balanced pairs of transistors with the current supplied through resistor 1201 by the magnitude of input voltage. If the former is greater the remaining current required by the current sources is drawn from the diode D1202. Current flowing through diode D1202 provides a voltage at the − input to the comparator 809 which is amplified therein and applied to the zener diode Z1201 as the digital signal. Transistor Q1210 provides more current capability from the zener diode circuit and provides a comparison output which is applied to the register to control the resetting of the particular significant bits as successive approximations are examined sequentially.

If the magnitude current is greater than the current drawn by the current sources comprising the transistor pairs, then the remaining current flows through diode D1201 to ground. This applies a positive voltage to point 1201 which voltage causes the comparator 809 to switch to its low output state and provide a corresponding signal comparator output. An important feature of the circuit is that instead of voltages, the individual binary pairs are providing current changing outputs which permit very rapid changes at the point 1201. The current sources act rapidly and directly upon the comparator thereby avoiding time delay.

The register 305 of the analog-to-digital converter is conventional in the art, and will not be described.

THE MANCHESTER GENERATOR

Figure 5E:
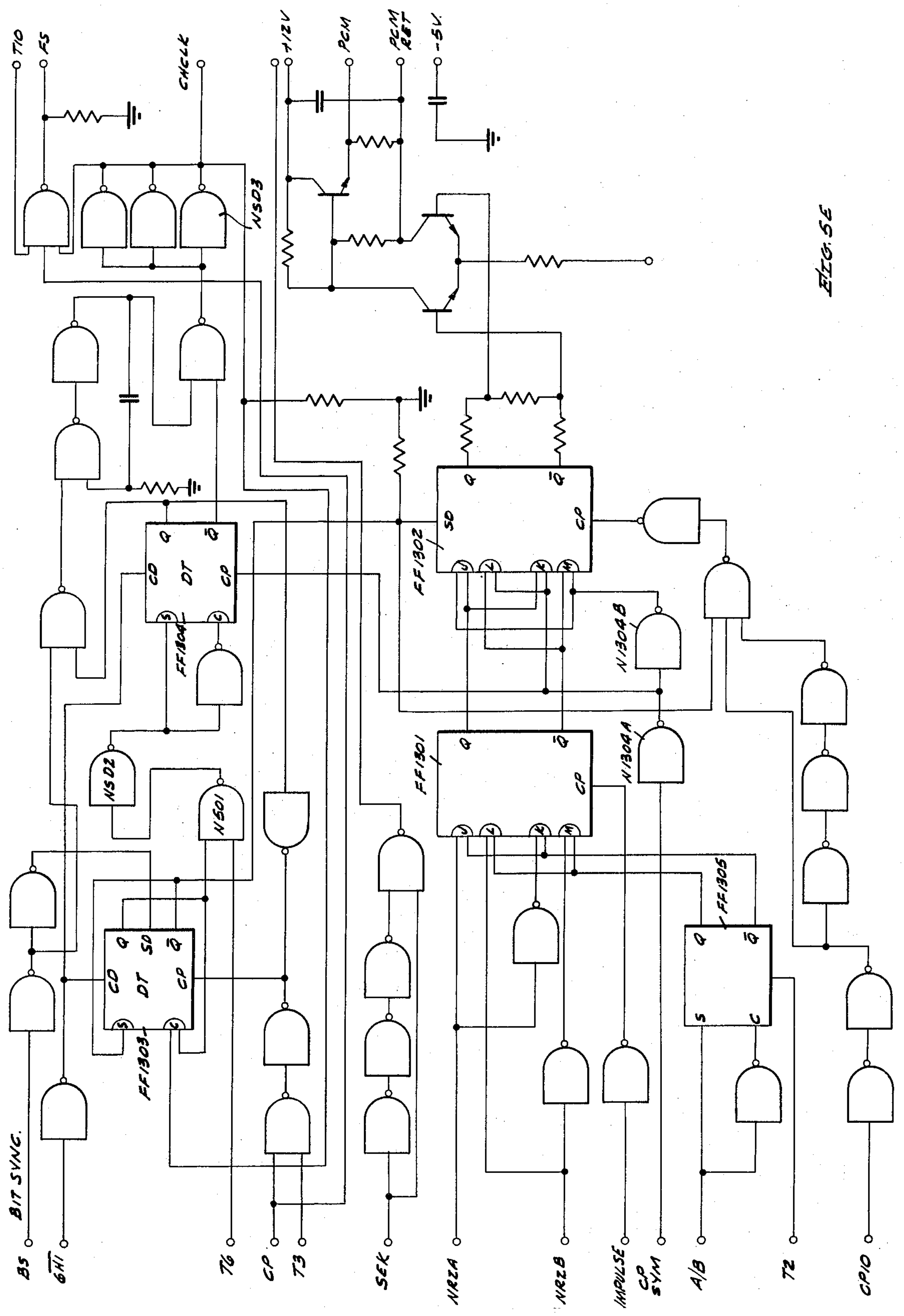
FIG. 5E is a schematic diagram of the Manchester generator of the main multiplexer representation of FIG. 3B.

Refer now to FIG. 5E. FIG. 5E illustrates the Manchester generator 307 of FIG. 3B.

The NRZ"A" input from the analog-to-digital converter 315 (see NRZ"A" input to Manchester generator 307 in FIG. 3B) is applied to the NAND gate N1301 and simultaneously to the J input of the flip flop FF1301. A flip flop FF1302 is also provided. These flip flops are of a type which have logical circuits integrated therewith and which, for example, may be of the type known as RF212 obtainable from the Raytheon Corporation, Waltham, Mass. The NRZ"A," NRZ"B" and A/B inputs are wired and interconnected so that when A/B is in its high state representing self-test, the data from NRZ"B," the self-test signal, is clocked into flip flop FF1301 in place of the NRZ"A" data which is the data from the dual audio channel which has been converted in the A/D converter to a digital data signal. When A/B is in its low state indicating that self-test is not being effected, which is the usual receiving state in the passenger entertainment system, the NRZ"A" data is selected by the input logic of the flip flop FF1301. The input logic is such that either the NRZ"A" or the NRZ"B" input appears at the Q output of the flip flop FF1301 as selected by the A/B signal indicating ordinary operating condition or condition of self-test. The output of the flip flop FF1301 in the entertainment mode is the same NRZ"A" data which was put in. The output of the Q circuit is the inverse of the NRZ"A" data. The $\overline{\text{CP symmetrical}}$ ($\overline{\text{CPSYM}}$) input is applied from the bit timing unit 306 of the main multiplexer of FIG. 3A and comprises a series of clock pulses with a frequency equal to the data rate of NRZ"A" data and with a 50 percent duty cycle high and low. This is so because it represents the output of a flip flop (not shown) in the bit timing unit 306 that is set on and off successively by the crystal oscillator 325 in the bit timing unit 306. The clock pulses applied at the $\overline{\text{CPSYM}}$ input are applied to NAND gates N1304A and N1304B and thence to flip flop FF1302. In flip flop FF1302 these pulses are logically combined with the NRZ"A" or NRZ"B" data from flip flop FF1301 in the manner illustrated and described in FIG. 4D illustrating the Manchester equation and waveforms. The clock pulse 10 (CP 10) input, which runs twice as fast as the $\overline{\text{CPSYM}}$ input, is utilized to clock the resulting Manchester encoded biphase data to the Q and $\overline{Q}$ outputs of flip flop FF1302. CP 10 is the output of the 10 megacycle crystal oscillator 325 in the bit timing unit 306 which for ordinary timing is passed through a divide by 2 counter. $\overline{\text{CPSYM}}$ and the other clock pulses are at approximately 5.01 MHz. The CP 10 pulse is directly applied from the crystal oscillator 325 and is at a 10.02 MHz clock pulse rate. The NAND gates and associated circuitry of circuit 1302 provide waveshaping of the CP 10 clock pulse to provide differentiation of the input clock pulses so as to provide for optimal clocking operation of the flip flop FF1302 circuit. The two transistors (not numbered) at the Q and Q outputs of the flip flop FF1302 present a differential amplifier to provide level shifting and proper amplification of the pulse code modulated (PCM) Manchester encoded biphase output from the Manchester generator 307. The circuit also provides some required speed up of the shifting time of flip flop FF1302.

The output of the differential amplifier pair of transistors (not numbered) which has been amplified and level shifted appears as the pulse code modulated and pulse code modulated return outputs illustrated in the right hand portion of the figure. A transistor in the collector circuits of the differential amplifier (not numbered) provides additional current gain capability of the circuit.

Now refer to the upper portion of FIG. 5E, the Manchester generator, in conjunction with the timing diagram of FIG. 4E. FIG. 5E illustrates one way of generating the frame sync (synchronizing voltage) which occurs at the start of each cycle of sampling of the 16 successive channels successively in the main multiplexer 120. Synchronization for the purpose of the illustrative embodiment is done for each channel sampling sequence. It will be understood of course that frame sync could occur and the frames could be every other sampling time or at any particular interval and in this case it has been decided to put the frame sync at the beginning of each cycle of channel sampling. Frame sync is any recognizable pattern which could not otherwise occur in the chain of data. In the illustrative embodiment as illustrated in FIG. 4E what is utilized is 7½ bits or 8 bits wherein the output at the PCM output line of FIG. 5E is in its high voltage state. Due to the fact that the system uitlizes Manchester encoding to transmit from the main multiplexer 120 to the submultiplexers 121 and between the submultiplexers 121 and the seat group units 139, this pattern cannot occur with normal data since in Manchester encoding the changes are made at least once per bit time. Therefore, this particular signal could not occur in normal data transmission and thus is utilizable as the synchronizing signal. That is, there could never be 7 straight highs in Manchester encoding and therefore any 7 straight highs will have to be the synchronizing pulse which the subunits can recognize. Therefore, each of the submultiplexers 121 and each of the seat group unit demultiplexers recognize the 7½ bit high time as the synchronizing pulse and they synchronize with each other off that 7½ bit long high or hyperpulse synchronizing signal. In this instance the term hyperpulse is utilized to mean an unusual length pulse, not an unusually high voltage pulse. At the PCM output, the least significant bit of channel 16 is transmitted, when the channel timing unit 308 of the main multiplexer 120 is at channel time 1 and when bit timing unit 306 is at time T3. The coincidence of the $\overline{\text{CH 1}}$ and the T3 inputs enables the change of state of flip flop FF1303. The flip flop FF1303 is selected and configured such that a change in its state can only occur with the coincidence of $\overline{\text{CH1}}$ and T3 signals. This change of state will either be from set to clear or from clear to set depending upon the condition before the two coincident signals came in.

However, during the period of transmission of the 16 channels of information, the flip flop FF1303 is always maintained in the clear state by the fact that it is not channel 1 time and therefore the clear direct input is maintained low which holds the flip flop FF1303 in the clear state.

After 16 channels have been sampled, a hyperpulse, illustrated as the 7½ or 8 bits of frame sync time on the first (channel times) line (and on the Manchester coded PCM output line) of FIG. 4E, is initiated by resetting the flip flop with the $\overline{\text{CH 1}}$ and T3 signals. The flip flop FF1303, upon changing into the set state, provides a high output at the Q output and a low output at the $\overline{Q}$ output. The $\overline{Q}$ output is sent to the "set direct" input of the flip flop FF1302 to hold the flip flop FF1302 in the set state. With flip flop FF1302 in the set state no information can be transmitted out on the PCM output line. In this condition, the PCM output remains at a high. This condition remains until the flip flop FF1302 is reenabled by disappearance of the set direct signal from the $\overline{Q}$ output of flip flop FF1303. During the period while the pulse code modulated output (PCM) remains high, the bit timing unit 306 in the main multiplexer 120 continues to count normally. When the bit timing unit 306 provides the time T6 output pulse, the conjunction of the signal input to NAND gate N5d1 in conjunction with the Q high state output during the hyperpulse period enables NAND gate N5d1 which in turn enables NAND gates N5d2 and N5d3 to set the flip flop FF1304. Setting the flip flop FF1304 Q output to its high or 1 state causes the FS output of the plurality of NAND gates in parallel (not numbered) to go to the low state. The FS output is provided at the FS input line to the bit timing unit 306 of the main multiplexer 120 and starts the bit timing units 306 counting from T1. The circuits 5d4 and 5d5 of FIG. 5E, the Manchester encoding, are not used in the main multiplexer Manchester encoder 307 but are used in the submultiplexers 121, 122 and 123. This is because the B.S. signal is present only in the submultiplexers 121, 122 and 123. It is more economical to employ the FIG. 4E circuit for main multiplexer 120 as well as the submultiplexers 121, 122 and 123 even though some unneeded circuitry is present. However, although the FIG. 4E circuit is utilized in the main multiplexer 120 in the illustrative embodiment, it will be appreciated that a design leaving out circuits 5d4 and 5d5 could optionally be used in the main multiplexer 120.

A channel clock output of the circuit of Manchester generator circuit of FIG. 5E is provided. When the time T10 input pulse is high and the F.S. output is high and the CP input is high then the CHCLK output goes low momentarily and on going high again (after CP goes low) it clocks the channel timing unit 308. During FS time, because of the low input to NAND gate N5d3, the CHCLK (channel clock) signal which normally causes channel timing unit 308 to shift, is inhibited. This circuit insures that the channel timing unit 308 stays in channel 1 during the hyperpulse period.

The FS low signal output resets the bit timing unit 306 back to the bit 1 or time T1 state. This unit 306 now counts through T1, T2 and T3. On reaching T3, the T3 input again enables the flip flop FF1303 to change state. Flip flop FF1303 in changed cleared state, removes the inhibiting signal from the SD input of flip flop FF1302 and enables the PCM data to be outputed from flip flop FF1302 of the Manchester generator 307. The 7 bit time of the hyperpulse is determined by the four clock periods T3, T4, T5 and T6 before the T6 reset signal is put in plus the additional counting from T1 to T3 before the SD input to flip flop FF1302 is removed. The additional half or whole bit frame signal time is caused by the fact that the Manchester encoding of the logical 1 bit always starts off with a high, and the last bit of channel 16 may end with a high.

Refer to the submultiplexer embodiment where the circuits 5d4 and 5d5 are used. These circuits detect the B.S. inputs and the output of flip flop FF1304. Flip flop FF1304 in its set state causes the FS output to go low. If flip flop FF1304 is ever in its set state while the B.S. input is low, circuits 5d4 and 5d5 recognize this and cause the FS output to remain low for a period after flip flop FF1304 returns to its clear state.

There are two synchronizing pulses in the submultiplexers 121, 122 and 123. These are the FS and BS sync pulses. These function to set the bit timing circuit 609 to times T1 and T4 respectively. In normal operation should these BS and FS pulses ever occur simultaneously, it indicates that the submultiplexer 121, 122 or 123 is improperly synchronized to the main multiplexer data. The long FS pulse generated in this case by circuit 5d4 (FIG. 5E) changes the state of the submultiplexer 121, 122 or 123 to inhibit bit timing start of count for an inhibiting time so that the conflict is removed and synchronization of the main multiplexer and submultiplexer data may be achieved by the next B.S. signal.

THE SUBMULTIPLEXER UNIT

Figure 6A:
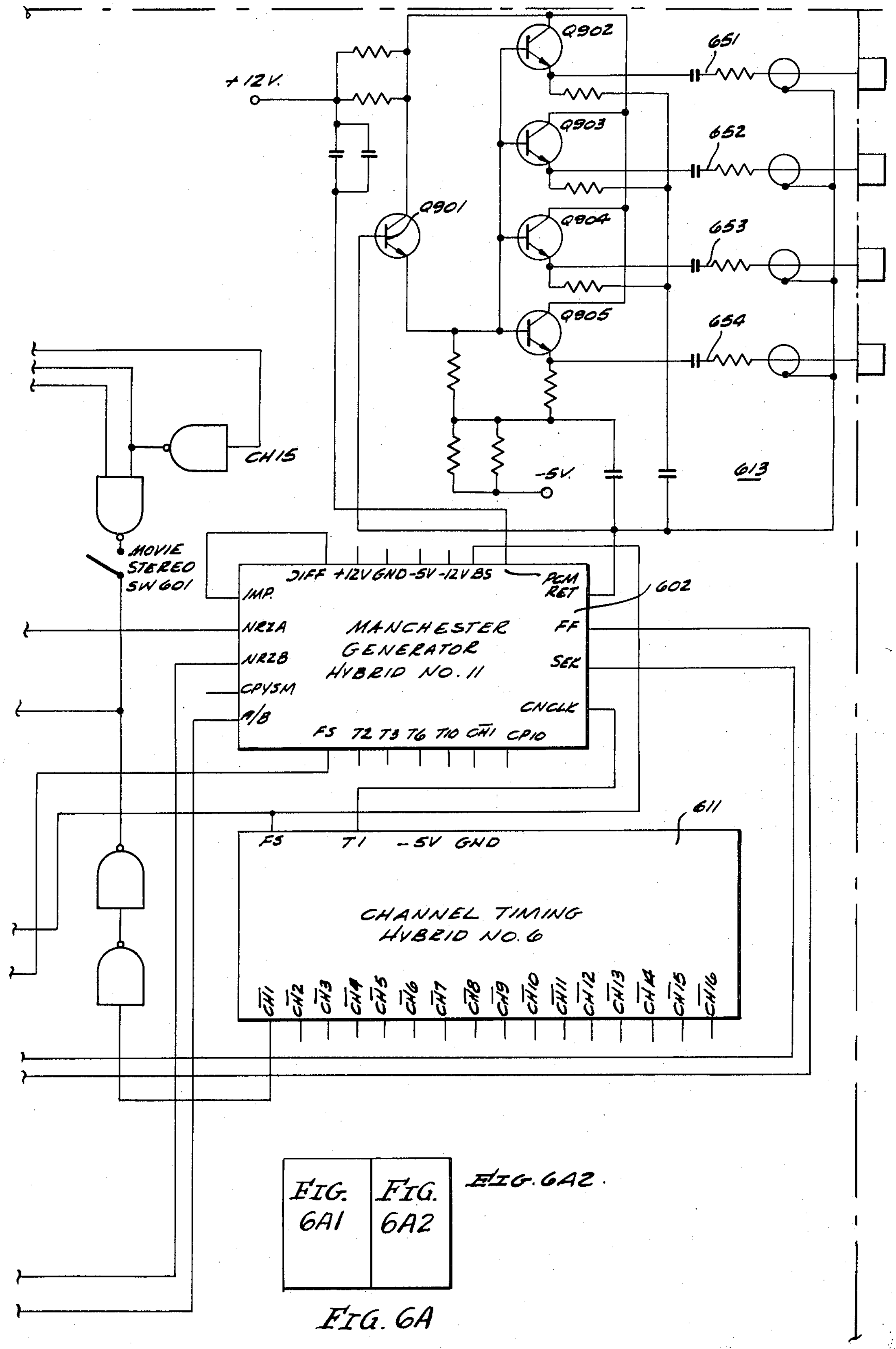
FIG. 6A is composed of FIGS. 6A1 and 6A2 which form a block and schematic representation of one of the compartment submultiplexer units of the illustrative embodiment of FIG. 1 and wherein is illustrated an analog-to-digital converter unit which may be substantially identical to the analog-to-digital converter unit of the main multiplexer of FIG. 3A, and additional circuitry comprising a dual audio amplifier to provide movie entertainment audio input, a passenger address amplifier which may be identical to the passenger address amplifier of the main multiplexer representation of FIG. 3B, bit and channel timing circuitry similar to the circuitry of the main multiplexer, a data and mode unit for decoding the Manchester encoded NRZ incoming data and an output channel wherein is schematically represented the division, for example, into four parallel circuits of output from the submultiplexer which is encoded in a Manchester generator similar to that of the main multiplexer and which is disseminated in four separate parallel columns of seat group units.

Refer to FIG. 6A. FIG. 6A illustrates the submultiplexer 121 in block and partially schematic diagrammatic form. It will be understood that in the illustrative embodiment of FIG. 1, two additional submultiplexers 122 and 123 are provided, each for an additional aircraft compartment. Since the submultiplexers 121, 122 and 123 are identical, or substantially so, only submultiplexer 121 will be described in detail.

The submultiplexer 121 comprises a dual audio amplifier 604, a passenger address amplifier 605, an A/D converter 610 which further comprises a rectifier 606, a ladder circuit 607, and a register 608, which may be substantially identical or identical to corresponding units illustrated in the main multiplexer 120. Submultiplexer 121 further comprises a bit timing circuit 609, a channel timing circuit 611, a Manchester generator 602 and a power supply 603, each of which may be similar or identical to the corresponding units in the main multiplexer 120. The submultiplexer 121 additionally comprises a data and mode circuit 601 and an output buffer circuit 613 which are not provided in the main multiplexer 120. The coaxial line 840 from the main multiplexer 120 is coupled into jack J602 and is extended to the input of the data and mode circuit 601. A jumper and a jack J603 provide a path for the incoming signals from the main multiplexer 120 whereby the input signals are also sent out of the first compartment submultiplexer 121 via the jack J603 into the next compartment submultiplexer 122, where again the signals are sent into the third compartment submultiplexer 123 by a similar means. After being sent through the third compartment submultiplexer 123 the line is terminated by its characteristic impedance so that no reflections are directed toward the signal source. A separate submultiplexer 121, 122, and 123 is provided for each respective compartment 131, 132 and 133. From the main multiplexer via a single coaxial cable 840 the data is sent through the line indicated in PCM into the three submultiplexers 121, 122, and 123.

As stated, the input signals are applied into the PCM and PCM return inputs to the data and mode circuit 601. The data and mode circuit 601 decodes the Manchester encoded data back into NRZ form.

The data and mode circuit 601 also detects the long hyperpulse in the main multiplexer PCM data and outputs a synchronization pulse to maintain the submultiplexer timing circuits 609 and 611 synchronized with those in the main multiplexer 120. The synchronizing of the bit timing circuit 609 and the channel timing circuit 611 is effected by means of the BS output of the data and mode circuit 601 which is applied to the BS input of the bit timing circuit 609 and simultaneously to the FS input of the channel timing circuit 611. The BS input and FS inputs respectively cause the flip flops to be in the proper state for starting the respective bit timing and channel timing sequence. The data and mode circuit 601 also detects the stereo/mono bits from the main multiplexer 120 and combines these with the LPA output of the passenger address amplifier circuit 605 and the movie enable signal and generates a signal which controls the mode in which the submultiplexer 121 is operating. That is, the data and mode circuit combines the movie enable digital signal from the local movie projector, the LPA digital signal from PA amplifier 605, and the mode information contained in the stereo/mono bits of the main multiplexer data and generates a digital signal designated A/B which controls whether the Manchester generator 602 encodes the digital data on line NRZ"A" or that on line NRZ"B" for transmission to the seat units. The NRZ"A" data consists of output from the local analog-to-digital converter 610, while the NRZ "B" data is the digital data from the main multiplexer 120 of FIG. 1 which has been decoded by the data and mode circuit 601. In the movie enable mode, the NRZ"A" output from the register 608 is utilized by the Manchester generator 602 during channel time 15 and 16 so that the movie information is sent to the seat unit. If the passenger has pushed the switches so that he is listening to channel 15 and 16, he hears the movie audio. The movie data is substituted for the channel 15 and 16 data from the main multiplexer 120. When passenger addressing from the compartment in which the submultiplexer 121 is positioned is desired, the PA amplifier 605 of the submultiplexer 121 causes the LPA output to go to its low state. In this state the data and mode unit 601 causes all 16 channels to be switched to the NRZ"A" output so that the data from the passenger address amplifier 605 goes out on all 16 channels. When the passenger address amplifier 605 is on, it inhibits the movie dual-audio amplifier unit 604 as well as inhibiting the 16 channels from the main multiplexer 120. Thus, the local PA audio (LPA) mode has a higher priority than the movie audio mode so that if both are on simultaneously, the equipment will go into the passenger address amplifier operative mode. If the passenger address signal from the main multiplexer 120 is actuated, this is represented by a 1 in the first and all subsequent even numbered channel first bit positions, and by a 0 in all odd numbered stereo/mono positions except the first stereo/mono position. In this mode, the data and mode circuit 601 causes the main multiplexer 120 data to be fed into the Manchester encoder 602 and out toward the passengers directly. That is, this sequence of stereo/mono bits causes the A/B line to switch the Manchester generator 602 from receiving the NRZ"A" data to receiving the NRZ"B" data from the main multiplexer 120. This is the data of the passenger address audio. In the main multiplexer passenger address mode, the pattern of 1's and 0's in the stereo/mono bit position which is used by the submultiplexer 121 to determine this mode is replaced in the submultiplexer output data by a pattern of all 0's to indicate monaural transmission. The submultiplexer converts the main multiplexer PA sequence of stereo/-mono digits which for the 16 channels is 1101010101010101 to a 1000000000000000 sequence. The reason why the submultiplexer 121 does this is because of the operation of the electronics in the seat group units 139. In this manner, a 1 in all stereo/-mono bit positions, which indicates self-test, causes the main multiplexer output data to be sent through the submultiplexer 121 without alteration.

In this condition, the main multiplexer 120 outputs the test waveform from the self-test generator 307 and does not output any of the audio including passenger address information. When the submultiplexer 121 receives the pattern of stereo/mono bits of all 1's in the stereo/mono bit positions or receives the pattern indicating passenger address, it provides the highest priority to enable the main multiplexer data to go through the Manchester generator 602. Since self-test and passenger address modes are mutually exclusive modes of operation of the main multiplexer 120, the submultiplexer 121 need not distinguish in priority between these two modes.

To summarize, main multiplexer data is fed through the NRZ"B" line input into the Manchester generator 602 whether it is being utilized or not. An output from the submultiplexer A/D converter 610, which is the digital representation of audio data from the passenger address amplifier 604 or from the dual audio amplifier 605, always appears at the NRZ"A" input to the Manchester generator 602. To determine the mode of operation, selection is required by the data and mode circuit 601 as to whether the NRZ"A" or the NRZ"B" data input to the Manchester generator 602 should be accepted. The main multiplexer data, which is decoded from Manchester coding in the data and mode circuit 601, is again encoded in the Manchester generator 602 and placed on the pulse code modulated output line. The reason for decoding the main coding in the data and mode circuit 601 and again encoding it in the Manchester generator 602 is that certain bits of the main multiplexer 120 data are used to obtain the desired mode for the submultiplexer 121.

The submultiplexer output data from the Manchester generator 602 is applied to the base of stage Q901. Stage Q901 is an emitter follower which feeds respectively into transistor emitter followers Q902 and Q903, Q904, and Q905 which are provided to respectively send the output signals along each of the four columns of seat groups 139 within the compartment 135. There may be a fault in one of the seat groups 139 in one of the sections and this arrangement allows the other three columns to not be thereby disabled. This also permits the shortening of the cable and of the long line which would otherwise be necessitated if all of the seat groups 139 in a compartment were fastened in series.

Thus, in the data and mode circuit 601, a Manchester to NRZ conversion on the data is performed and the data is then transmitted along the NRZ"B" output line into the Manchester generator 602 where the data is again put into Manchester code form. The decoding in the data and mode circuit 601 is the inverse of the coding. That is, a Manchester data string of pulses is split into NRZ data and clock pulses. Thus, the NRZ data pulses are exited from the data and mode circuit 601 into the NRZ"B" input to the Manchester generator 602. In the Manchester generator 602, as in the case of the main multiplexer 120 Manchester generator 307, the clock pulses and the NRZ signals are again mixed to provide a Manchester coded output into the transistor Q901. As indicated above, transistor Q901 is an emitter follower, the output of which is coupled to each of the four emitter follower circuits Q902, Q903,

Q904, and Q905. This enables the output data from the compartment submultiplexer 121, 122, or 123 to be divided along the four aisles, two in each of the sections 134 and 135, so as to enable three of the aisles to be on the air in the event of the breakdown of one of the seat group 139 units. The output of emitter followers Q902, Q903, Q904, and Q905 is therefore applied as pulse code modulation to the respective row of seat demultiplexer/encoders of 141 of seat groups 139 on either side of the aisle of one of the sections 134. Only one of the submultiplexers 121, 122, and 123 is illustrated in detail in FIG. 6 and described herein by way of example since submultiplexers 122 and 123 may be substantially identical to submultiplexer 121. A power supply unit 603 is provided. Responsive to the 115 volt 400 Hz input, power supply 603 provides the +12 volts, −12 volts, and −5 volts required for operation of the submultiplexer unit 121.

In the submultiplexer 121 are also provided a movie dual audio amplifier unit 604, a passenger address amplifier unit 605, and an analog-to-digital converter unit 610. Unit 610 comprises rectifier unit 606, ladder unit 607 and register unit 608. A bit timing unit 609 and channel timing unit 611 are also provided. The analog-to-digital converter 610 and its rectifier 606, ladder 607, and register 608, the bit timing unit 609, and the channel timing unit 611 may be similar or substantially identical to the corresponding units of the main multiplexer 120; that is, rectifier 303, ladder 304 and register 305 in the A/D converter 315, bit timing unit 306, and channel timing unit 308. The passenger address amplifier unit 605 may be identical substantially to the passenger address amplifier unit 302 of the main multiplexer. The dual audio amplifier 604 may be substantially identical to one of the dual audio amplifiers 301 of the main multiplexer 120. Similarly to the action of the passenger address amplifier 302 of the main multiplexer 120, responsive to submultiplexer passenger address enable signal, the passenger address amplifier 605 inhibits the dual audio amplifier 604 in the movie audio input channel.

In the presence of the movie audio input, the dual audio amplifiers 604 act similarly to the last dual audio amplifier pair 301 of the main multiplexer 121 and a pulse amplitude modulated input corresponding to the movie input is applied to the rectifier 606 at the PAM input line. When movie dual audio amplifier 604 is inhibited by the public address amplifier 605, the pulse amplitude modulation from the audio voice signal put into the passenger address amplifier 605 of the submultiplexer 121 instead provides a PAM pulse amplitude modulated signal at the PAM line into the rectifier 606 of the analog-to-digital converter 610. In the identical fashion to their counterparts in the main multiplexer 120, which therefore need not be repeated here, the rectifier 606, the ladder circuit 607 and the register 608 operate to put NRZ data along the NRZ "A" line into the Manchester generator 602 where the selected data is placed into Manchester code form. Bit timing unit 609 supplies bit timing to the analog-to-digital converter 610 register 608 circuit. The bit timing unit 609 also supplies timing to the rest of the submultiplexer 120, including inputs from which the Manchester generator 602 generates a clock signal to increment the channel timing unit 611.

A movie stereo switch SW601 is provided which provides selection of the stereo/mono bits which are inserted along with movie audio data into channels 15 and 16 of the data format when movie audio is present. This switch and its associated gates (not numbered) supply the correct stereo/mono bits for the NRZ "A" data to the register 608. A movie enable signal is also applied to the data and mode unit 604 which enables the movie audio program to be received along the PAM line at the output of dual audio amplifier 604. Since the main pulse code modulated signal which is placed into jack J602 from the main multiplexer 120 must also be supplied to the additional submultiplexers 122 and 123, this is effected through the input at jacks J602 and J603 wherein the coax within the data and mode unit 602 is connected to the output coax (not numbered) which is sent from jack J603 to the second submultiplexer 122 and thence to a similar circuit where a jump is provided to the third submultiplexer 123.

The method by which the data and mode circuit separates the information, that is, effectively "exclusively ORing" the Manchester code and pulse information to extract the clock pulses therefrom and supply NRZ data to be again encoded in the Manchester generator 602, is an important feature of the invention and is explained further below.

When the movie input has been emplaced into the submultiplexer 121, 122 or 123 of the particular compartment, the movie audio input upon being fed into the dual audio amplifier 604 provides a PAM signal into the A/D converter 610. At this time, a movie enable signal is introduced along the movie enable line into the data and mode unut 601 which forces the A/B line to switch during channels 15 and 16 from reading the NRZ "B" data from the data and mode hybrid into reading the NRZ "A" data instead from the register 608. When movie audio is introduced via the dual audio amplifier 604, the PAM output is operated on by the A/D converter 610 and the signal is injected into the NRZ "A" line into the Manchester generator 602 where it is encoded with the clock pulse from the bit timing unit 609. Since the movie input is placed in on channels 15 and 16, the $\overline{\text{Ch15}}$ and $\overline{\text{Ch16}}$ (Channel 15 not and Channel 16 not) signals from the channel timing unit 611 are applied to the data and mode unit 601.

Assume that operation is normal without movie audio input. Under these conditions, the bit timing unit 609 and the channel timing unit 611 send respective bit and channel timing signals to the Manchester generator 602 and to the register 608 of the A/D converter 610. The channel timing signals are injected into the $\overline{\text{Ch15}}$ and $\overline{\text{Ch16}}$ lines in the dual audio amplifier 604 and into the data and mode unit 601. Therefore, even though the dual audio amplifier 604 is not in use, it is still getting timing from the channel timing unit 611. When movie audio is to be injected, the movie enable signal into the data and mode unit 601 is in true state. The data and mode unit 601 is then placed in movie audio mode. In this mode, the Manchester generator 602 encodes data from the NRZ "A" line during channel 15 and 16 time. It receives its data on the NRZ "B" lines during channels 1 to channel 14 times generated by the channel timing unit 611. That is, the movie audio is being injected into channels 15 and 16 of the bit string. If channels 15 and 16 contain main multiplexer audio bits, the submultiplexer, when placed in movie enable, ignores these bits. Therefore, the movie enable signal causes an A/B pattern to occur which switches during channel times 15 and 16 from the NRZ "B" data to the NRZ "A" data. Similarly, when the submultiplexer 121 is placed in the passenger address mode, the movie channels are inhibited by the inhibit signal output and the audio signal from the PA amplifier 605 in the submultiplexer 121 is instead supplied into the PAM input of rectifier 606 of the A/D converter 610. In this mode, all channels 1–16 are overridden and local PA data is inserted. The $\overline{LPA}$ signal tells the data and mode unit 601 that the unit is in local passenger address mode. The A/B output of the data and mode unit 601 is held in condition such that the Manchester generator 602 reads only the data from the NRZ "A" line input. This causes the main multiplexer data input from the NRZ "B" line, which is the data from channels 1 to 16, to be completely ignored, and the movie input data is also inhibited in this condition.

The signals from the main multiplexer 120, whether stereo, monaural, passenger address, or self-test mode signals, are transmitted along the coaxial cable 840 into the submultiplexer 121 of the first compartment 131. In the submultiplexer 121, the signals are both extracted for that compartment 131 on the input line and are transmitted along output line 603 and along the coaxial cable to the second multiplexer 122. Effectively, the cable 840 may be considered as a continuous coaxial line comprising lines 840, through the compartments, and which terminates in a 50 ohm termination. From the submultiplexer 121 the entertainment is provided to the individual seat groups, for example, the group along the four coaxial lines which go into the four individual passenger service areas comprising groups of seats which may, for example, be as many as 22 seat groups of two or three seats each. The signals which are supplied along the seat harness comprise a single coaxial line which transmits from the submultiplexer 121 the pulse code modulation in series along the individual seat groups 139, the plus and minus voltage and return lines to the individual passenger service area seat groups 139 which supply the power supply plus voltage, minus voltage and return path, and the common clock, gated data forward and gated data backward signals from the section timer decoders 152 which carry the service signals.

Responsive to a command from an operator or an appropriate setting in respective compartment, 131, 132 or 133, each corresponding submultiplexer 121, 122 or 123 comprises means to preempt channels 15 and 16 of the tape unit and substitute two local movie audio inputs which are sampled, converted into digital words along with synchronizing pulses, and time-sequenced into the pulse train in place of the channel 15 and 16 inputs from the main multiplexer 120. The full pulse code modulated (PCM) data train of 16 channels is transmitted to the seat demultiplexers 153 (see FIG. 6) of the demultiplexer/encoder units 141. In the absence of movie audio inputs (no command signal) the submultiplexers 121, 122 and 123 transmit channel 15 and 16 along with the other 14 channels as received from the main multiplexer unit 120. The seat demultiplexer 153 or the demultiplexer/encoder 141 converts the passenger's selected program back to its analog voltage form, which is then amplified to drive his stereo audio transducer (not numbered).

Each input audio channel from the tape unit 120 is provided with a pre-emphasis network which both enhances the signal-to-noise ratio of the mutliplexed high frequency audio signals and helps to compensate for the natural roll-off of the type of pneumatic transducer presently in airline use. The demultiplexer-encoders 141 each include a low pass filter (not numbered) by which a fixed predetermined roll-off of the response is maintained.

Passenger address (PA) override functions are provided in the main multiplexer 120 and in the submultiplexers 121, 122 and 123 which preempt all 16 channels, including the two channels of local movie audio. Thus, all channels receive the passenger address (PA) announcements. The override passenger address function of the main multiplexer 120 is given priority over that of the submultiplexers 122, 123, and 124.

Figures 6B, 6C:
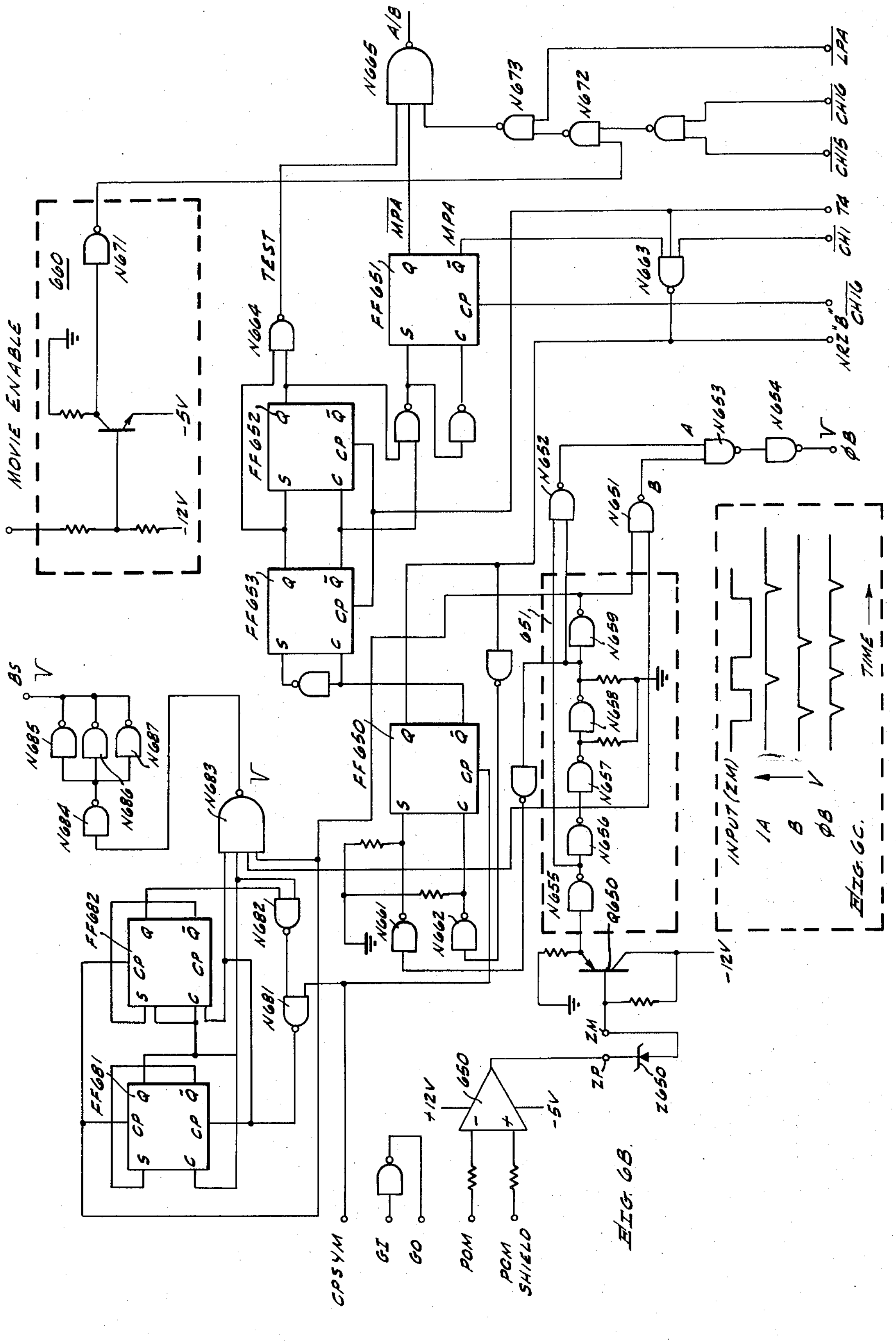
FIG. 6B is a partially block and partially logic and partially schematic representation of the data and mode circuits of FIG. 6A.
FIG. 6C is a waveform diagram illustrating inputs plotted against timing for the data and mode circuitry of FIG. 6B.

Refer to FIG. 6B. FIG. 6B illustrates the data and mode circuit 601 of the submultiplexer 121, 122 or 123. Since substantially identical, only one data and mode circuit 601 is described. Except for the output circuit which has been illustrated schematically and described in detail in conjunction with the description of the submultiplexer of FIG. 6A, the remaining submultiplexer units comprising the dual audio amplifier 604, the PA amplifier 605, the A/D converter units 610, the Manchester generator 602 and the bit and channel respective timing units 609 and 611 correspond to and may be identical or similar to the corresponding units of the main multiplexer 120. For this reason, a separate description of these units would be repetitive and will not be undertaken. The data and mode circuit 601 presents some unique aspects and is described as follows.

Refer again to FIG. 6B. FIG. 6B illustrates the data and mode circuit 601 of the submultiplexer 121, 122 or 123. A first function of the data and mode circuit 601 is to decode the incoming Manchester encoded data from the main multiplexer 120 and convert it into NRZ data. NRZ is an abbreviation meaning non return to zero. The PCM and PCM ground shield return line are compared in comparator 650. When the pulse code modulated signal shows a below ground state indicating a negative pulse input the comparator provides a full +5 volts output at the point ZP. That is the comparator 650 in the presence of a PCM signal causes the cathode of the zener diode Z650 to be at +5 volts. The zener diode Z650 converts the +5 volts to 0 volts and the 0 volts to −5 volts, thus shifting the level of the voltage instead of between zero and +5 volts to between −5 volts and 0 volts. The input to the zener diode Z650 is illustrated in the first waveform entitled "input (ZM)" of FIG. 6C. The PCM signal is applied to the base of transistor Z650 and then through a delay and sequential inversion circuit 651. The delay and inversion circuit 651 comprises the NAND gates N655, N656, N657, N658, and N659. In conjunction with the delay and inversion gates 651 are provided a pair of NAND gates N651 and N652 which employ outputs of the delay and inversion circuit 651 to form a pair of differentiators operating off the negative-and positive-going edges of the PCM input signals from the main multiplexer 121. Gates N653 and N654 serve to and together the outputs of NAND gates N651 and N652 so that a negative-going spike appears at the $\phi$B output corresponding to each change in the PCM input. The wave-form A output of NAND gate N652 is illustrated as spikes on each positive-going portion of the input as illustrated in FIG. 6C and the waveform B output of NAND gate N651 is illustrated on the line B of FIG.

6C wherein a negative-going spike appears at the output of NAND gate N651 for each negative-going excursion of the input (ZM) corresponding to the PCM input (note ZM at the anode output side of zener diode Z650). As illustrated on the $\phi$B line of FIG. 6C a negative-going spike appears for each of the A and the B outputs of the respective NAND gates N651 and N652. The $\phi$B signal is therefore a signal synchronizing with the Manchester encoded data from the main multiplexer 121 and serves to synchronize the submultiplexers 121, 122 and 123 to the main multiplexer 120. That is it synchronizes the oscillator which provides the basic timing shown as the LC oscillator in the bit timing unit 609 of the submultiplexer 121 to the corresponding oscillator 325 in the main multiplexer 120 (see FIG. 3A). This is illustrated in the bit timing circuit 609 of FIG. 6A by the LC input oscillator circuit which is followed by a divide by 2 counter (not illustrated) in the bit timing unit 609. That is, the $\phi$B output of the NAND gate N654 in the circuit of FIG. 6B is the $\phi$B input illustrated coming into the bit timing unit 609 of FIG. 6A.

It will be understood that the data from the main multiplexer 120 remains high or low for an interval depending upon the input data. However, this time is a maximum of 200 nanoseconds because the Manchester encoder 307 change occurs at that rate.

When the main multiplexer 120 generates PCM transitions its 10 megacycle oscillator is in the same state. That is, the output of the main multiplexer 120 is always clocked on the positive-going edge of the main multiplexer 10 megacycle clock. Then as long as the submultiplexer 121, 122 or 123 10 megacycle clock is in a predetermined fixed state each time a transition comes, the submultiplexer oscillator is in synchronism with the main multiplexer oscillator. Since the submultiplexer oscillator runs at the same frequency as the main multiplexer oscillator, all of the clock frequencies derived from this oscillator including the CPSYM clock frequency input are also at the correct frequency and in synchronism with the incoming PCM data. The CPSYM signal is the output of the oscillator of the bit timing unit 609 as passed through a divide by 2 counter. The PCM input data from the main multiplexer 120 passes through the comparator 650, the level shifter zener diode Z650, the transistor A650, and the portion of the delay line comprising NAND gate N655, N656, N657 and N658 and is fed via the NAND gate N661 into the S input of the flip flop FF650. After a slight delay in NAND gate N650, the same input is applied via the NAND gate N662 to the C input of the flip flop FF650. The S and C inputs are therefore essentially the same data which are 180 degrees out of phase or effectively the inverse of each other. The flip-flop FF650 is clocked at the CP input from the CPSYM input at such time that its output represents NRZ decoded data. That is, the CPSYM is the clock data at about 10 megacycles divided by 2. Therefore, every time the CPSYM clock pulse occurs, the flip flop FF650 is set to respond to its input data. If the input data bit was a transition from high to low (Manchester 1) then a 1 results; it was a transition from low to high then a zero results. That is since a 0 is represented in Manchester by a transition from high to low and a zero by a transition from low to high, the 1s and 0s of the NRZ data are made to appear at the output of flip flop FF650 by clocking the flip flop during the second half of each data bit, and utilizing the inversion of circuit 651. The output goes directly to the NRZ"B" line which is also shown in the unit 601 as an input to the Manchester generator 602 in FIG. 6A. The data however, undergoes one minor modification.

Whenever the submultiplexer 121 is in the MPA mode and it is not channel 1 time, the stereo/mono bits of the NRZ"B" data are forced to a logic 0 indicating monaural transmission. Thus the stereo/mono bits are forced to a pattern of 1 and a string of 15 additional 0's when main multiplexer passenger addressing is occurring, which pattern appears at the output of the NRZ"B" line of the submultiplexer 121. This is because these bits must be interpreted by the seat units as monophonic material.

This completes the description of circuit operation to perform the first function of the data and mode circuit 601 to decode the data input from the main multiplexer 120 into NRZ data.

In addition, the submultiplexer 121 detects the presence of self-test and the presence of main PA input from the main multiplexer 121. This is done by the flip flops FF651, FF652 and FF653. The flip flops FF653 and FF652 store the stereo/mono bits by being set at the time T4. Since the flip flops FF653 and FF652 are only set at the T4 times, they therefore send only the stereo/mono bits through at the proper time. During self-test when all of the stereo/mono bits are a 1, the two outputs of the flip flops FF653 and FF652 are 1's which is detected by the "test" NAND gate N664, which provides an output test signal, which provides a corresponding negative or low voltage to the corresponding input to the NAND gate N665. Since the successive stereo/mono bits in sequential sampling of the 16 channels are channeled through the flip flops FF653 and FF652 one at a time, during much of the time, the flip flops FF653 and FF652 will be in a state such that the stereo bit of the odd numbered channels except for channel 1 resides in flip flop FF653 and the stereo bits of the even numbered channels reside in the flip flop FF652. That is, at any one given instant, there is only one bit in the flip flop FF653 and one in flip flop FF652. Channels 1 and 2 are both 1's during both self-test and main PA, but during main PA the successive pairs of bits are 0 1's (zero ones) and specifically at the beginning of channel 16 time time the bits in flip flops FF653 and FF652 indicate that there is main PA: which is detected and clocked at the time into flip flop FF651. That is, if the flip flop FF651 is set at $\overline{CH\ 16}$ (channel $\overline{16}$) time at its clock pulse input and the flip flops FF653 and FF652 are in the respective 0 and 1 states, this indicates that the main multiplexer is in PA mode. This causes a 0 to appear at the Q output of FF651 and to be put into the input of NAND gate N665. This also causes the $\overline{Q}$ output to be a high. This high is applied to the NAND gate N663 to modify the NRZ"B" data stereo/mono bits to be all 0's as hereinbefore described.

Whenever any one of the three inputs to the NAND gate N665 is a low, it resets the NAND gate N665 to put a high output on the A/B line. When the A/B line is in the high state at the data and mode unit 601, the Manchester encoder 602 listens to the NRZ"B" input. Therefore, during either self-test or main multiplexer PA announcements, as well as during normal operation, when one of the channels from the main multiplexer 120 is being listened to, the A/B line ensures that the NRZ"B" input to the Manchester generator 602 which comes from the main multiplexer 120 and which is being provided to the passenger. The movie enable circuit 660 is a conventional buffer which detects the presence of the +28 volt movie enable DC signal and converts it to a high state at the output of NAND gate N671. This circuit is inverted twice in the ensuing two NAND gates N672 and N673 and is applied to as the third input to the NAND gate N665. However, in order for the NAND gate N672 to be activated by the movie enable signal, either the $\overline{CH\ 15}$ or $\overline{CH\ 16}$ channel timing pulse must be a low. The state of $\overline{CH\ 15}$ and $\overline{CH\ 16}$ is determined by the channel timing circuit 611. Therefore, whenever movie enable is present thereby providing the proper input to NAND gate N672 from the NAND gate N671 and it is channel 15 or channel 16 time, then the output of NAND gate N672 goes low. Whenever either the output of NAND gate N672 is low or the $\overline{LPA}$ input to NAND gate N673 is low, then the output of NAND gate N673 goes high. Thus if $\overline{LPA}$ is high, the output of NAND gate N673 goes high only during channels 15 and 16 times when movies are present. This causes the output of the NAND gate N665 to go low during channel times 15 and 16, provided that the other two inputs to NAND gate N665 are high. The A/B signal then transfers the input to the Manchester generator 602 from the NRZ"B" line to the NRZ"A" line which comes from the A/D converter 610 within the particular submultiplexer unit 121, 122 or 123. This causes the movie audio data to supplant the data on channels 15 and 16 from the main multiplexer 120.

If on the other hand the $\overline{LPA}$ input to the NAND gate N673 is a low, this causes the A/B output to go low continuously provided that neither the test or $\overline{MPA}$ inputs to NAND gate N665 (which two inputs are derived from data from the main multiplexer 120) is a low. That is, if either the gated movie output from the NAND gate N672 or the $\overline{LPA}$ signal is a low, the output of the NAND gate N673 is a high, which enables the A/B output of NAND gate N665 to be a low and shifts the data to the NRZ"A" input line. Now recall that when the $\overline{LPA}$ signal is a low this also causes inhibiting of the dual audio amplifier 605 in FIG. 6A which causes only the local passenger address (LPA) data to appear on the NRZ"A" input to the Manchester generator 602.

The data and mode circuit 601, therefore provides an A/B control signal such that main multiplexer 120 data input is reencoded into Manchester encoded signal and sent to the passenger (1) always during self-test, (2) always during main multiplexer PA announcements, (3) during channels 1–14 of channel time when there are local movie inputs in the submultiplexer present, and (4) during all 16 channels when there is neither movie nor local PA announcements. NRZ"A", the submultiplexer data is caused to be utilized by the A/B line during channels 15 and 16 whenever these channels are supplanted by local movie audio occasioned by the movie enable 28 volt signal or whenever local passenger address announcements are being made from the particular compartment submultiplexer 121, 122 or 123.

This completes the description of circuit operation to perform the second function of the data and mode circuit 601 which is to keep the data in the correct mode, either NRZ"A" or NRZ"B."

The third function of the submultiplexer 121 data and mode circuit 601 is to detect the long once per 16 channels output hyperpulse from the main multiplexer 120 and to provide an output signal suitable to synchronize the sub-multiplexer channel and bit timing thereto.

Now refer to the upper left portion of FIG. 6B which shows the data circuit 601. A pair of clip flops FF681 and FF682 are provided into which are fed the PCM input data which has not as yet been decoded. These flip flops FF681 and FF682 are forced to a low state whenever the input PCM data from the main multiplexer 120 is low. If however the main multiplexer input data remains high for several bit times (the long hyperpulse signal input), then the flip flops FF681 and FF682 act as a counter which is clocked by the CPSYM clock input locally generated in the bit timing circuit 609. The flip flop counter FF681 and FF682 then counts through the binary states 1 through 4. Binary state 4 (1, 1) is detected by the NAND gate N682 and is fed into the input to the NAND gate N681 to disable the clocks to both flip flops FF681 and FF682 when the count has reached 4. That is, once the count gets up to 4, flip flops FF680 and FF682 are disabled and thus the count will remain in the 4 state. The fact that the flip flops FF681 and FF682 are in the high state means that at least 4 bit times have gone by with the PCM input having been continuously high. If there are 5 counts in the high state there are no Manchester encoded inputs since the Manchester encoded input insures that there is a transition once every bit time and it would be impossible for the flip flops FF681 and FF682 to count unless the multiplexer is in the hyperpulse period during which Manchester encoding is not taking place. The Manchester data from the main multiplexer 120 comes out of a flip flop and this flip flop is directed to the high state continuously during the hyperpulse period. The Q outputs of the flip flops FF681 and FF682 are applied respectively to two inputs of the NAND gate N683. The other two inputs to the NAND gate N683 are delayed signals from the PCM input from the main multiplexer 120 occurring from the delay line 651. That is two of the inputs are from the respective flip flops FF681 and FF682 Q outputs. At the end of the hyperpulse period a negative transition occurs on the input PCM data. Since the NAND gate N683 has the upper two input lines enabled, the lower two input lines on this negative transition cause the NAND gate N683 to provide a negative-going pulse at its output in exactly the same manner that gate N651 did in the delay circuit 651. Therefore, NAND gate N683 provides a negative-going output pulse only at the end of a long hyperpulse period. This negative-going impulse of NAND gate N683 is applied to the NAND gate N684 and which inverts the input and applies it to the parallel NAND gates N685, N686 and N687 to cause a corresponding negative-going pulse output at the BS output line. This negative-going BS pulse is used to reset the bit timing and channel timing counters in the bit timing and channel timing units 609 and 611 in the submultiplexer 121. It sets bit timing unit 609 to the T4 time and it sets channel timing unit 611 to the channel 1 time. Therefore, the third function of the data and mode circuit, that of the counter of flip flops FF681 and FF682 and attendant circuitry, in response to the hyperpulse from the main multiplexer 120 causes the slaving of all timing in the submultiplexers 121, 122 and 123 to the timing units of the main multiplexer 120.

Refer to FIG. 7. FIG. 7 illustrates the seat demultiplexer/encoder 141. One seat demultiplexer-/encoder 141 is provided for each three seat group 139 in each of the sections 134 and 135 of each of the compartments 131, 132 and 133. A seat demultiplexer/encoder 141 can be utilized for a seat group 139 of a lesser or in fact a greater number of seats, for example, for two or one seat 199 in a seat group 139. In the illustrative embodiment, two basic types of units are provided, one applicable for a three seat group, and the other applicable for either a two seat group or a one seat group.

The passenger service unit will be discussed in detail hereinafter. However for purposes of the present discussion, the passenger service encoder or seat encoder 152 of the seat demultiplexer/encoder 141 comprises a passenger service encoder 701. Encoder 701 encodes the data presented to it from the passenger control units 150 and it transmits this coded information to the section timer/decoder 142. Seat encoder 701 also accepts data transmitted to it from its respective section timer/decoder 142 at times which will be indicated hereinafter. This is accomplished by way of a gated data 1, gated data 2 and clock input arrangement. The data function under which this is done is discussed hereinafter in the discussion of the section timer/encoder 142. The passenger service encoder 701 may for example be a single large structure comprising approximately 750 devices and accompanying circuits and the logic of which is discussed in detail hereinafter in the discussion of FIG. 16.

Into the passenger service encoder 701 in addition to the gated data forward, common clock, gated data backward, and plus and minus voltage inputs, there is provided a plurality of auxiliary blower voltages for fans and other units in the equipment (not illustrated). The lower voltage is applied through the unit 701 and out of the lower output motor output terminal shown in the seat demultiplexer/encoder 141 and into the next sequential seat demultiplexer/encoder 141 of the group. Some of the voltage seen in the upper portion of FIG. 7 is also tapped off for the particular seat group unit 139.

The inputs of 115 volts AC for the blower and for the oxygen control are applied to the seat units 139 in order to enable power to be applied to a fan for the passenger's comfort which may be mounted about shoulder high into the individual seat units 199. An emergency oxygen unit is provided in the seat units 199. The 115 volt AC and oxygen control voltage is applied into a jack input and after being tapped off at the oxygen and blower outputs to the seat units, the voltage simultaneously is applied to the next sequential seat group unit 139.

The input from the transistors stages Q902, Q903, Q904 and Q905 of the submultiplexer 121, 122 or 123 (see FIG. 6A), after being applied to the cables leading to the respective columns of seat groups 139, are applied to the individual seat groups 139 for example, into the first seat group 139 on the PCM and PCM shield line inputs shown at input jack J702. Also, the power B+, B−, and return lines, are applied to a power conditioner unit in the entertainment system demultiplexer 153 and to the passenger service encoder 152 to provide power to the various units in the seat group demultiplexer/encoder 141.

Figure 13:
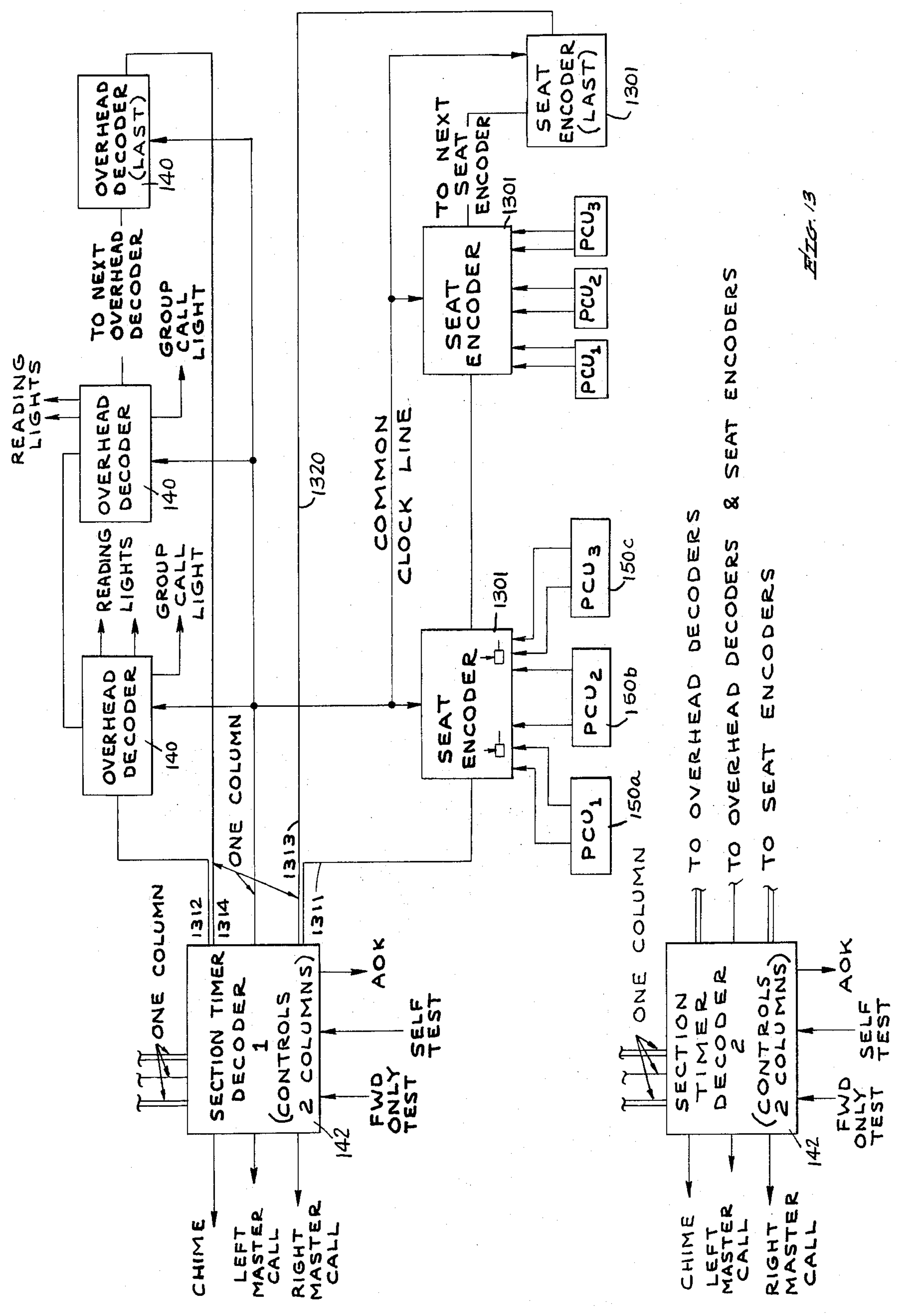
FIG. 13 is a schematic block representation of the passenger service system of the illustrative embodiment of FIG. 1 and wherein is illustrated the block and interconnections for the two section timer/decoders and fragmentally is illustrated some of the plurality of seat encoders, the passenger control units associated with each seat encoder and the overhead decoders corresponding to each seat encoder and wherein is indicated the various call lights, input signals and interconnections for one of the compartments.

The encoders 152 of the seat demultiplexer/encoders 141 are connected together as illustrated in FIG. 13 and will be described hereinafter. The seat demultiplexers 153 are connected together from the most forward seat group 139 to the most backward seat group 139 of each column of seat groups 139 along one of the columns such that a first seat group 139 sends the signal simultaneously to all of the seat demultiplexers 153 of a group in parallel. This parallel connection will be hereinfter described. That is, electronically speaking, from each of the column jack outputs from the submultiplexer 121 illustrated in FIG. 6A, a cable is applied to the first seat group 139 of a respective column of seat groups 139 and a jumper through the seat groups 139 is provided from which a cable travels to the input to the second seat group 139 of the column and a jumper is applied across and the cable continues down the line. Each of the seat groups 139 also taps off input from the jumper connection between input and output cables from the submultiplexer 121 such as to electronically provide each of the 32, for example, seat group units, a parallel input from the submultiplexer 121, a portion of the power being tapped off by each of the seat groups 139.

Refer to FIG. 7. FIG. 7 is a partially block and partially schematic representation illustrating a typical seat demultiplexer/encoder of the type which services a row of 3, 2 or 1 seats in a column of seat rows in any one of the sections of the aircraft. Only one seat demultiplexer/encoder of FIG. 7 will be described since it is representative of each of the seat groups, although it will be understood that there will be up to 32, for example, in each of the columns of seat rows and a corresponding number of overhead decoders, one for each seat demultiplexer/encoder.

Refer again to FIG. 7. Into the jack J702 appears the pulse code modulated input from the submultiplexer of the particular compartment in which this demultiplexer/encoder is located. The PCM data which comprises a frame sync and the appropriate Manchester encoded data from the submultiplexer appears in the comparator, data detector and clock pulse separator unit 701. In the unit 701 the clock pulses and the NRZ data are recovered from the Manchester encoded data. The data is fed into a data shift register 715 and simultaneously into timing unit 702. The recovered clock pulse signal CPFS is fed into the timing unit 702. In the timing unit the recovered timing signal CPFS is buffered to provide CP and $\overline{CP}$ signals which are sent to the shift register 815. Additionally, the CP and $\overline{CP}$ signals taken from the CPFS signal are utilized for clocking of the timing circuits and the timing unit 702. By integrating circuits (to be described) the seat CPFS input signal is utilized to generate a frame sync output from the timing unit. The frame period is the time for a complete sampling of all of the channels to occur. That is, it is the frame sync time, 1.4$\mu$ sec or 7 bit times, plus the time necessary to sequentially sample at approximately 2 microseconds each of the 16 channels. Each sample of the 16 channels as described above in the illustrative embodiment has 10 bits. Therefore, the total frame time is 167 bits or approximately 33 microseconds. The frame sync signal in the timing unit 702 is utilized to initialize or reset the counters of the timing unit. The frame sync signal is applied to the channel select unit 704 to initialize its channel counter. The channel counter, a 4-bit counter, will be described in conjunction with the description of the channel select unit hereinbelow. The 4 bits enable counting from 1 to 16. From the CPFS clock signal, there are also generated the word sync, and the word gate outputs. The word sync signal is introduced into the channel select unit to provide the clock signal for the channel select unit 704. The word sync clocking pulses are about a 500 KHz square wave. The word gate is the timing pulse for storing a new word in the parallel hold register. That is, each time the word gate signal occurs, a new word is permitted to flow from the shift register 715 into the parallel hold register 716. The stereo information is recovered from the NRZ data by the timing unit 702 and is fed into the channel select unit 704. There are two stereo bits corresonding to each channel pair.

Using the 4 timing signals frame sync, the two stereo bits $\overline{SB}$ and $\overline{SA}$, and the word sync from the timing unit 702, the channel select unit 704 provides read audio timing pulses for each of 6 digital-to-analog converters in the D/A converter unit 703. The read audio timing pulses select the appropriate pulse code modulated (PCM) data for each D/A converter based on the passenger's selection of the channel which he desires to hear. The passenger's channel selection is controlled by three lines from the passenger control unit, that is, three lines for each of the three passengers in a three group unit, for example. In addition, during system or self-test, the channel select unit verifies the performance of each of the audio amplifiers 705. Also, the channel select unit can test the audio transducers to verify that they have not opened. If any audio amplifier 705 or transducer in the passenger control unit has failed, the channel select unit 704 does not send an OK signal back to the seat encoder unit of the service system. The reading lights and call lights associated with the seat unit are on during test until the channel select unit 704 verifies that the audio amplifiers and the transducers are operative, at which time all of the lights associated with the particular seat group being tested are turned off. If the audio amplifier fails, the lights will remain on. If a transducer fails, the lights will blink at a low frequency.

The data which has been recovered in the comparator data detector and CP generator 701 is fed through shift register 715 and the parallel hold register 716 in a manner to be described in the D/A converter unit 703. The appropriate data is stored in the D/A converters by the read audio timing pulses from the channel select unit. The read audio timing pulses select the particular data for the monaural or stereo channel selected by the passenger.

The audio amplifiers 705 amplify audio output currents from the D/A converters 703. These amplified currents from the amplifiers 705 create a high level power amplified output signal to drive the transducers.

The system thereby utilizes a single large power supply instead of many little ones, eliminating many parts and reducing weight and cost. The power conditioner supplies three highly regulated and filtered voltages referred to as VR1, VR2 and VR3 for the D/A converters operation. A power conditioner 706 is supplied for each seat demultiplexer/encoder unit. The section timer supplies power to each seat demultiplexer/encoder unit in a column. The section may, for example, supply power for two columns. The power conditioner filter receives the −V and +V which, for example, are −13 and +13 volts ±2 volts at the inputs and filters these voltages to reduce the ripple.

Figure 8A:
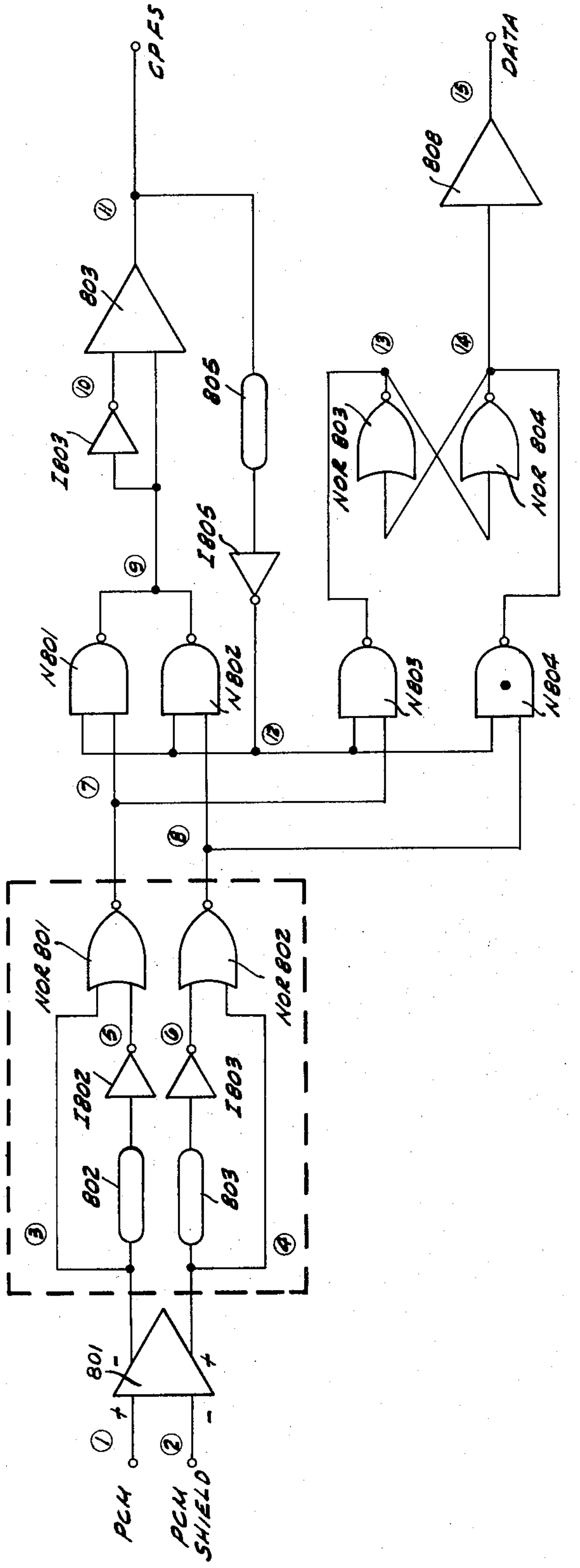
FIG. 8A is a logic diagram of the comparator; data detector and clock pulse separator unit of FIG. 7.
Figure 8A:
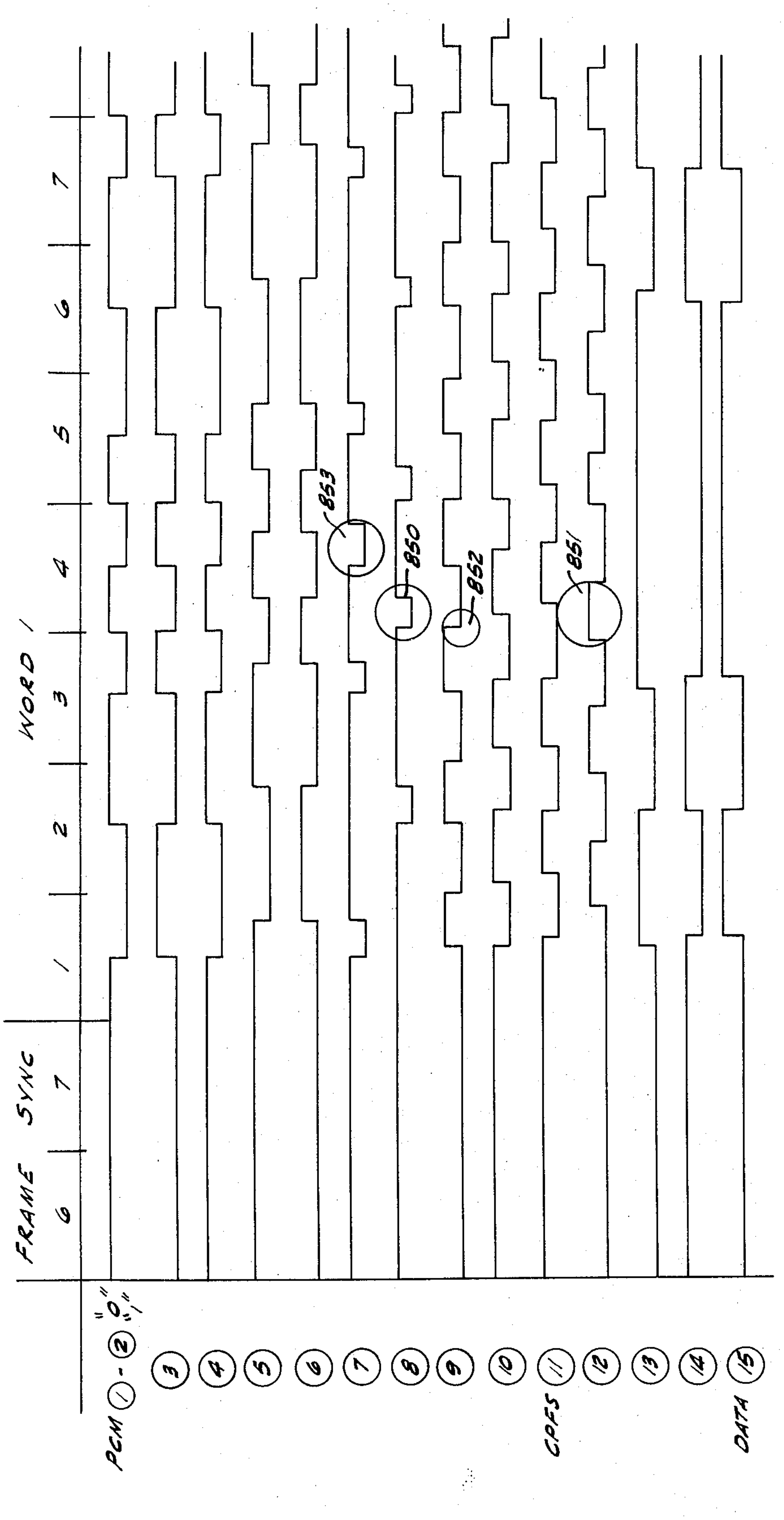

Refer to FIG. 8A. FIG. 8A is a logic diagram illustrating the comparator, data detector, and clock pulse (CP) separator. The PCM and PCM return signals are introduced from the cable from the submultiplexers into a comparator 801. The device 801 provides level shifting, comparison and voltage amplification to adapt the input signal to the logic levels required by the remainder of the circuitry. The outputs of the circuit 801 are complementary in that whenever one of the outputs is a 1, the other is a 0.

One output of the comparator 801 is fed into an input of the OR gate 801 and simultaneously is fed through a delay circuit 802 and an inverter I802 into the other input to the NOR gate NOR 801. The other or complementary output from the comparator 801 is fed into a second delay line 803 and inverted in an inverter I803 and fed into one input of NOR gate NOR 802. This complementary input is also fed into the second input to NOR gate NOR 802.

This combination of a delay line, an invertor, and a NOR gate generates a narrow pulse corresponding in width to the delay line time delay following any PCM data changes. NOR gate 801 generates a pulse after each negative PCM transition, and NOR gate 802 generates a pulse after each positive PCM transition. That is, these outputs represent the negative going and positive going of the PCM transistions. The operation of the comparator, data detector and CP separator thus far described is illustrated by the waveforms 1 through 8 of FIG. 8AA Comparator, data detector, and CP separator timing diagram corresponding to encircled numbers 1 through 8 of FIG. 8A. The transition states at 7 and 8 are respectively fed into the NAND N801 and N802 and thence into a buffer amplifier 803. The buffer 803 and inverter I802 enables stretching of the pulse which is applied to the input of the buffer 803 so that the CPFS output is lengthened in time. A feedback inhibit circuit comprising a delay line 805 and an inverter I805 is fed back to the second input to the NAND gates N801 and N802 to respectively inhibit the NAND gates from recognizing transitions at the end of the bit times as illustrated in the timing diagram of FIG. 8AA. However, it enables transitions at the half bit times to appear at the CPFS output. This is the recovered clock pulse. While apparent, an example of a circuit operative for this purpose is illustrated in copending application Ser. No. 7,482 assigned to the assignee of the present invention and filed under the name of Carroll R. Perkins, et al. and further identified as PD-69350.

The transition stages at 7 and 8 are also applied to one of the inputs of NAND gate N803 and N804 The inputs from the servo loop 805 and I805 are simultaneously applied to NAND gates N803 and N804 to also inhibit these circuits during the end of bit time. The outputs of NAND gates N803 and N804 set the flip flop comprising NOR gates NOR803 and NOR804 to the state corresponding to the original NRZ data component of the PCM input at point 1. After being suitably amplified in buffer amplifier 808 the data appears at the output. This CPFS output and data output of the comparator, data detector and CP separator 701 is applied to the timing unit 702 and simultaneously to the shift register 715 as illustrated in FIG. 7.

Refer to FIG. 8AA, the comparator, data detector and CP separator timing diagram which is associated with the operation of FIG. 8A. As stated, the waveforms represent the PCM, CPFS and data waveforms illustrated in FIG. 8A. The numbers on the timing diagram correspond to the circled numbers in FIG. 8A. The PCM data input frame consists of the 16 sampled words of 10 bits each. The frame synch word is 7 bits long which is represented by the 6 and 7 bits at the beginning at the left side of the waveforms of FIG. 8A. The first sampled channel is illustrated by way of example. That is, the first word coming in is the first dual amplifier channel sampled. The reason for the shield and return line is the fact that this is really a differentiation waveform because the shield does not truly maintain ground but the difference between the shield and the PCM data is maintained at the proper value. The waveforms 3 and 4 are levelshifted and amplified. Waveforms 5 and 6 are the delayed and inverted outputs of the delay lines 802 and 803 and their respective inverter amplifiers I802 and I803 and illustrated in FIG. 8A. The resultant output at the NOR gates NOR801 and NOR802 are illustrated in waveforms 7 and 8 respectively. These are the differentiated edges of the transitions of the waveforms wherein the NOR gate NOR802 recognizes transition from of the PCM input and the other NOR gate NOR801 recognizes the transitions from high to low of the PCM input. When there is a transition on either as represented on either waveform 7 or waveform 8, the NAND gates N801 and N802 go into operation to provide an inverted output. The NAND gates also provide some pulse stretching, compare waveforms 9 and 10 with respective waveforms 7 and 8. The waveform 11 represents the furthest stretched and buffered output of waveform 9 and 10. Waveform 11 is the clock pulse signal for the timing unit which is designated CPFS. By feedback means comprising a delay line 805 and the inverter I805 of FIG. 8A the CPFS output 11 is delayed inverted and fed back to the NAND gates N801 and N802 and also to the NAND gates N803 and N804 of FIG. 8A. The waveform 12 inhibits the operation of NAND gates N801 and N802 at the end of bit times and inhibits the NAND gates N803 and N804 also at the end of bit times. For example, at the end of bit time 3 the transition at 8 illustrated in the circle 850 is inhibited from affecting the output at 9 because the feedback illustrated in the directly beneath waveform portion 851 of waveform 12 inhibits the NAND gates N801 and N802, because it is a positive going excursion. The term "node" as used herein means the voltage at a point where a number of branch currents meet. After the stretched pulse at node 9 recovers to its quiescent state as illustrated by 852, the node 9 is ready to be triggered or clocked again by a transition as illustrated in waveforms 7 and 8, for example, in the illustrated example, this is shown by the transitions within the waveform at 853 which occurs at the half bit or tracing upwards about midway through the bit 4 time. In Manchester encoded data, as has been explained hereinabove, there are always transitions at the half bit time. The CPFS circuit therefore is locked or synchronized to the half bit transitions which have been originally encoded by Manchester encoder. The circuit therefore provides a simple yet efficient phase lock loop. The NAND gates N803 and N804 as has been stated, are inhibited by the node waveform 12. Note that the first transition after the frame sync must be at a half bit time to start clock phase correctly.

When not inhibited, the output of NAND gates N803 and N804 permits the effective flip flop provided by NOR gates NOR803 and NOR804 to be set to the state corresponding to the original NRZ input data in the main multiplexer unit. The circuit therefore inhibits the recognition of the transitions of nodes 7 and 8 at the end bit times which effectively removes the original Manchester encoding of the NRZ data. That is, the flip flop NOR803 and NOR804 is clocked to a state corresponding to the PCM input just after its half bit time transition. That is, all 1's come through the NAND gates N803 and all 0's in the original NRZ data come through the NAND gate N804 by action of the inhibiting function of node 12 because when it is not inhibiting, it is permitting the decoded data to come through. The buffer amplifier 808 enables the NRZ data to appear at the output marked data in FIG. 8A. This is shown at the waveform 15 of FIG. 8AA.

Figure 8B:
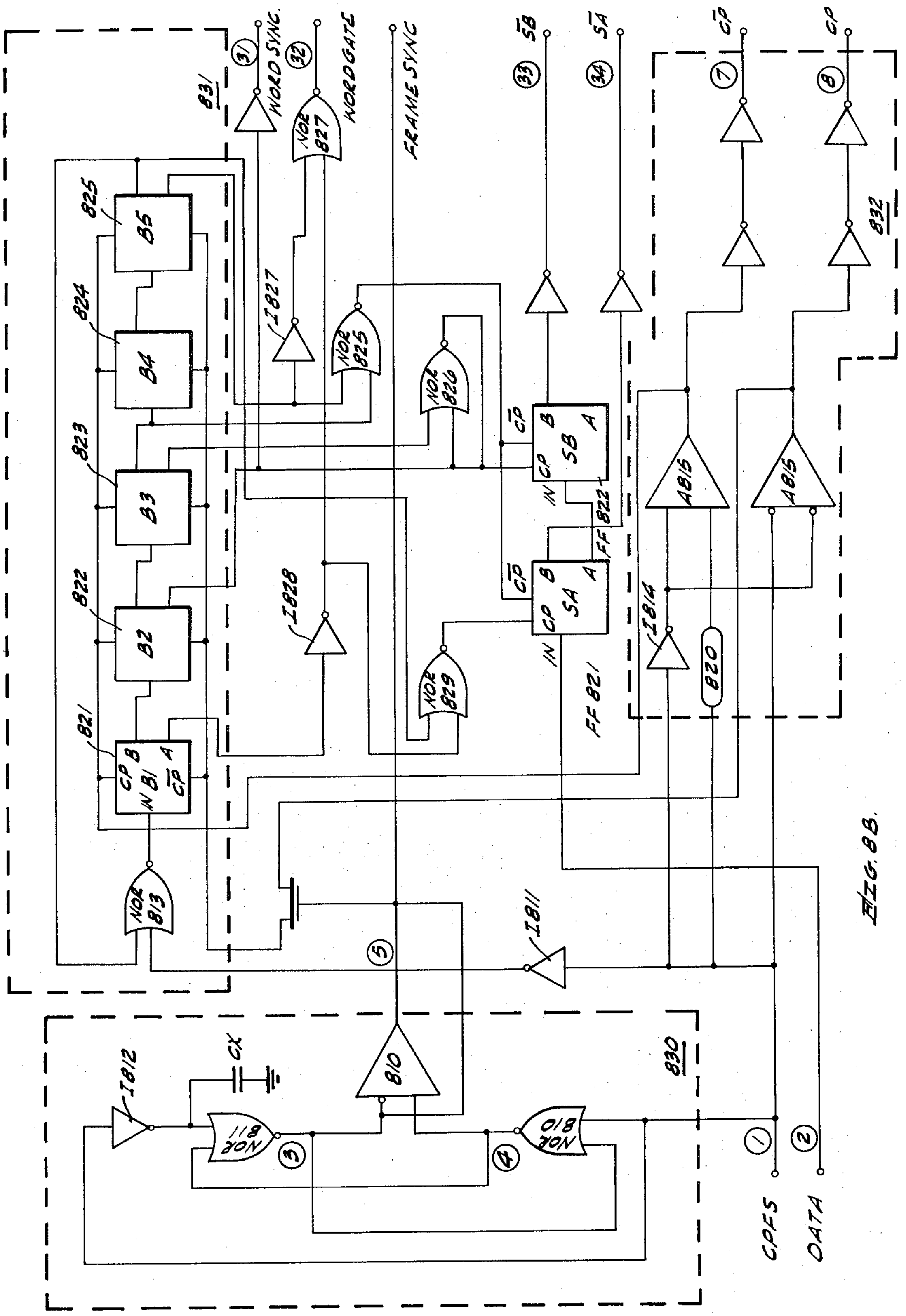
FIG. 8B is a logic diagram of the timing unit of FIG. 7.
Figure 88B:
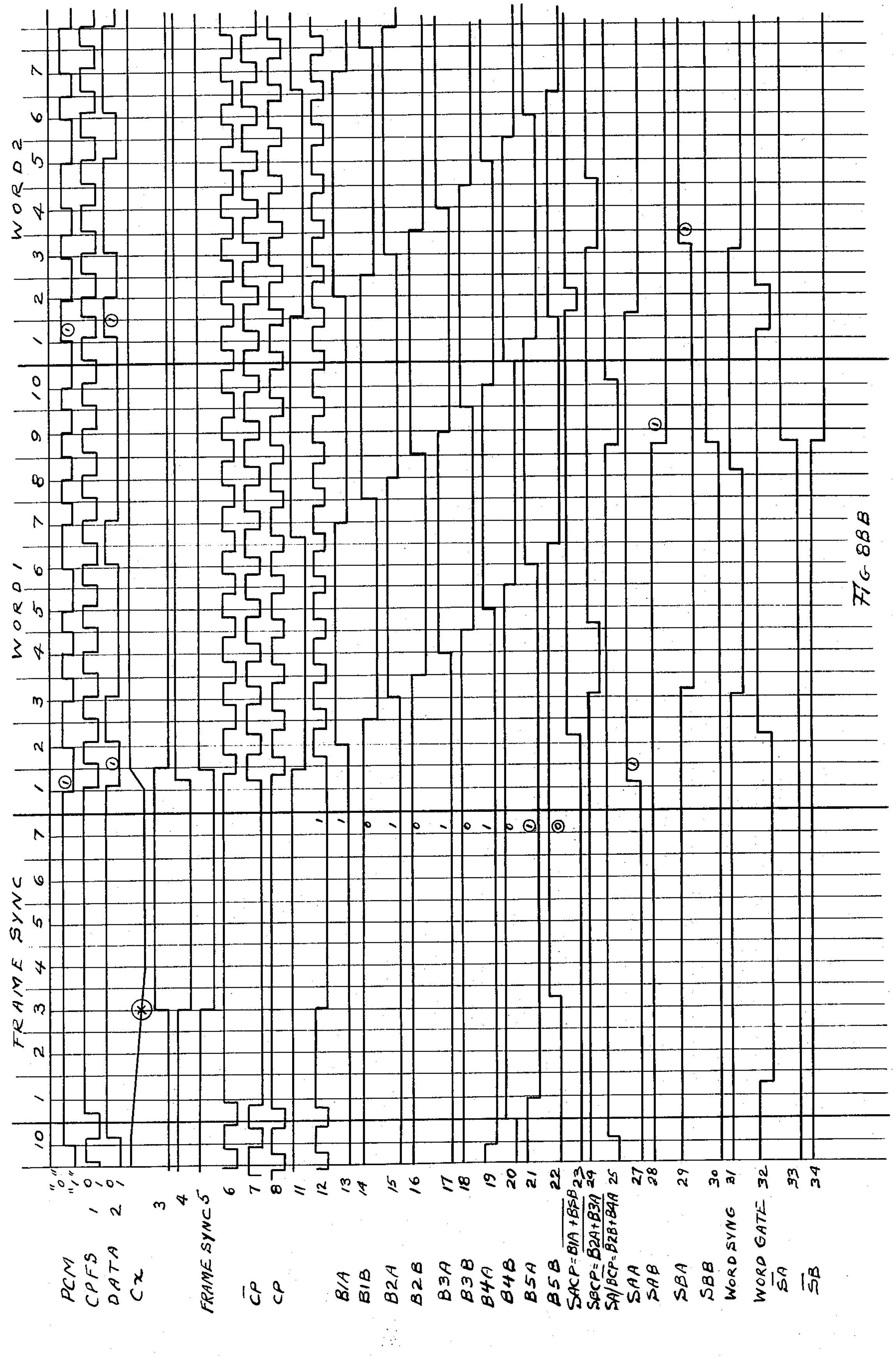

Refer to FIG. 8B which illustrates the timing unit 702 of FIG. 7. The timing unit comprises a frame sync detector 830, a bit time counter 831 and a clock pulse generator and shaping buffer 832. The remainder of the circuitry not surrounded by dashed lines generates the word sync and the word gate, and recovers the stereo information denoted by the $\overline{SA}$ and $\overline{SB}$ signals.

Refer to FIG. 8B in conjunction with FIG. 8BB. In the timing unit of FIG. 8B (see FIG. 7 also) the data and CPFS separated information is fed into the encircled lines indicated as encircled 1 and 2. In the timing diagram of flG. 8BB the PCM is shown as a reference which indicates the separation of the PCM incoming data by the circuit 701 into the CPFS delayed and stretched clock pulse signal and the incoming NRZ data. The first 7 bits of the PCM data will of course be the frame sync and will be shown on the CPFS and the data lines as a high during this period, except that the CPFS signal will be a low at the end of the 10 th bit time. During the sampling of the first channel that is, during the appearance of word 1, the data shown by way of illustration causes a CPFS pulse. It will be remembered that the bit rate is at slightly over 5 MHz. The CPFS signal is at a 5 MHz recurring frequency. The difference between bit rate and frequency is that there is not necessarily a transition at each of the bit rate times. The recovered NRZ data is also at a 5 megabit rate, that is, the transitions occur in accordance with the input data although they can theoretically occur at each of the 5 megabit times. The CPFS clock pulse circuit is sent into the pulse width discriminator and is fed into the NOR gate NOR810 which forms one-half of a flip flop together with a NOR gate NOR811 which is provided. The CPFS signal is simultaneously applied through an inverter element I812 which inverts the CPFS signal and applies it to one input of the NOR gate NOR811. The inverter I812 is purposely made slow acting so that it does not pass through short pulses. However, the inverter I812 does allow the wide frame sync pulses to be amplified and passed therethrough to be applied to the NOR gate NOR811. Therefore, of the pulses on the CPFS line only the frame sync wide pulse passes through the inverter I812. The remaining clock pulses are blocked by the inverter I812 because of its slow response time. An input capacitor controls the integration time of inverter I812. The output of the NOR gate NOR811 illustrated at 3 is the waveform J illustrated in FIG. 8BB. The waveform changes abruptly after the output of inverter I812 has reached the threshold indicated at the corresponding point X on the $C_X$ line. The output at 3 is coupled back to the second input of the NOR gate NOR810 to cause a transition of the NOR gate NOR810 as shown by the waveform 4 in FIG. 8BB. At the end of the frame sync the first CPFS incoming signal into NOR gate NOR810 causes a transition to the opposite state as illustrated at waveform 4, while the other output at waveform 3 must wait until the CX recovery time constant has provided a value sufficient so that the threshold is no longer present. The buffer amplifier 810 amplifies the input signals 3 and 4 to provide a differential as illustrated by the waveform 5. The output at 5 is the frame sync pulse as indicated by the frame sync output in FIG. 8B. This output is also simultaneously applied to the bit time counter 831 through the NOR gate NOR813. The frame sync pulse initializes all timing in the timing unit 702 and the channel select unit 704. The inverter I811 is provided merely to furnish edge recovery of the waveform at point 5. The clock pulse CP generator unit 832 receives the CPFS input signal 1 and power buffers it and shapes it to provide a plurality of clock pulse outputs as illustrated by waveforms 7 and 8 shown in FIG. 8B and FIG. 8BB. The buffer and waveshaping circuit comprises an inverter I814, a delay unit 820 which may be similar to the delay units 802 and 803 for example, of FIG. 8A and a second buffer circuit A815, the circuit essentially as stated shapes the wave and provides good clock pulse and clock pulse bar outputs.

Refer to the bit time counter 831. The frame sync signal upon being applied through NOR gate 813 into the first flip flop 821 of the bit time counter 831 initializes the counting of the bit time counter 831.

The bit time counter 831 is essentially a shift register utilized as a bit time counter wherein the CP or clock pulse input from point 8 are simultaneously fed into one input of each of the register circuits 821, 822, 823, 824 and 825 and at an instant of time later the $\overline{CP}$ inputs are also fed into these five units from point 7. This causes essentially a recycling counting from 1 to 10 at the end of which time feedback into the NOR gate circuit NOR813 inverts its output and resets the bit time counter. From the various units 821, 822, 823, 824 and 825, output composites and various combinations of these outputs are fed so as to provide the word sync output from the register units 822. The word gate input is provided by the outputs from the shift register unit 825 and 821. Note that CP and $\overline{CP}$ both return to zero before the other goes to the logical one state to enable proper shifting and counting in the bit timing counter 831.

The signals $\overline{SA}$ and $\overline{SB}$ are recovered stereo bits from the NRZ data. The first bit of each 10 bit word is clocked into the first stage of the flip flop FF821 by the timing pulse from NOR gate NOR829 as illustrated by SACP-23 of the timing diagram FIG. 8BB. The stereo bit shifted into the first half of FF821 is illustrated by the signal SAA-27 of the timing diagram FIG. 8BB. The stereo bit is then shifted to the second half of the flip flop FF821, SAB-28, by the clock pulse SA/B $\overline{CP}$-25 from NOR gate NOR825. Next the stereo bit is shifted into flip flop FF822, SBA, by the timing pulse CBCP-24 as illustrated in FIG. 8BB. Next the stereo bit is shifted to the second half of FF822, SBB-30, by the timing pulse SA/B $\overline{CP}$-25. The outputs of FF821 and FF822, SAB and SBB, become $\overline{SA}$ and $\overline{SB}$ when inverted. The signals $\overline{SA}$ and $\overline{SB}$ have the stereo and monoral information for the channel select units operation 704 of FIG. 7.

Figure 8C:
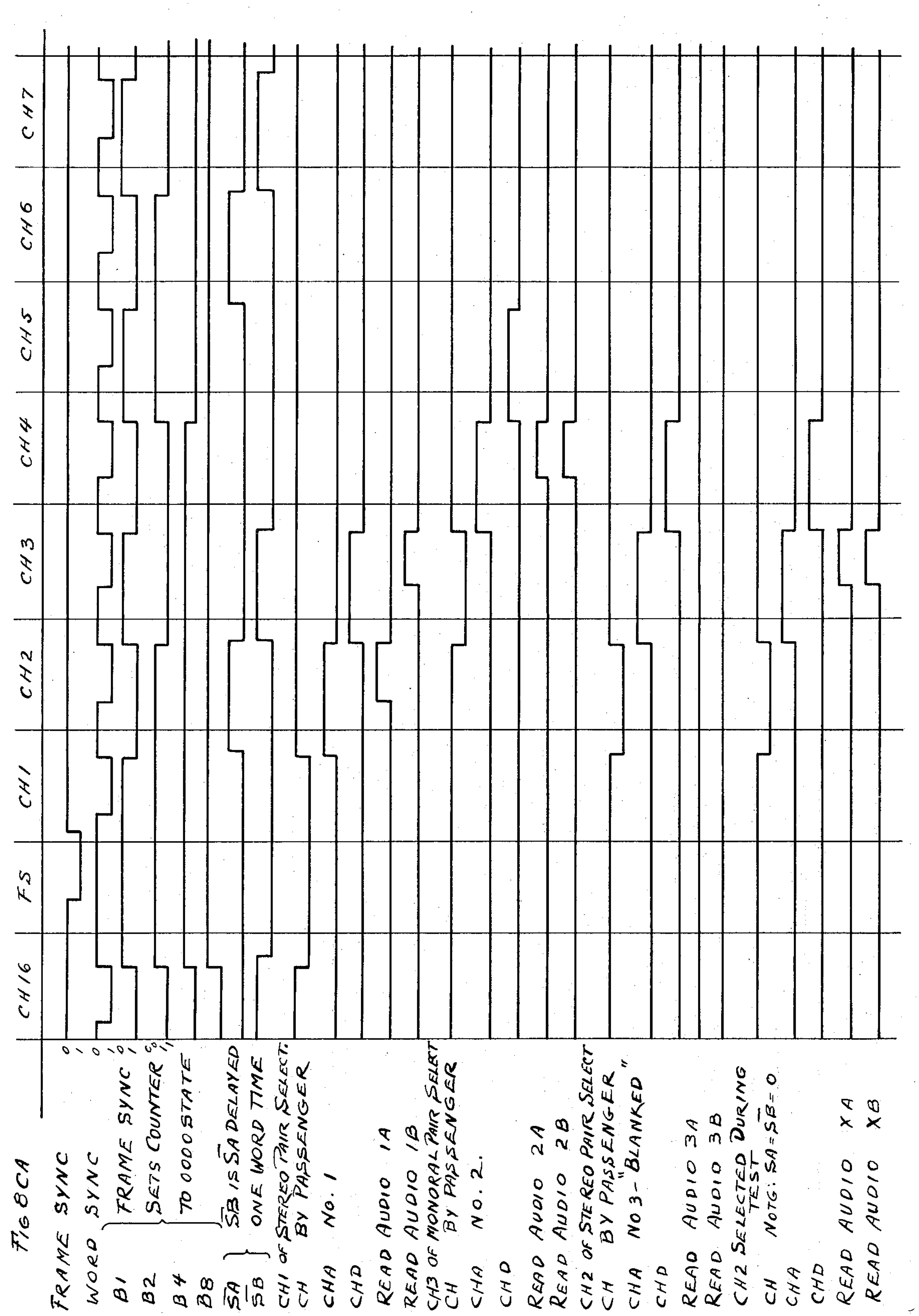
FIG. 8C is composed of FIGS. 8C1 and 8C2 which form a logic diagram of the channel select unit of FIG. 7.

Refer to FIG. 8C the channel select unit 704 illustrated in FIG. 7. The channel select unit essentially comprises a comparator circuit, a counter circuit, a level detector circuit and a read audio circuit. In addition, the unit comprises a self test unit which in itself compares comparators and additional logic elements to provide the test output for the self test function.

Now refer to FIG. 8CA the channel select timing diagram for the channel select unit of FIG. 8C. A 4 bit counter 851 illustrated in FIG. 8C is synchronized in operation by the frame sync signals illustrated in FIG. 8BB. The counter is incremented by the word sync pulses. The counter 851 may be a conventional binary counter or may be one especially adapted for use with MOS circuitry as described in the copending application Ser. No. 27,273, assigned to the assignee of the present invention, and filed under the name of Stephen P. F. Ma, and further identified as PD-69346. The waveforms illustrated in B1, B2, B4 and B8 are the four binary outputs of the 4-bit binary counter 851.

In FIG. 8C the channel select unit has $\overline{SA}$ and $\overline{SB}$ inputs wherein, as illustrated in FIG. 8CA the $\overline{SB}$ input is the $\overline{SA}$ input delayed one word time and the $\overline{SA}$ is the inverted stereo/mono bit of the present word being processed, hence, the $\overline{SB}$ input is the inverted stereo/mono bit of the previous word or channel sample. The stereo/mono bits of the next previous channel sampled and of the channel presently being sampled are fed through the array of NOR gates (not numbered) where the signals are inverted. During nontest mode, that is when either $\overline{SA}$ or $\overline{SB}$ or both are 1's the output of the NOR gates NOR852 or of the NOR gate NOR853 will be an inverted signal. Unless both $\overline{SA}$ and $\overline{SB}$ are both 0's there is no test mode output from NOR gate 851. Thus, if both $\overline{SA}$ and $\overline{SB}$ are 1's the channel being processed is monaural. If $\overline{SA}$ is a 0 and $\overline{SB}$ is a 1, the present channel being processed is the first half of a stereo pair of adjacent channels. If $\overline{SA}$ is a 1 and $\overline{SB}$ is a 0, the channel being processed is the even numbered next successive stereo channel of a pair of the stereo pairs. As stated hereinabove, when $\overline{SA}$ and $\overline{SB}$ are both 0's we are in the test mode and test mode output appears at NOR gate 851 output. The outputs of NOR gates 852 and of NOR gate NOR 853 which corresponds to the stereo information being presently processed are processed such that during test mode all channels are processed as monaural. This guarantees that a channel will be selected during test mode. This circuitry of the NOR gates NOR852, NOR853 and NOR851 guarantees that there will be an output regardless of the switch position in which the passenger has left his control unit. This just assures that regardless of the setting in which the passenger has left the passenger control unit, test mode operation can be effected.

Now refer to the comparator circuit. The comparator circuit is also described in the copending application PD-68395 which is assigned to the assignee of the present invention.

The comparator circuit provides a way in which with three wire inputs to each of the input points S19, S12 and S14 the passenger may select any one of 12 of the 16 channels provided in the equipment. In addition, two of the wire inputs to the S12 and S14 inputs are used during self-test to check the continuity of the passenger's audio transducers. By continuity we mean whether there is an open circuit in the passenger's transducer. Each of the comparators 861, 862 and 863 can recognize one of three states, a ground, an open or an intermediate value which corresponds to a resistance of approximately 110K ohms (where K = 1,000). The inputs S19, S12 and S14 to level detector units 861, 862, and 863 are representative of the inputs introduced by the passenger in seat number 1. These inputs at each of S19, S12 or S14 will be selected by passenger number 1 who actually, as will be explained hereinafter, has 12 different switch positions to which he can switch at his seat. In accordance with which switch position to which he switches, the level detector will determine the corresponding program as selected by the passenger. In the actual switching, as will be described hereinafter, at each of the inputs S19, S12 and S14 the passenger will be selecting either a ground voltage, a connection to a 100 K resistor and/or in the case of the inputs to S19, it will be either connection to ground, to 100 K or to open. The 4-bit binary counter 851 is meanwhile counting from 0 through 15, a total of 16 channels.

The table below illustrates the channel select connections with the self-test transducer to be explained and should be taken and in conjuction with FIG. 8C explains how channel selection is accomplished.

CHANNEL SELECT CONNECTIONS WITH TRANSDUCER SELF-TEST

| "Program Select" switch position | Line 2 | Line 4 | Line 9 |
|---|---|---|---|
| 1 (1, 2,)S | 10K ± 10% | 10K ± 10% | 10 ohm mx. |
| 2 (3, 4)S | 100K ± 10% | 10K ± 10% | 10 ohm mx. |
| 3 (5, 6)S | 10K ± 10% | 100K ± 10% | 10 ohm mx. |
| 4 (7, 8)S | 100K ± 10% | 100K ± 10% | 10 ohm mx. |
| 5 (9, 10)S or (9, 9)M | 10K ± 10% | 10K ± 10% | 100K ± 10%. |
| 6 (10, 10)M or blank | 10K ± 10% | 10K ± 10% | Open circuit. |
| 7 (11, 12)S or (11, 11)M. | 100K ± 10% | 10K ± 10% | 100K ± 10%. |
| 8 (12, 12)M or blank | 100K ± 10% | 10K ± 10% | Open circuit. |
| 9 (13, 14)S or (13, 13)M. | 10K ± 10% | 100K ± 10% | 100K ± 10%. |
| 10 (14, 14)M or blank. | 10K ± 10% | 100K ± 10% | Open circuit. |
| 11 (15, 16)S or (15, 15)M. | 100K ± 10% | 100K ± 10% | 100K ± 10%. |
| 12 (16, 16)M or blank. | 100K ± 10% | 100K ± 10% | Open circuit. |

For example, assume in the passenger control unit that the passenger has turned to switch position 7 which indicates that he desired to hear program 7. As illustrated, program 7 may comprise channels 11 and 12 in stereo or channel 11 monaural transmission. Program 7 corresponds to the following impedance values, referring to the channel select table below. Input S12 means that connection is established by the setting of the S12 input to a resistance of 100,000 ohms. The other end of the 100,000 ohm resistor is connected to ground. At this setting, the S14 input is connected to ground through an impedance of less than 11,000 ohms. This is indicated in the above table under Line 4 adjacent the row corresponding to program 7. Similarly, the S19 input would be connected to the ungrounded side of a 100,000 ohm resistor. By this means the level detector through voltage divider action senses the level of input impedance. Thus, the level detector essentially by connecting to a combination of resistances which may be open circuit, 100K or less than 11K ohms determines the levels of the signals which are permitted to pass through the level detector circuit 861, 862, and 863.

Actually, in the level detector the level selected, for example the level corresponding to program 7 is actually converted to four DC levels or four bits.

When connection is made for transducer testing which is an optional connection wherein if a transducer fails, the open circuit condition will be during test by either level detector 862 or 863. The output of the combined level detector comprising units 861, 862, and 863 appears at the top shown NOR gate of the comparator circuit and of the NAND gates circuits shown in the first level of inputs or to the left of comparator 854. Each of the combinations shown, for example, NOR gate NOR854 NAND gate NADN851 and NOR gate NOR855 shown in the comparator 854 comprises an exclusive NOR circuit. An exclusive NOR gate is herein defined as the same characteristics of an exclusive OR except that it has complementary outputs. That is, when the output of the level detector matches the count at a given instant of the 4-bit binary counter 851, the circuit will operate to provide an output of 0 into the NOR gate NOR856. Similarly, all of the other groups of three gates comprising exclusive NOR circuits operate to compare the level output of the level detector with the instantaneous state of the 4-bit binary counter 851 such that when match occurs, all 0's occur at the input to NOR gate NOR856. With the presence of all 0's at the input of NOR gate NOR856 there is a 1 at the output at the particular instant of comparison corresponding to a word or channel which has been selected by the passenger.

Refer to FIG. 8CA, the channel select timing. The output just described is comprised of the timing waveform channel 1 of the stereo pair which the passenger happens to have selected. The channel select timing need not be gone into in detail since in general the upper portion corresponds to the counter level, the $\overline{SA}$ and $\overline{SB}$ signals correspond to stereo information and the stereo pair selected levels are shown by the waveforms Ch1 of stereo pair selected by passenger number 1. The three waveforms are the Ch, ChA and ChD lines where the Ch is the correlated output provided by the level detector, ChA is this output delayed one time and ChD is this output delayed a second channel word length time. The ChA and ChD signals are processed to generate the read audio 1A and read audio 1B waveforms. Whether channels are monaural or stereo is determined by the phase relationships of the waveforms $\overline{SA}$ and $\overline{SB}$. For example, as illustrated by read audio 1A and read audio 1B, waveforms, (see also the read audio output of the channel select 704 and the read audio input into the D/A converter 703 of FIG. 7). The read audio signals, for example read audio 2A and read audio 2B waveforms illustrated in FIG. 8CA are provided such that for a mono channel the read audio 2A and read audio 2B waveforms are coincident whereas in stereo pairs they are not coincident as illustrated by the waveforms of read audio 1A and read audio 1B.

That is, the read audio 1B is delayed by one word time with respect to the read audio 1A.

If the second half of a stereo pair is selected by a passenger as illustrated by read audio 3A and read audio 3B waveforms, the read audio signal is inhibited so that no channel is selected. Thus, if the passenger happens to select channel 4 to listen to, and channel 3 and 4 constituted a stereo pair of inputs, then the passenger would hear nothing, and know he would have to change his selection. As illustrated by the last four waveforms of FIG. 8CA, the channel select timing, during test, regardless of which channel is selected by the passenger, even if a normally blank channel was selected, there would be coincidence of the read audio XA and read audio XB waveforms and therefore a mono channel would be selected. This technique insures that during test an audio output will occur whether a mono or stereo channel is the channel to which the passenger control units happed to be tuned at that point.

Similarly, for seats 2 and 3 the channel select unit number 2 704B or the channel for the second passenger with the S29, S22 and S24 inputs and the channel select unit number 3, 704C with its S39, S32 and S34 inputs are provided. These correspond to the upper portion which is illustrated, that is portion 704A of the channel select unit 704 which is illustrated in detail in FIG. 8C. The waveforms shown at the right hand half of FIG. 8C at the upper portion correspond to the read audio waveforms for example, read audio 1A and read audio 1B at the output of the channel select unit seat number 1, 704A.

Now refer to the lower half of FIG. 8C which illustrates the channel select unit circuitry for self-test conditions. The self-test portion of the channel select unit is provided such that when in the self-test mode if all of the passenger control units and all of the seat electronics units are good, the entire compartment should be dark. If either of the transducers of any of the passenger control units fail, then a blinking at a 1 cycle per second rate will be maintained for the aisle lights and reading lights associated with its particular seat group. If any other portion of the seat group electronics fails other than the transducers, the aisle and reading light corresponding to that seat group will remain on. This is effected as follows: During the self-test mode the signal output on all channels corresponds to a low frequency full scale square wave voltage output.

Refer to FIG. 7 in conjunction with the self-test portion of the channel select unit illustrated in FIG. 8C. As illustrated in the lower right hand half of FIG. 7, the output of each of the six audio amplifiers 705 is fed into the audio in portion in the channel selector unit. this corresponds in FIG. 8C to the audio 1A, audio 1B, audio 2A, audio 2B, audio 3A and audio 3B inputs to the comparator circuit 860 of FIG. 8C. In a unique manner, since during the self-test all of the seat units are being tested, in order to reduce the otherwise excessive load which would be put on the power supply system, the audio outputs of the amplifiers 705 are made to be provided to the channel select unit in complementary voltage conditions. That is, if the upper amplifier audio 1A output is in a positive direction, means are introduced in the digital-to-analog converter to cause the audio 1B output to go in a complementary negative going direction. Similarly, this is done for audio 2A and 2B and audio 3A and 3B signals into the channel select unit. This reduces the maximum current requirements by a factor of 2. How this is actually done will be described hereinafter in conjunction with the digital-to-analog converter circuits 703.

On flipping the self-test unit 170 to the self-test position, the square wave output at one cycle per second frequency generated in the main multiplexer is fed along the main multiplexer coax lines and into the submultiplexer and then along the lines into the individual seat group units of each compartment. In the digital-to-analog converter as explained above and as will be described in detail, the D/A converters 703 reconstruct the 1 cycle per second signal which is the signal on all channels during test from the main multiplexer into complementary audio outputs for each audio pair audio 1A and 1B, audio 2A and 2B and audio 3A and 3B.

During self-test, the service system has been set up so that all reading lights and aisle call lights are on. The test will cause the test output correspondingly to turn off all the reading and aisle lights if all elements of the system are operative.

As has been described hereinabove, the test mode is established at the seat unit by the $\overline{SA}$ and $\overline{SB}$ signals both being 0's at the input to NOR gate NOR851 continuously. With the test mode input the operation of the entire test circuitry in the lower half of the channel select unit is established.

In the comparator 880 a plurality of level detectors 881, 882, 883, 884, 885, and 886 are provided. The level detectors is responsive to one of the audio 1A, audio 1B, audio 2A, audio 2B, audio 3A, and audio 3B inputs from the outputs of the respective amplifiers 705 (see FIG. 7) during conditions of self-test. During phase 1 and phase 2 of the low frequency audio (1 cycle per second) frequency coming in, (where the word "phase" is an arbitrary designation of what has occured in the D/A converter in complementing the inputs) the opposing signals are respectively detected. For example the audio 1A input is detected in level detector 861 and if they exactly That is, the negative going portion will have to pass a threshold as established by the level detector 881B and the positive going waveform will have to pass the threshold as determined by detector 881A. Therefore, assuming an audio input to channel 1A which is established by the artificially generated self-test input signal is full scale positive, there will be a 0 output from the threshold detector 881A. In this condition there will be a 1 output from the 881B threshold detector. Similarly, this will be provided in the case of the audio 2A and audio 3A input circuits. The converse will occur in the case of the audio B circuits. That is, the negative detectors for the level detectors 882, 884 and 886 will have the reverse, respectively 0 and 1 outputs for the negative going phases. All of the 0 outputs from the positive detectors 881, 883, 885 and the negative detectors 882, 884 and 886 are provided as inputs to NOR gate NOR870. Thus if all of the signals provided to units 881, 882, 883, 884, 885 and 886 provide digital outputs from the respective level detector units the NOR gate NOR870 will provide a 1. This completes one-half of the test cycle by an indication of 1 output from NOR gate NOR870. Similarly, a 1 output will appear at the NOR gate NOR871 if all of the audio amplifiers can go to the opposite full scale extreme. Thus, if one output alternately appears at each of the NOR gates NOR870 to NOR871, it is assumed that all of the digital-to-analog converter circuits and all of the audio amplifier circuits are fully operative. The circuit 873 stores the fact that all of the amplifiers passed phase 1 and that NOR gate NOR870 has a 1 output. Similarly, the store unit 874 stores the fact that all of the amplifiers passed phase 2 as determined by a 1 at the output of NOR gate NOR871. When 1's have been stored in both of the circuits 873 and 874, the test has been passed and the test output will be a 1 and will cause all of the reading and aisle lights associated with this particular seat group to turn off (assuming that all passenger control units are operative). The fact that the lights go off verifies that the entire seat group unit electronics are operating.

An auxiliary transducer test optionally may be provided and will be described for the illustrative embodiment.

It has been previously mentioned that the test NAND gate shared by the level detectors 863 and 862 recognizes whether the transducers have opened or not. An illustrative example is the transducers of seat 1. Similarly, the transducers in 704B and 704C channel select units also provide appropriate test level detector outputs in accordance with the condition of the transducers. That is, if all of the transducers in the passenger control units are operative, the appropriate signal appears in NOR gate NOR876 and is applied to one input of NOR gate NOR875. If all the transducer units are indeed operative for that seat group, the input from NOR gate NOR876 is a 1 which causes a 0 output at the input to NOR gate NOR877. With this input to NOR gate NOR877 the test output permits all of the aisle and reading lights associated with that seat group unit to be turned off. However, if any of the transducers have failed, there will be a 0 output from NOR gate NOR876 which will cause the NOR gate NOR875 to be controlled by the signal output from the store unit 872. If the seat electronics is properly operative, 872 will continuously change its state at a 1 cycle per second rate corresponding to the audio input signal during self-test conditions. With a failed transducer, therefore, the other input to NOR gate NOR875 will be varying so as to cause alternative 1 and 0 outputs at a 1 cycle per second rate. This will cause the NOR gate NOR877 to be correspondingly actuated and a test output will be generated which will cause the aisle and reading lights of that particular seat unit to go on and off at a 1 cycle per second rate.

In summary therefore, if all the lights go off, all of the transducers and all of the seat electronics are operative; if all of the lights remain on, there is some fault in the seat electronics, and if the lights blink on and off at a 1 cycle per second rate, there is a fault in a transducer.

In discussing the level detector 880 of the channel select unit, in a practical embodiment, the threshold of the respective plus and minus level detectors of the groups 861 through 866 may have a threshold in a positive case of approximately +5 volts and in the case of the negative going voltages of −5 volts. It should also be noted that the outputs of the audio amplifier 705 illustrated in the seat demultiplexer/encoder unit of FIG. 7 which are approximately in the test mode are swings of from +10 to −10 volts output. Therefore, the threshold action of the units 881 through 886 occurs about midway of the plus and minus swing. In the case of the positive going level detectors 881 through 886 audio input voltages are greater than +5 volts and create a logical 0 output as has been described hereinabove and negative swings of greater than −5 volts in the negative direction cause the negative going level detectors to provide a logical 0 output. Conversely, when the swing in the positive direction is less than the +5 volts positive going voltage, then the output of the positive threshold level detectors is a logical 1. Similarly, when the swing in the negative direction is less than −5 volts at the output of the audio amplifier 705, a logical (one) 1 output appears at the output of the minus level detector units 881 through 886.

Figure 8D:
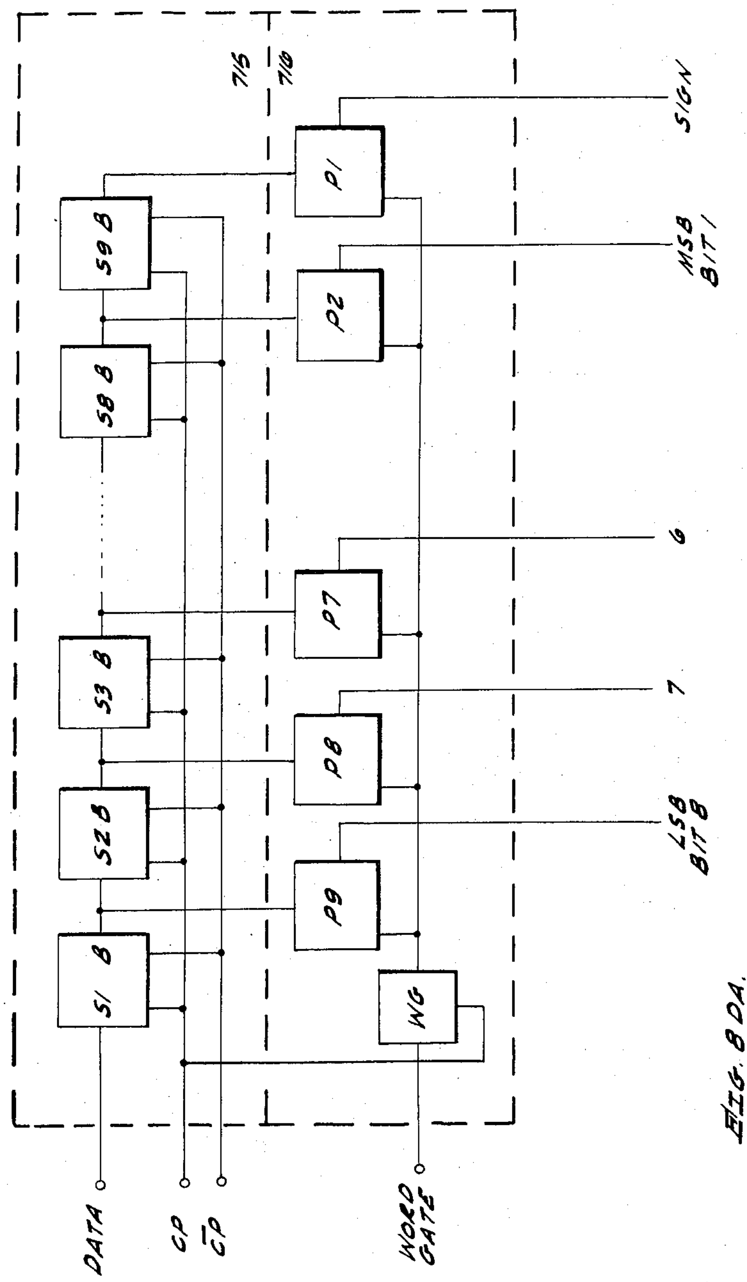
FIG. 8D is a block and wiring diagram illustrating a three seat unit digital-to-analog converter of FIG. 7.
Figure 8D:
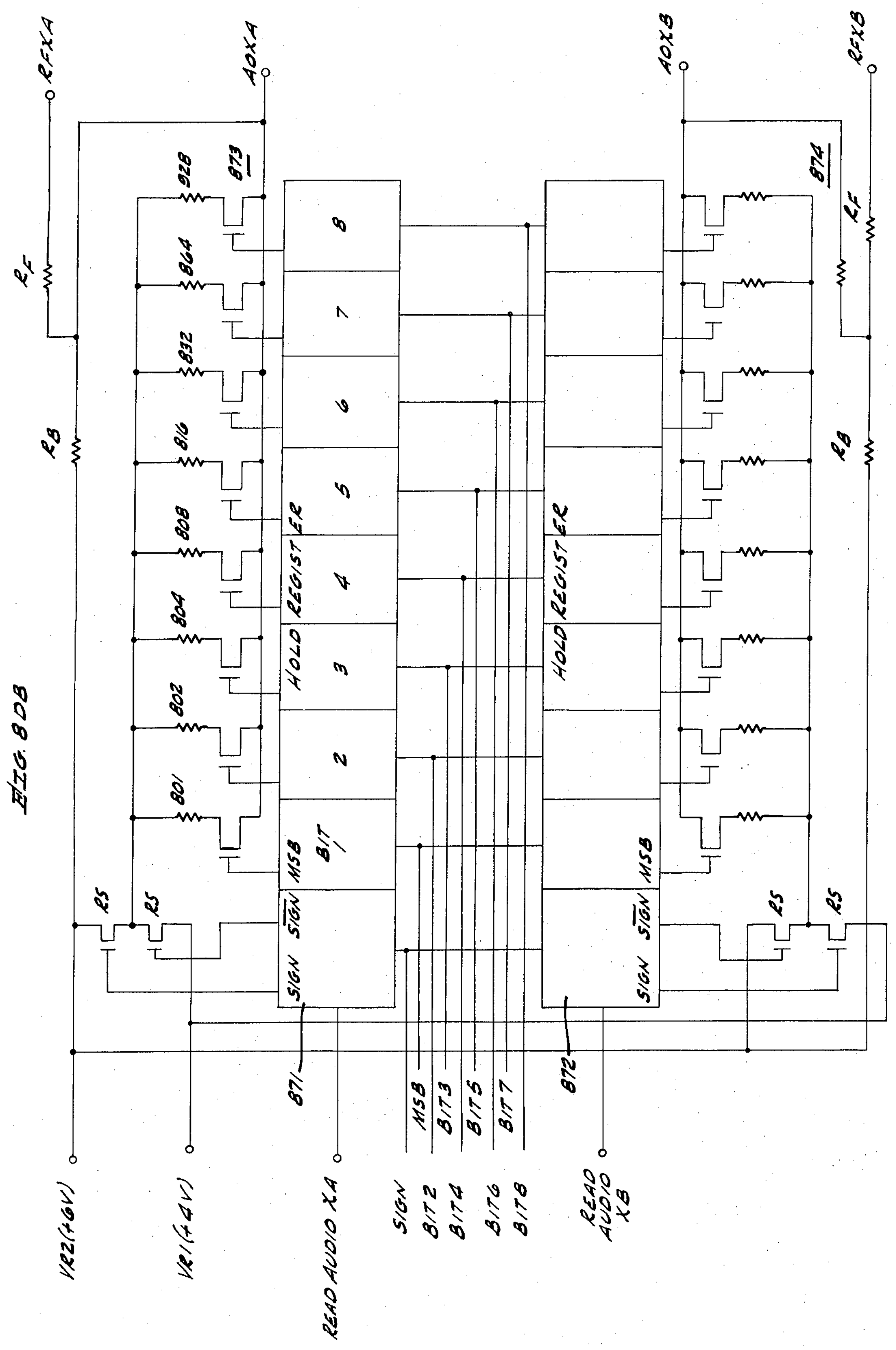
Figure 8D:
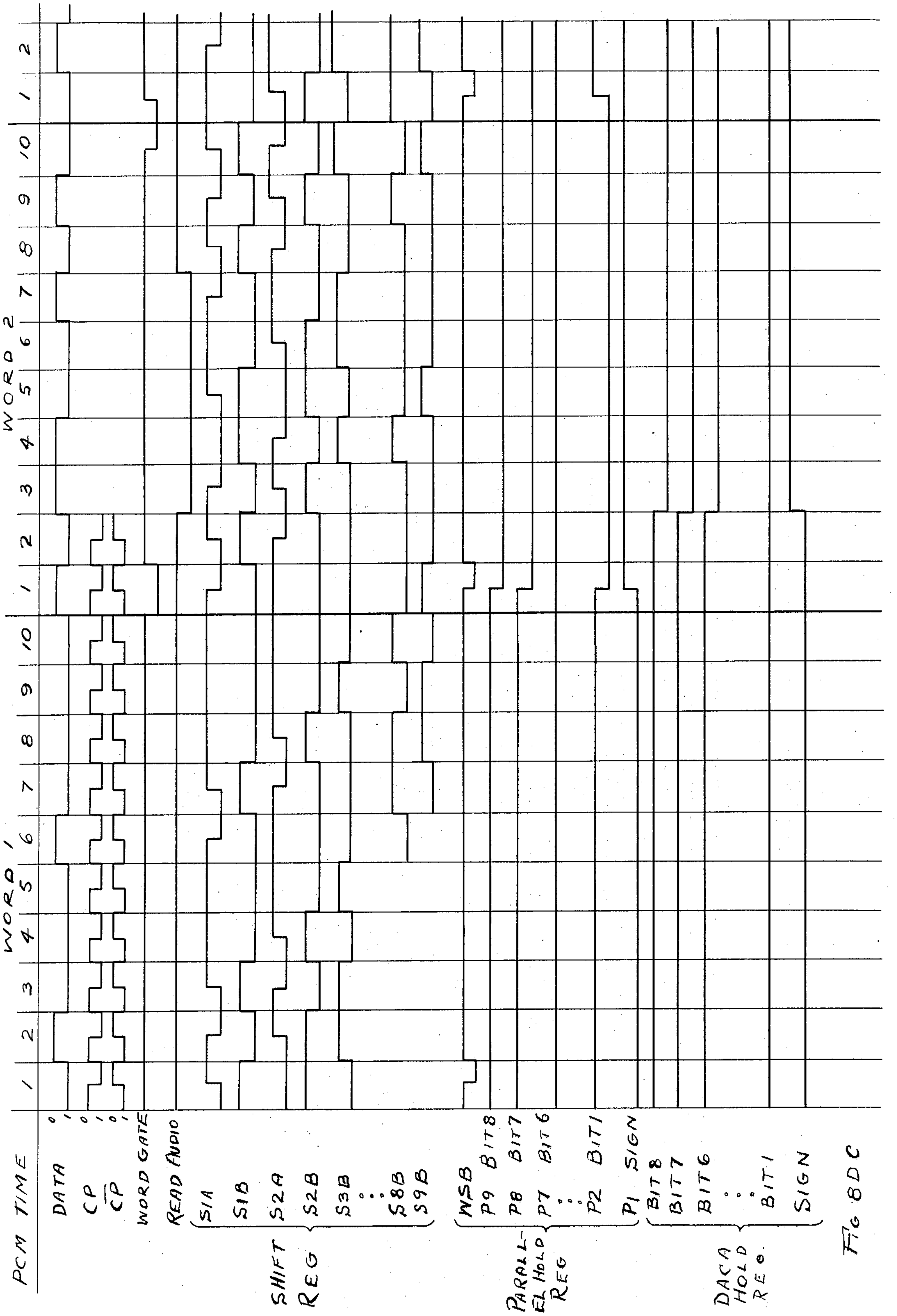
Figure 8D:
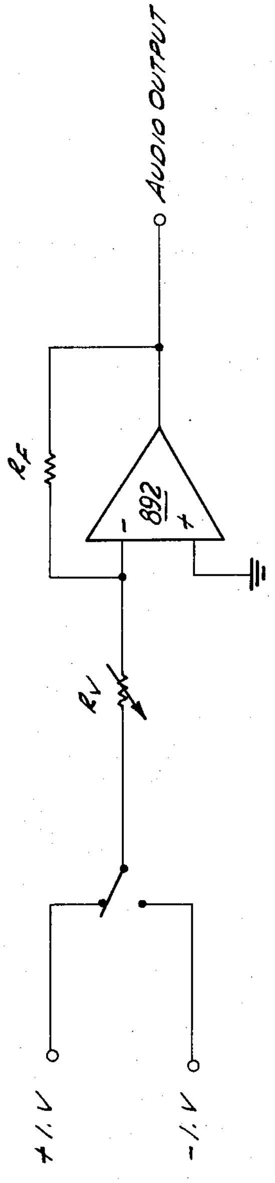
Figure 8D:
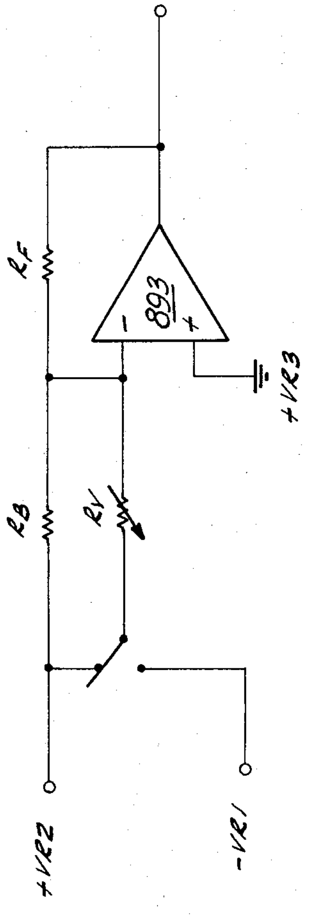

Refer to FIG. 8D in conjunction with FIG. 7. A shift register 715, a parallel hold register 716, and three dual digital-to-analog converter units 717, 718 and 719 are provided. The input to the shift register 715 comprises the seat CP and $\overline{CP}$ clocked inputs from the timing unit 702, and the NRZ data from the multiplexer which has been transmitted through the submultiplexer and into the individual seat demultiplexer/encoder units. It will be remembered that the data is the data which has been detected in the detector 701 of FIG. 7 and separated from the Manchester encoder pulses. Refer to FIG. 8DA and FIG. 8DC in conjunction with FIG. 8D. In the shift register, shifting of the data and pulses occurs continuously. The data is shifted at successive clock pulse times by the CP and $\overline{CP}$ signal inputs until 9 bits have been shifted into the shift register 715. The 10 bits of the data input are shifted into the shift register with 9 of the 10 bits corresponding to the information being retained and the 10th bit, the stereo/mono bit being discarded. At the appropriate time when the 9 bit word is present in the shift register 715, the word gate input causes the word to be shifted into the parallel hold register 716. Refer to the timing diagram of FIG. 8DC. This is illustrated in the timing diagram of FIG. 8DC wherein the data waveform indicates a typical line of data for words 1 and 2 and the beginning of word 3, the clock pulses are represented, and the word gate input signals are represented which govern the action of the shift register 715 and the parallel hold register 716 as just described.

Thus it is readily seen that for every word time, a word appears in the parallel hold register.

It will be understood, therefore, that the parallel hold register sequentially word by word holds each of the 16 words per frame. Each word is held in the parallel hold register for the duration of a word time, that is, 10 clock pulses.

During the frame sync time, there is just an extra pause for a while and nothing is effected in the circuit. The words from the parallel hold register are presented successively to each of the single digital-to-analog converter units of the three dual digital-to-analog converter units in the system. They are permitted, however, to be strobed into the individual units of the dual digital-to-analog converters in accordance with the read audio signals which have been generated in accordance with the passenger's selection of what program he wishes to hear. In the case of the stereo programs, two adjacent channels will be introduced into each of the dual digital-to-analog converters. In the case of the mono channel being selected, only one of the 16 channels of words, namely the one selected by the passenger, will be strobed into the hold registers of the dual digital-to-analog converter units. It should be appreciated that there are three passengers operating three passenger control units. Therefore, as many as six different words for each frame period could theoretically be introduced into the six individual hold registers 871,872 of the dual digital-to-analog converters. Of course, where more than one passenger is asking for the same channel, the read audio input signals accordingly will permit a lesser number of words for each frame time to appear into the hold registers 871,872, that is, there is duplication where, for example, channel 3 and 4 were selected by two of the three passengers in a stereo insert selection process. Therefore, the three passengers determine which words are presented into the dual digital-to-analog converters 717, 718 and 719. Therefore, six words or less in accordance with passenger determination appear in each frame period in the three dual digital-to-analog converters 717, 718, and 719 of FIG. 8D. The $V_{ss}$, $V_{dd}$, and $V_{gg}$ voltages supply power to the digital-to-analog converter unit of FIG. 8D and the VR1 and VR2 voltages supply reference voltages for the D/A converter. The output voltages illustrated in FIG. 8D are the same audio output voltages illustrated in unit 703, the D/A converter shift register and parallel hold register circuit of FIG. 7. The outputs from the dual D/A converter unit 717 include output RF1A (feedback resistor for amplifier 1A), A01A (audio output to amplifier 1A), A01B (audio output to amplifier 1B), and RF1B (feedback resistor for audio amplifier 1B) and correspondingly appear at the output of the dual D/A converter 717. Similarly, RF2A, AO2A, AO2B, RF2B outputs appear at the output of dual D/A converter 718 and four outputs appear at the output of dual digital-to-analog converter 719.

Now refer to FIG. 8DB. FIG. 8DB illustrates one of the dual digital-to-analog converters 717, 718 or 719 of FIG. 8D. Out of the parallel hold register 716 of FIG. 8D, there are sequentially presented the words of the successive 16 channels sampled. During each word time, the sign bit and bits 1 through 8 are presented simultaneously to the hold register. However, as has been described hereinabove, only in response to the read audio signals which occur from the channel select unit 704 as selected by the passenger, are the words permitted to be shifted into the hold register. Assume, for example, that word 3, that is channel 3, has been selected by the passenger. The successive samplings of channel 3 are thereby sequentially presented to the hold register 871 such that the bits appear as indicated in the hold register 871. The word transfer into the hold registers 871 and 872 in FIG. 8DB, the dual digital-to-analog converter, occurs for example, as follows. First, referring to FIG. 8CA, the channel select timing, assume that the passenger in seat number 1 has selected channel 1, and this happens to be a stereo selection. At channel 2 time after a word delay, the read audio 1A signal causes the word in channel 1 to be placed into the hold register 871. At channel time 3, the read audio 1B signal causes the word in channel 2 to be sent into the hold register 872.

Now refer to FIG. 8CA and the waveforms of the second passenger selection, assuming the passenger selects a monaural pair by pushing the channel 3 button. That is, a monaural selection happens to be in the channel 3 position by action of the operator of the tape deck prior to flight, for example. Now the action occurs in the dual digital-to-analog converter 718 illustrated in FIG. 8D, and which will be the identical converter which is illustrated, for example, in the FIG. 8DB. That is, there are three dual digital-to-analog converters as illustrated in FIG. 8DB, one for unit 717, one for unit 718 and one for unit 719. On selecting this monaural channel, as illustrated by the read audio 2A and read audio 2B waveforms of FIG. 8CA, at channel 4 time, the word in channel 3 is transmitted into the hold register 871 of the dual digital-to-analog converter unit 718 by the read audio 2A waveform signal. That is, the read audio 2A signal strobes the word into the hold register 817 at channel 4 time, the word being the channel 3 word. As further illustrated in FIG. 8CA, the read audio 2B waveform causes the same word at the same time to be strobed into the hold register 872 of dual digital-to-analog converter 718. In summary, since both hold register 871 and hold register 872 have the same word, this is a monaural signal. Similarly, referring to the waveforms of read audio 3A and read audio 3B, the signals will be respectively put in the hold registers 871 and 872 of dual digital-to-analog converter 719 in a manner similar to the selection of passenger number 1, but in this case for passenger number 3. However, as illustrated in FIG. 8CA, the channel select timing, in this particular illustration passenger number 3 has selected channel 2, which in this case happens to be the second half of the stereo pair and the passenger is therefore blanked out. That is, whenever the passenger selects the second half of the stereo pair he hears nothing. In this case, as illustrated by the read audio 3A and read audio 3B waveforms of the channel select timing illustrated in FIG. 8CA, there is no pulse appearing but merely an inhibiting level, and therefore words are never strobed into the hold register 871 nor the hold register 872.

Now refer again to FIG. 8DB, the typical dual digital-to-analog converter circuit. A resistor and switching network 873 is provided responsive to the hold register 871 and a second channel resistor and switching network 874 is provided and connected responsive to the hold register 872. These two networks are the actual D/A converters of D/A converters 717, 718 and 719, that is, where the conversion from digital-to-analog signals actually takes place. The plurality of resistor and MOS devices in series circuits represents a plurality of successively weighted resistors, the total of which represents an adjustable overall resistor. The conductance of the overall adjustable resistance at any instance corresponds to the analog value associated with the word in the hold register. The summation of bits in the hold register 871, for example, will be somewhere between 0 and 256 and the sign will indicate whether plus or minus value. The responsive resistor MOS parallel combined circuit will have the corresponding value at any instance appearing between the points 890 and AOXA.

Refer to FIG. 8DD. The variable resistor $R_v$ is the electrical equivalent of the bank of resistors and series connected MOS devices in the unit 873. The plus and minus 1-volt inputs to the switch 801 which corresponds to the two input MOS devices (not numbered) is illustrative of the VR1 (+4 volts) and VR2 (+6 volts) illustrated in FIG. 8DB. Referring to FIG. 8DB, the sign bit causes the switching to either the plus voltage or minus voltages illustrated in FIG. 8DB and in FIG. 8DD. The $R_f$ resistor shown in FIG. 8DD is the $R_f$ resistor illustrated in FIG. 8DB is also the $R_f$ resistor illustrated in FIG. 8DE. The $R_b$ resistors are illustrated both in FIG. 8DC and 8DE. The VR1 and VR2 inputs correspond to those illustrated in FIG. 8DC.

Refer to FIG. DB in conjunction with FIG. 8DE. The resistor and switch network 873 converts the 8 bits of magnitude in the hold register 871 into a resistance value between point 890 and AOXA of FIG. 8DB whose conductance is directly proportional to the digital value of the word in the hold register 871. That is, effectively in the digital-to-analog conversion, the digital value has now been converted to a conductance value. In FIG. 8DD this conductance $R_v$ is converted from a conductance into a voltage at the output of operational amplifier 892. The sign of this value is controlled by the +1 or −1 voltage schematically illustrated in FIG. 8DD corresponding to the sign. To improve the switching operation of unit 873 of FIG. 8DB, the operation of the circuitry has been shifted above ground. This is effected by converting the respective reference voltages VR1 and VR2 by appropriate conventional power regulation of power conditioner 706 of FIG. 7. These reference voltages, for example, may be approximately +4 for VR1 and +6 for VR2 and +5 volts for VR3 illustrated in 8DE. The resistor $R_b$ in FIG. 8DE is such that the output of the operational amplifier 893 level shifts back such that the analog output voltages are symmetrical with respect to ground.

Refer again to FIG. 8DB. A plurality of resistors R801, R802, R804, R808, R816, R832, R864 and R928 are provided which respectively represent $2^7$, $2^6$, $2^5$, $2^4$, $2^3$, $2^2$, $2^1$ and $2^0$ powers. These are respectively connected to individual switching devices (not numbered) which in turn are connected respectively at the input to the most significant bit and so on from bits 1–8 of the hold register 871. The other inputs to the resistors R801 through R928 are connected in common between a pair of switching devices which in turn are connected to the sign bit of the hold register 871. The resistors R801, R802, R804, R808, R816, R832, R864, and R928 are respectively of values such that R802 is two times R801, R804 is two times R802, R808 is two times R804, and so on to R928. This provides the binary weighting of the magnitude of a number in the hold register 871. The conductance of the weighted variable resistor thereby provided, wherein the varying is in accordance with the magnitude in the hold register, is such that the weighted summation of the magnitude of the numbers contained in the hold register and appears as a conductance between the point 890 and the point AOXA which is represented in schematic form in FIG. 8DD and 8DE by the variable resistor $R_v$.

The circuits corresponding to FIG. 8DD and FIG. 8DE are conventional in the art and thereby will not be illustrated schematically since one skilled in the art could readily build a circuit from the block and schematic representation of FIG. 8DD and FIG. 8DE.

Figure 10:
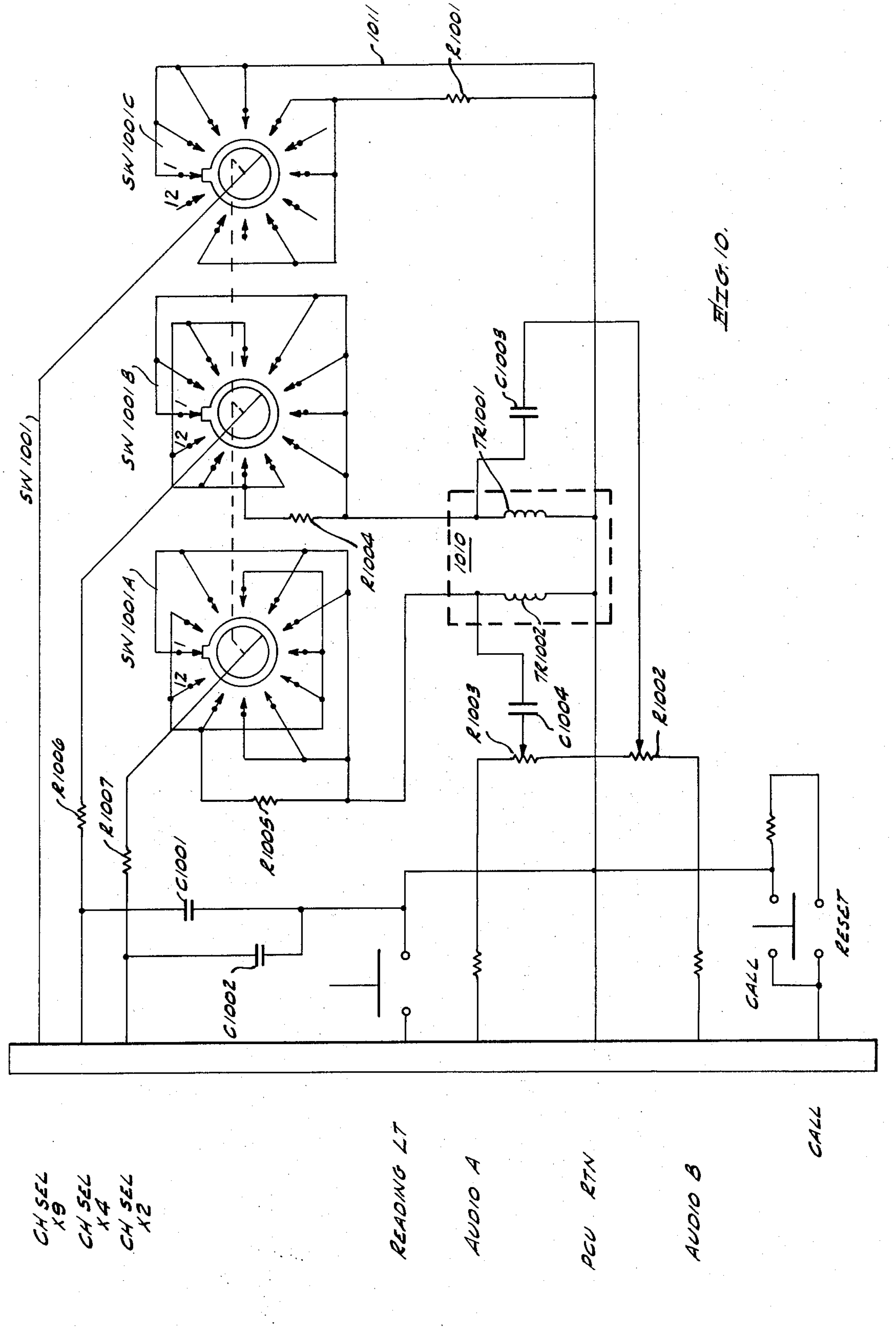
FIG. 10 is a schematic diagram of the passenger control unit circuit diagram of FIG. 9 illustrating channel selection switching, entertainment, reading light and call service circuits and self-test features of this unit.
Figure 11:
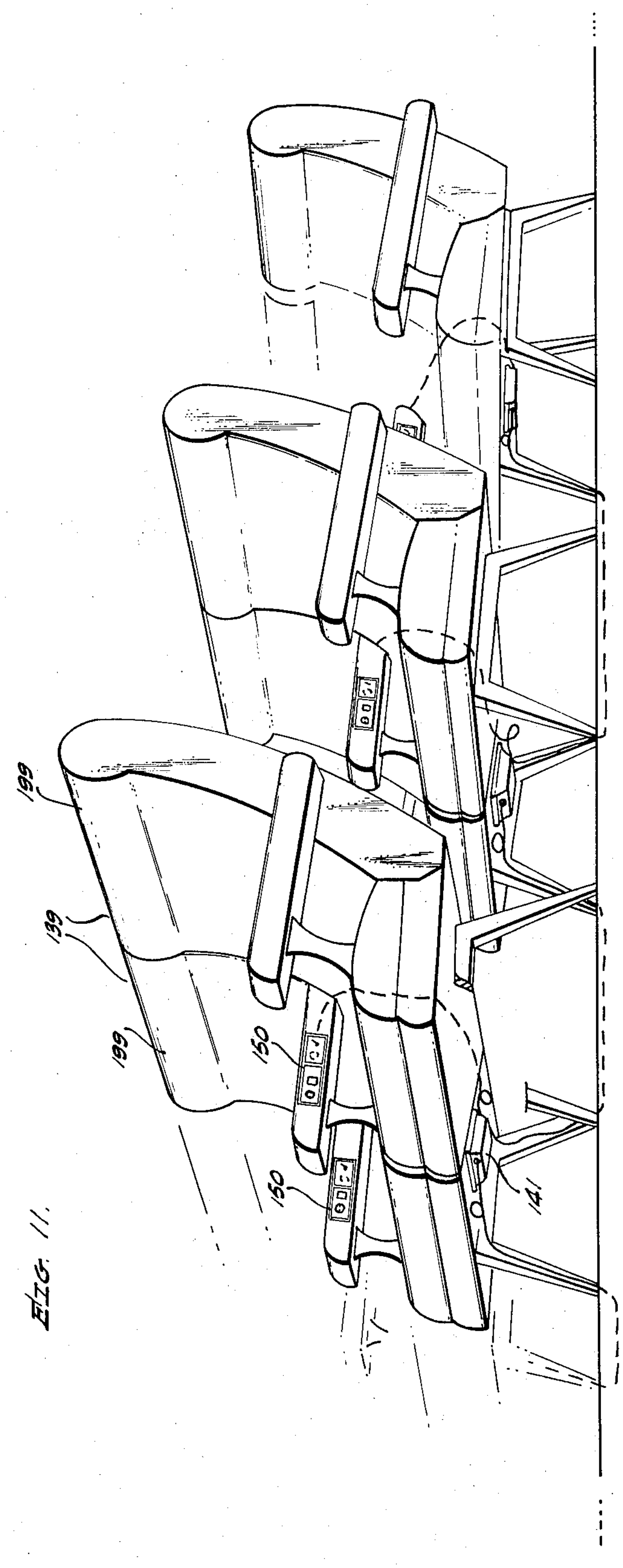
FIG. 11 is a diagram of the passenger entertainment-/passenger service system seat level configuration for a row of three seats.

Now refer to FIGS. 10 and 11. FIG. 10 is a schematic diagram of the passenger control unit of the illustrative embodiment of the present invention and FIG. 11 is a pictorial diagram illustrating the location of typical passenger seat group unit electronics equipment and controls by the passenger.

Now refer more particularly to FIG. 10, the electrical representation of the passenger control unit. The passenger control unit selector 150 as illustrated in FIG. 11 may be on the inner portion of the arm of the chair in which the passenger is seated. As illustrated in FIG. 11, the seat group unit 139 may comprise a plurality of individual passenger seats 160 each of which is equipped with a passenger control unit button selector 150 and a seat group unit 141 which is shown in greater detail in FIG. 7 of the drawings.

Now refer to FIG. 10 in conjunction with FIG. 7. The function of the passenger control unit is to enable the passenger to select the program to which he wishes to listen, to control the volume control of that program, to turn on his overhead reading light, to call the stewardess for service by pressing the appropriate call button (to be described) which the stewardess can later reset. The spare options are not illustrated in FIG. 10. A ganged 12 position three wafer rotary switch SW1001 is provided. This rotary switch SW1001 provides the channel selection feature by turning to the appropriate channel to select the channel which in turn provides the appropriate signals along channel select inputs 2, 4 and 9 illustrated at the left hand portion of FIG. 10. A resistor R1001 is provided which may, for example, be of the order 110,000 ohms in close tolerance of ± 5 percent and is disposed between a plurality of the selected switch positions of rotary switch 1001 and PCU return. Relative to the above table corresponding to the channel select switch position, the functions R1001 will optionally cause the appropriate channel to be selected. A resistor R1004 which may be a 100,000 ohm resistor within close tolerance, for example, ± 5 percent is provided. A transducer device 1010 is provided which may comprise transducer elements TR1001 and TR1002. Resistor R1004 is connected between one end of the transducer element TR1001 and the PCU return. In accordance with the passenger's selection at the passenger control unit of the appropriate channel the connection is made through resistors R1006, and R1007 which causes channel selection wires X2, X4 or X9 as appropriate in various combinations to be selected. For example, assume that the passenger has selected a program which corresponds to an input appearing at X9. On the line X9 as illustrated in the table, three impedance conditions can occur. The first is a connection to 10 ohm which is essentially virtual ground and which is applied through line 1011. The second condition occurs when the gang switch SW1001 is connected to resistor R1001 which provides essentially the connection to 110 K ohms. The third condition occurs when the gang switch position SW1001 is connected to one of the open positions illustrated and switch element SW1001C. Similarly, as illustrated in the table, from the X4 line through the resistor R1006 connection is made through the rotary switch element SW1001B to either the resistor R1004 which is a 100,000 ohm resistor, for example, or directly through the low DC resistance of the transducer element TR1001 to the PCU return line. Similarly, in the selection the X2 line is connected to PCU return through resistor R1007 and thence through the switch SW1001 element SW1001A either to the transducer relatively low DC resistance line or optionally through R1005 which may be a 100,000 ohm resistor. By proper conditions of selection of 9, 4 and 2 as illustrated on the table, the appropriate connection is made through the wiring diagram of FIG. 9 into the channel select unit 704 of FIG. 7.

Now assume that the system is in self-test condition. In this condition, it has been described above how the audio amplifiers are checked out. However, the transducer elements TR1001 and TR1002 are also checked out in self-test.

Assume in self-test that the transducer element TR1001, for example, has failed. In this condition, the connection of the X4 line through R1004 will be looking at an open circuit and since R1004 will not be connected to the PCU return line, the failure of the transducer element TR1001 has caused an open condition. During self-test, the seat group electronics associated with this passenger control unit recognizes this transducer failure by the presence of an open circuit at either X2 or X4 corresponding to opening of elements TR1001 or TR1002. When an open transducer TR1001 or TR1002 element is found as discussed hereinabove in conjunction with the self-test circuit in FIG. 7 and in particular with the channel select unit 704 the reading lights and aisle lights associated with this seat group will blink at the input 1 cycle per second frequency range. The service system is the system which controls the lights. During self-test operating mode, the 1 cycle per second signal generated in the main multiplexer is processed in the seat group unit 139 and particularly into the seat group electronics 141. When the transducer element TR1001 or TR1002 has failed, the channel select unit 704 recognizes this, as discussed hereinabove, by the impedance on the appropriate lines. The self-test signal is fed by line 790, illustrated in FIG. 7, into the seat encoder to cause the lights to blink at the 1 cycle per second range.

Refer again to FIG. 10. The capacitor C1003 provides DC isolation for the transducer element TR1001 from the volume control resistor R1002 to the transducer element TR1001. This DC isolation allows the open circuit of transducer TR1001 to be recognized during failure of the transducer. Similarly, the resistor 1006 and capacitor C1001 form a low pass filter to filter out the audio signals and send them on PCU return to ground to provide a DC voltage to the channel select unit 704 with a nominal AC ripple. In this manner, the DC resistance can be isolated from the audio which drives the transducer TR1001. Similarly, the transducer element TR1002 is DC isolated from the volume control resistor R1003 by capacitors C1004 and the resistor R1007 and capacitor C1002 form a low pass filter to provide a rippling DC voltage at the channel selection position X2 and eliminate the effects of audio in channel selection. Resistors R1002 and R1003 provide the volume control in the passenger control unit. The passenger, by varying the resistance of these potentiometers causes the audio volume to vary. Resistors R1002 and R1003 may be optionally separated or ganged for the passenger such that they may step up volume of one or both of the earphones optionally as desired. The transducer elements TR1001 and TR1002 which together comprise transducer 1010 are the audio transducers for his headset which the passenger wears in listening to passenger address, movie audio and monaural or stereo tape input programs.

Figures 9, 9A:
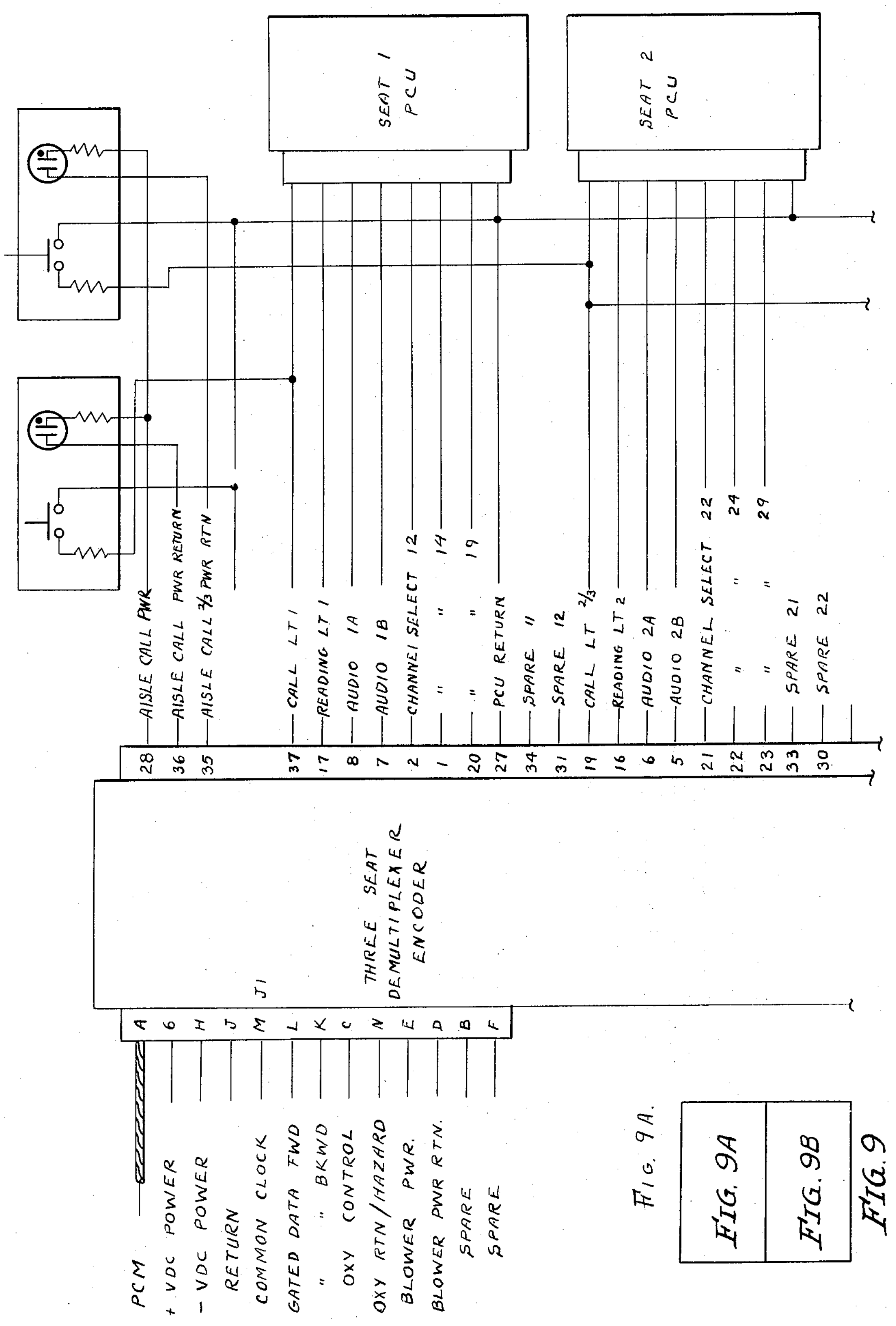
FIG. 9 is composed of FIGS. 9A and 9B which form a partially block and partially schematic diagram of seat group electronics showing the seat demultiplexer, the passenger control units, the optional aisle call lights and aisle call reset switches.
Figure 9B:
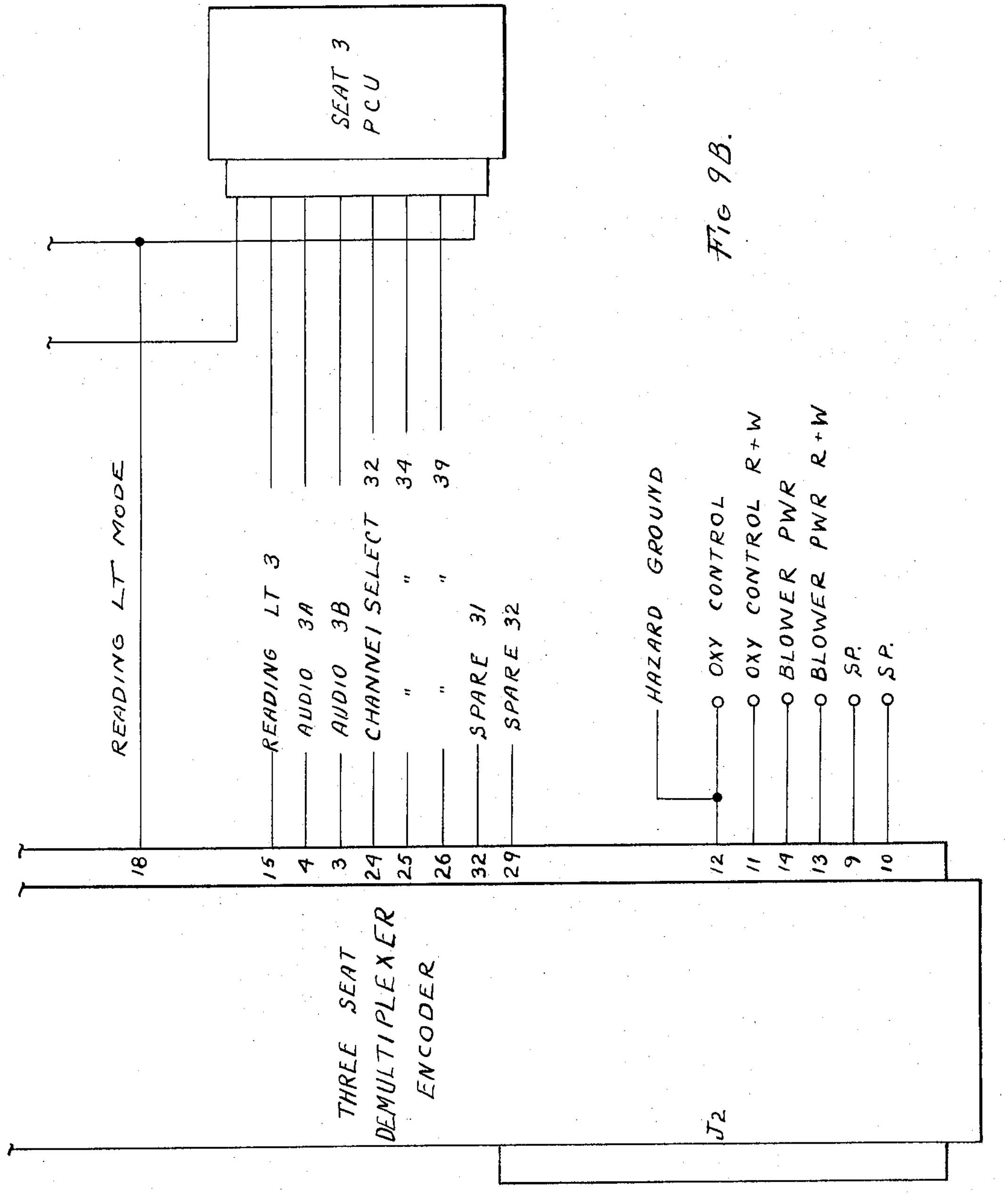

This concludes the entertainment portion of the PCU except for the wiring diagram of FIG. 9 which illustrates the connection pattern from the channel select unit 704 to the PCU. Additionally, illustrated in FIG. 10 is the reading light and stewardess call circuit. The reading light switch, as described herein in connection with the service system, may be optionally a momentary or a latching switch. The stewardess call switch is a three—position switch. One position activates a call wherein the stewardess is called by turning the aisle call lights on and where appropriate, the master call light. The switch will normally be reset upon service being rendered by the stewardess by pushing the switch to the reset position. The switch is normally in quiescent position as illustrated in FIG. 10.

PASSENGER SERVICE SYSTEM

With the exception of the test panel operation of test panel 170 in FIG. 1, the service system of the invention is on a section basis, that is each service system operates within a given section to provide the proper passenger service.

With reference to FIG. 11, the passenger entertainment/passenger service system seat level configuration, and further in conjunction with FIG. 1 which shows the breaking down of the system into compartments and sections, the passenger service portion except for the test panel operation is substantially autonomously performed within each section. That is, each section comprises a section timer/decoder 142 and a means to provide the appropriate service signals to each of the seat groups units 1301 in a given service area or section. For example, these may be up to 31 seat groups, each seat group of which may be respectively a three-seat group, a two-seat group or a one-seat group configuration. If desired, the one-seat group configuration may be a specialized case of the two-seat group configuration.

Refer to FIG. 13 which illustrates a portion of the service system of the invention. In each of the sections a section timer/decoder 142 is provided. The section timer/decoder 142 may have a chime 156, and one or two master call lights 145 and **145*a* which may be stationed either in the rear or the front of the section or both, such that a stewardess may be continuously alerted as long as at least one passenger is requesting service. In a given compartment, two section timer/decoders service the compartment. One of the section timer/decoders services the inboard installation and one services the outboard installation. As illustrated in FIG. 1, there may be four rows of seat groups in each compartment. For example, a first column of seat groups 147 may for example comprise 22 seat groups in a single column, a second column within the same section 139 may comprise 22 seat groups in a column 146. In the second section of the first compartment may be provided a third column 148 of individual seat groups and a fourth column 149 of individual seat groups. One of the section timer/decoders 142 in each of the compartments 131, 132 and 133 services the outboard columns of seat groups of this compartment and the other of the section timer/decoders 142** in each of the compartments services the two inboard columns of seat groups in that compartment.

OPERATION OF THE PASSENGER SERVICE SYSTEM

Refer to FIG. 13. Each of the section timer/decoders 142 controls two columns of seats in one of the compartments 122, 123 or 124. That is, one of the section timer-decoders 142 controls the outboard columns of seat groups in one of the compartments and another section timer/decoder 132 controls the two inboard seat groups in that compartment.

Figure 14:
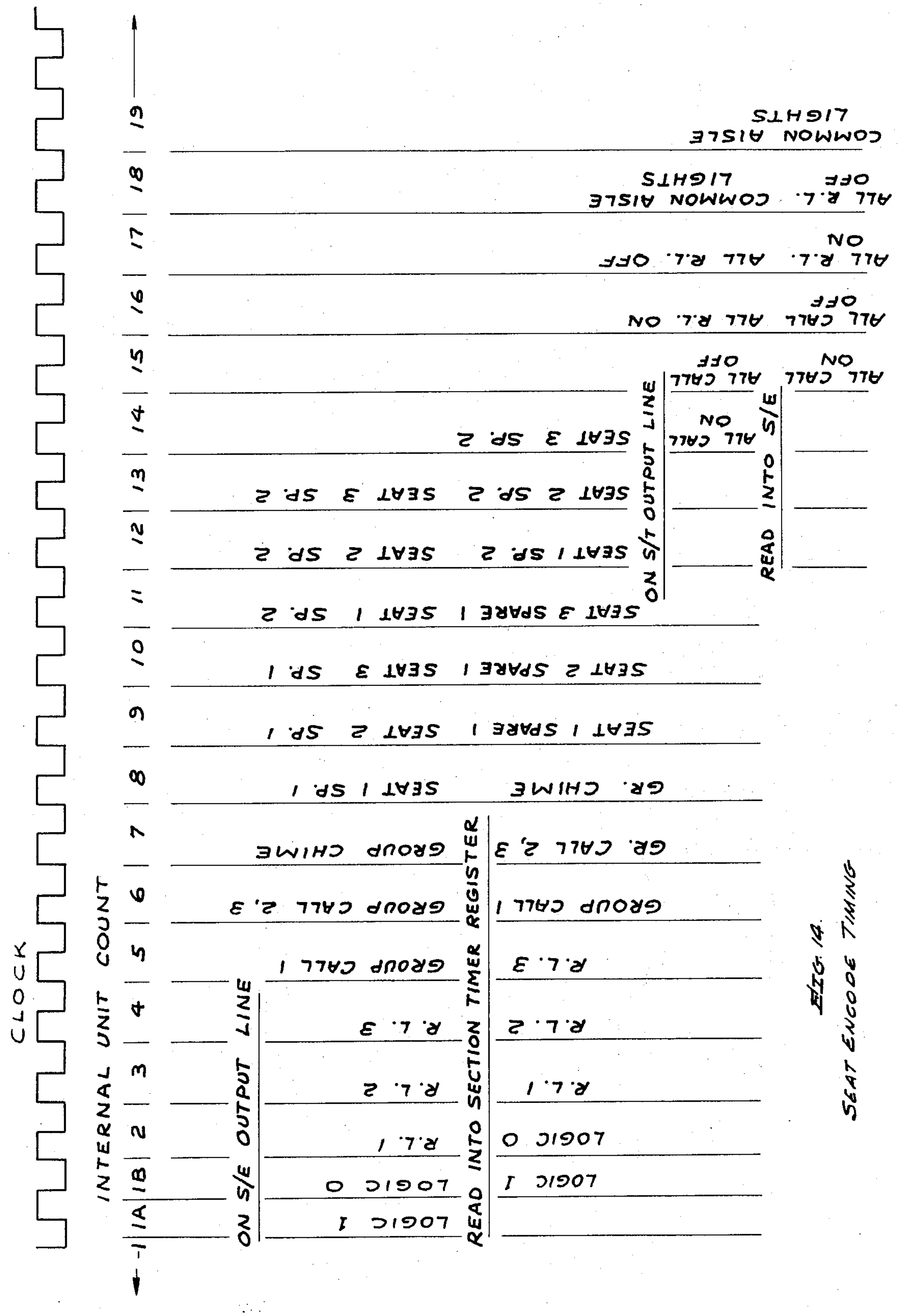
FIG. 14 is a timing diagram presenting a waveform representation of the 3.5 KHz clock pulses of the seat encoder timing and the corresponding times of data on the seat encoder output line, the times for reading data into the section timer register, the timing for commands to be placed on the section timer output line and the times for reading them into the seat encoder.

Now refer to FIG. 14 in conjunction with FIG. 13. Each of the seat encoders 1301 continuously and sequentially scans each of up to three passenger control units 150. For example, refer to the seat encoder unit 1301 with its particular three passenger control units 150*a*, 150*b* and 150*c*. The section timer/decoder 142 has a clock unit (to be described) which sends 20 clock pulses at a 3.5 KHz rate to the seat encoder. That is, each clock cycle is 300 microseconds of which the positive going clock pulse is 150 microseconds wide. A register or counter (to be described in the seat encoder) receives the clock pulses from the section timer/decoder clock when generated and utilizes them in the scanning process. At the passenger's request each passenger control unit is capable of initiating four functions; namely call, reading light, and two spare functions. The passenger control unit 1, for example, initiates the various functions for the passenger on the left side or number 1 seat of the group of three seats. Similarly, in the case of the seat number 2 of a particular seat group unit, the various functions are initiated by passenger control unit 2. Also, in the case of seat number 3 of the particular seat group unit, the various functions are initiated by passenger control unit 3. Each of the inputs are scanned sequentially in accordance with the indications in FIG. 14, the seat encoder timing. In clock time 2 of FIG. 14, the flip flop in the seat encoder corresponding to reading light 1 is observed by the section timer/decoder 142. By observed is meant that the logical switching is open such that the data present in the flip flop corresponding to reading light 1 in passenger control unit 1 is sent into the section timer/decoder 142. At clock time 3, the information of the reading light 1 flip flop in the seat encoder is read into a corresponding reading light 1 flip flop in the section timer/decoder 142. At clock time 3 also, the switching is opened to the reading light 2 flip flop in the seat encoder. At clock time 4, the reading light 2 information is read from the reading light 2 flip flop in the seat encoder to the corresponding reading light 2 flip flop in the section timer/decoder. Simultaneously, during clock time 4, the switching is opened to the reading light 3 flip flop in the seat encoder. In clock time 5, the condition of the reading light 3 flip flop in the seat encoder is transmitted into the section timer/decoder 142 reading light 3 flip flop. In clock time 5, also, the group call 1 flip flop in the seat encoder is observed by the section timer/decoder 142. In clock time 6, the group call 1 flip flop state is transferred to a corresponding group call 1 flip flop in the section timer/decoder. Simultaneously, in clock time 6 the group call 2/3 flip flop in the seat encoder unit 1301 is scanned. In clock time 7, the state of the group call 2/3 flip flop in the seat encoder is transmitted to the corresponding flip flop in the section timer/decoder 142 and simultaneously the group chime flip flop in the seat encoder has its lines open to the section timer/decoder 142. In clock time 8, the seat 1 first spare output is scanned and the lines open to the section timer/decoder 142. Similarly in sequential clock times 8, 9, 10, 11, 12, 13 and 14, the flip flops corresponding to the data indicated in FIG. 14 are scanned and the corresponding transmission of information along the data line 1311 is effected so that the information in the seat encoder unit is read into the corresponding section timer/decoder flip flops. At time 14, no scanning operation takes place. However, at time 14 the seat 3 spare 2 data in the corresponding seat encoder flip flop is sent over data line 1311 to the corresponding flip flop in the section timer/decoder register. At clock time 14, the self-test command "all call on" is sent from the section timer/decoder 142 to the seat encoder 1301 to set the corresponding flip flop in the seat encoder to receive this data. Clock times 14 through 17 are reserved for the transmission of self-test commands from the section timer/decoder 142 to the seat encoder 1301. These include the "all call on," "all call off," "all reading lights on," and "all reading lights off" commands, which are originated by the test panel 170 of FIG. 1 and are sent directly to all section timer/decoders 142. Clock times 18 and 19 are used for the respective transmission by the section timer/decoder 142 and reception by the seat encoder 1301 of the "common aisle lights" command.

A three-position switch in the test panel unit 170 (see FIG. 1) to be described hereinafter may be in either "all call on" condition switch position, "all call off" switch position, or normal operating non self-test condition. Assume that the self-test panel 170 is turned to the "all call on" condition when it is desired to test all call signals in the various seat group units in the aircraft. In the "all call on" switch condition, the "call on" input line into the section timer/decoder from the self-test panel 170 is a logic 1. In this condition, at clock time 14 the "all call on" condition state is transmitted on the section timer/decoder 142 output line 1311. At clock time 15 the "all call on" state is read into the latches composed of gates 16152, 16154, 16157, and 16160 (FIG. 16) in the seat encoder unit 1301, which are normally set by the passenger control units when the passenger initiates a call request. It is assumed of course that no passengers are in the plane during self-test mode operation and that no passenger control units have the call button pressed. At clock time 5 of the next clock cycle timing sequence, the state of flip flop FF1301 (the group call 1) is sent on the seat encoder output line. At time 6 the group call is sent into the section timer/decoder to cause the corresponding master call light to go on indicating that a call condition is present. Also at time 6, the state of flip flop FF1302 (group call 2/3) is placed on the seat encoder output line and at clock time 7 group call 2/3 is read into the section timer/decoder to cause the corresponding master call light to go on. As a result of the two counts 5 and 6 causing the section timer/decoder corresponding flip flops to be enabled, a signal is transmitted on the gated data line 1313 which is sent into the overhead decoder and causes the group call light 1303 to go on. This verifies the continuity of the circuit from the seat encoder latches through the section timer/decoder 142, to the master call lights and to the overhead decoders and to the group call lights 1303. Corresponding with this condition, the respective inboard and outboard aisle call lights 1321 and 1322 should correspondingly light. In the case of an inboard seat group in a compartment with only three columns of seats, the light 1322 goes on separately on the group call 1 command and the light 1321 goes on separately on the group call 2/3 command. The light 1322 is set by one latch and the light 1321 is set by the latch so that the going on of a light indicates that its particular latch is operative and the lines to the particular passenger control units 3 and 1 and their corresponding lights are operative. In similar fashion, when the self-test panel 170 call switch is in "all call on" condition, a similar set of circumstances occurs. That is, at clock time 15 the "all call off" state of the section timer/decoder 142 is put on the section timer/decoder output line 1311 to reset the latches composed of gates 16152, 16154, 16157, and 16160 to "off" condition. On the ensuing clock time 16, the "all call off" condition is read into these seat encoder latches. In this condition, all aisle lights, master call lights, and overhead decoder group call lights should be off if the system is operating properly. Similarly, in the self-test command unit "all reading lights on" condition, the "all reading lights on" line to the section timer/decoder 142 is high. At clock time 16, the "all reading lights on" signal is placed on the section timer/decoder 142 output data line 1311. At time 17, the "all reading lights on" condition is read into the seat encoder 1636 to set the reading light flip flops FF1303, FF1638, and FF1640 to the "on" flip flop condition. With these flip flops set to "on" condition, in the next cycle during respective clock pulse times 2, 3 and 4, reading light 1, reading light 2 and reading light 3 data are sent to the section timer/decoder 142. Accordingly, during the correct format time the section timer/decoder 142 communicates the information to the overhead decoder such that corresponding reading lights of the particular seat encoder group units are all turned on.

In the condition of "all reading lights off" set in the test panel unit 170 for self-test command, during time 17 the "all reading lights off" signal is placed on the section timer/decoder output line 1311. At clock time 18, the "all reading lights off" signal is read into the seat encoder which sets the respective flip flops FF1636, FF1638 and FF1640 to "off" condition. In this condition, on the next cycle the information is transmitted into the corresponding flip flops of the section timer/decoder 142 and reading light off data is transmitted to the overhead decoder and the corresponding reading lights in the overhead decoder go off if the system is in operative condition.

When the test panel unit 170 (FIG. 1) is not in self-test command condition switch setting, none of the four switch lines are enabled and the self-test conditions of times 14 through 17 are all in the logic zero state. Clock time 18 (see FIG. 14) is used for the common aisle lights command.

Each section timer/decoder 142 may either control two columns of seat encoder units 1301 and corresponding overhead decoder units or control one column depending upon determined passenger requirements. Assume in the illustrative embodiment that there is one column being controlled by a section timer/decoder 142. Because of the absence of data lines from a second column into the section timer/decoder connector, the system goes into the "single column" mode. At clock time 18, a logical 1 bit is transmitted from the section timer/decoder and is received by the seat encoder "common aisle lights" flip flop FF1641 (FIG. 16) at clock time 19. Responsive to this flip flop FF1641 being set, aisle call light 1322 is turned on if the latch composed of gates 16152 and 16154 is set, corresponding to a call request by passenger 1, and aisle call light 1321 is turned on if the latch comprising gates 16157 and 16160 is set, corresponding to a call request by either passenger 2 or 3.

For the two column configuration a slightly different mode is utilized. This is usually provided for the outboard type of seating arrangement wherein there is no aisle on the outboard side to be observed. In this configuration, any of the three passengers putting a call request into respective passenger call units 150*a*, 150*b* or 150*c* will set the state of flip flop FF1301 and the state of flip flop FF1302. Therefore, a call by any of the three passengers will cause both aisle call lights 1322 and 1321 to go on.

Now refer to FIG. 16. FIG. 16 shows a single unit of the seat encoder 1301 of FIG. 13 which for example, may be placed on a single medium scale integrated chip.

At the beginning of each interrogation cycle, there is on the clock line a hyperpulse defined as a pulse whose levels are −15 volts to +15 volts as opposed to the regular clock levels of −15 volts to 0 volts. The purpose of this hyperpulse is to reset each of the seat encoder units 1301. This hyperpulse serves to reset counters 1601 provided within each seat encoder unit. The hyperpulse is generated in the section timer/decoder as will be described.

Refer further to FIG. 16. The seat encoder 1301 comprises a clock detector 1610, control logic circuitry 1602, input/output logic 1603, a multiplexing gate 1604, a counter 1601, a call logic unit 1605, a reading light logic section 1601, and a spare logic section 1607.

Now refer to the clock detector portion 1610. Into the common clock line 1320 appears the hyperpulse and the series of 20 clock pulses 1A through 19 (see FIG. 14). FIG. 15 which illustrates the seat encoder system timing, also illustrates the common clock line waveform including the hyperpulses and the 20 clock counts and illustrates the gated data forward in and the gated data forward out to be described in connection with the seat encoder system timing. The clock train generated in the section timer/decoder 142 is input to the clock detector circuit 1610 at each of the seat encoder units 1301. At the beginning of each interrogation cycle, a hyperpulse appears on the common clock line 1320. As stated, this hyperpulse has as its voltage levels −15 volts and +15 volts as opposed to the normal clock pulse levels which are −15 volts and 0 volts. The purpose of this hyperpulse is to reset each of the seat encoder units to the count of 1, thereby synchronizing each of the seat encoder units to the section timer/decoder unit 142. After the counter 1601 is set to count 1, seat encoder unit 1301 is enabled to receive a strobe pulse on the gated data line 1311. The hyperpulse output from the clock detector 1610 is applied to the set line of the first flip flop FF16001 of the counter 1601. The hyperpulse is simultaneously applied also to the clear inputs of the remaining flip flops of the counter 1601 to clear these flip flops. Thus when the hyperpulse is applied to the counter 1601, the first flip flop FF16001 is set to a 1 and the remaining flip flops of the counter 1601 are set to 0. This sets the first count of the counter as a 1 in the most significant bit position and sets all 0's in the others. Upon each successive clock pulse, the clock pulse input, when enabled, is applied to the respective CP line. For example, on the first clock pulse the clock pulse input is applied to the CP line of flip flop FF1601 and resetting occurs such that the first flip flop is in the 0 (zero) state, the second flip flop is in the 1 (one) state, and all the remaining flip flops are in the 0 (zero) state. After that in typical ring counter fashion the counter counts up to 19. The hyperpulse previously described is differentiated from the clock pulse which is on the same common clock line 1320 by the hyperpulse detector 16113 located with the clock detector 1610. The output of this hyperpulse detector 16113 is amplified by gate 1636 and its output is applied to the counter 1601. This sets flip flop 16001 to the 1 state and clears all the other flip flops in this counter to the 0 state.

The strobe pulse (illustrated in FIG. 15) is generated either by the section timer/decoder or by the previous seat encoder, as will be described, and is applied either to the gated data input line 1311 or to the gated data input line 1313 in the input/output logic unit 1603. Assume that the strobe pulse is applied to the gated data input line 1311. Upon being applied through the logic this strobe pulse causes the flip flop FF16002 to be set to a logic 1 state. This indicates that the strobe pulse was applied to the gated data input line 1311. Now assume that the strobe pulse is applied to the gated data input line 1313. This strobe pulse causes flip flop FF16003 to be set to a logic 1 state and indicates that the strobe pulse was applied to the gated data input line 1313. As has been described, the section timer/decoder 142 alternately controls the columns of seat decoder units and overhead decoder units by a front-to-rear and then a rear-to-front "daisy chain" scanning operation. Therefore, a strobe pulse is applied to a particular seat encoder unit alternately on the gated data input line 1311 and the gated data input line 1313 and the seat encoder unit then communicates with the section timer/decoder 142 by sending data along the same gated data input line on which the strobe pulse was applied. The outputs of flip flops FF16002 and 16003 are applied to NOR gate N16116 of the control logic 1602. When either input is applied to NOR gate N16116, an output is applied along the output line 16500. This output is applied to the input of NOR gate N16129 of the clock detector 1610. Whenever either of the conditions of forward data or backward data being applied along the respective lines 1311 or 1313 to a particular seat encoder unit 1301, the state of the NOR gate N16116 is such that a 0 output is forwarded along the line 16500 of the control logic 1602 which enables operation of the NOR gate N16129 of the clock detector 1610. A pair of output NOR gates (not numbered) are employed at the output of NOR gate N16129 in order to provide clock and $\overline{\text{clock}}$ respective outputs. The $\overline{\text{clock}}$ signal is applied along the line 16501 to all of the counter 1601 stages simultaneously so as to increment the counter 1601 each time that a clock pulse occurs for the 20 successive clock pulses. The clock input from the other output stage (not numbered) of the clock detector 1610 is also applied on the clock input line simultaneously with applying of the $\overline{\text{clock}}$ signal input along the line 16501 to successively count up the counter 1601. As previously described in FIG. 14, count times 2 through 13 are utilized to transmit data from the seat encoder 1301 to the section timer/decoder 142. This data is transmitted along that gated data line which is being utilized by the section timer/decoder 142 for such communication and which has been defined by the setting of flip flop FF16002 or flip flop FF16003. The seat encoder 1301 does not know whether it will receive a strobe on the forward direction gated data line 1311 or on the backward direction gated data line 1313 at the input/output logic 1603. The only way in which the seat encoder 1301 knows in which direction to send the data to the section timer/decoder 142 is by its observing which of the flip flops FF16002 or FF16003 in the input/output logic circuits 1603 has been set by the strobe pulse illustrated in FIG. 15.

Refer to FIG. 15. The strobe-in pulse from the section timer/decoder 142 causes communication to proceed between the first seat encoder unit 1301 of a section and the section timer/decoder 142 via the input gated data line 1311. After all communication has been completed with the first seat encoder unit, the multiplexing gate 1601 of the first seat encoder unit then generates a strobe-out pulse (see FIG. 15) which is sent via the output line 16502 of the multiplexing NOR gate N1601 into the "exit gate" logic 1620. In the exit gate unit 1620, the special gate N16107 is opened such that a strobe-out pulse is sent along the gated data line 1313 to the next seat encoder unit 1301. When received, this pulse serves to start communication between the next seat encoder unit 1301 and the section timer/decoder 142. Therefore, the strobe-in pulse to a particular seat encoder unit 1301 causes data to be sent from that seat encoder unit 1301 to the section timer/decoder 142, while the strobe-out pulse generated by one seat encoder unit 1301 and sent to the next seat encoder unit causes data to be sent from this next seat encoder to the section timer/decoder 142.

Thus far it has been assumed that the first seat encoder unit is the seat encoder which is being described. Assume however, that one of the other seat encoders in a column of seat encoder units is receiving and sending data in accordance with the waveforms of FIG. 15. The strobe-in pulse is received from the next previous seat encoder on forward line 1311. Forward line 1311 extends from the section timer/decoder 142 and then from seat encoder unit to seat encoder unit forward to backward, in the compartment 135. Upon going through the logic the strobe-in pulse sets the flip flop FF16002. This enables line 16500 which starts the count. After the 20 counts (see FIG. 15) are completed, the strobe-out pulse is generated by the multiplexing NOR gate N1601. The strobe-out pulse occurs at the time at which special gate 16107 of the exit gates 1620 is set to cause the output signal to go along line 1313 to the next seat encoder unit going from front to rear. Therefore, sequentially along the line 1313 each seat encoder unit respectively in accordance with receiving the strobe-in pulse as illustrated in FIG. 15, communicates with the section timer/decoder 142 during the ensuing 18 pulse times. On the 18th pulse time, the seat encoder unit in operation generates the strobe-out pulse which causes the next seat encoder unit 1301 to be enabled to communicate during the ensuing cycle of the clock times. The various signals in each internal unit cause the various service functions to be scanned and performed during each sequential cycle of 20 counts going from the section timer/decoder 142 and forward to aft, seat encoder by seat encoder.

Refer again to the discussion of the service system of FIG. 13 and the individual internal unit timing counts of the seat encoder illustrated in FIG. 14. The service functions which occur in the encoder 1301 illustrated in FIG. 16 comprise reading light functions, call functions, and spare functions for each of the three passenger control units 150*a*, 150*b* and 150*c*.

Refer again to FIG. 14. The reading light functions occur during the internal clock unit periods 2, 3 and 4. Refer to the reading light switch 1 section 150*a* by way of example. The reading light switch 2 and reading light swtich 3 circuits operate substantially identically to the reading light switch 1 circuit and therefore will not be described. The reading light switch 1 is actuated in the passenger control unit 150*a* by the passenger. The reading light switch may be either a push button type 16601 or a latch type 16602 as illustrated in FIG. 16. The reading light function is implemented for the particular passenger control unit 1 of a particular seat group unit 139 if either of the input lines on the NOR gate N1673 is in 1 condition. The upper line (not numbered) is in the 1 condition where a latching switch 16602 is utilized and the switch is closed by the passenger. If a reading light momentary switch is utilized, the NOR gate N1673 lower line is enabled upon the pressing of the reading light switch 16601 by the passenger. The momentary reading light switch 16601 is associated with logic to be described such that if the light is off and the button is pushed the light will turn on and vice versa. That is, if the button is pushed while the light is on, the light will turn off. The reading light switch in the absence of actuation is normally open. If a latching type reading light switch is used, the reading light mode input is grounded. This disables momentary flip flops FF1641 and FF1640 and enables NOR gate N16202. This allows the upper input line (not numbered) of the NOR gate N1673 to be controlled by the latching reading light switch. If a momentary type reading light switch is used, the reading light mode input is at a logic 0 state. This disables NOR gate N16202 and enables the momentary flip flops FF1641 and FF1640.

When the hyperpulse input to flip flop FF1641 is at a logic 1 state, flip flop FF1641 is set to a logic 1 state if the reading light switch is closed to the change state. This places a logic 1 at the T input to flip flop FF1640 and the output of this flip flop, which is connected to the bottom input of the NOR gate N1673, changes state. That is, if flip flop FF1640 is in the reading light "on" state and the reading light 1 switch is pushed, the flip flop FF1640 will be changed to the reading light "off" state. That is, if flip flop FF1640 is in the "off" state it will be changed to the "on" state. Momentary depressible reading light switch 16601 has a vibration or bounce characteristic such that if pressed mechanically it normally vibrates several times. Each vibration would cause the flip flop FF1640 to change state and the light to be blinking on and off. The circuit of flip flop FF-641 corrects for this condition to permit only a single change of state of flip flop FF1640 upon each separate pressing of the button by the passenger. In order to cause the flip flop FF1640 to change state, the T input of flip flop FF1640 must go to the logic 1 state. This can only happen if the flip flop FF1641 is set to a logic 1 state. Flip flop FF1641 is only set at the time the hyperpulse input first goes to the logic 1 state if the reading light switch 16601 is closed at the time. If there is contact vibration (bounce) of this reading light switch 16601 when it is pushed, there are two cases to consider — either this bounce occurs at a time when the hyperpulse input is a logic 0 or when it is a logic 1. Consider the first case of a logic 0. Since flip flop FF1641 can only be set during the time that the hyperpulse input is a logic 1, the logic does not respond to switch bounce which takes place when the hyperpulse input is a logic 0. Now consider the case where the switch bounce occurs when the hyperpulse input is a logic 1. If the switch happens to be in the "change" state when the hyperpulse input is a logic 1, flip flop FF1641 is set to a logic 1 and normal operation results. If the switch happens to be in the "no change" state when the hyperpulse input is a logic 1, then flip flop FF1641 is set to a logic 1 at the next time when the hyperpulse input is a logic 1. Then normal operation results. For incorrect operation to result, the duration of the switch bounce would have to be long enough so that the hyperpulse input is at a logic 1 state two successive times while the switch is still bouncing. Also, during the first hyperpulse time the switch would have to be in the "change" state, while it would have to be in the "no change" state when the next hyperpulse arrives. Under these conditions, during the first hyperpulse time flip flop FF1641 is set to a logic 1, changing the state of flip flop FF1640. Then, when the second hyperpulse arrives flip flop FF1641 is reset to a logic 0. Finally when the third hyperpulse arrives, the switch level (now at a constant, no bounce, "change" state) sets flip flop FF1641 to a logic 1 state again so that the state of flip flop FF1640 is again changed. Thus the final state of flip flop FF1640 is the same as its initial state even though the passenger has pushed the reading light switch 16601. The probabilities that the switch bounce would occur just as described above are so low that this type of failure seldom occurs and in the few cases of such occurrence, the passenger would merely again press the button.

Refer to the call function illustrated in FIG. 16. There are two separate call and reset circuits, one for the passenger control unit 150*a* and one for the combination of the passenger control units 150*b* and 150*c*. Since the two call and reset circuits are substantially identical, only the call and reset circuit for seat 1 of the seat group will be discussed. Signals responsive to the passenger's call are initiated and transmitted in the times 5 and 6. The group call 1 is initiated at time 5. The group call 2/3 is initiated at time 6. The group chime signal is initiated at time 7. Assume the passenger in the first seat of a seat group 139 initiates a call. The switch SW16603 is thrown into the ground or call position. With the switch SW16603 in this position, the output of NOR gate N16170 is in the logic 0 state. This causes the top input (not numbered) of NAND gate N16153 to go to the logic 1 state. The count 6 signal is applied to the bottom input (not numbered) of NAND gate N16153. When this input is a logic 1 the output of NAND gate N16153 is a logic 0. This causes the two cross-coupled NOR gates, NOR16152 and NOR16154, to switch to the call state with the output of NOR gate NOR16152 a logic 1 and the output of NOR gate NOR16154 a logic 0. At count time 5, the output of NOR gate NOR16152 is gated to the output of NOR gate NOR16093 and is the group call 1 data bit sent to the section timer/decoder 142. Now assume the passenger in the first seat of the seat group unit 152 desires to reset the call reset. This will normally be done by the stewardess after the passenger has been serviced. The switch SW16103 is thrown into a position such that the output of the switch SW16603 is a resistor to ground. This is shown in FIG. 16B as the upper position of the switch. With the switch in this position, the output of NAND gate N16170B is in the logic 0 state. This causes the center input (not numbered) of the NOR gate NOR16059 to be in the logic 0 state. The bottom input (not numbered) of NOR gate NOR16059 is in the logic 0 state at count time 6 and the top input (not numbered) of NOR gate NOR16059 is also in the logic 0 state. Therefore, the output of NOR gate NOR16059 is in the logic 1 state. This causes the two cross-coupled NOR gates, NOR16152 and NOR16154, to switch to the reset state with the output of NOR gate NOR16152 a logic 0 and the output of NOR gate NOR16154 a logic 1. At count time 5, the output of NOR gate NOR16152 is gated to the output of NOR gate NOR16093 and is sent to the section timer/decoder 142 as a "no call" data bit. Switch SW16603 is a momentary type switch and has three positions. The call position and the reset position have just been described. The third position is an open state and is the "normal" position. After the passenger has pushed the switch to the "call" position, he releases it and it rests in the "normal" position until it is thrown into the "reset" position. After the call has been reset, the switch SW16603 is released and rests in the "normal" position. The group call 1 data is sent out of the seat encoder 1301 at clock time period 5. At clock time 5, the $\overline{\text{clock}}$ 5 pulse is applied to the second input of NOR gate NOR16093 and a 1 output from NOR gate NOR16093 results. This output of NOR gate NOR16093 is applied to an input to the multiplexing NOR gate NOR1601 to provide a corresponding output on line 16502. This output from multiplexing gate NOR1601 is applied via line 16502 to the exit gates. At times 5, the exit gate 16105 is enabled. This causes the data to be transmitted along line 1311 to the section timer/decoder 142. If it was not the first seat encoder 1301 of the column the signal would go via the other seat encoders one by one forward until it reached the section timer/decoder 142 with little delay and not with the delay of a full clock pulse. At internal time 6, the signal from the line 1311 is read into the call flip flop in the section timer/decoder 142. This flip flop being in the set condition immediately causes the master call light to go on. In the illustrative embodiment, the calls of seats 2 and 3 are ORed together such that a call from either causes a corresponding call output at the appropriate clock time 6 which enables the group call flip flip for seats 2 and 3 in the section timer/decoder 142 at time 7 with the corresponding master call light being lit. When passenger 1 calls, in accordance with the illustrated logic circuit, the left aisle call light 143*a* becomes lit. When either of passengers 2 or 3 calls in accordance with the logic circuit, the signals cause the right aisle call light 143 to be lit. This is for the case where there are separate calls from seat 1 and from seat 2 and 3. In the case of the outboard 2 columns, modified logic circuits are provided whereby in the case of any one of the three calls being initiated, both aisle lights will be turned on. There is provided a chime logic which produces one chime pulse ach time a passenger requests a call function. This chime is utilized to inform the stewardess that a passenger is requesting service. When any of the three passengers associated with this seat encoder unit 1301 pushes his call switch SW16603, there is applied to one input of NAND gate N16090 a logic 0 This causes a logic 1 to appear at the output of NAND gate N16090. This signal is applied to the S input of flip flop FF16089 and at the start of count time 7, this flip flop FF16089 is set to the logic 1 state. The output of flip flop FF16089 is applied to the multiplexing NOR gate NOR1601 and is then sent to the section timer/decoder 142. At this same time, the S input of flip flop FF16034 is a logic 1. At count time 8, flip flop FF16034 is set and the output of flip flop FF16034 is applied to the reset input of flip flop FF16089. This prevents the chime output from going to the logic 1 state again until no passenger is holding his call switch in the call position. The action of the flip flop FF16034 insures that even though the passenger continues depressing his call button, only one chime results such that the stewardess is not unduly annoyed by button failure or by continuous pressing of the button by an irate passenger. On repreated pressing, if the passenger is not serviced and again presses this button, a second chime results.

Refer to the spare logic 1607. If the spare logic is utlized, upon closing of the request spare switch SW1650, the NOR gate NOR1663 is actuated. At clock count time 8 the NOR gate NOR1663 is enabled to provide an output logic 1 on the seat 1, spare 1 output line. This 1 is applied to the multiplexing gate NOR1601. At clock time 8, this signal is sent from the exit gate circuit special gate 1610 via the line 1311 or 1313 to the section timer/decoder 142.

Refer to the overhead decoder 140. The overhead decoder unit 140 comprises circuits substantially identical to the timing circuits illustrated in FIGS. 14 and 15 comprising the gated data forward in and out signals, the control logic, clock detector and input/output logic of the seat encoder unit 1301 and therefore will not be described repetitively.

Figure 17:
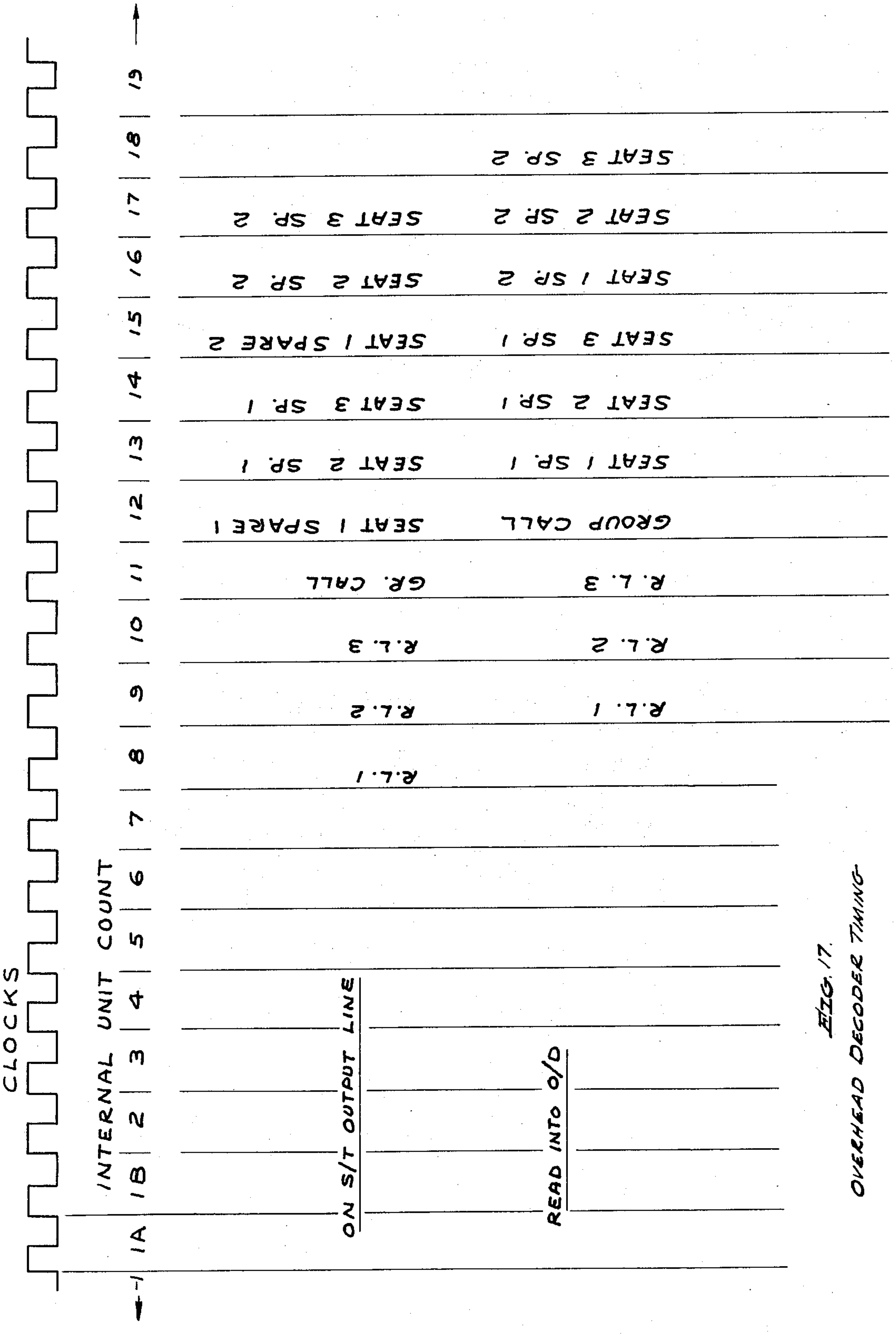
FIG. 17 is a timing diagram illustrating the clock pulses, the internal units count, the data appearing at representative clock internal units count times on the section timer output line and the data read into the overhead decoder and corresponding internal unit count times for the overhead decoder unit of the illustrative embodiment of FIG. 1.

Therefore, in conjunction with the description of the overhead decoder circuit 140 refer also to FIG. 17 which illustrates the overhead decoder timing.

Figure 12A:
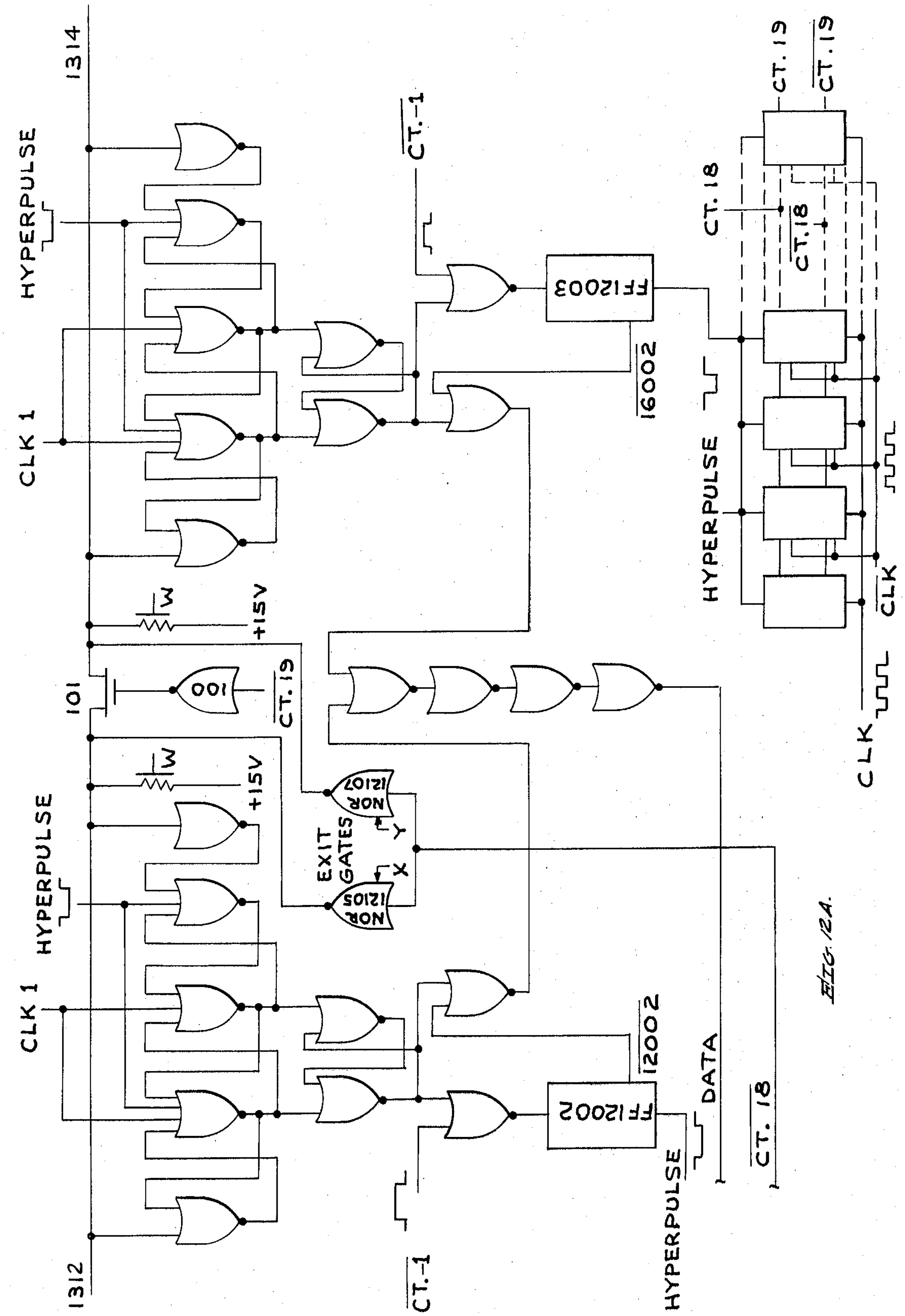

The overhead decoder has substantially the same input/output logic including the exit gate logic, the control logic, the clock detector, and the counter as does the seat encoder unit 1301. The signals are therefore sent into and out of the overhead decoder unit 140 in either the forward or backward direction in a manner exactly corresponding to that of the seat encoder units 1301. As stated, the overhead decoder timing is very similar to the timing diagram of FIG. 14 for the seat encoder timing. Its internal clock units provide clock pulses of from 1A to 19 in recurring cycles. The overhead decoders also have section timer/decoder output lines to provide data transfer from the section timer/decoder 142 to the respective overhead decoders 140 similarly to the action of data lines 1311 and 1313 over which the data is fed at appropriate clock times from the section timer/decoder 142 to the seat encoders 1301. The timing of functions is similar to that of FIG. 14. The overhead decoder section comprises a plurality of flip flops which correspond respectively to reading light 1; reading light 2; reading light 3; group call; seat 1, spare 1; seat 2, spare 1; seat 3, spare 1; seat 1, spare 2, seat 2, spare 2; and seat 3, spare 2 functions. Refer to the overhead decoder 140 illustrated in FIG. 12. The plurality of flip flops comprise the reading light flip flop FF RL1, reading light 2 flip flop FF RL2, the reading light 3 flip flop FF RL3, the seat 1 spare 1 overhead decoder flip flop FF 1SP1, the seat 2 corresponding flip flop FF S2SP1 and the seat 3 corresponding spare 1 flip flop FF S3SP1, the seat 1 and 2 and 3 spare 2 respective flip flops FF S1SP2, FF S2SP2, and FF S3SP2, flip flops respectively. There is also provided a group call light flip flop FF GCL. Responsive to the setting of the respective reading light flip flops FF RL1 FF RL2 and FF RL3, there is in each case a corresponding NOR gate (not numbered) which upon being enabled by the setting of the corresponding flip flop FF RL1, FF RL2, or FF RL3, causes the corresponding light RL1, RL2, or RL3 to be lit over the passenger who has pushed the button for lighting of the reading lamp of the overhead decoder respectively over his corresponding seat passenger control unit (PCU). Assume for example a passenger in seat group 1 has pushed the "on" button for reading light 1. At the internal unit count 2, the reading light signal is applied via the logic on the line 1311 into the section timer/decoder 142. At clock time 8 of the same timing cycle the reading light signal is sent over data line 1312 to the corresponding overhead decoder 140 which has requested the reading light to be turned on. The spare flip flops are similar to the corresponding reading light flip flops and will not be described in detail. If any of the three people have requested a call, a corresponding flip flop in the seat encoder FF1301 or FF1302 is actuated which at the appropriate time causes data transfer via the data line 1311 into the section timer/decoder 142. Following that the appropriate left or right master call light 145 is lit and the chime 156 is rung. By virtue of the timing of the section timer/decoder 142, when a call is initiated from a seat encoder along the data line 1311, on the ensuing time count the section timer/decoder 142 automatically sends the signal to the corresponding overhead decoder 140 such that the light over that group of seats corresponding to a call request is lit. The stewardess can observe both over the seat groups to see which group or groups are calling and also can observe the aisle side seat lights.

Figure 16A:
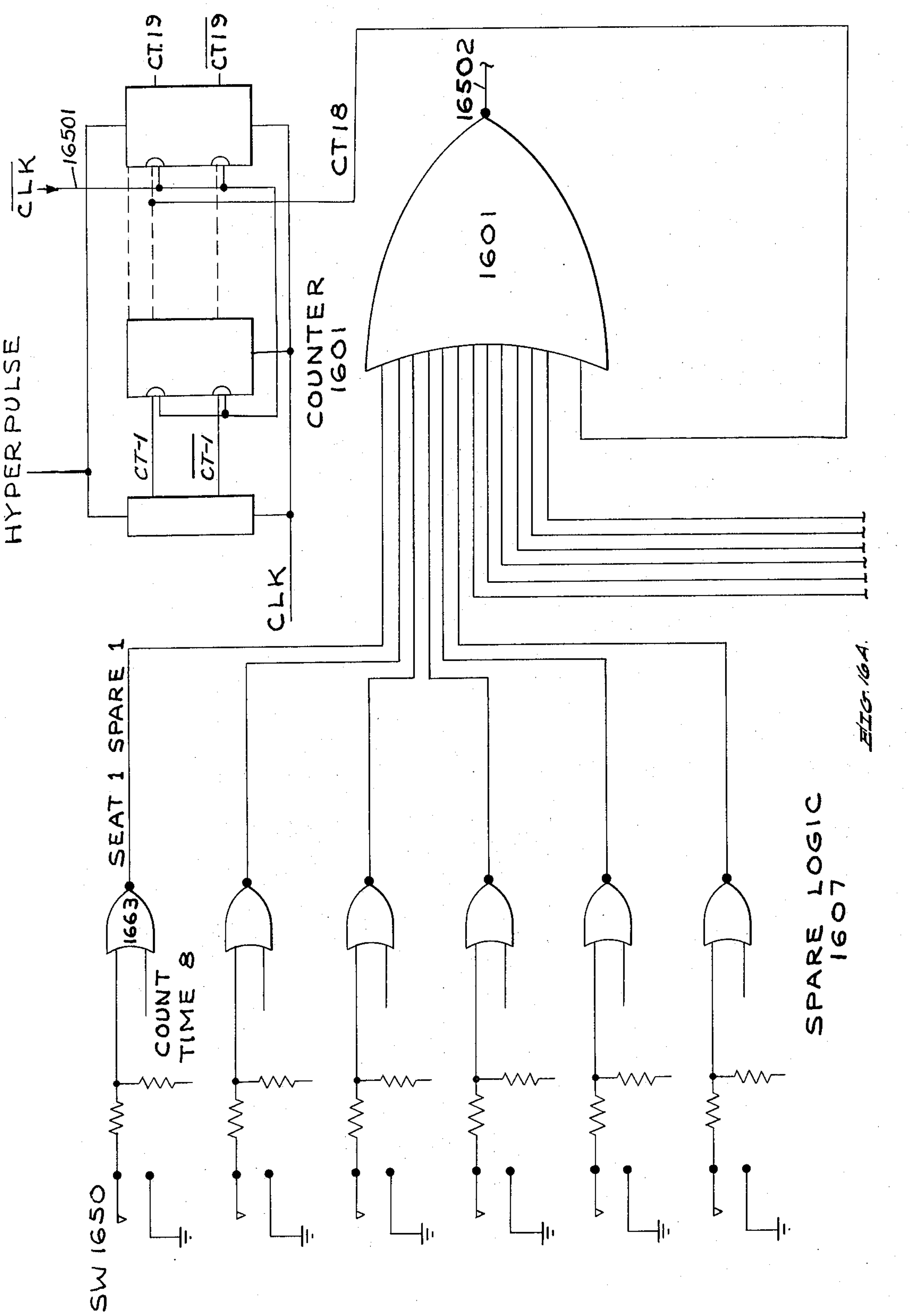
FIG. 16A is a logic diagram representation of of the multiplexing gate and spare logic circuitry of the seat encoder unit.
Figure 16B:
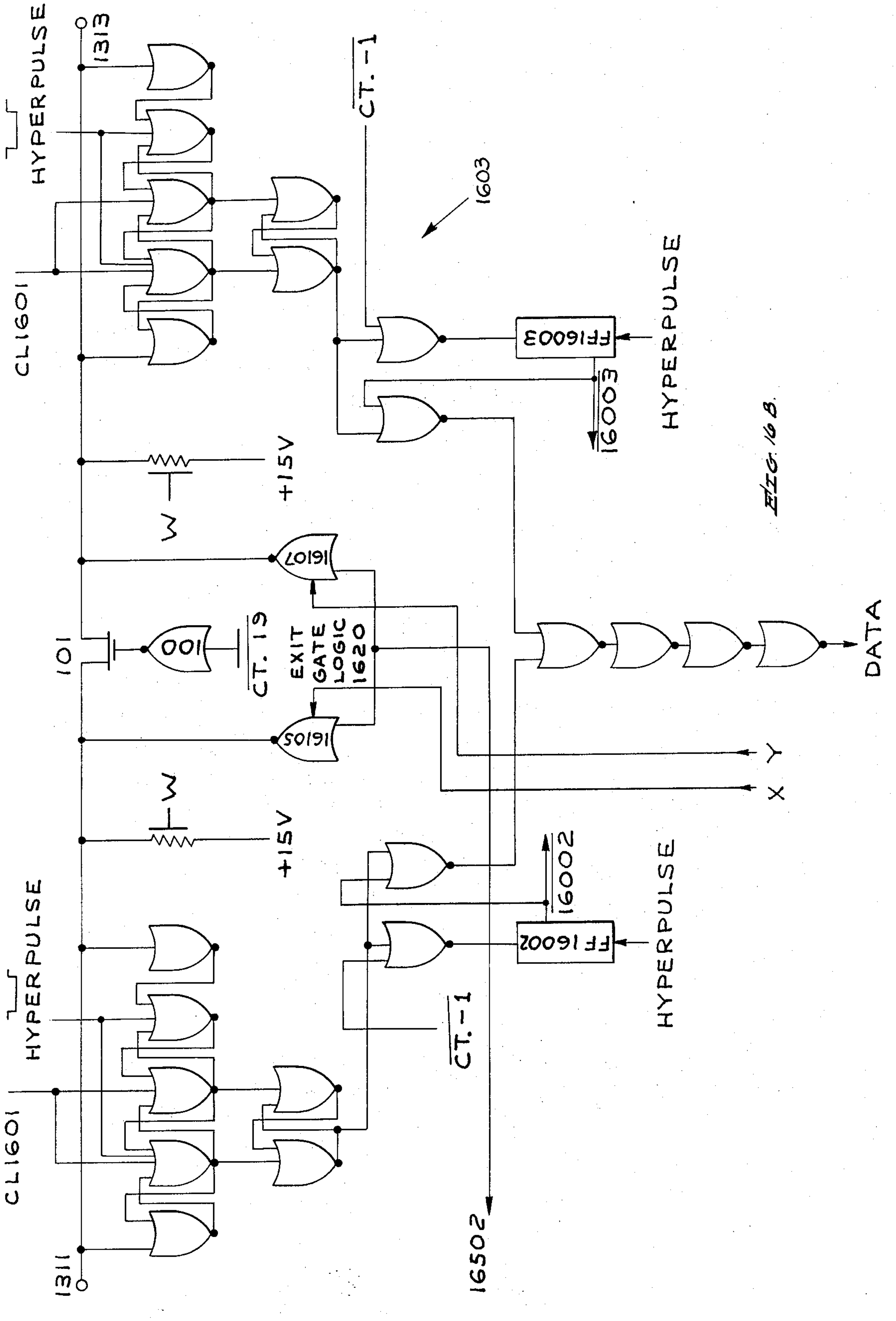
FIG. 16B is a logical diagram representation of the input/output logic unit showing the lines and inputs from the section timer/decoder and to the following seat encoders.
Figure 16C:
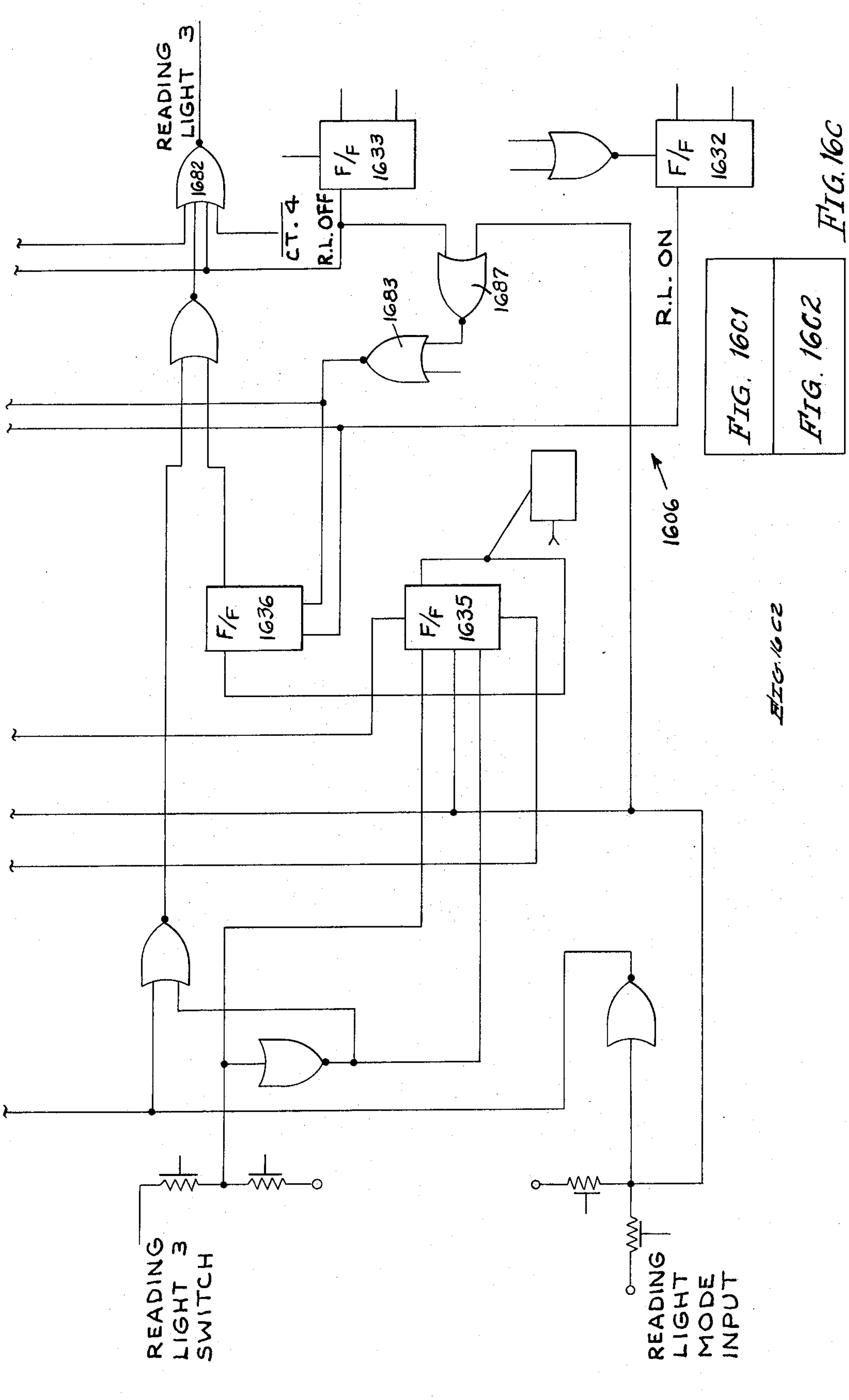
FIG. 16C is composed of FIGS. 16C1 and 16C2 which form a logic diagram representation of the reading light logic portion of the seat encoder illustrating the logic responsive to operation by the passenger of the passenger control logic for request for reading light service and the self-test features therein incorporated.
Figure 16D:
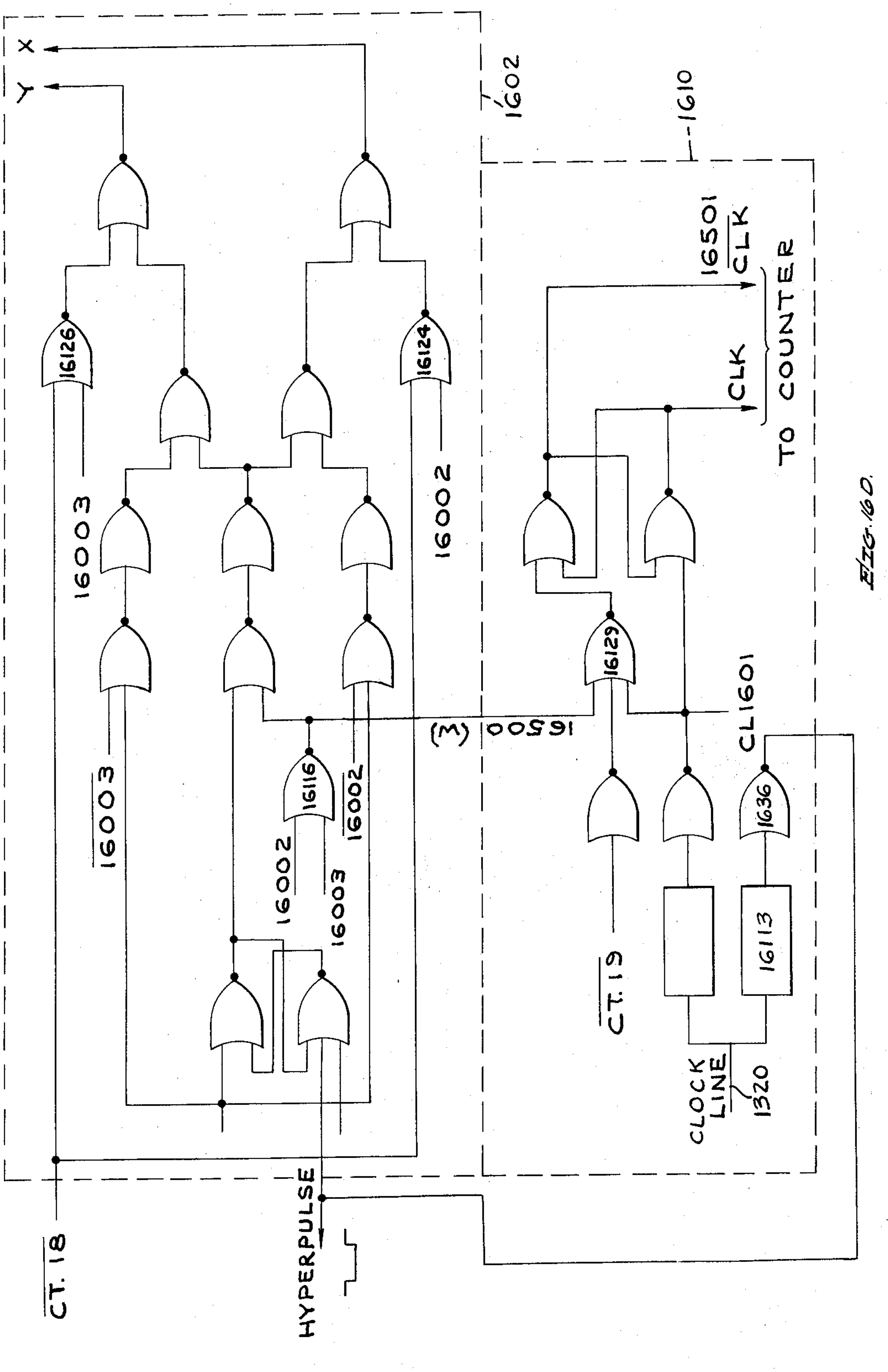
FIG. 16D is a logic diagram representation of the control logic and clock detector units for the seat encoder of the service system of FIG. 16 and wherein is shown the generation of logical outputs to the seat encoder counter and to the input/output logic units of the seat encoder.
Figure 16E:
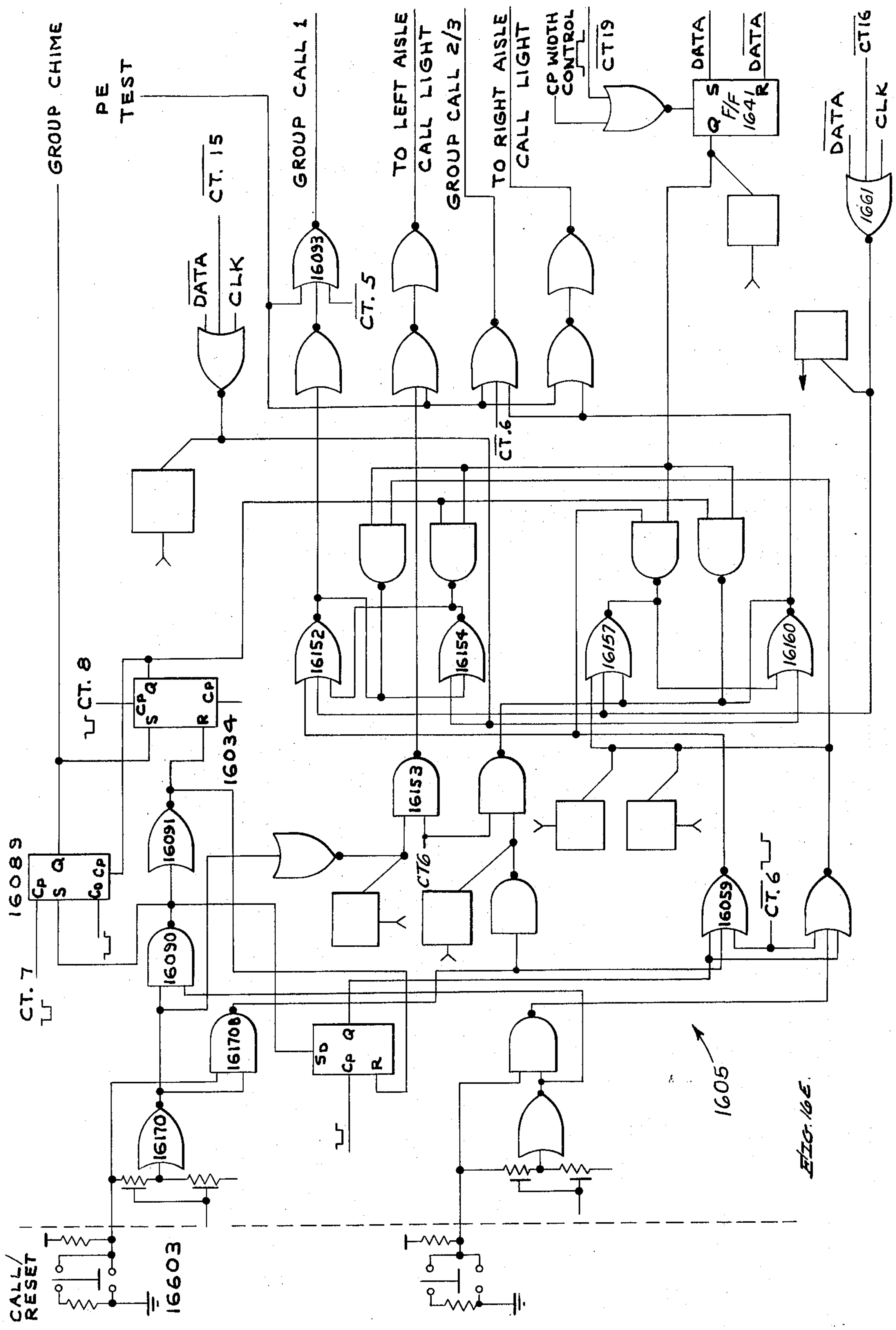
FIG. 16E is a logic diagram representation of the passenger control unit input for call and reset functions and the logic units responsive thereto in the call logic section of the seat encoder units of the service system of FIG. 16.

Refer again to the seat encoder exit gate section of FIG. 16B. In the timing sequence, at the end of an interrogation cycle of a particular encoder, a count 19 signal is sent into the NOR gate 100 which in turn closes the switch 101 to this particular seat encoder 1301. This permits the signal to go directly to the next seat encoder 1301 and blocks signals from coming into the particular seat encoder because the clock CL1601 stops counting at the end of the 20 clock times in the cycle which corresponds to the particular seat encoder 1301 and corresponding overhead decoder 140. Similarly, the clocks are enabled sequentially along the line of encoders and decodes, for example from seat encoder 1 to seat encoder 22 in a given column. Each clock is designed to be set by the strobe upon receiving a signal from the next adjacent unit and to go off at the end of 20 counts. For this reason, the overhead decoder units 140 are exactly in synchronism in time with the corresponding seat encoders 1301 immediately beneath them. Thus at the appropriate clock time 8, if passenger 1 of seat group 1 pushes his appropriate PCU reading light button, the reading light 1 signal is applied to the first overhead decoder 140 and at clock time 9 of the first seat group unit 139, the reading light 1 is turned on immediately above passenger 1. Similarly, if passenger 2 wishes a light, at clock time 3 of the cycle assigned to the first seat encoder unit 1301, the reading light 2 request initiated by passenger 2 causes a signal to appear on the line 1311 leading to the section timer/decoder 142. Then at time 9 of the same cycle, the corresponding reading light 2 signal is sent to the corresponding first overhead decoder 140 and at time 10 this light is lit.

Similarly, the other types of calls from each of the passengers occur at the proper time by actuation of the overhead decoder flip flop by the appropriate signal from the section timer/decoder at the corresponding times illustrated in FIG. 17. Now refer to the group call light flip flop FFGCL. If any of the three passengers utilizing a particular seat encoder 1301 request a call, at time 5 or 6 depending upon whether it is passenger 1 or passenger 2 or 3 who have called, the group call is initiated and as described hereinabove sent to the section timer/decoder 142 to cause the corresponding master call light and the chime to become activated. As shown in FIG. 17, at time 11 of the cycle corresponding to the particular seat encoder and overhead decoder immediately above, the group call signal is sent from the section timer/decoder 142 to the particular overhead decoder 140 which is over the passenger who has called. At time 12 in the timing cycle, the group call flip flop FFGCL is set so that via the corresponding group call light NOR gate (not numbered) the group call light immediately above that group is thereby lit. This enables the stewardess to look overhead and see which groups are requesting service.

It is thus seen that operation in one direction, for example, forward to backward because the respective clocks CL1601 of each unit have their own particular cycle during which they send out the clock enabling signals to permit the seat encoder 1301 and overhead decoder 140 to become actuated and then at the end of the cycle to close the corresponding switches 101 such that the signal is applied to start the cycle in the encoder and decoder immediately following.

A unique feature of the invention is referred to as "daisy chain" or as alternate forward and backward operation. By this means of the invention, one of the seat group units may be disabled at any given time in normal operation and the signals given to the other seat groups. That is, if any single seat group from 1 through 22 for example, is out of order, the forward signal progressive advance will cause all of the seat groups up to that seat group to perform their required service functions and the backward cycling signals will cause all of the seat groups behind the faulty seat group to become sequentially serviced from rear toward the front.

Refer again to FIG. 16, and the respective flip flops FF16002 and FF16003. The forward and backward directions are effected by each of the seat encoder and overhead decoder logic systems by virtue of the fact that at a special time the 16105 gate is enabled by the X signal in the exit gate circuitry which enables the data to go in the first (1311) direction; and at a particular time Y, gate 16107 is enabled so as to permit that data to be sent along the 1313 direction. The direction of data transfer is determined by the action of respective flip flops FF16002 or FF16003 in response to the strobe from the previous unit which appeared either along line 1311 or along line 1313 into the corresponding flip flop FF16002 or FF16003 depending upon the direction rearward or forward of the next adjacent seat group or the section timer/decoder 142 from which the strobe was sent. Thus if the direction of sequential interrogation by the section timer/decoder 142 is from forward to back, the particular seat encoder 1301 flip flop FF16002 receives the strobe, which indicates that forward to back operation is occurring; and the data which is sent from the flip flop FF16002 enables gate 16116 and causes the X logic to go to the enabling state whereby the X special gate 16105 is enabled. Referring to the control logic 1602, when flip flop FF16002 is set indicating a signal coming in from the line 1311, this in turn actuates the $\overline{16002}$ signal which in turn causes the X logic exit gates to be activated and therefore transfers are effected along the 1311 line. Similarly, if the strobe came from the rearward to forward direction along line 1313, the flip flop FF16003 is set which causes the 16003 signal to go into operation to thereby cause the Y logic to provide a signal to cause gate 16107 to effect transfer along the 1313 line. At count time 18, the $\overline{\text{count 18}}$ signal at the input of the control logic forces the corresponding NOR gate NOR16124 or NOR16126 to change state which transfers the signal then to the next higher or lower row or seat group depending upon whether the signal has originally come from the backward to the forward or from the forward to the backward portion.

This describes the action of the seat encoder units and the overhead decoders and the manner in which the signal progresses both from forward to backward in the compartment and from the back of the compartment forward so that all units except the unit at fault are kept on the air as long as only one unit is at fault and at least all units, regardless of how many units are at fault, up to the first unit forward which is at fault and up to the first unit backward which is at fault, are continuously serviced. The bypass line 1313 which bypasses the intermediate encoders between the front and the back insures this operation. Similarly, data line 1312 provides the sequential operation from forward to back of overhead decoders and the line 1314 is used to enable the progressive operation from the section timer/decoder 142 directly to he rearmost overhead decoder 140 and back towards the front overhead decoder 140.

Figure 27:
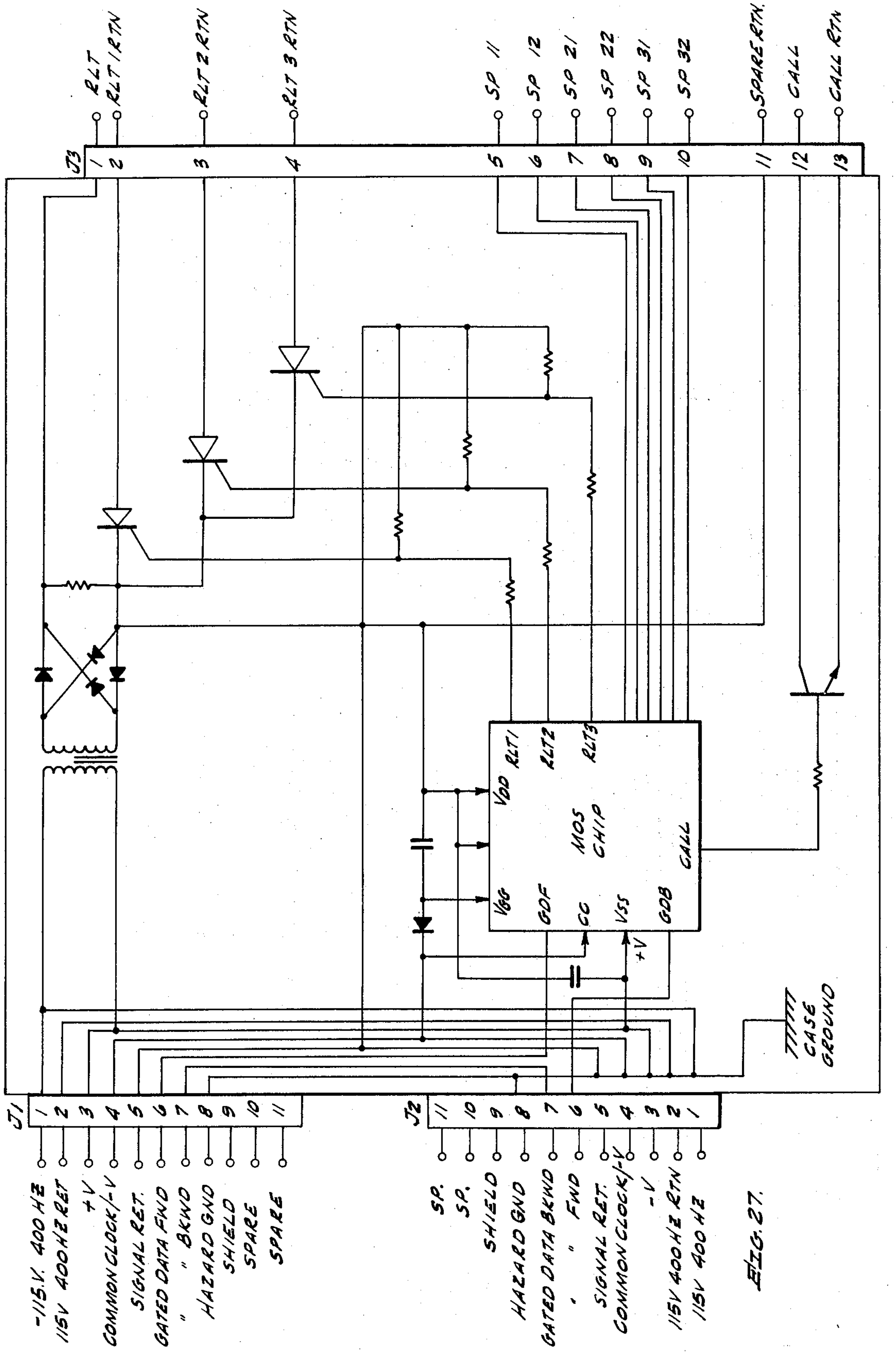
FIG. 27 is a partially block and partially schematic diagram of the overhead decoder unit. This example shows a three-seat configuration.

Refer to FIG. 27. FIG. 27 is an example of the overhead decoder unit 140 wherein a three seat configuration is shown. The MOS chip is the overhead decoder described above and illustrated in FIG. 12A and FIG. 12B. The transformer, diodes, transistors, resistors, capacitors, and silicon controlled rectifiers are conventional parts and they are used to power the chip and power and control the lights in a conventional manner. The negative voltage power for the chip, it will be noted, is derived from peak detecting the clock pulses on the common clock line. The primary power for the reading lights is full-wave rectified and then switched on or off for the individual reading lights per the overhead decoder control signals RLT 1, RLT 2, and RLT 3. The SCR's amplify the reading light control signals to turn the reading lights on.

Figure 18A:
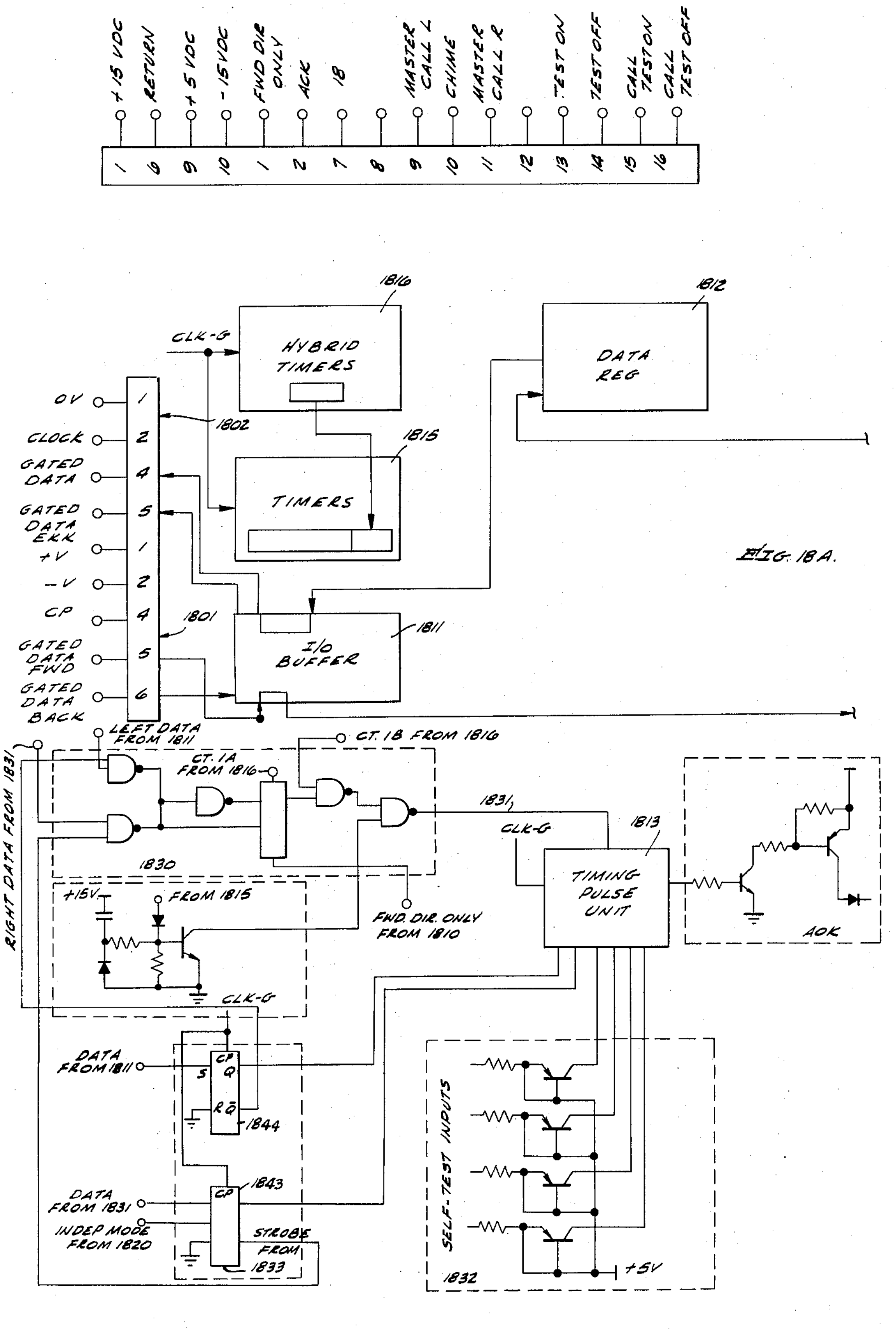
FIG. 18A and 18B, taken in side by side relationship with FIG. 18A on the left, form a block and schematic diagrammatic representation of a representative one of the section timer/decoders of the illustrative embodiment of FIG. 1 and illustrating the connections into and out of the section timer/decoder for optionally one or two columns of seat group units serviced, the input/output buffer units, the timers, the data register, the master call turn on buffers, the logic unit, certain registers, the timing pulse unit, and self-test buffer and other units of the service system.
Figure 18B:
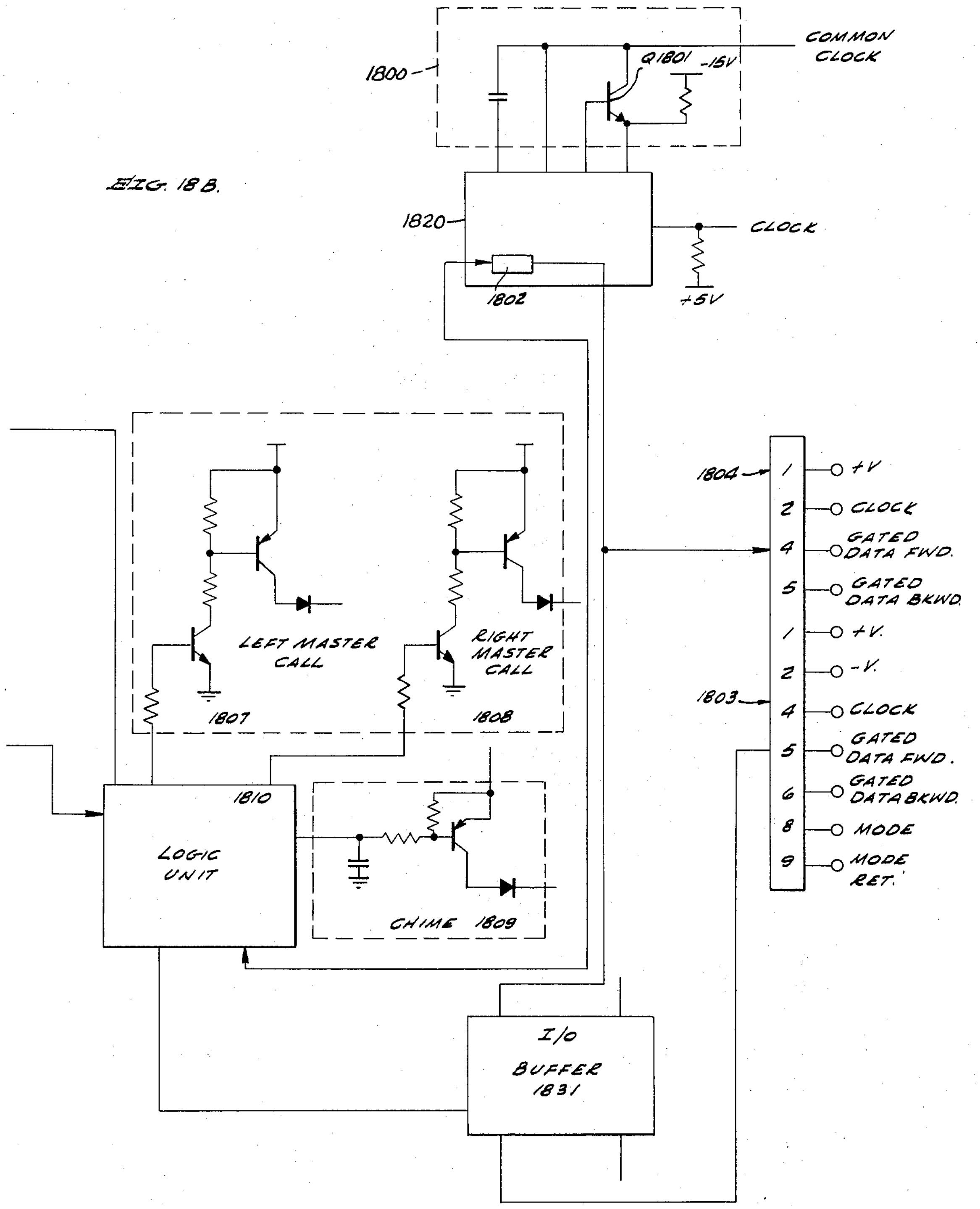

Refer to FIG. 18, which illustrates a block and partially schematic representation of a typical section timer/decoder 142. There are two section timer/decoders 142 for each compartment 135. One section timer/decoder 142 services the outboard seat group installation and the other services the inboard seat group installation.

UNITS OF SECTION TIMER/DECODER 142

Refer to FIG. 18. FIG. 18 illustrates the section timer/decoder 142 (see FIG. 13). A plurality of connectors 1801, 1802, 1803 and 1804 are provided. Each of the section timer/decoders 142 can service for example a left-hand overhead decoder 140 column via connector 1801 and a left-hand corresponding seat encoder 1301 column via connector 1802, a right-hand overhead decoder 140 column via connector 1803 and a corresponding right-hand seat encoder 1301 column via connector 1804. These may be either the inboard pair or outboard pair of columna of corresponding seat encoder 1301 and overhead decoder 140 units. Alternatively, servicing by section timer units 142 may be effected in other arrangements as desired by the user. Also, provision may be made such that if there are only three columns, either the right-hand or left-hand section may utilize only the left connectors 1801 and 1802. Responsive to the inputs from the left-hand seat column connector 1802 are provided a left-hand column input/output buffer 1811, a logic unit 1810 (which may also comprise a chime buffer 1809 and respective left and right master call light turn on buffers 1807 and 1808) and a data register unit 1812. Additionally, a timing pulse unit 1813 which further comprises an oscillator 1825 provides system timing clock pulses. The unit 1813 further comprises control logic for restarting the system so that the system alternately interrogates in the forward and the backward directions. An identical configuration can be provided for the right side, for example, the right I/O buffer 1831. The remaining units on the right side are not illustrated for purposes of simplicity of illustration as they are identical to the left-hand units. A register and clock buffer unit 1820 is provided which comprises a register REG 1802 and a part of the clock buffer circuit 1800. A pair of timer counters (timer 1 and timer 2) 1816 and 1815 respectively are provided. The timer units 1816 and 1815 comprise a 32 count counter unit including a 19 bit ring counter C1801. Timer 1 1816 and timer 2 1815 in response to the clock signal which is generated in the timing pulse unit 1813 provide timing to the remainder of the section timer/decoder unit 142.

SECTION TIMER/DECODER 142 OPERATION

Refer further to FIG. 18. A conventional 0 to 18 bit ring counter comprising 19 flip flops connected in ring arrangement and also comprising a conventional 5-bit binary counter provides the necessary timing for the section timer/decoder 142. The 5-bit binary counter (not shown) is incremented once for each complete cycle of the 19 bit ring counter. The first bit of the 19 bit ring counter is synchronized to the seat encoder 1301 by a pulse from the timing pulse unit 1813 which triggers both the ring counter 1815 and 1816 in the section timer/decoder 142 and the corresponding counter which counts from 1 to 19 in the seat encoder 1301. The 5-bit counter can handle 31 groups of seat rows in a given column. Each group is sequentially counted up from 0 through 18 to provide the timing counts for the operation of the service system for that seat group.

The circuits of the ring counter, to count from 0 to 18 and a 5-bit counter incremented each time the count cycles from 0 to 18, and a synchronizing pulse to synchronize the first or most significant bit of the ring for the count 0 are conventional and will not be described in detail. Units 1816 and 1815 thus acting together and with the 5-bit binary counter provide the section timer/decoder 142 timing pulses.

Figure 19:
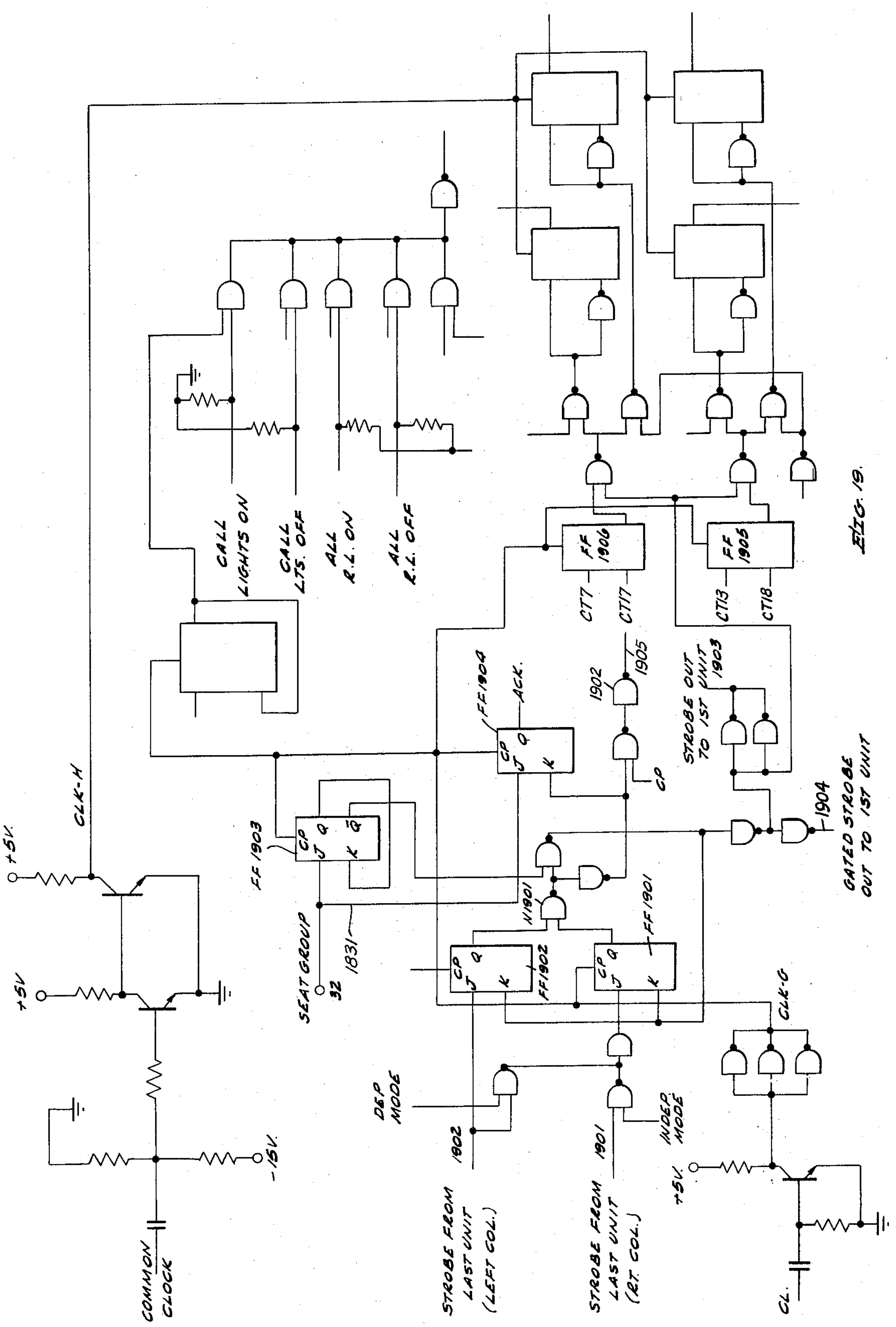
FIG. 19 is a logic diagram representation of the timing pulse unit of the section timer/decoder of FIG. 18.

The clock pulse from timing pulse unit 1813 which increments the timers 1816 and 1815 is shown in FIG. 19. A conventional free-running multivibrator provides the clock pulses at a 7 KHz rate and is divided by two to provide a 3 ½ KHz clock rate output. This provides a symmetrical 3 ½ KHz counting clock (not numbered). The multivibrator is conventional and is not shown in FIG. 19. This clock provides the timing pulse output at a 3 ½ KHz rate from the timing pulse unit 1813 which clocks the timers 1816 and 1815. Conventional gating in the timers 1816 and 1815 also provide outputs at various counts such as counts 2, 3, and 4 for input into the data register 1812. Similarly, conventional timing logic circuits (not illustrated) develop signals such as high signals for use at groups of times such as a high at times 5, 6 and 7, a high at times 4, 5, 6 and 7, a sequence of output signals at 3, 4, 5, 6 and 7, and a "do nothing" output which is utilized in accordance with whether there are two group columns of seat rows being serviced by the section timer/decoder 142 or just a single column which alternatively is provided if there are three columns of seat rows in each compartment instead of four. If there are two columns plugged into the section timer/decoder 142, the "do nothing" output is low at time 7 and if there is only one column being serviced by the section timer/decoder 142, the "do nothing" output low is at times 7, 9 and 12. In similar fashion, logic trees responsive to the ring counter C1801 generate sets of clock pulse outputs at counts 3, 9, 11, 12 and 14; an output at counts 7, 11 and 14; and an output at counts 7, 9, 10, 11, 12, 13 and 14. Similarly, individual outputs are provided at counts 13, 14, 15, 16, 17, 18, $\overline{5}$, $\overline{6}$ and 7 and outputs are generated at $\overline{\text{CT-18}}$ and at $\overline{\text{CT-6}}$. Conventional logic responsive to the 5-bit counter reaching 32 is also provided (not shown) such that whenever the count of seat group 32 is reached, a high output is provided at the 5-bit counter to reset the interrogation cycle of the system. That is, normally the section timer/decoder 142 is responsive to a strobe at the end of interrogation of the seat group units; and this count 32 signal from the 5-bit counter provides a back-up pulse which will cause the system interrogation to start in the event the strobe generating circuit becomes inoperative. That is, the strobe pulse will not be generated in the event that either the line or one of the seat group units is faulty. Action is required to continue to provide service to the other seat groups and the seat group output pulse 32 supplies this when there is a defect in the line of one of the seat groups.

Refer to FIG. 19 in conjunction with FIG. 18. FIG. 19 shows the logic of the timing pulse unit 1813. The strobe from the last unit 1901 of the right column and the strobe from the last unit of the left column are respectively applied to the timing pulse unit as indicated both in FIG. 18 and FIG. 19 following a delay provided by respective delay units 1843 and 1844. The reason for the logic of FIG. 19 is that it is desired to start the interrogation cycle after the strobes have been received from the last seat group row in both the left and the right columns. These could come at different times, if, for example, the columns are of different lengths. A pair of flip flops FF1901 and FF1902 are provided. Flip flop 1901 is set by the strobe from the last unit of the right column and flip flop FF1902 is set by the strobe from the last unit in the left column. Dependent mode and independent mode signals are provided respectively when one column or when two columns are serviced. That is, when operating in the dependent mode when only one column is serviced, the strobe from the column being serviced is applied to both of the flip flops FF1901 and FF1902. Upon setting of both of the flip flops FF1901 and FF1902, whe both strobes reach the flip flops, the NAND gate N1901 is activated and its output is a low. The low at the output of NAND gate N1901 generates the hyperpulse at the output of NAND gate N1902 which, as shown in FIG. 15, reinitializes the service system timing of the particular column of seat groups serviced by a respective section timer/decoder 142. When NAND gate N1901 provides a low output simultaneously in addition to the hyperpulse enabling pulse, a strobe is applied to the first unit. This "strobe out to first unit" signal is provided at output line 1903. This strobe output from line 1903 provides a strobe to the first seat group unit and simultaneously to the corresponding first seat group unit overhead unit and provides the gated data forward input strobe-in pulse illustrated in FIG. 15 for the seat encoder.

It will be appreciated that the overhead decoder system common clock lines are provided for the overhead decoder system, and that means are provided to generate gated data forward in and gated data forward out pulses which are identical to those illustrated in the seat encoder system timing diagram of FIG. 15 which to avoid duplication are therefore not separately shown. However, it should be understood that the strobe output to the first unit 1903 provides both the strobe-in signal shown in the seat encoder system timing of FIG. 15 and the corresponding (not shown) overhead decoder system timing circuit.

A "gated strobe out to first unit" signal is also developed in the logic of FIG. 19 in order to set the ring counter in timers 1816 and 1815 to the first count state. The "gated strobe out to first unit" on the output line 1904 sets the 0 to 18 bit ring counter (not shown) of the timer units 1816, and 1815 to count 0 and simultaneously sets the 5-bit binary counter (not shown) which counts from seat group 1 to seat group 32 to 0 which is the first count of the 0 to 31 count.

When the 5-bit counter in the timers 1 and 2, 1816 and 1815 respectively reaches the count of 32, this starts the sequence over again where there are actually 31 groups of seats. However in the illustrative case, there are a maximum of 22 seat groups and therefore the binary counter does not reach 32 since it is reset by the gated strobe output to the first unit on line 1904 (see FIG. 19). Therefore, if the count 32 is reached and there are less than 32 seat groups, trouble in the seat group line is indicated either in the seat groups or the cables. For this reason, the binary counter generates a seat group 32 output signal which is used to set the flip flop FF1903 (FIG. 19) such that the service is continued even though one of the seat groups or the cables therebetween is disabled. The input from the seat group 32 output of the binary counter in timers 1816 and 1815 provides an additional operating function. The enabling by the count to 32 causes flip flop 1903 to be set. The resulting output drives NAND gate N1902 to provide the "hyper enable" and gated "strobe out to first unit" signals on lines 1905 and 1904 and also provides the "strobe out to first unit" signal on line 1903. The seat group count 32 signal from the binary counter of the timer 142 is also applied to the flip flop FF1904 which upon being set generates an output signal to cause an AOK light to become lit. Lighting of the AOK light indicates to the service personnel that there is trouble in one of the seat group units or the cables. An open circuit detector 1830 is also provided. In addition to the starting of the system by strobes being received from the last seat of the given column of group seat units and the starting by the binary count of 32, the open circuit detector 1830 of FIG. 18 provides a third way of starting the system. In the event of a failure in the line, wherein the binary count of 32 continues to operate the circuit, service is properly maintained in case of an overhead system failure. However, this system is not satisfactory in the case of a failure in the electronics or the cabling of one of the seat groups. The reason for this is that the section timer/decoder 142 would continue to operate regardless of where the break in the line occurred or the failure occurred for the remaining seat group units and therefore would momentarily react to a string of 0's indicating no calls and lights required to be turned off in the remaining seat units after the break until the backwards signal of the "daisy chain" is encountered. This would cause continuous flicking on and flicking off of overhead lights 155 and master call lights 145 if there is a request for service on the air. Therefore, to take care of this situation, a permanent one bit (shown in FIG. 14, the seat encoder timing) may be inserted, for example, between positions 1 and 18 such that if a string of 0's occurs without this 1 the section timer/decoder 142 is alerted to the fact there is a break in the line. Responsive to the presence of 0's at all bit times including that of the permanent 1, the circuit 1830 goes into operation. It looks at this bit value at that particular time. If a 0, the indication from 1830 by the output on the line 1831 into the timing pulse unit 1813 causes the flip flop FF1904 to turn on the AOK light and also to restart the cycling even though one of the seat group units or its interconnections is out of service. The seat group 32 binary counter output is also applied at this input to the flip flop FF1904 to indicate trouble in an overhead decoder. Therefore, if a failure occurs in an overhead unit, the binary counter 32 signals the troubles and if a failure occurs in a seat unit, the special circuit 1830 causes the output to indicate the trouble on the line.

Above have been described the various ways of restarting (1) when there is no trouble, (2*a*) when there is trouble in one of the seat encoders and (2*b*) when there is trouble in one of the overhead decoders.

SELF-TEST FEATURES OF THE SECTION TIMER/DECODER

In the self-test system, from the test panel 170 (FIG. 1), four signals are applied in self-test: "all call on," "all call off," "all reading lights on," and "all reading lights off." The self-test buffer unit 1832 (FIG. 18) changes the input levels from +28 volts and ground to +5 volts and ground. The four lines between the buffer unit 1832 and the timing pulse unit 1813 carry the ground to 5 volts.

Refer again to FIG. 19. The four lines illustrated in FIG. 18 as being applied to timing pulse unit 1813 are illustrated in FIG. 19 by the right hand center section by the input signals "all call lights on," "all call lights off," "all reading lights on," and "all reading lights off."

Refer to the seat encoder timing in FIG. 14. At the respective time counts 14, 15, 16, and 17, the commands are initiated and transmitted from the section timer/decoder 142 (see FIG. 19). During these times, (see FIG. 13) these signals are transmitted to the respective call flip flops composed of gates 16152, 16154, 16157, and 16160; and the respective reading light flip flops FF16032, and FF16033 in the seat encoder 1301.

Responsive to the "all call lights on" signal, the FIG. 19 logic circuits enable the NAND gates to send at count 14 to all of seat encoder units 1301 of the column regulated by this section timer/decoder 142 the "all call lights on" signal on the section timer/decoder output line 1312. At time 15, the timer logic puts the "all call lights off" signal on the section timer/decoder output line, and at the same time the "all call on" signal is read into the seat encoder to set if required the latches composed of cross-coupled gates 16152, 16154, 16157, and 16160. At count time 16 the "all reading lights on" signal is transmitted onto the section timer/decoder output line 1311 and the "all call off" signal is read into the seat encoder to reset the same latches if required. At time 17, the "all reading lights off" signal is placed on the section timer/decoder 142 output lines 1311 and simultaneously the "all reading lights on" signal is applied to flip flop 16032 and thence to the flip flops FF16036, FF16038 and FF16040 in the seat encoder units. At count time 18, the "common aisle lights" signal is applied on the output line 1311 of the section timer/decoder 142 and the "all reading lights off" signal resets the flip flops FF1303, FF1304 and FF1305 in the seat encoder units 1301 (see FIG. 13). At time 19, the "common aisle light" signal is read into the respective seat encoders 1301 to cause the seat lights 150A, 150B and 150C to light in accordance with the predetermined mode of operation.

Optionally, although not illustrated, means are provided such that, responsive to indication of power failure in one of the seat encoders 1301, all of the lights and other service functions are turned off and will need to be reset by the passengers. Alternatively, a memory may be provided in the seat encoder 1301 into which the information of present operation of services will be stored and from which the information can be drawn after the restoration of power has occurred. By such means the conditions that existed at the time of failure will again be instituted into the compartments 135. A capacitor may be provided in the seat encoder 1301 to maintain the state of the flip flops for a period sufficient to take care of most power outage, momentary power failure or power interruption problems.

The section timer/decoder 142 has clock times (see FIG. 14) when it receives information from the seat encoders 1301. At other times it transmits information either to the seat encoders 1301 and/or to the overhead decoders 140 of the columns which it services. For example, the section decoder timer 142 transmits information into the seat encoders 1301 from system times 14 through 19 (FIG. 14).

Refer to FIG. 19. Flip flop FF1905 provides an output responsive to input counts 13 and 18 to maintain a high output state from the end of count 13 until the end of count 18. At all other times (during clock times 1 through 13) the output pulses from flip flop FF1905 on the receive output lines receive FWD (S/E) and receive RTN (S/E) are in low condition such that the section timer/decoder 142 can receive signals.

Refer to FIGS. 18 and 19 with respect to FIG. 17, the overhead decoder timing. The section timer/decoder 142 transmits to the overhead decoders 140 from times 8 through times 17. Flip flop FF1906 controls this information transfer in response to the input from count 7 and the input from count 17 to provide a receive forward overhead decoder and receive return overhead decoder low output from the end of count 7 (or the beginning of count 8) to the end of count 17.

Figure 20:
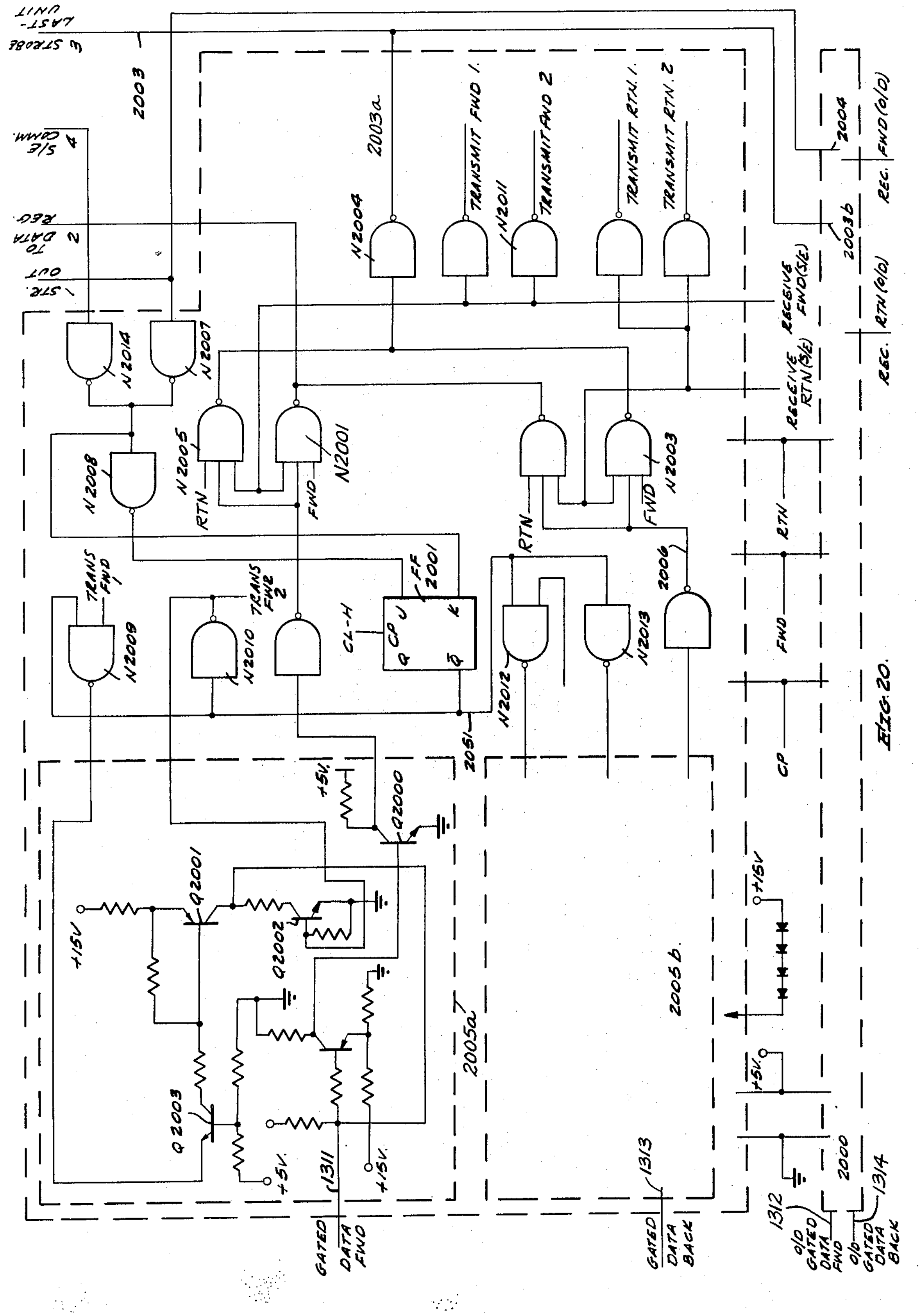
FIG. 20 is a partially schematic and partially logic diagram representation of the column input/output buffer unit of the section timer/decoder of FIG. 18.

Now refer to FIG. 20 in conjunction with FIG. 18. FIG. 20 illustrates the left I/O buffer unit 1811. There are two buffers, the left buffer 1811 and the right buffer 1831. Since the units are substantially identical, only the left I/O buffer 1811 is described. Additionally, in each of the column I/O buffers 1811 and 1831, a pair of identical circuits are provided. This is illustrated as box 2000 of FIG. 20, which is the same as the remaining circuitry with the exception that the NAND gates N2001 and N2002 and their input signal lines are omitted in the unit 2000.

Refer to FIG. 18 in conjunction with FIG. 13. Data line 1311 carries the data between the section timer/decoder 142 and the seat encoders 1301 when the system is operating in the forward-to-backward direction. The data line 1313 carries this data when the system is operating in the backward-to-forward direction wherein the information is fed first to the last seat encoder 1301 and then on forward. Similarly, the overhead decoder data line 1312 carries the data between the section timer/decoder 142 and the overhead decoders 140 when the system is operating in the forward-to-backward direction. The overhead decoder data line 1314 carries this data when the system is operating in the backward-to-forward direction wherein the information is fed first to the last overhead decoder 140 and then on forward.

Refer again to FIG. 20. The seat encoder 1301 gated data forward line 1311, the seat encoder gated data back line 1313, the overhead decoder gated data forward line 1312 and the overhead decoder gated data back line 1314 are illustrated at the left hand portion. The gated data forward information line 1311 permits transmission of data between the next seat encoder 1301 in the chain and the left column I/O buffer 1811. Similarly, the line between the connector 1802 and the left hand column I/O buffer 1811 carries the gated data forward and back. The seat encoder data gated data forward input is applied into a left level shifter circuit 2005A. Similarly, the seat encoder 1301 gated data back information is provided into a level shifter 2005B. The level shifters are substantially identical, and only one is illustrated. Similarly, in the unit 2000 a pair of level shifters are provided and are identical to the level shifters 2005A and 2005B. Because of the different timing involved, the level shifter circuit permits seat encoder gated data forward to be sent into the transistor Q2000 at the periods when the data is received from the next previous seat encoder 1301 or from the section timer/decoder 142 for transmission to the logic illustrated to the right. At times when the data is shifted in the opposite direction, the data is sent from the output of transistor Q2001 backward on the seat encoder gated data forward line. Two transistors Q2001 and Q2002 are provided. The reason for the transmission in the forward direction between 5 volts and ground is that when receiving data from the seat encoder columns data is received at logic levels between +15 volts and ground. To be compatible with the section timer/decoder 142 logic, these voltages have to be shifted to between +5 volts and ground. This is done by transistor Q2000. When transmitting to the seat encoder columns from the section timer/decoder 142, the level shifting must be from between +5 volts and ground to between +15 volts and ground. This is done by transistors Q2001 and Q2002. That is, on seat encoder data coming in, the level is shifted from the seat encoder voltages of +15 volts and ground by the circuits of transistors Q2000 and going in the reverse direction the level of +5 volts and ground which is used in the section timer/decoder 142 is shifted from between +5 volts and ground to +15 volts and ground by the circuits of transistor Q2001 and Q2002 so that on the return cycle the correct voltages are applied to the seat encoders 1301. In operation, the seat encoder gated data forward information is fed through the transistor Q2000 and sent from its collector into a 3-input NAND gate N2001. When transmitting in the forward direction the FWD input is a high and the return (RTN) input will be a low. The receive-forward output for the seat encoder 1301 from FIG. 19 is applied at the receive-forward seat encoder input point in FIG. 20 and provides a high to enable the gate N2001 at this time. Therefore, since all three inputs are high, on the forwarding of data periods, the NAND N2001 inverts the signal and provides output at the data-to-data register output point.

Figure 21:
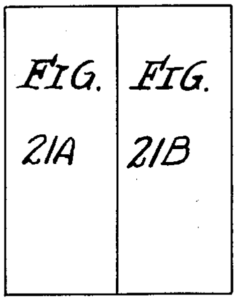
FIG. 21 is composed of FIGS. 21A and 21B taken in side by side relationship with FIG. 21A to the left and FIG. 21B to the right and illustrates in logic and schematic diagrammatic representation the logic unit of the section timer/decoder of FIG. 18.

Now refer to FIG. 21. FIG. 21 illustrates the logic for the logic unit 1810.

Assuming that the data output from the data-to-data register line in FIG. 20 is left data, it is applied at the input to NAND N2101 (FIG. 21).

Refer back to FIG. 20. The data sent through the I/O buffer are the various signals illustrated in the seat encoder timing diagram of FIG. 14.

In the return mode (every other cycle of interrogation) the I/O buffer unit 1811 is in the return mode to permit data to be transferred from the seat encoder 1301 toward the timer/decoder 142. In the return mode, the gate N2002 will be enabled. This circuitry of the seat encoder gated data back circuit is essentially the same as the circuitry for the seat encoder gated data forward circuit. This will not be described in detail. The output of receive return seat encoder illustrated in the lower right hand corner of FIG. 19 will be applied at the receive-return seat encoder input and provides a high at one input of the return gate N2002. In the return mode, the RTN input signal to gate N2002 is also a high and the data line coming through gate N2002 is inverted and appears at the data-to-data register output point. The gates N2001 and N2002 are connected together so that regardless of the direction the data is sent between the seat encoder 1301 and section timer/decoder 142 the data appears at the same output point upon output data-to-data register points.

The strobe output from the flip flop 1843 and 1844 illustrated in the strobe delay circuit 1833 of FIG. 18 is utilized to start the timing pulse unit 1813. This is one of the three ways of restarting the system timing.

Refer to FIG. 15. The gated data forward strobe out pulse is generated within one of the seat encoder units 1301 and applied at a time when data is not being transmitted on the lines 1311 and 1313. Assume that the data is being transmitted on the line 1311. The strobe pulse from the previous seat encoder unit 1301 applies to the seat encoder gated data back line 1313 as shown on the left hand portion of FIG. 20. This strobe is level shifted in the level shifter 2005b and is applied along the signal line 2006 to the forward NAND gate N2003. At this time the forward input is high assuming that transmission is occuring on line 1311 in the forward direction. Also the third input to NAND gate N2003 is high because of the receive return seat encoder input signal which is received from the timing pulse unit 1813 illustrated in FIG. 19 and shown generated in the lower right corner. The middle input of NAND gate N2003 is high at the "strobe out to next unit" time. This causes NAND gate NAND 2003 to provide an output which is fed through NAND gate N2004 and provides the "strobe from last unit " output signal.

Where the system is in the return rather than the forward mode the strobe occurs on the other line 1311 and after passing through the level shifter it will apply a high strobe signal at the center input line shown to NAND gate N2005. At this time the return signal is at a high and the receive forward seat encoder line is also at a high so that the strobe signal is transmitted through NAND gate N2004 to provide the strobe from last unit output required for restarting the clock sequence. That is, the strobe from last unit signal restarts the entire signal sequence in successive seat encoders 1301 going in the forward or in the backward direction as required. The overhead decoder 140 corresponding to the seat encoder 1301 directly below it is required to provide a strobe at the same time the strobe is provided by its seat encoder unit 1301. This is received by the unit 2000 and an output appears at line 20036 which corresponds to the strobe from last unit output of the seat encoder column. The output lines 2003*a* and 2003*b* are wired together and both are required to be highs in order to get an output at the summing point 2003 which output indicates reception of the strobe from the last unit in the column. This output is fed into the discrete strobe delay circuit 1833 on the line specifically into the flip flop 1844. Similarly, the flip flop 1843 will receive the corresponding strobe input from the right column I/O buffer 1831 (not illustrated in detail). The flip flops 1844 and 1843 of FIG. 18 delay the strobe pulse one time period and then feed it into the timing pulse unit 1813 to start the count tming. Thus the strobe pulse which is generated at time 18 of the last encoder and decoder and is delayed to time 19 by the strobe delay circuit 1833 is delayed another bit time in flip flops FF1901 and FF1902 of FIG. 19. The timing pulse unit of FIG. 19 generates on line 1903 a "strobe out to first unit " pulse which is received by the column I/O buffer 1831 as illustrated in FIG. 20 at the input line "strobe out to first unit."

This input is applied as a high to NAND gate N2007 causing a low output from this gate. This output is applied to the K input of Flip Flop FF2001 and its inverse is applied to the J input of Flip Flop FF2001 through NAND gate N2008. The clock-H input is generated by the action of the common clock output (See FIG. 19) and is applied to Flip Flop FF2001. At this time, the strobe out to first unit pulse is caused to appear at the $\overline{Q}$ out of Flip Flop FF2001 and is applied as a low to the top input of NAND gate N2009. At this time the other input of NAND gate N2009 is a high. This causes the output of NAND gate N2009 to be a high. That is, it is sufficient for one of the inputs to be a low to insure that the output is a high. This causes transistor Q2003 to be in the OFF state thereby causing transistor Q2001 to be in the OFF state. At this time the $\overline{Q}$ output of flip flop FF2001 is also applied as a low to the input of NAND gate N2010. The output of NAND gate N2010 is tied to the output of NAND gate N2011. In order for this common tie point to be a high it is necessary that both individual gates would have a high output if they were not tied together. At this time this condition is satisfied and the common tie point is a high. This high is applied to the base of transistor Q2002 causing Q2002 to be on. This causes the seat encoder gated data forward line to be at ground level which is interpreted by the first seat encoder unit 1301 as the strobe level. This starts the count in the first seat encoder 1301 and corresponding overhead decoder 140. Similarly, on strobing in the backward to forward "daisy-chain" direction, the $\overline{Q}$ output of flip flop FF2001 is applied to the top input of NAND gate N2012 and also to the input of NAND gate N2013. The outputs of these gates are applied to the 2005*b* section of FIG. 20 in a manner similar to that described in conjunction with the generation of a strobe in the forward direction. This signal is then transmitted on the gated data back line to the last of the seat encoders 1301 along line 1313 which starts the timing count of the last seat encoder 1301 of the column and its corresponding overhead decoder 140.

Refer now to the "commands to unit" signal shown in the upper right hand corner of FIG. 20. This input is involved in the self-test system of the present invention. The seat encoder 1301 commands to the various units are generated (see FIG. 19) during counts 14 through 18 (see also FIG. 14). The "commands to unit" signal is applied to NAND gate N2014. The output of NAND gate N2014 is tied to the output of NAND gate N2007 and proceeds through the logic of FIG. 20 in a manner substantially identical to that described for the strobe out to first unit signal. If a logic 0 is being transmitted, the $\overline{Q}$ output of flip flop FF2001 is a high. This is applied to the top input of NAND gate N2009. The other input of NAND gate N2009 is also a high at this time. This causes the output of NAND gate N2009 to be a low. This low is applied to transistor Q2003 and causes this transistor to be on. This in turn causes transistor Q2001 to be on, such that its collector is at a substantial +15 volt level. At the same time the output of NAND gate N2010 is a low. This low is applied to the base of transistor Q2002 turning it off. The substantially +15 volt level applied to the seat encoder gated data forward line is applied to the particular seat encoder unit 1301 which at the time is being interrogated. In a similar fashion, the data may be sent through the return circuit by being sent on the line 2051 through the NAND gates N2012 and N2013 and through the transistor circuit 2005*b* where the proper levels are provided for the seat encoders 1301 and the signal is sent on the seat encoder gated data back line 1312.

In the times 8 through 17 (see FIG. 17) the overhead decoder 140 data signals must be sent. In order to do this, the signal generated in the data register 1812 (see FIG. 18) not as yet described is applied through the left column I/O buffer 1811 and thence into the overhead data line 131. This data is sent over the overhead decoder commands to unit line 2004 which goes through the left hand column I/O buffer 2000 and out through the data line 1313 in a manner similar to that described for the corresponding left hand seat encoder column line.

The structure and operation of the left and right column I/O buffer units 1811 and 1831 in the section timer/decoder 142 have been described.

Now refer to FIG. 21. FIG. 21 illustrates the logic unit 1810 illustrated in block diagrammatic form in the section timer/decoder 142 of FIG. 18. In the upper left hand section of FIG. 21 there is illustrated the logic for the right and left master call circuits which are substantially identical. Therefore only the right master call circuit will be described. The logic unit circuits 1810 illustrated in FIG. 21 provide the signals required for the respective left and right master call light 145 turn on buffers 1807 and 1808 (see FIG. 18).

As illustrated in FIG. 14, the call signals initiated by the passengers are transmitted by the respective seat group units during the timing count periods 5 and 6. Assume that the system is in the double column mode. That is either two outboard or two inboard columns are being serviced by a single section timer/decoder 142.

If a passenger initiates a group call either at time 5 or time 6, the appropriate master call light 145 is required to be lighted.

Refer to FIG. 13. Data from call buttons at the passenger control units 150*a,* 150*b* or 150*c* respectively, appear at time 5 or time 6 correspondingly on the line 1311 and are sent to the section timer/decoder 142. This data goes through the right column I/O buffer 1831 and provides the right data input (FIG. 21) to NAND gate N2101A. This data goes through the ensuing gates (not numbered) and on the line 2100 where it actuates the NAND gates N2102 and N2103 if at count time 5 or 6 the data is at logic 1. In response to the group call initiated by the passenger, the corresponding NAND gate N2102 or N2103 provides a low at its output which is passed through the subsequent gate in the line N2104 and clears the flip flop FF2101.

Upon pressing of the button by a first passenger to turn on the master call light 145, it is desired not to turn off the master call light 145 of the particular column upon resetting of the button by the stewardess unless no other passenger is also requesting a call. The circuit of logic unit 1810 of FIG. 21 provides this function by requiring that two "strobe out to first unit" signals occur for the master call light 145 of the particular column to be turned off.

Refer again to FIG. 21. At the count of 5 or 6 as appropriate in accordance with the particular passenger calling and in accordance with the timing diagram of FIG. 14 the NAND gate N2103 or N2102 is respectively enabled. This causes the NAND gate N2104 to clear the flip flop FF2101 and to set the flip flop FF2102 to turn on the right master call light 145 via the right master call signal applied to the right master call light turn on buffer 1808 illustrated in FIG. 18. This causes the right master call light 145 to go on. Upon servicing by the stewardess each successive "strobe out to first unit" input signal when all of the seat groups in the seat column have been interrogated will set the flip flop FF2101. However, before the next "strobe out to first unit" can occur, a count 5 and count 6 will again occur in another of the seat encoders 1301 and the flip flop FF2101 will again be reset if another passenger in the column requests a call. This will keep the flip flop FF2102 set and keep the right master call light 145 on.

Assume the stewardess comes to the particular seating group, renders the service and resets the call switch at the seat group to show that service has been rendered. A strobe output then occurs which sets the flip flop FF2102. However, the call button has been reset. This causes the call to not occur at count times 5 and 6 for this particular unit. Therefore the flip flop FF2101 will not be reset on the next timing cycle of that particular seat group unit where the call arose. Therefore, if there are no other calls in any other seat encoder unit of the column, the second "strobe out to the first unit" occurs after all seat group units in the column have been interrogated. This, in turn, will be transmitted to NAND gate N2105. With the flip flop FF2101 in set condition, NAND gate N2105 has the output from Q in a continuously high condition and therefore NAND gate N2105 causes flip flop FF2102 to become reset. Resetting of flip flop FF2102 turns off the right master call light 145.

Since the left master call works similarly, this circuit will not be described. In the one column service case, the count 5 circuit is disabled for the right master call circuit so that the data is only looked at at the count 6 period. In the left master call case, the opposite occurs. That is, only the count 5 data is sampled and the other circuit is disabled.

Refer to FIG. 14. The chime is initiated at time 7. The data stream is examined therefore at time 7 to see if a chime should be initiated. Taking the right data, for example, since the left data is identical, the data is applied from the right data line through NAND gate N2101A and the ensuing NAND gates to actuate NAND gate N2106. At time 7 the J1 input to NAND gate N2106 will be a high. If the data at that time is a high a chime should be instituted and NAND gate N2106 will have a low output. This low output is applied to the collector of transistor Q2101. The application of a low pulse to the collector of transistor Q2101 is coupled through capacitor C1801 to the base of transistor Q2102. This turns off transistor Q2102 during the time period determined by the time constant of the integrating circuit comprising capacitor C1801 and resistor R2101. Turning off of transistor Q2102 causes +5 volts to appear at its collector. The +5 volts are fed back through transistor Q2101 to maintain the circuit on by feedback through capacitor C1801 to the base of transistor Q2102 for the entire time constant period. Thus although a momentary pulse is applied from the NAND gate N2106 the circuit is on for the full time constant period which is approximately 1 second. The pulse generated at the collector of transistor Q2102 is inverted in the inverter Q2103 which causes a chime signal output for a duration of 1 second. The chime output from transistor Q2103 of FIG. 21 is applied to the chime buffer 1809 (see FIG. 18) to cause the chime to go on for the duration of the signal.

Refer to the left and right circuits at the lower portion of the logic unit 1810 illustrated in FIG. 21. The left data and right data channels are substantially similar. Therefore only the left data circuit will be described.

Refer to FIG. 17. In the overhead decoder 140 there is only one group call. That is, upon pressing of the call button for service by any of the three passengers in a seat group, only one overhead decoder 140 group call light 1303 need be put on to let the stewardess know that one of the passengers in that seat group is requesting service. The circuit illustrated in the lower left hand portion of the logic unit 1810 (FIG. 21) combines the group call 1 and the group call 2 and 3 signals at times 5 and 6 illustrated in the seat encoder timing diagram of FIG. 14 and causes either one of the group call signals to provide an output at time 6.

In this circuit, at times other than times 6 (see the seat encoder timing diagram of FIG. 14) the data goes directly through the circuit without time delay (but however with inversion). Therefore, at times other than count time 6, the data is applied through NAND gates N2107, N2108, and N2109 and the output is transferred to the left data register 1812 (FIG. 18) to be described. At time 6, the $\overline{\text{count 6}}$ pulse is applied to NAND gate N2108 to disable the NAND gate N2108 at time 6. The data is not forwarded to the left data register 1812.

If a group call signal is initiated either at time 5 or count time 6 (FIG. 14) it is desired that a 1 appear at the data to left data register output of the NAND gate N2109.

Consider the case of time 6. The logic 0 due to the group call signal being initiated at time 6 is applied to NAND gate N2110 from the left data channel. This produces a logic 1 at the output of NAND gate N2110 which is applied at one of the inputs to NAND gate N2111.

Simultaneously, at count time 6 the other input to NAND gate N2111 will also be a 1 which will cause a low output. This low or 0 output is applied to NAND gate N2109 to provide a 1 output at the "data to left data register" line. Thus, if there is a group call at count time 6, the corresponding data appears in the left hand register.

Consider the case of time 5. At time 5, the 1 at the left data input is applied to and sets the flip flop FF2103 to an output 1 condition. This causes the $\overline{Q}$ output of flip flop FF2103 to be a low output which causes a 1 or high output at the NAND gate N2110 since if either of its inputs is a low the output is a high.

Because of being stored in the flip flop FF2103 which is set to the $\overline{Q}$ output state, the 1 remains at the input to NAND gate N2111 so that on the pulse output at count 6 at the other input to NAND gate N2111 its output will go to a low or 0 state. As in the case of count 6, this low input is applied to the NAND gate N2109 to provide a 1 output at the data to left data register to indicate a call condition and to cause the call light 1303 in the overhead decoder 140 to light.

The right data column is identical so that the action is the same for the right channel or other seat group columns serviced by the section timer/decoder 142. If only one seat group column is serviced by the timer 142, then the data is applied from the left data channel (the only seat group column connected) through the NAND gate N2112 and directly into the NAND gate N2113. This causes the data to go into the right data register 1820. In that case, the data in the left data register would be the same as the data in the right data register.

Where two columns are serviced by the section timer/decoder 142, only the overhead decoder 140 of the column which has initiated the call has its call light turned on whereas when one column only is serviced the lines are tied together.

Refer to the circuit of flip flop FF2104 shown in the right hand central portion of logic unit 1810. This circuit causes the data to alternately go in the forward and backward directions within a column of seat groups. Every time the strobe-out pulse is applied to the first unit to start a seat column scan, the flip flop FF2104 changes state. In the "one" state, the flip flop FF2104 enables the lines to the encoders 1301 successively going toward the rear of the section and in the reset state, the flip flop FF2104 enables the lines to the encoders 1301 successively going toward the front of the section.

An optional feature may be provided such that the daisy chain or return path cycling is not provided. This is afforded by permitting a forward only signal to be applied. This is implemented by a special operator set switch which may be located in the test panel unit 170 and which sets the K input at a permanently low state such that the flip flop FF2104 remains in the forward signal output state. This is utilized in conjunction with the self-test circuits so that on going in the forward mode it may be observed, when in the "all call lights on" or "all reading lights on" mode, which reading lights or call lights are lit. If lights are lit only back to a certain seat, this indicates to a trouble shooter that either the line to the following rearwardly disposed seat group units or a seat group unit itself is defective. The logic circuit illustrated in the center including NAND gate N2114 which provides an output J1 and NAND gate N2115 which provides an output F1 provides the special clock signals for respectively enabling the chime circuit and the flip flops FF2103 and FF2105. These clock signals initiate the signals which cause the enabling at count 5 of flip flops FF2103 and FF2105 and allow the chime signals to be sent through the chime timing circuit. As the clock pulses are applied into the NAND date N2116, they provide an output at K1 which is the inverse clock input required for the master call logic. Upon being inverted in the NAND gates N2117 and N2118 the output is again a positive clock pulse which is utilized for the right flip flops FF2101 and FF2102 and the corresponding flip flops (not numbered) in the left master call circuit.

LEFT DATA REGISTER 1812

The format of the data as it is generated in the seat encoder 1301 timing units of the seat column is illustrated in FIG. 14. The format of the data required by the overhead decoder 140 is that illustrated in FIG. 17. The purpose of the left data register 1812 is to convert the format from that of FIG. 14 to that of FIG. 17. The left data register 1812 essentially provides not only the required storage but the required shifting such that the data which is in the seat encoder 1301 timing unit at time 2, for example, will be in the overhead decoder unit 140 at time 8. At time 8 the reading light 1 data corresponding to that initiated from the seat encoder 1301 timing unit at time 2 is put on the line toward the particular overhead decoder 140 being addressed.

Similarly, at time 3 of the seat group encoder 1301 the putting of the reading light 2 data is put on the line toward the section timer/decoder 142 and the reading light 1 signal is read into the section timer/decoder 142 corresponding flip flop (not shown), corresponding to this at subsequent time 9, the reading light 2 data is sent from the section timer/decoder 142 to the proper overhead decoer 140 into which it is read at time 10.

The logic circuit of the left data register 1812 (FIG. 22) accomplishes this function. Refer to FIG. 22. The left column data comes in at the input line marked "left data in" in the format of the seat encoder 1301 timing diagram of FIG. 14. It leaves the left data register 1812 at the "left data out" output line in the format illustrated in FIG. 17.

Figure 23:
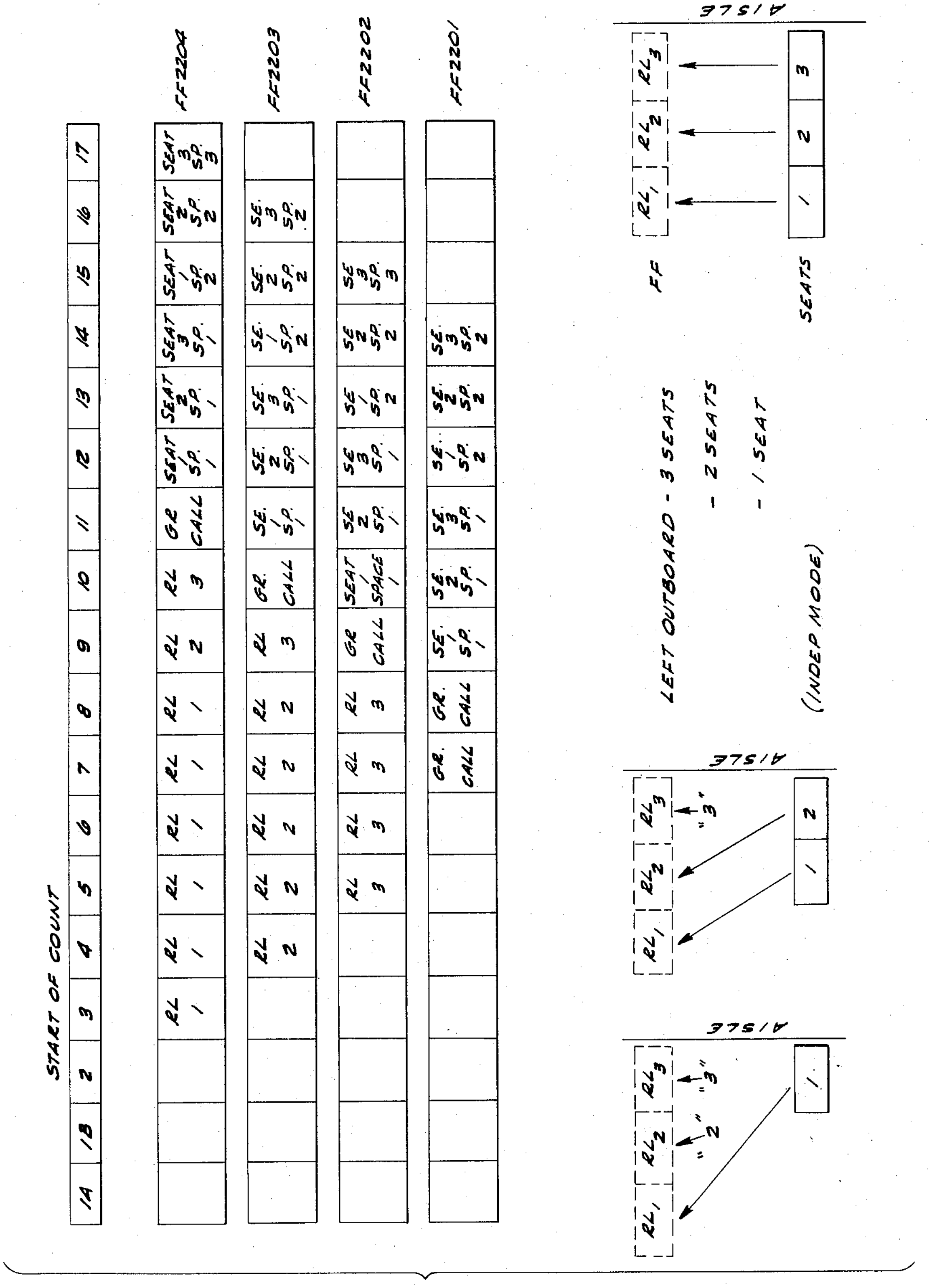
FIG. 23 is a timing and command diagram illustrating the times with relation to the start of count timing pulses of the flip flops in a column and section timer controlling means therefor as illustrated in FIG. 18, the figure illustrating the respective conditions of the flip flops in conjunction with the logic showing reading onto the data output lines and into and out of the flip flops at the various timing counts in response to passenger initiated and self-test service calls in the illustrative embodiment system of FIG. 1.

Refer to FIG. 23 in conjunction with FIG. 22. Take the reading light 1 command for example. This "reading light 1 on" command is initiated by the passenger in depressing the passenger control reading light button (seat 1). Upon depressing of this button, the timing signal is initiated in the seat encoder 1301 at count time 2. At time 8 the reading light 1 data is sent from the section timer/decoder 142 to the corresponding overhead decoder 140. As illustrated in FIG. 17, at time 9 of the overhead decoder 140 timing, (which corresponds to time 9 of the seat encoder timing) the reading light 1 command data is read into the overhead decoder 140.

As shown in FIG. 22 this data in the left data register 1812 (assuming a left seat group) is inserted at the left data in input line.

As illustrated in FIG. 23, at time 3 the reading light 1 signal has been read into flip flop FF2204 the left data register 1812 of the section timer/decoder 142 (see FIG. 18 and FIG. 23). This is illustrated by the flip flop states at the particular timing sequence as illustrated on the flip flop FF2204 progressive flip flop command containing diagram of FIG. 23. The logic illustrated in FIG. 22 inhibits the flip flop FF2204 from changing state until count 8. As shown in FIG. 23, the flip flop FF2204 therefore is in the reading light 1 command set state throughout this time period from time 3 when the data was inserted until the end of time 8. Similarly, the reading light 2 request is initiated by pressing the button in seat 2 of the particular passenger control unit. This causes the reading light 2 data (see FIG. 14) to be placed on the line toward the section timer/decoder 142 at time 3 and to be read into the section timer/decoder 142 at time 4 (see FIG. 22-left data in). The reading light 2 data is read into flip flop FF2203 (see FIG. 22). The logic circuit of FIG. 22 inhibits flip flop FF2203 with the reading light 2 data contained therein during time count periods 4 through the end of 8. At time 9 this reading light 2 data is transferred into flip flop FF2204 and read out at the left data out output line (see FIG. 23).

Similarly, as illustrated in FIG. 23, the reading light 3, group call, seat 1 spare 1, seat 2 spare 1, seat 3 spare 1, seat 1 spare 2, seat 2 spare 2, and seat 3 spare 2 signals are at the appropriate times illustrated in FIG. 14 read into the left data register 1812 of (see FIG. 18) the section timer/decoder 142 and the logic of the left data register 1812 (FIG. 22) causes the flip flop FF2204 to contain this data at the appropriate times illustrated in the overhead decoder timing chart of FIG. 17. This left data is read out on the left data out-line (FIG. 22) from the left data register 1812 (see FIG. 18) into the column I/0 buffer 1811 and thence into the cable to the overhead decoders 140 such that it is read into the overhead decoders 140 at the timing periods indicated in FIG. 17.

The individual logic circuits shown in the lower section of the left data register 1812 provides the appropriate timing inputs into the corresponding points of the logic shown in the upper left hand corner of FIG. 22. Timing count inputs are applied to the logic illustrated in the lower portion of FIG. 22 by the ring counter and associated logic-circuits of the units 1816 and 1815 hereinabove described.

One example of the implementation wherein the corresponding flip flops FF2201 through FF2204 are loaded at the appropriate timing counts, data is shifted into the flip flops at the corresponding timing counts and the flip flops are inhibited during corresponding timing counts is illustrated in the table hereinbelow:

SECTION/TIMER DATA REGISTER REQUIREMENTS INDEPENDENT MODE

| | Load Flip Flop | Shift into Flip Flop | Do nothing |
|---|---|---|---|
| FF2204 | Ct. 2 (R.L.1) | Ct. 8 (R.L.2) | Ct. 3. |
| | | Ct. 9 (R.L.3) | Ct. 4. |
| | | Ct. 10 (group call) | Ct. 5. |
| | | Ct. 11 (seat 1, spare 1). | Ct. 6. |
| | | Ct. 12 (seat 2, spare 1). | Ct. 7. |
| | | Ct. 13 (seat 3, spare 1). | |
| | | Ct. 14 (seat 1, spare 2). | |
| | | Ct. 15 (seat 2, spare 2). | |
| | | Ct. 16 (seat 3, spare 2). | |
| FF2203 | Ct. 3 (R.L.2) | Ct. 8 (R.L.3) | |
| | | Ct. 9 (group call) | Ct. 4. |
| | | Ct. 10 (seat 1, spare 1). | Ct. 5. |
| | | Ct. 11 (seat 2, spare 1). | Ct. 6. |
| | | Ct. 12 (seat 3, spare 1). | Ct. 7. |
| | | Ct. 13 (seat 1, spare 2). | |
| | | Ct. 14 (seat 2, spare 2). | |
| | | Ct. 15 (seat 3, spare 2). | |
| FF2202 | Ct. 4 (R.L.3) | Ct. 8 (group call) | |
| | | Ct. 9 (seat 1, spare 1). | |
| | | Ct. 10 (seat 2, spare 1). | Ct. 5. |
| | | Ct. 11 (seat 3, spare 1). | Ct. 6. |
| | | Ct. 12 (seat 1, spare 2). | Ct. 7. |
| | | Ct. 13 (seat 2, spare 2). | |
| | | Ct. 14 (seat 3, spare 2). | |
| FF2201 | Ct. 6 (group call) | | |
| | Ct. 8 (seat 1, spare 1]. | | |
| | Ct. 9 (seat 2, spare 1). | | |
| | Ct. 10 (seat 3, spare 1). | | Ct. 7. |
| | Ct. 11 (seat 1, spare 2). | | |
| | Ct. 12 (seat 2, spare 2). | | |
| | Ct. 13 (seat 3, spare 2). | | |

For the single column mode the following operations are performed by the logic of FIG. 22:

SECTION/TIMER DATA REGISTER REQUIREMENTS—LEFT, INBOARD, SINGLE COLUMN DEPENDENT MODE

| | Load Flip Flop | Shift into Flip Flop | Do Nothing |
|---|---|---|---|
| FF2204 | Ct. 2 (zero) | Ct. 8 (R.L.1) | Ct. 3. |
| | | Ct. 9 ( ero) | Ct. 4. |
| | | Ct. 10 (group call) | Ct. 5. |
| | | Ct. 11, (zero) | Ct. 6. |
| | | Ct. 12 (seat 1, spare 1). | Ct. 7. |
| | | Ct. 13 (zero) | |
| | | Ct. 14 (zero) | |
| | | Ct. 15 (seat 1, spare 2). | |
| | | Ct. 16 ( ero) | |
| FF2203 | Ct. 2 (R.L.1) | Ct. 8 (zero) | Ct. 3. |
| | | Ct. 9 (group call) | Ct. 4. |
| | | Ct. 10 ( e o) | Ct. 5. |
| | | Ct. 11 (seat 1, spare 1). | Ct. 6. |
| | | Ct. 12 (zero) | Ct. 7. |
| | | Ct. 13 (zero) | |
| | | Ct. 14 (seat 1, spare 2). | |
| | | Ct. 15 (zero) | |
| FF2202 | Ct. 14 (zero) | Ct. 8 (group call) | Ct. 4. |
| | Ct. 11 (zero) | Ct. 10 (seat 1, spare 1). | Ct. 5. |
| | Ct. 3 (zero) | | Ct. 6. |
| | Ct. 9 (zero) | Ct. 13 (seat 1, spare 2). | Ct. 7. |
| | Ct. 12 (zero) | | |
| FF2201 | Ct. 6 (group call) | | Ct. 7. |
| | Ct. 8 (seat 1, spare 1). | | Ct. 9. |
| | Ct. 11 (seat 1, spare 2). | | Ct. 12. |

Figure 24:
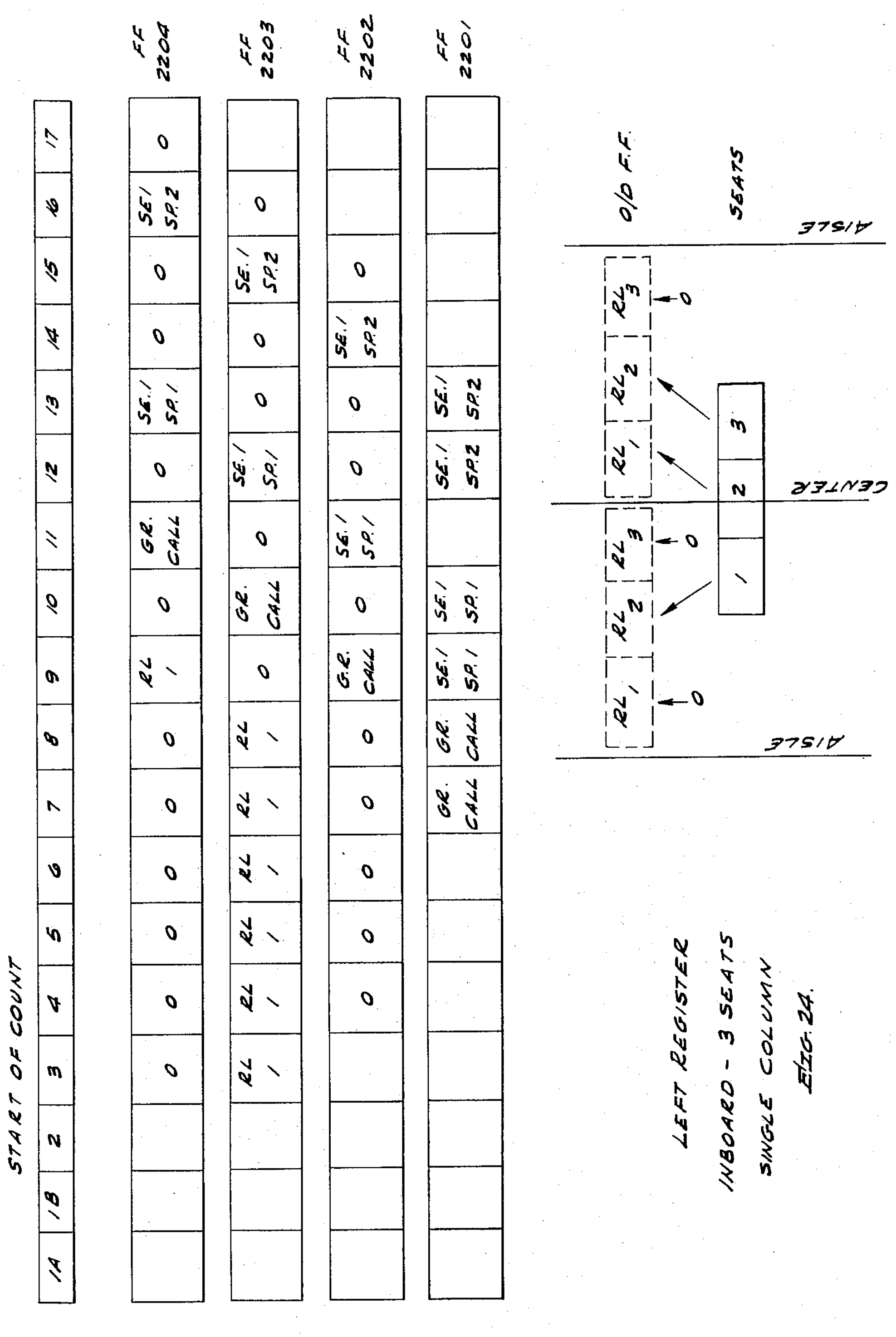
FIG. 24 is a diagram illustrating the start of count and corresponding actions of the flip flops in the overhead decoder for the left register inboard command generated in the single column control by a section timer/decoder of FIG. 18 and illustrating the conditions of the respective flip flops for the left register operating in this mode.

Now refer to FIG. 24. FIG. 24 illustrates the variation of the illustrative embodiment wherein a section timer/decoder 142 services a single column and as described hereinabove, the data is shifted into the appropriate flip flops FF2201 through FF2204 at the times indicated in FIG. 24.

Figure 21A:
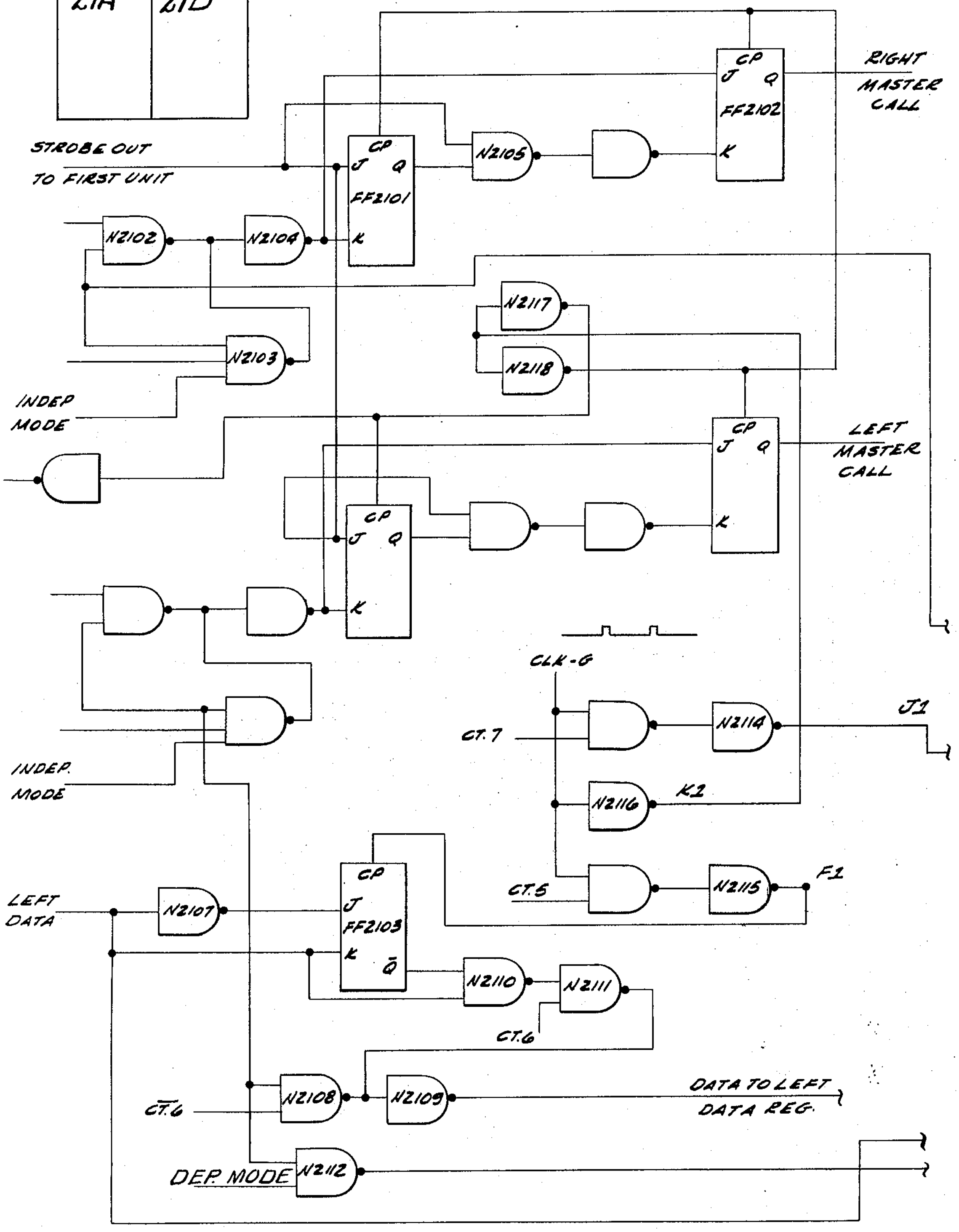
Figure 21B:
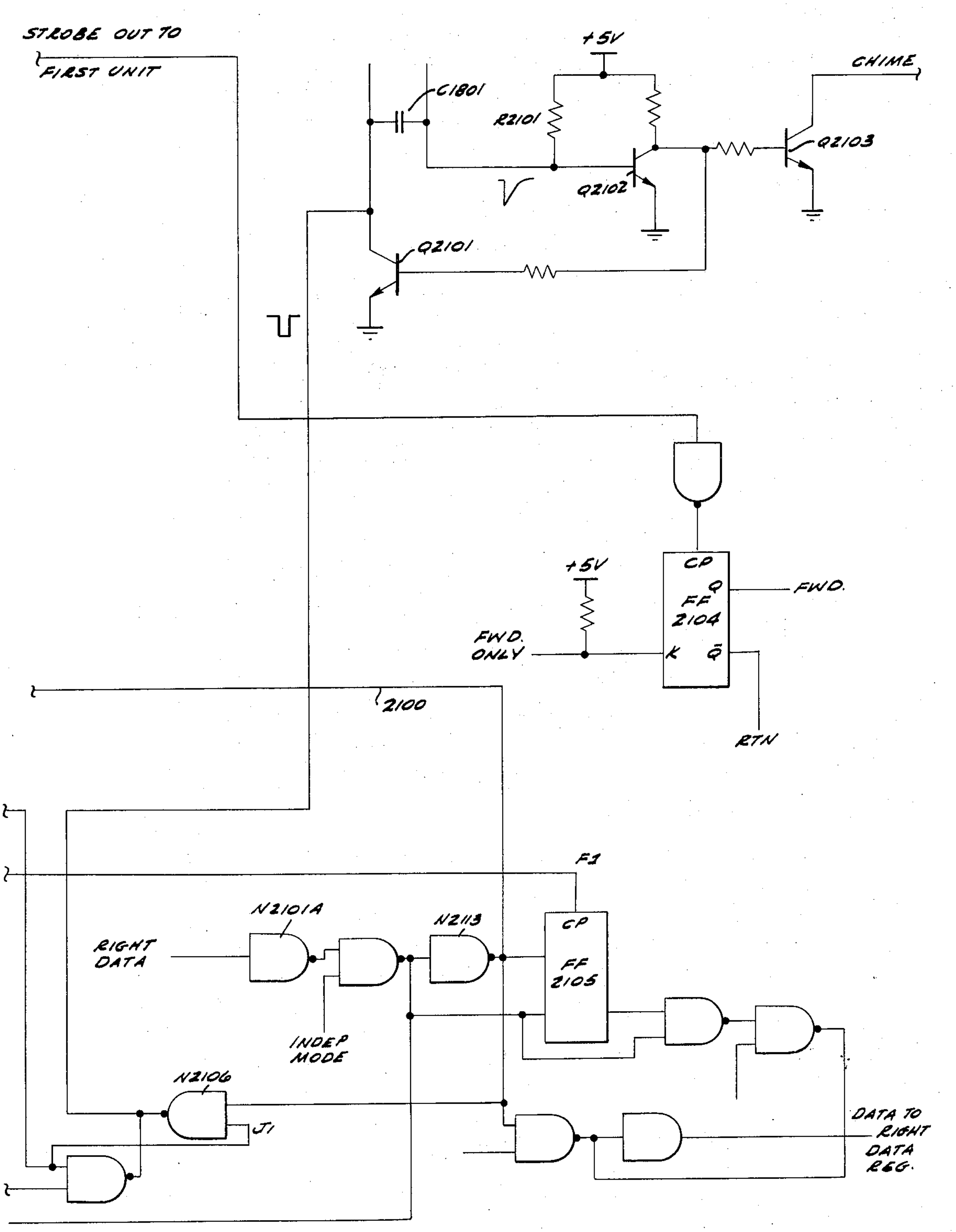

Refer to FIG. 18. At the input connector 1804 the dependent signal is introduced at the mode input. The absence or presence of a seat column cable (not shown) connected to connector 1804 determines the mode of operation of the section timer/decoder 142. In the mode wherein the section timer unit operates a single column of seat groups, there is no cable shorting the mode and mode RTN inputs. The cable is placed into the connector and shorts the mode and mode return lines of connector 1804 when the section timer/decoder 142 services two columns of seat groups. This mode signal causes the logic of FIG. 22 to operate either as illustrated in FIG. 23 wherein two groups are serviced or as illustrated in FIG. 24 wherein a single column of seat groups is serviced. This signal also affects the operation of the logic correspondingly in the timing pulse unit 1813 illustrated in FIG. 19, and in the logic unit illustrated in FIG. 21A and FIG. 21B. As illustrated in FIG. 14 this signal is sent to the seat encoder 1301 for the common aisle lights command and is read into the seat encoder at times 18 and 19.

A simple inverse signal is employed for operation in the independent mode and is introduced into the Q2602 to turn on. On turning on, the transistor Q2602 causes an output at its collector to be applied at the clock line output.

Refer to FIG. 18. The output from the FIG. 26 clock line is applied to the collector of transistor Q1801 of FIG. 18. The emitter of transistor Q2602 provides a clock control output which is applied to the base of transistor Q1801 of FIG. 18. Therefore, with the clock input to transistor Q2601 at the ground level, transistor Q1801 is turned on. Turning on of transistor Q1801 causes the substantially −15 volts at its emitter to also appear at its collector. Therefore the clock output to the various units at this time is at −15 volts. Thus the −15 volts required at the seat encoders 1301 and overhead decoders 140 serviced by a respective section timer/decoder 142 are provided. Thus the ground of the clock input pulses from the oscillator provides the −15 volts required for clock pulse voltage at these various units. In the +5 state of the oscillator clock input to the circuit of FIG. 26, transistor Q2601 is cut off. This turns off transistors Q2602 and Q1801 (see FIG. 18). This causes ground to be applied through resistor R2601 and the diode D2601 to the clock line, therefore causing the clock line output from transistor Q1801 to be at ground level. Therefore, the clock pulse input which was between 0 and +5 volts is inverted by the circuit of FIG. 26 and also causes level shifting between −15 and ground voltage respectively.

Figure 26:
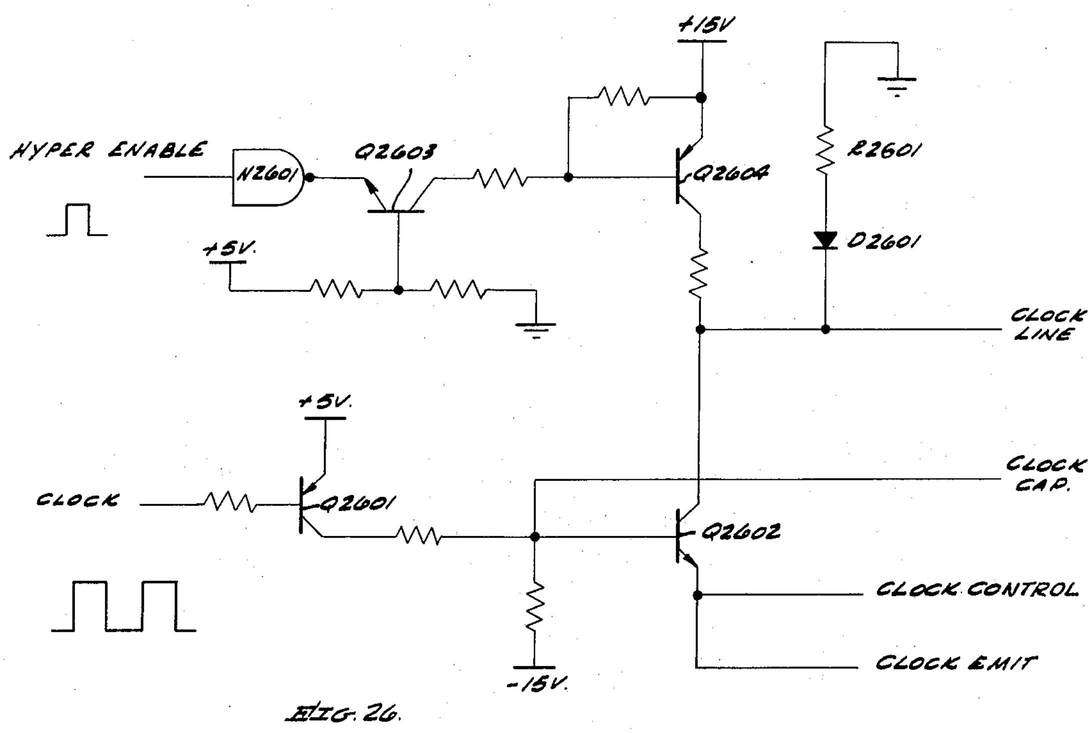
FIG. 26 is a schematic and logic diagrammatical representation of the clock buffer portion of the register and clock buffer circuit of the section timer/decoder of FIG. 18.

The normal clock operation of the FIG. 26 circuit and hence of the output of the register and clock buffer unit 1820 has been described. However, at the beginning of each of the cycles wherein are interrogated all successive seat encoders 1301 and successive corresponding overhead decoders 140 a hyperpulse is required. At this time, the hyper enable signal which appears at the output line 1905 illustrated in FIG. 19, the timing pulse unit 1813, appears at the input to NAND gate N2601. At the time when the hyper enable pulse is at +5 volts, the output of NAND gate N2601 is zero. The zero output of NAND gate N2601 turns on transistor Q2603 which turns on transistor Q2604. Turning on of transistor Q2604 causes the +15 volts at its emitter to be also applied at the clock line output. This puts a +15 volts on the output line of the register and clock buffer unit 1820 which sends the hyperpulse out to the seat encoders 1301 and overhead decoders 140. Synchronization is thus provided since the hyperpulse is applied from transistor Q1801 to all seat encoders 1301 and overhead decoders 140 units simultaneously. The hyperpulse is sent out at the beginning of each column cycle going from the section timer/decoder 142 to the columns of overhead decoder 140 and seat encoder 1301 units such that the hyperpulse causes each of the units 1301 and 140 to look for a strobe pulse. The strobe pulses are sequentially provided to the first corresponding units of these enumerated FIGS.

Figure 25:
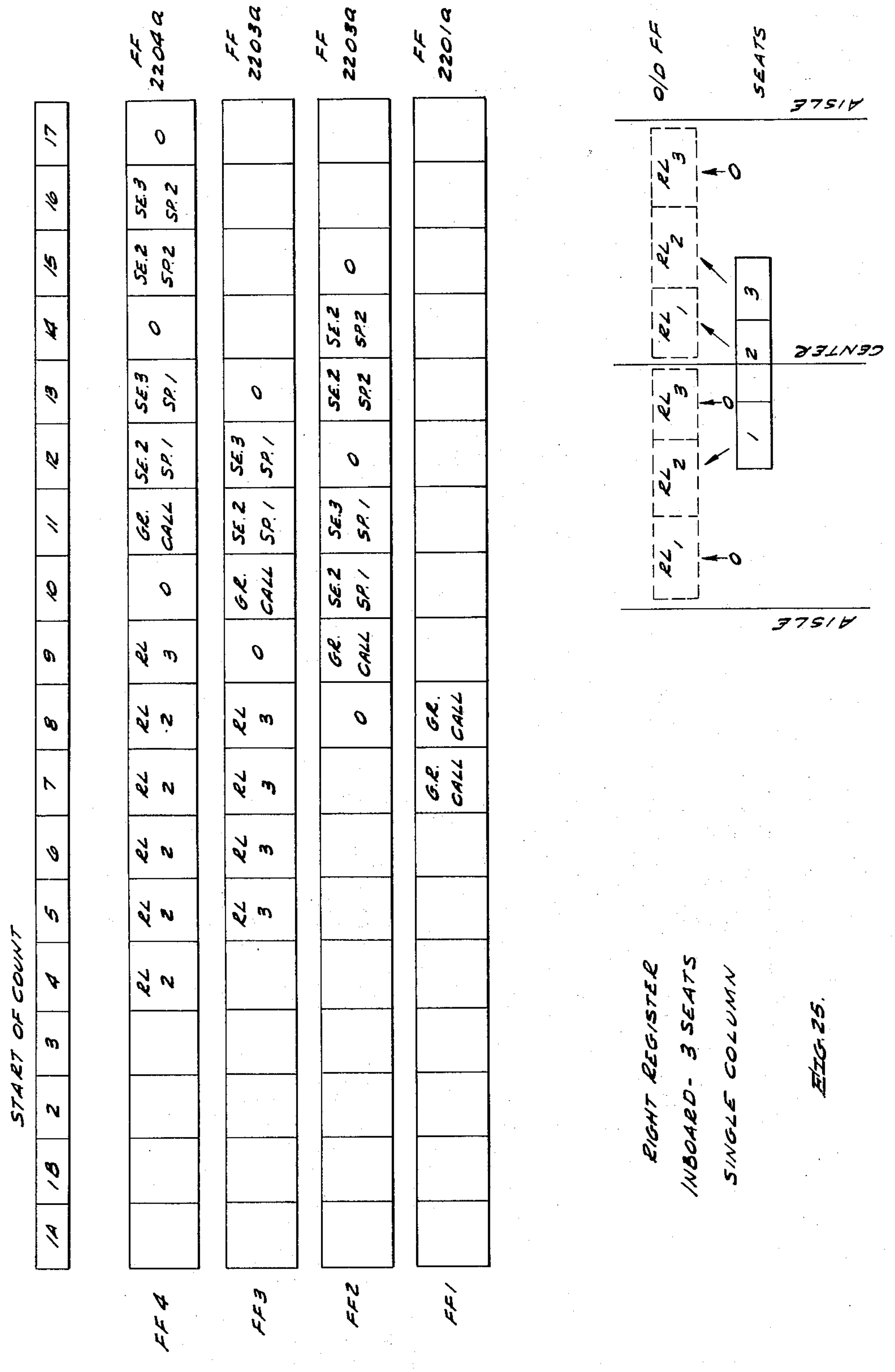
FIG. 25 is a diagrammatic timing and flip flop state representation similar to the representations of FIGS. 23 and 24 for the right register of the section timer/decoder of FIG. 18 in controlling the inboard for the illustrative example of a single column wherein there are three seats in the seat encoder units of the column.

Refer to FIG. 25 in conjunction with FIG. 18. FIG. 25 illustrates the timing of the right data register portion of the register and clock buffer circuit 1820, for the single column mode. The register circuit is not shown since it is substantially identical to the register circuit of the left data register 1812 illustrated in FIG. 22.

The operation of the left data register 1812 is that illustrated in FIG. 23 and as described hereinabove when operating in the independent (two-column) mode. For the single (one-column) mode which is the dependent mode, the operation is as illustrated in FIG. 24. The operation of the right register of the right register and clock buffer circuit 1820 of FIG. 18 is identical to the operation to the left data register 1812 illustrated in FIG. 22 and the sequence of operations illustrated in FIG. 23 for the two-column or independent mode and will not be described in detail.

Refer to FIG. 25. The right register circuitry illustrated also in FIG. 22 when in the dependent mode causes the unit to operate as illustrated in FIG. 25.

Refer to FIG. 26. FIG. 26 shows the clock buffer portion of the right data register and clock buffer circuit 1820. The clock pulse input is generated from a conventional 3.5 $KH_z$ generator (not shown) that also applies the timing for the timing pulse unit 1813 illustrated in FIG. 19. When the clock input is at the ground level it causes the transistor Q2601 to turn on. This in turn causes the transistor encoder 1301, thence from the first encoder 1301 to the second encoder 1301 and simultaneously along the overhead decoders 140 to start the respective timing counts within the individual encoder 1301 and corresponding overhead decoder 140 units simultaneously at the appropriate time when responsive to the strobe pulses. On the return cycle the hyperpulse is again sent out to all of the lines such that all of the encoders 1301 and decoders 140 are enabled to look for the strobe pulse which when it occurs enables the last encoder 1301 and corresponding overhead decoder 140 of the particular column. The sequential strobe pulses enable the other seat encoder 1301 and decoder 140 units in the reverse "daisy-chain" direction. Thus the circuit of FIG. 26 permits the restart of the entire column of interrogation in the forward direction and then in the return direction. The three methods of starting the hyperpulse (explained hereinabove) are (1) the last unit interrogated sends out a strobe pulse (2) if count 32 is reached, this starts the hyperpulse, (3) when an open circuit occurs in the seat column system this causes the hyperpulse to be enabled.

In the above description of FIG. 18 through 26, the operation of the section timer/decoder unit 142 of FIG. 18 to provide the necessary output to the seat group encoders 1301 and corresponding overhead decoders 140 and to store the required information which comes from these units at the appropriate times is described.

SELF-TEST OPERATIONS FOR THE SERVICE SYSTEM

The service self-test system involves the selftest panel 170, the section timer/decoder 142, the service portion of the seat group unit 139, the overhead decoders 140 and the various lights including the master call lights 145, the reading lights 155, the overhead decoder group call lights 1301 and the aisle call lights 143. The self-test system is normally operated to check out the system at a time when the passengers are not present. The passenger service system is usually tested before testing the entertainment system. In the self-test panel 170 a switch 2571 is thrown to turn on all of the reading lights 155. If all of the reading lights 155 responsively turn on, it is established that the reading lights 155 can be turned on. If any one of them remains off, it is individually serviced. Next, all of the reading lights 155 are turned off and it may be observed whether any reading lights 155 remain on. This checks out the reading light 155 system. In the illustrative embodiment system, either a momentary type switch may be provided to turn the lights on and off or a latching switch may be provided. The self-test "all reading lights on" switch is a three-position switch which may in "on," "off" or "normal" position. In normal position the reading lights are under the passenger's control. In the on and off positions, the reading lights 155 are under the control of the self-test unit. If a momentary passenger reading light switch is being used, upon throwing of the toggle switch 2571 to "on" condition, all of the lights will turn on. Upon going to the center or normal position, the momentary lights do not return to the state in which they were in before the turn on test occurred. In the case of the latching type of reading light switch embodiment, upon putting the "all reading lights on" switch 2571 into "on" position, the lights all turn on and upon replacing to the normal position or center position, the lights return to the condition they were in before the test. It should be understood that some of the lights may have been on before the "all reading lights on" test ensued. In the "reading lights off" position, for the momentary switch embodiment, all of the reading lights turn off and if any of the lights are observed not to turn off, obviously the associated unit is at fault. In the case of the latching type switch embodiment, upon turning switch 2571 to the off position, all the lights which are operative to turn off do turn off. If any lights remain on, then there is a fault in that particular seat encoder 1301. However, in the case of the latching switches, when the test switch is returned to normal or passenger operable condition, the lights will return to the same condition they were in before the test was instituted.

Refer to FIG. 2. Upon setting the switch 2571 to the "all reading lights on" condition, a signal is transmitted along cable 2573 to the section timer/decoder 142. The signal is transmitted through the section timer/decoder 142 onto the line 1311 to the seat group unit or seat encoder 1301. In accordance with the bit timing of the seat encoders, the "all reading lights on" signal appears on the data line 1311 between the section timer 142 and the first seat group unit 1301 at time 16. At time 17, this data is read into the seat encoder 1301. Refer to FIG. 16. The data is applied through the input/output logic 1603, and into the flip flop 1632 in the reading light logic unit 1606. This input "all reading lights on" signal causes the Q output to go to a 1 state. This clears the reading light flip flops FF1636, FF1638 and FF1640. Clearing of the flip flops FF1636, FF1638 and FF1640 turns on the corresponding individual passenger reading lights 155 outputs. The reading light data is then sent to the section timer/decoder 142 and thence to the overhead decoder 140 as if the passengers had all pressed their respective "reading light on" buttons. The "all reading lights off" signal is initiated by turning the switch 2572 in the self-test panel 170 to "all reading lights off" condition. In accordance with the section timer/decoder 142 timing, this signal appears on the line 1311 at the time 17 of the seat encoder 1301 involved. At time 18 the "all reading lights off" signal will be read into the seat encoder 1301 group. The path through the encoder 1301 as shown in FIG. 16 is identical to the "all reading lights on" command except that the flip flop FF1632 is not enabled at this clock time. Therefore the signal is applied to and enables the "all reading lights off" flip flop FF1633. Due to this data, the Q output of flip flop FF1633 is at a high and is applied through gates N1687 and N1683 to set the respective reading light flip flops FF1636, FF1638 and FF1640. Setting of flip flops FF1636, FF1638 and FF1640 accordingly, turns the reading lights off just as if the passenger had done this at the appropriate time by putting the signal on the data line to the section timer/decoder 142 and at the appropriate times putting the signal into the overhead decoder 140.

Refer to the "all call lights on and off" commands. These are initiated at the self-test panel 170 by respectively setting the switch 2572 to the "all call lights on" to "all call lights off" position.

Assume that in the illustrative embodiment system, only the momentary types of call switches are provided for the passengers. Upon setting the switch 2572 in the selftest panel 170 to the all call lights on position, all of the call lights including the aisle call lights 143, the group call lights 1303, and the master call lights 145 in each section are turned on. After the test has been effected and the switch is returned to normal condition, the lights 143, 1303 and 145 do not return to the condition they were in before the test. Similarly, on flipping the self-test panel switch 2572 to the "all call lights off" position, all of the aisle call lights 143, group call lights 1303, and master call lights 145 are turned off. In this case also since the switches are momentary, the lights do not return to original condition after the test and they have to be separately set if this is desired.

Refer to FIG. 14. The "all call off" signal is enabled by the section timer/decoder unit 142 to be put on the line 1311 at time 15. At time 16, the "all call off" signal is read into the seat encoder (see FIG. 16). This signal takes the same data-in path through the input/output logic 1603 as do the reading light commands but at this time is applied into the call logic unit 1605. For the "all call lights off" signal, as in the case of the "all call lights on" signal, the data is applied through the input/output logic 1603 to the NAND gate N16109. This is the $\overline{\text{data}}$ signal at the output line to the NAND gate N16109 in the call logic unit 1605 at the input to the NOR gate NOR 1661. At clock time 16, the NAND gate N16167 is enabled causing logic 0 to be applied at the corresponding input to NOR gate NOR 1661. At this time, the $\overline{\text{data}}$ input also makes the input along that line a logic 0. During the second half of the bit time 16 the clock input is also a low such that the NOR gate NOR 1661 output is a 1. This output from NOR gate NOR 1661 is applied to the call light NOR gates NOR 16152 and NOR 16157 and produces a 0 at their outputs. This applies a 0 to NOR gates NOR 16160 and NOR 16154. Since the lights are not being turned on, the other input to NOR gates NOR 16160 and 16154 are also 0. This provides 1 outputs at NOR gates NOR 16160 and NOR 16154, which control the aisle call lights as shown in FIG. 16 and hereinabove described. Both the group call 2, 3 (seats 2 and 3) and the group call 1 requests are sent via the multiplexing gate NOR 1601 out of the unit into the section timer/decoder 142 and at the corresponding time they cause the overhead decoder 140 to turn off the overhead decoder group call lights 1303 and the section timer/decoder 142 master call light 145 is turned off, as described in the previous description of the individual passenger call signal upon the stewardess providing the service and switching off the light.

In similar fashion, with the self-test panel switch 2572 in "all call lights on" condition, at time 14 the section timer/decoder 142 applies the signal to the data line 1311 to the encoders 1301 and the signal is transmitted through the encoders 1301 along the data line 1311 into section timer/decoder 142 and overhead decoders 140, causing all of the group call lights 1303 aisle call lights 143, and master call light 145 to be turned on. The reading lights and call lights are the indicators for the self-test of the service system.

The entertainment system self-test portion has been described hereinbefore in conjunction with the description of the entertainment system portion.

Upon throwing the switch 2574 of the self-test panel 170 to "on" position, with the service system in the "all reading lights on" test mode (with switch 2571 in the on position), an appropriate test signal is sent over a cable line to the main multiplexer 120 where the entertainment test is initiated. The main multiplexer 120 transmits a special test pattern wherein all stereo bits are set at 1 to identify the test mode for the submultiplexers 121, 122 or 123 and seat demultiplexers 153. It is not normally possible to transmit this all 1's bit pattern, is reserved only for the special case of self-test. Responsive to switch 2574 or a corresponding switch in the main multiplexer unit 120, being in proper position, a low frequency (approximately 1 Hz) square wave is generated in the self-test unit of the main multiplexer 120 and is transmitted on all channels. This low frequency audio signal is applied through the submultiplexers 121, 122 or 123 and to each of the seat demultiplexers 153 in the aircraft. The presence of this low frequency audio signal at the output of each audio amplifier of a seat unit 139 is sensed by the sensing device in each passenger control seat unit 150 to verify operation of the unit. A "test OK" logic signal is sent from the entertainment portion of each of the seat group units 139 to the service system encoder 1301 of each corresponding seat group unit 139.

Refer to FIG. 16. The PE test input is applied to the reading light output NOR gates NOR 1674, NOR 1678 and NOR 1682, the 1, 2 and 3 reading light output NOR gates. Since the reading lights 155 are first all turned on before making the entertainment test, all three of the inputs of the NOR gates 1674, NOR 1678 and NOR 1682 (without a PE test input signal applied) are in the 0 state. This provides a reading light on command to each of the reading lights 155. With the PE test input signal applied, each of the NOR gates NOR 1674, NOR 1678 and NOR 1682 provides an output to turn off the overhead decoder 140 reading lights 155.

Previous to testing the entertainment system, the reading lights have all been tested and it is known that the reading light circuits are all in good condition or which ones are faulty. Presuming that all have been repaired and are operative upon test, with the introduction of the entertainment system 1 Hz signal test, if any of the lights remain on, this indicates that within the particular seat encoder unit 141 the entertainment system is faulty.

That is, the "test OK" logic signal sent to the service system encoder 1301 of each tested unit is the signal applied at the passenger entertainment test input. This signal overrides the service system reading lights on test (assuming that the service system was kept on "reading lights on" switch position of switch 2571).

In addition, the service test means can test the audio transducers to verify they are not "open." If a transducer is open, the reading lights 155 above its seat group encoder unit 139 will blink at approximately a 1 Hz rate. This was explained hereinabove in conjunction with the PCU circuit 150.

Assume that the test of the seat group units 139 exclusive of the transducers in the passenger control units 150 has been passed. The passenger entertainment test input turns off all of the lights. If there is an electronic failure, the lights 155 for that particular seat group 139 remain on continuously. If there is an open transducer, then the 1 Hz rate test signal is gated by the circuitry into the PE (passenger entertainment) test input line which thereby causes the lights to blink at a 1 second frequency.

While salient features have been illustrated and described with respect to several particular embodiments, it should be readily apparent that modifications can be made within the spirit and scope of the invention, and it is therefore not desired to limit the invention to the exact detail shown and described.

What is claimed is:

1. In a combined passenger entertainment and service system:

- a multiplexed audio distribution subsystem comprising:
  - a main multiplexer for converting a plurality of channels of audio input signals into a single digital bit stream including stereo/mono bits to indicate the presence of stereo signals, and
  - a plurality of demultiplexers for reconverting selected portions of said digital bit stream corresponding to selected channels into audio signals, including stereo signals when indicated;
- a passenger reading light and attendant call service subsystem comprising:
  - a plurality of seat encoders associated with respective ones of said demultiplexers for generating control data in accordance with individual passenger requests, said encoders being serially connected one to another by means of bidirectional gated data switches,
  - a plurality of serially connected overhead decoders for decoding reading light control data and controlling overhead reading lights in accordance therewith,
  - a timer-decoder directly connected to at least one of said seat encoders and to at least one of said overhead decoders for providing timing and control data to said encoders and decoders and for decoding attendant call control data from said seat encoders, and
  - an attendant control panel associated with said timer-decoder for controlling all reading lights and all attendant call lights; and
- a self-test subsystem for testing said multiplex audio distribution subsystem, using said service subsystem for providing a visual indication of test results, comprising:
  - a digital test signal generator,
  - means for converting the output of said test signal generator into a single digital bit stream having a format compatible with said multiplexed audio distribution subsystem, said stereo/mono bits being used to indicate the presence of a self-test signal,
  - means associated with each of said seat encoders for recognizing whether said stereo/mono bits indicate the presence of a self-test signal, for converting (using the circuits of the associated demultiplexer) said self-test signal into an analog self-test signal, and for comparing the amplitude of said analog self-test signal with a predetermined threshold, and
  - means for causing the associated seat encoder to generate appropriate light control data, whereby a visual indication is given by said service subsystem of test results whenever said analog self-test signal amplitude exceeds said predetermined threshold.

2. The combined passenger entertainment and service system of claim 1 wherein said audio distribution system further comprises a pair of audio transducers at each seat location and said self-test subsystem further comprises means for checking the electrical continuity of each transducer pair and means for causing the associated seat encoder to generate distinctive light control data whenever there is a failure in the electrical continuity of said pair.

3. The system of claim 2 wherein said self-test signal is a digitized low frequency squarewave signal and said distinctive light control data causes the flashing of an overhead reading light at said low frequency.

4. The system of claim 1 wherein said stereo/mono bits consist of one bit per channel per sample, said bit in combination with the corresponding bit of the immediately preceding channel giving a total of four states signifying respectively:

a. both channels mono,
b. both channels forming a single stereo channel,
c. self-test mode,
d. public address override mode.

5. The system of claim 4 wherein both self-test mode and public address override mode inhibit the addition of other audio channels into said digital stream, thereby ensuring that all channels carry self-test data or public address data respectively.

6. The system of claim 1 wherein said multiplexed audio distribution subsystem further comprises a plurality of submultiplexers for distributing said digital bit stream and optionally inserting therein digital information representing additional audio inputs including movie audio and public address.

7. The system of claim 6 wherein said movie audio input overrides predetermined audio outputs from said main multiplexer.

8. The system of claim 6 wherein said public address audio is output simultaneously on all channels.

9. In a combined passenger entertainment and service system, a "daisy chain" arrangement for controlling overhead reading lights, said arrangement comprising:

- a timer-decoder,
- seat encoders serially connected one to another for transmitting passenger service request control data via a first gated data line,
- overhead decoders serially connected one to another for receiving said control data via a second gated data line;
- a forward data connection between said timer-decoder and the first of said seat encoders;
- a forward data connection between said timer-decoder and the first of said overhead decoders;
- a backward data connection between said timer-decoder and the last of said serially connected seat encoders;
- a backward data connection between said timer-decoder and the last of said serially connected overhead decoders;

a common clock line connected from said timer-decoder to all of said encoders and decoders;

means within said timer-decoder for alternating between forward and backward cycles initiated by strobe pulses applied to said forward data connections and said backward data connections respectively;

an end-of-frame strobe pulse to a succeeding encoder-decoder pair from the preceding encoder-decoder pair via said first and second gated data lines respectively for enabling said succeeding encoder-decoder pair to transmit and receive control data;

an end-of-cycle synchronization pulse to all of said encoders and decoders via said common clock line for resetting all said encoders and decoders; and means associated with said timer-decoder for detecting a failure.

10. The "daisy chain" arrangement of claim 9 wherein said means for detecting a failure comprises a counter for counting the number of frames within a cycle and a strobe pulse detector for detecting the strobe pulse from the last of said serially connected decoders in a given cycle.

11. The "daisy chain" arrangement of claim 9 wherein said means for detecting a failure comprises a permanent one bit in the control data output of each seat encoder and means for detecting said bit.

12. The "daisy chain" arrangement of claim 9 further comprising means for initiating the start of the next cycle upon the detection of a failure within a given cycle.

* * * * *